(12) United States Patent
Kriesel

(10) Patent No.: US 7,214,128 B2
(45) Date of Patent: May 8, 2007

(54) APPARATUS AND METHODS FOR THE VOLUMETRIC AND DIMENSIONAL MEASUREMENT OF LIVESTOCK

(75) Inventor: Marshall S. Kriesel, Saint Paul, MN (US)

(73) Assignee: Geissler Technologies, LLC, Plymouth, MN (US)

( * ) Notice: Subject to any disclaimer, the term of this patent is extended or adjusted under 35 U.S.C. 154(b) by 87 days.

(21) Appl. No.: 11/045,898

(22) Filed: Jan. 27, 2005

(65) Prior Publication Data

US 2005/0136819 A1    Jun. 23, 2005

Related U.S. Application Data

(62) Division of application No. 10/211,792, filed on Aug. 2, 2002, now Pat. No. 6,974,373.

(51) Int. Cl.
*A22C 17/00* (2006.01)
(52) U.S. Cl. .................................................. 452/157
(58) Field of Classification Search ................ 452/157; 382/100, 110, 312; 119/840, 174, 518; 356/603; 600/587

See application file for complete search history.

(56) References Cited

U.S. PATENT DOCUMENTS

| 5,412,420 | A | * | 5/1995 | Ellis | 348/135 |
|---|---|---|---|---|---|
| 5,483,441 | A | * | 1/1996 | Scofield | 700/90 |
| 5,576,949 | A | * | 11/1996 | Scofield et al. | 702/179 |
| 5,644,643 | A | * | 7/1997 | Scofield et al. | 382/110 |
| 6,377,353 | B1 | * | 4/2002 | Ellis | 356/603 |
| 6,549,289 | B1 | * | 4/2003 | Ellis | 356/603 |
| 6,625,302 | B2 | * | 9/2003 | Kalscheur et al. | 382/110 |
| 6,751,364 | B2 | * | 6/2004 | Haagensen et al. | 382/313 |
| 7,039,220 | B2 | * | 5/2006 | Kriesel | 382/110 |

* cited by examiner

*Primary Examiner*—Thomas Price
(74) *Attorney, Agent, or Firm*—James E. Brunton, Esq.

(57) ABSTRACT

A method for measuring the physical characteristics of livestock animals such as cattle and hogs. The apparatus of the invention includes a plurality of strategically positioned cameras that are used to obtain data concerning volumetric, curvilinear (surface) and linear measurements of livestock animals such as cattle and hogs and the full carcasses thereof. In accordance with the method of the invention, the data is analyzed to provide information that substantially assists the commercial producer of livestock animals in producing a high-quality end product for the consumer while adding profitability to the enterprise.

19 Claims, 88 Drawing Sheets a  2D VIEW b  3D VIEW c  3D VIEW

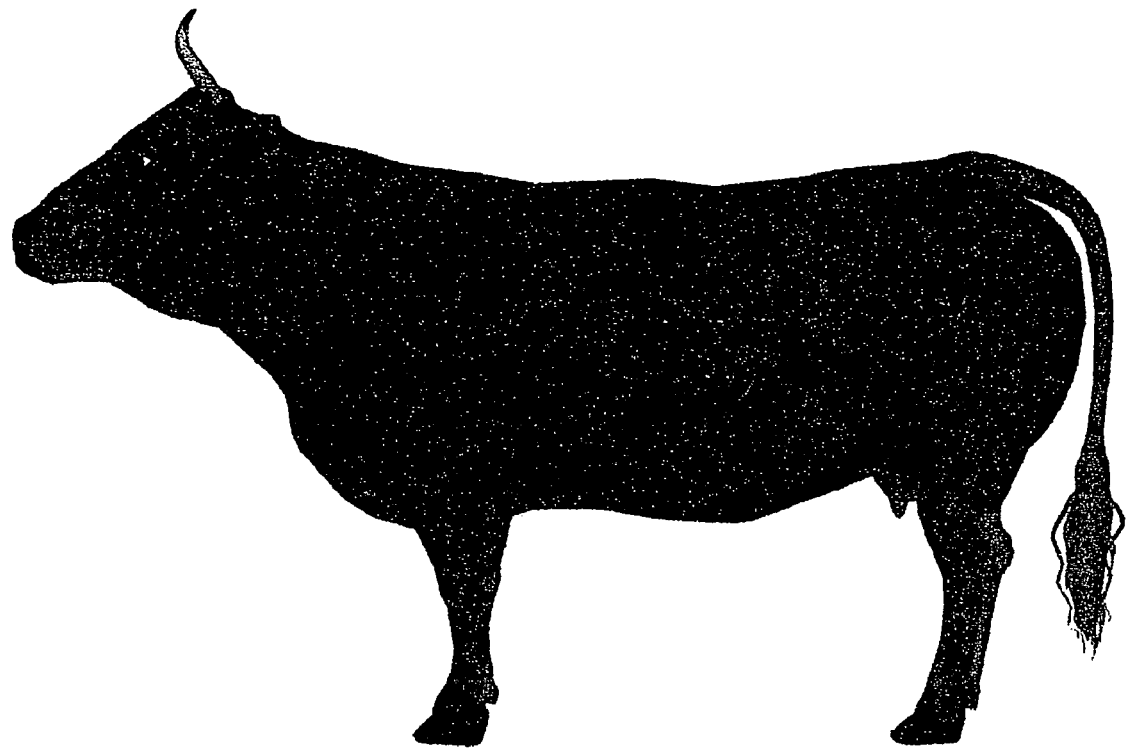
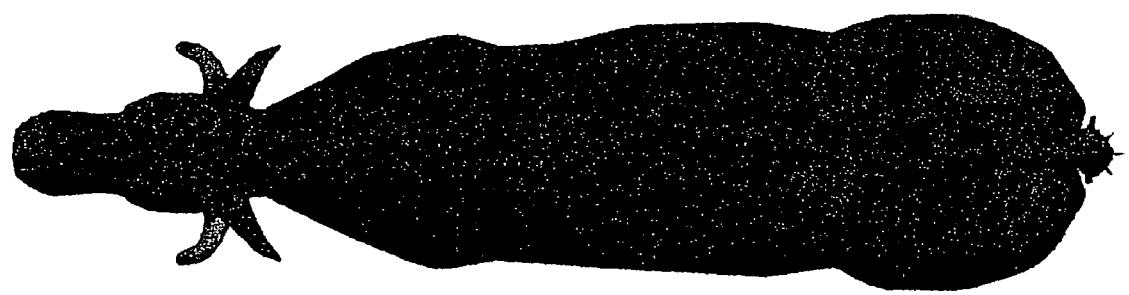
FIG. 2-6B

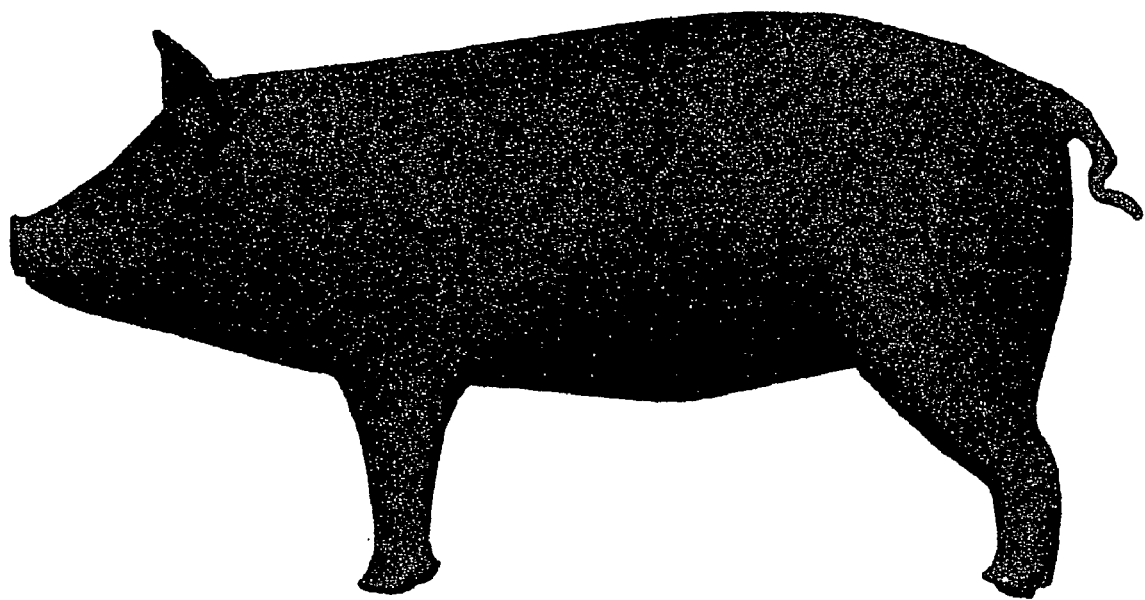
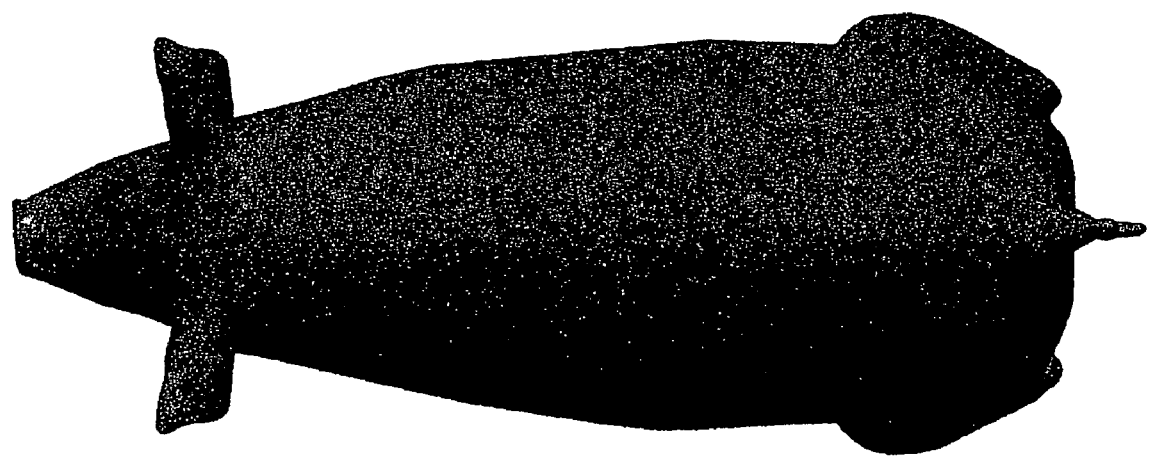
FIG. 2-6C

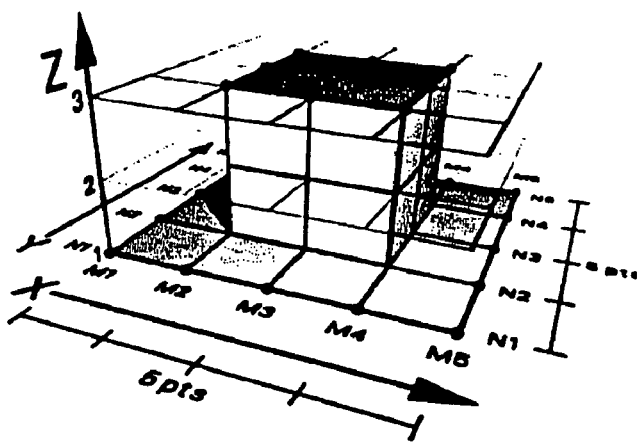
a) Simple target block within an X, Y, Z coordinate system.
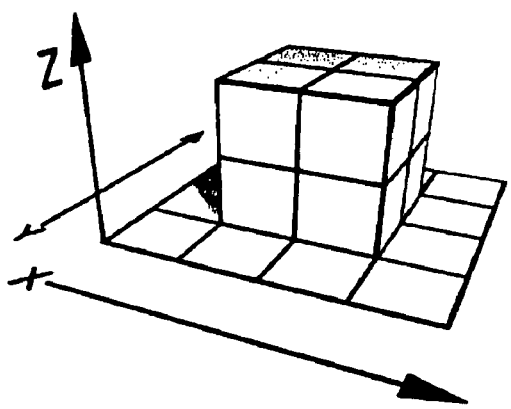
b) Range image matrix where N rows represent y positions and M columns represent X positions and values represent Z
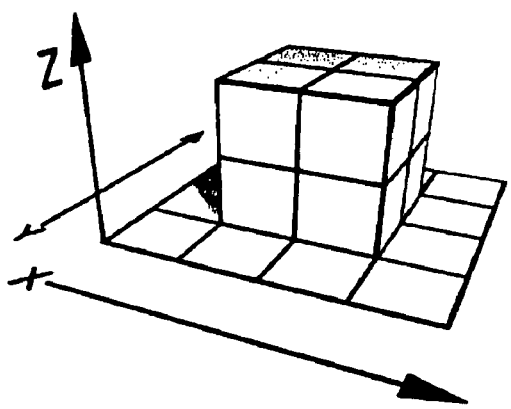
c) Mesh surface representing 3D data surface.
FIG. 2-8

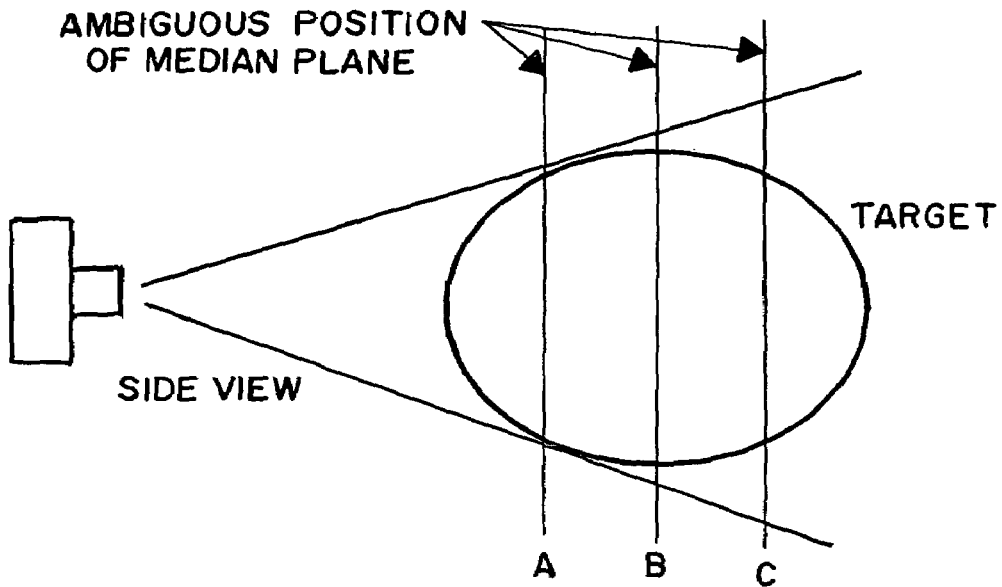
a) The lateral position of the median plane, used as the plane of symmetry, cannot be accurately established from only a side view camera. The target surface at the plane position is either out of view or it is nearly parallel to the camera axis.
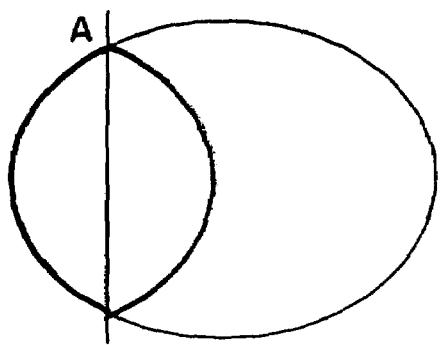
b) Cross section of volume generated with the assumption of the median plane at position A
FIG. 2-11A

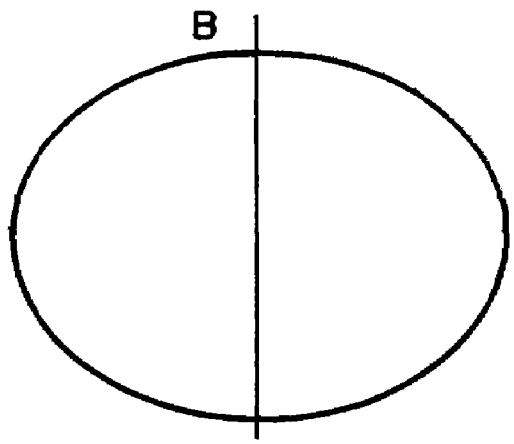
c) Cross section of volume generated with the assumption of the median plane at position B
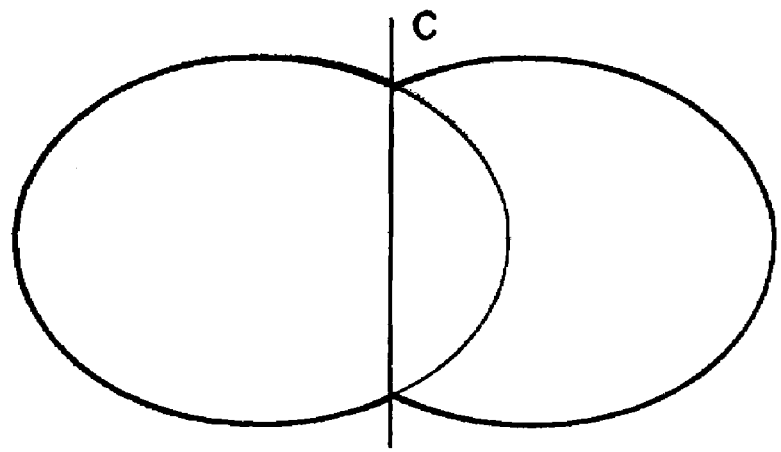
d) Cross section of volume generated with the assumption of the median plane at position C
FIG. 2-11B

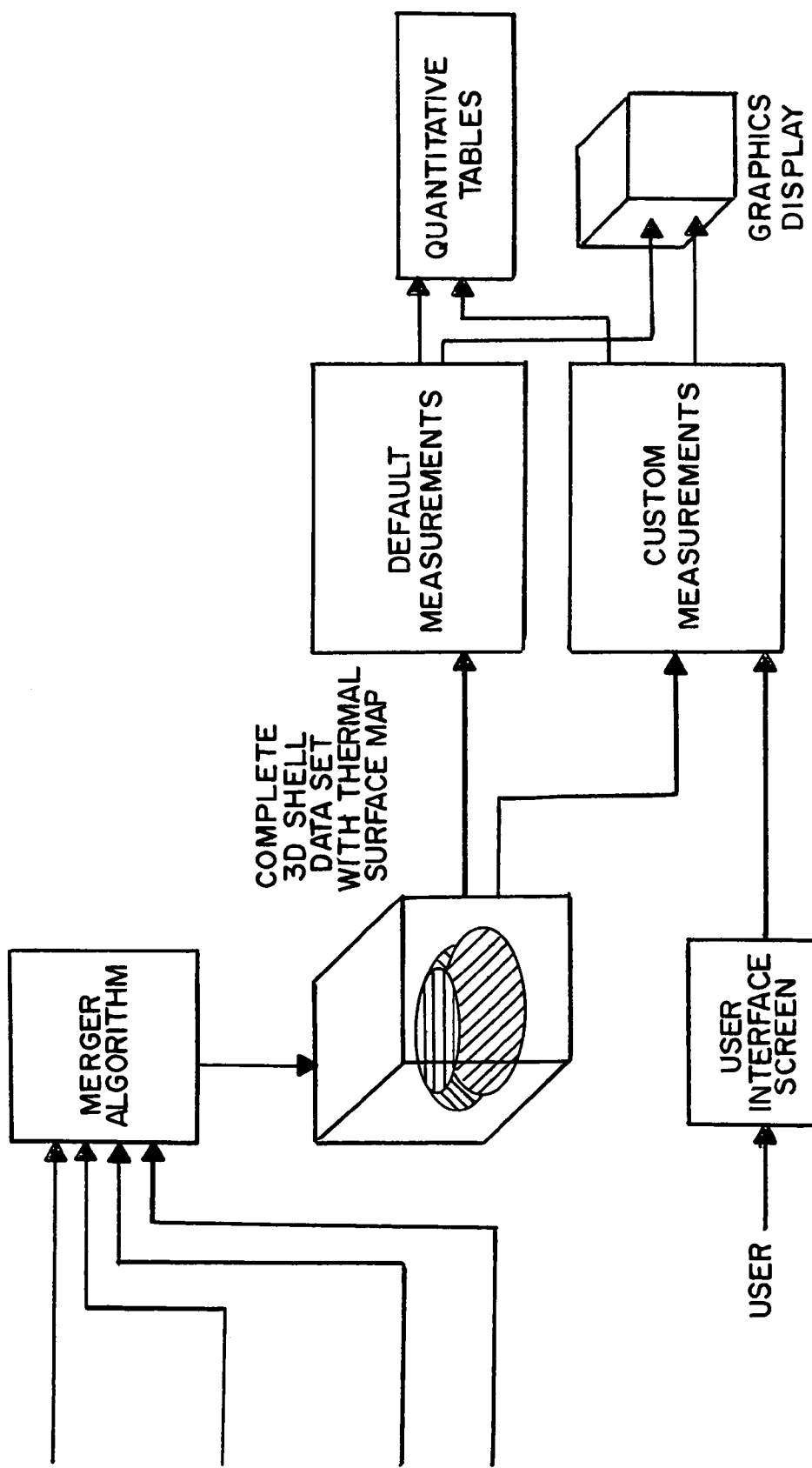

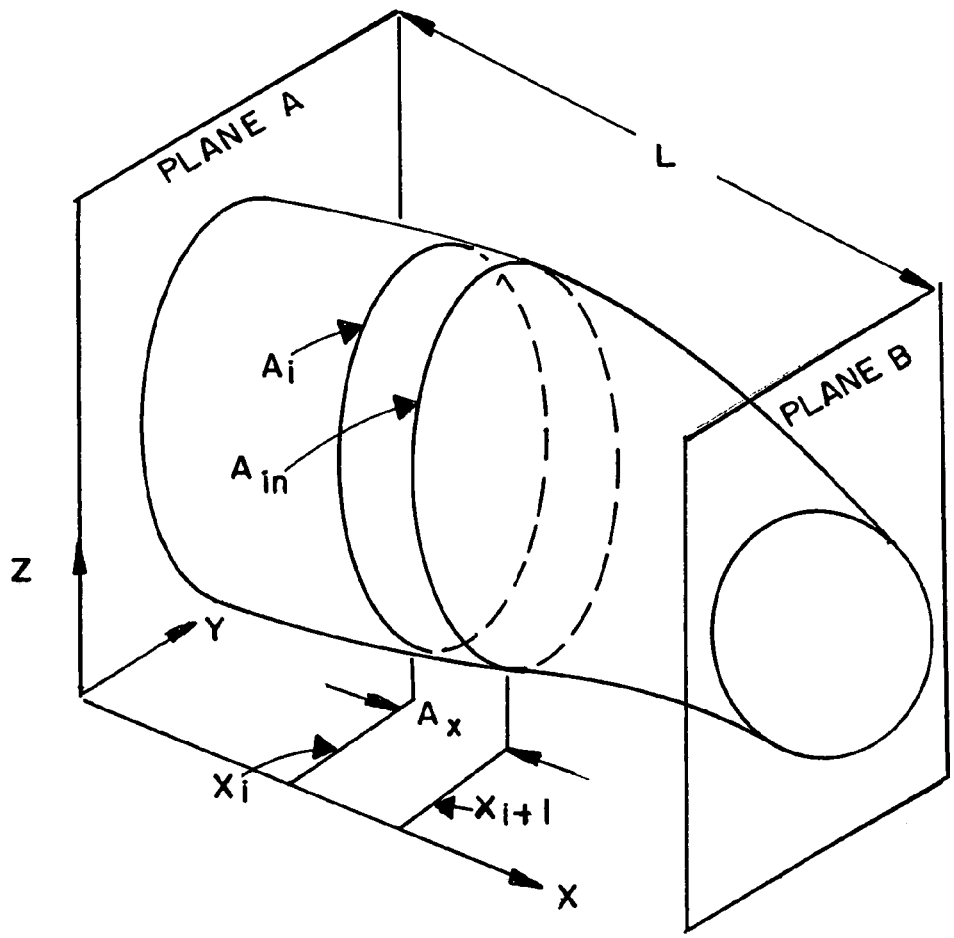
a) COORDINATES FOR VOLUMETRIC CALCULATIONS
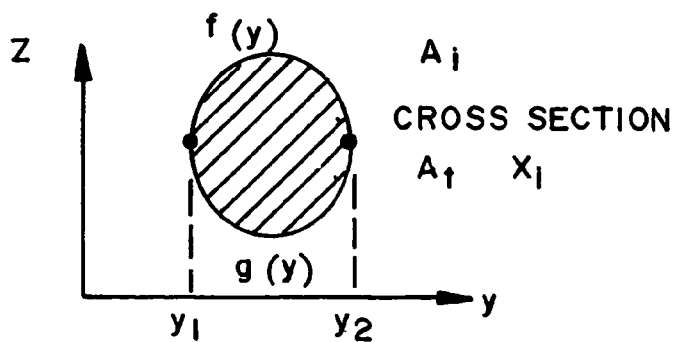
b) COORDINATES FOR CROSS SECTIONAL AREA CALCULATIONS
FIG. 2-26

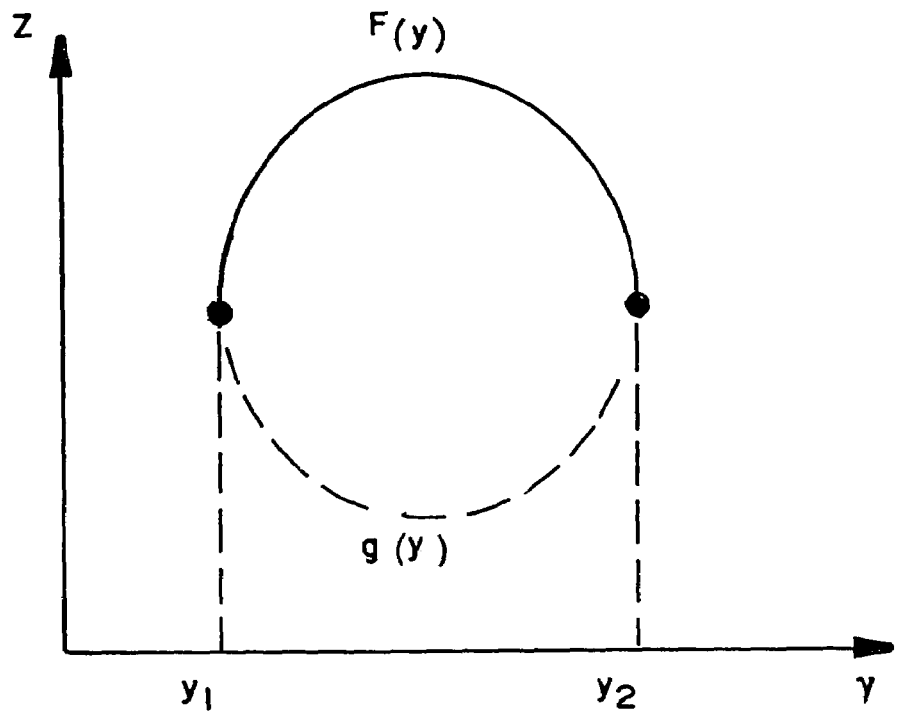
c) CROSS SECTION OF ANIMAL TORSO
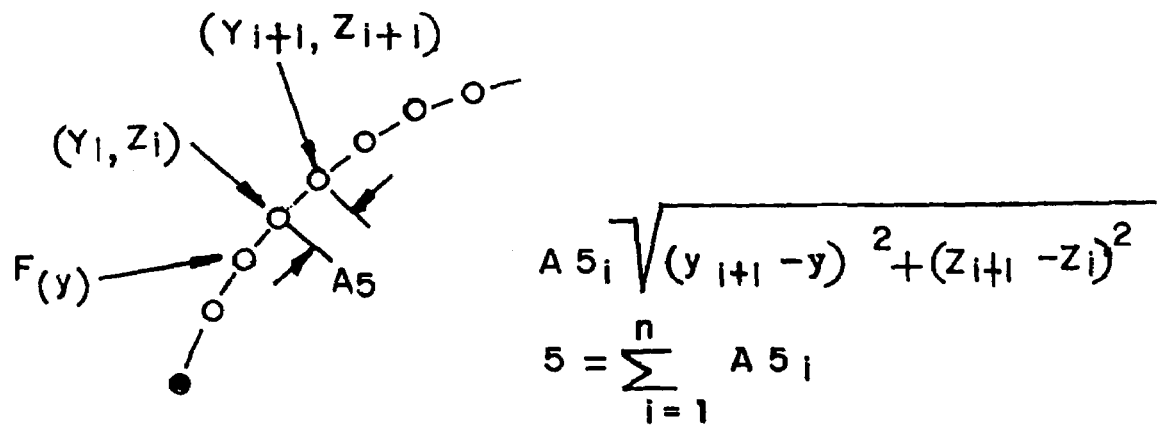
FIG. 2-27

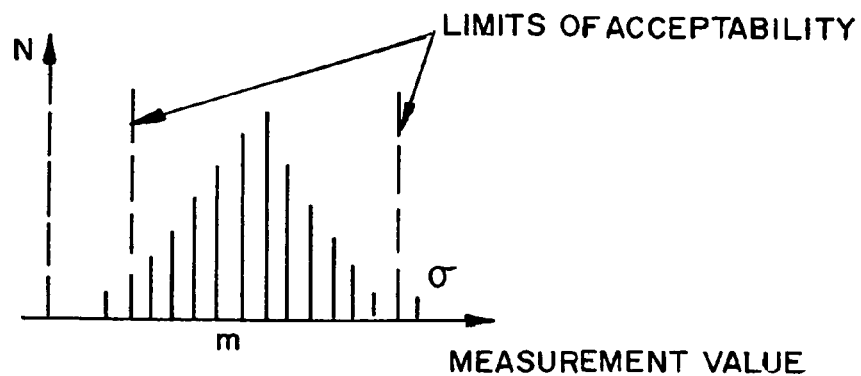
a) BASIC HISTOGRAM
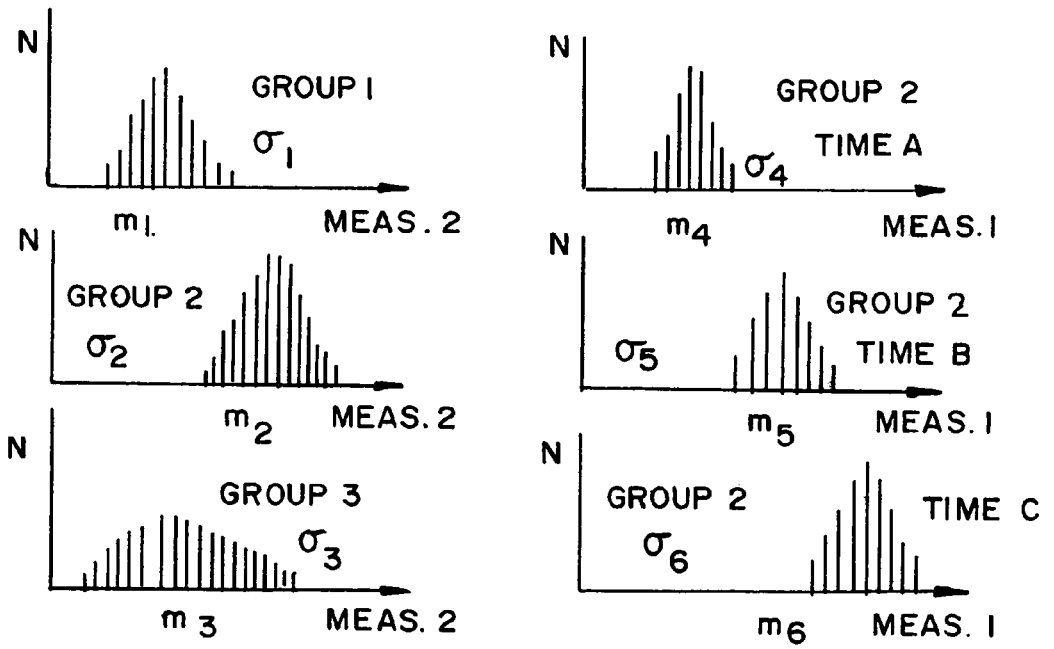
b) A SERIES OF HISTOGRAMS COMPARING DIFFERENT GROUPS.
c) A SERIES OF HISTOGRAMS OF THE SAME ANIMAL GROUP OBTAINED AT DIFFERENT TIMES
FIG. 2-29

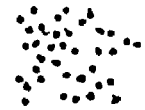
a) CLUSTER GRAPH FOR THREE MEASUREMENT TYPES. (N=2)
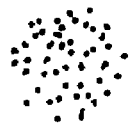
b) CLUSTER GRAPHS FOR THREE MEASUREMENT TYPES (N=3)
FIG. 2-30

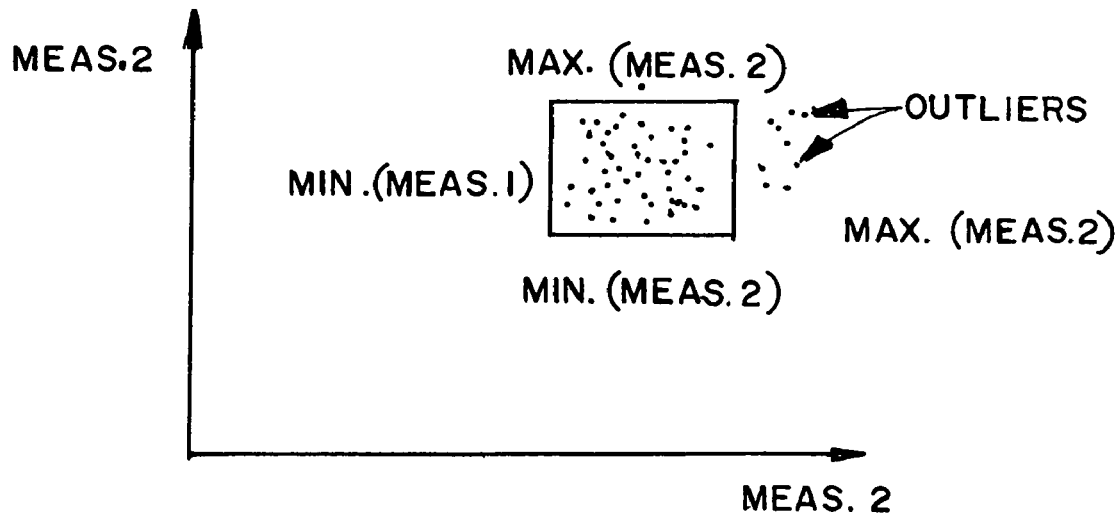
a) TWO MEASUREMENT CLUSTER DIAGRAM WITH BOUNDRRY LIMITS TO IDENTIFY OUTLIERS.
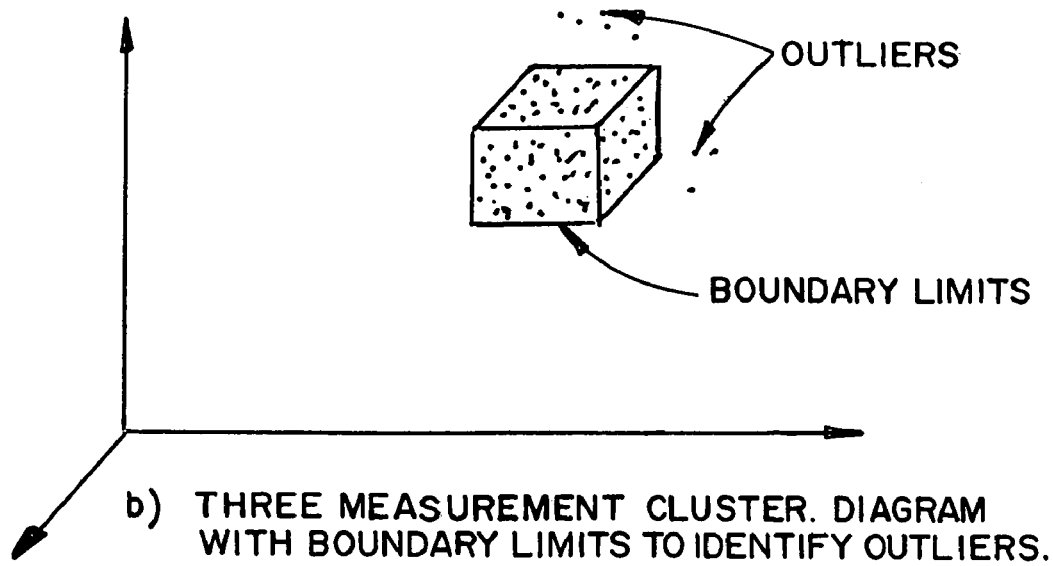
b) THREE MEASUREMENT CLUSTER. DIAGRAM WITH BOUNDARY LIMITS TO IDENTIFY OUTLIERS.
FIG. 2-31

Histograms representing livestock measurements. Limits are shown excluding extreme values.

Cluster plots representing livestock measurements. Limits are shown which may identify animals with extreme measurements for special treatment.

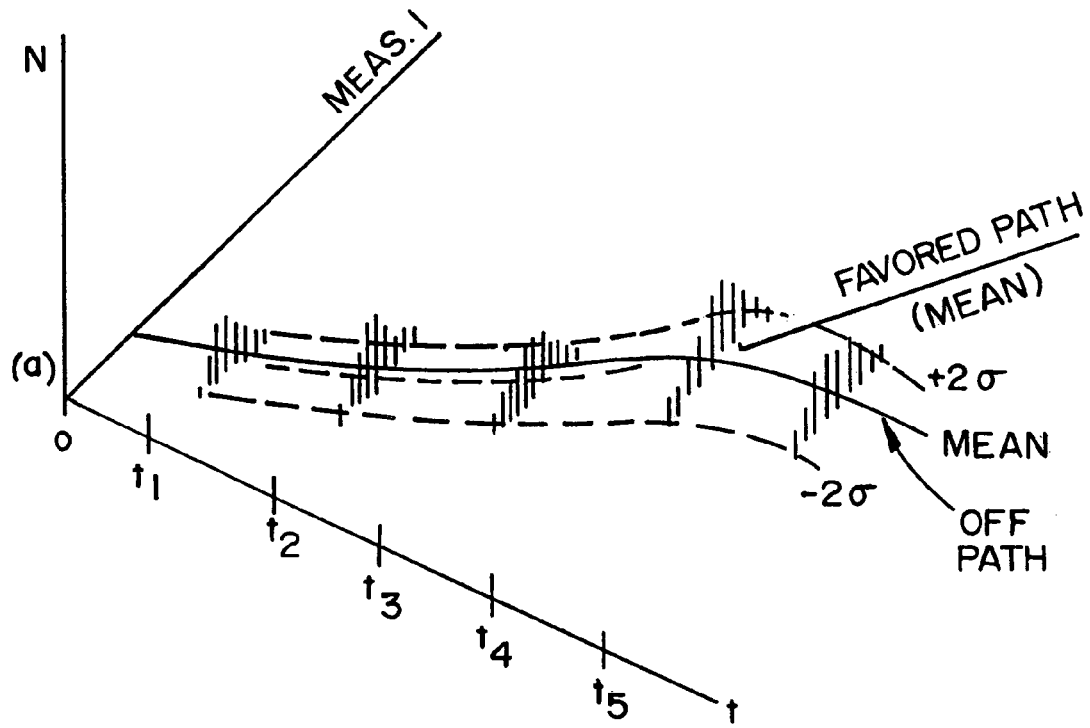
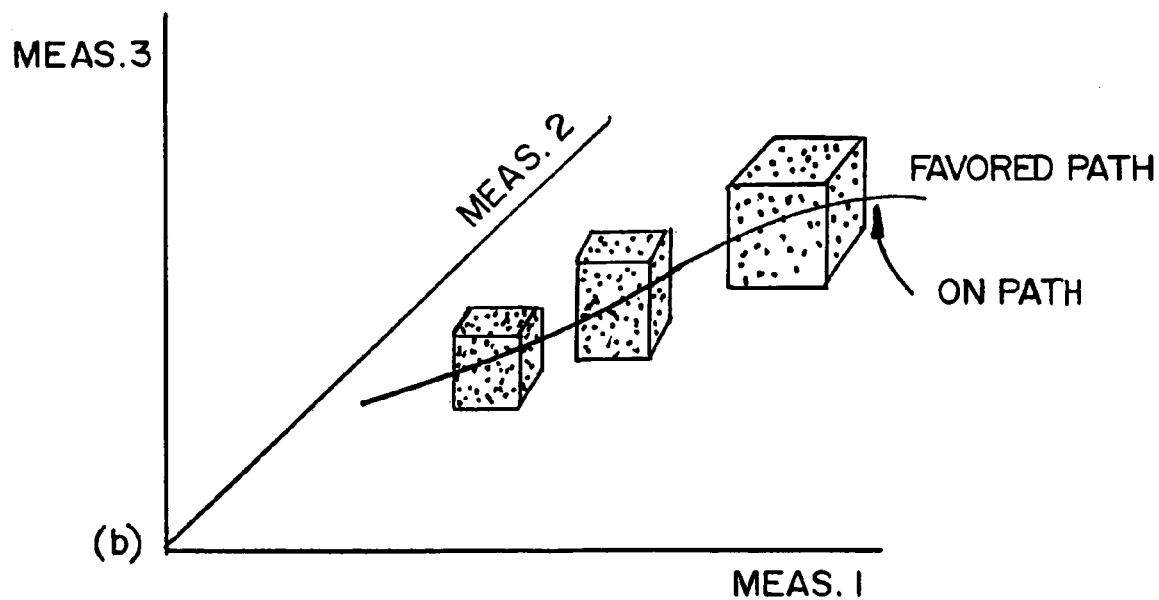
FIG. 2-35

CLUSTER ANALYSIS PLOT SHOWING FEEDLOT STRATEGY OF HOLDING BACK THOSE ANIMALS WITH SUBTHRESHOLD MEASUREMENTS AND ADVANCING THOSE ANIMALS WITH SUPERTHRESHOLD MEASUREMENTS.

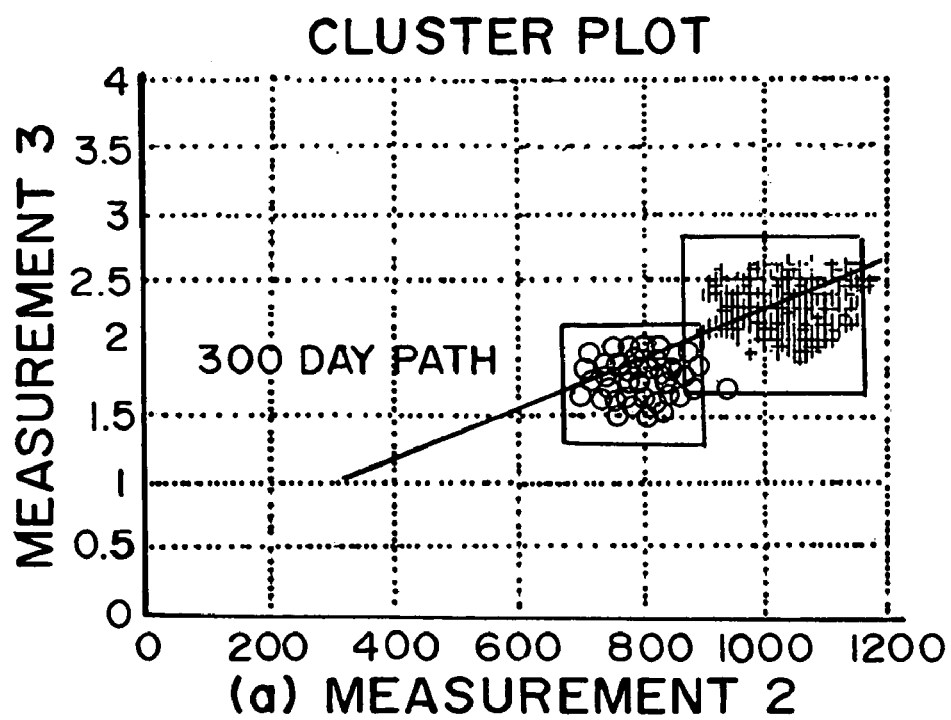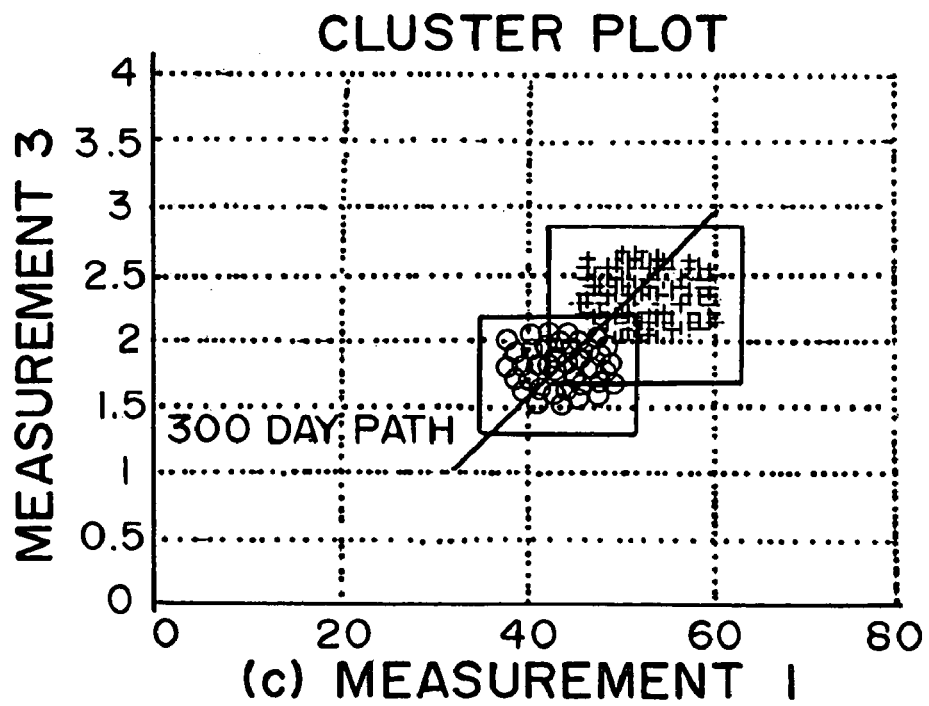
Cluster plots of group data at several times during the stay at a feedlot.
FIG. 2-37A

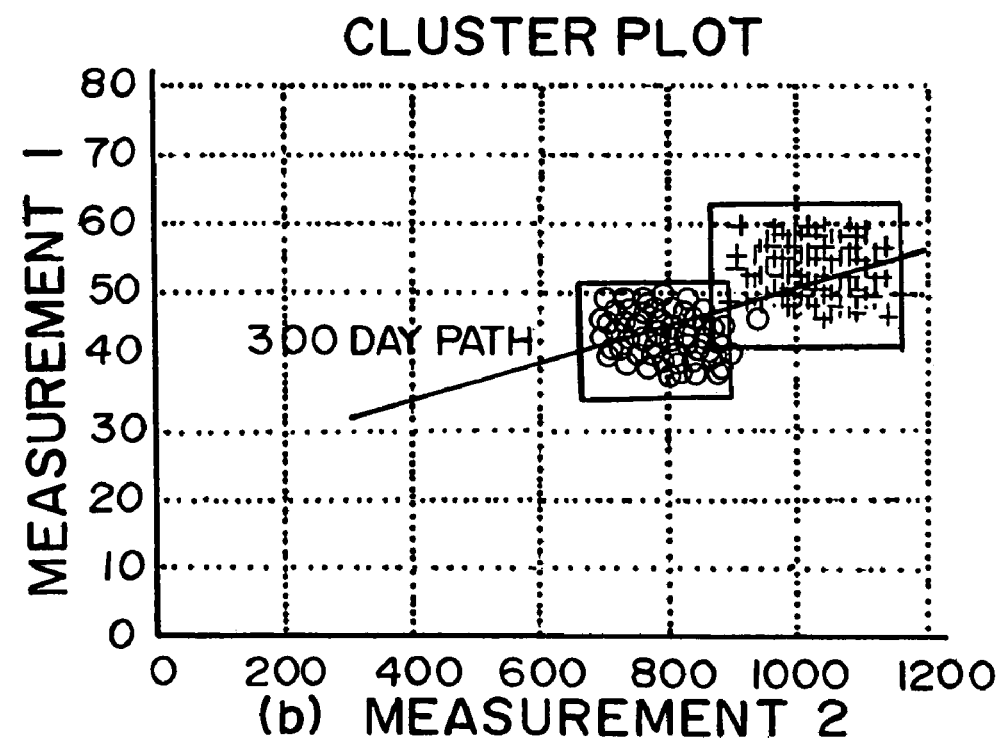
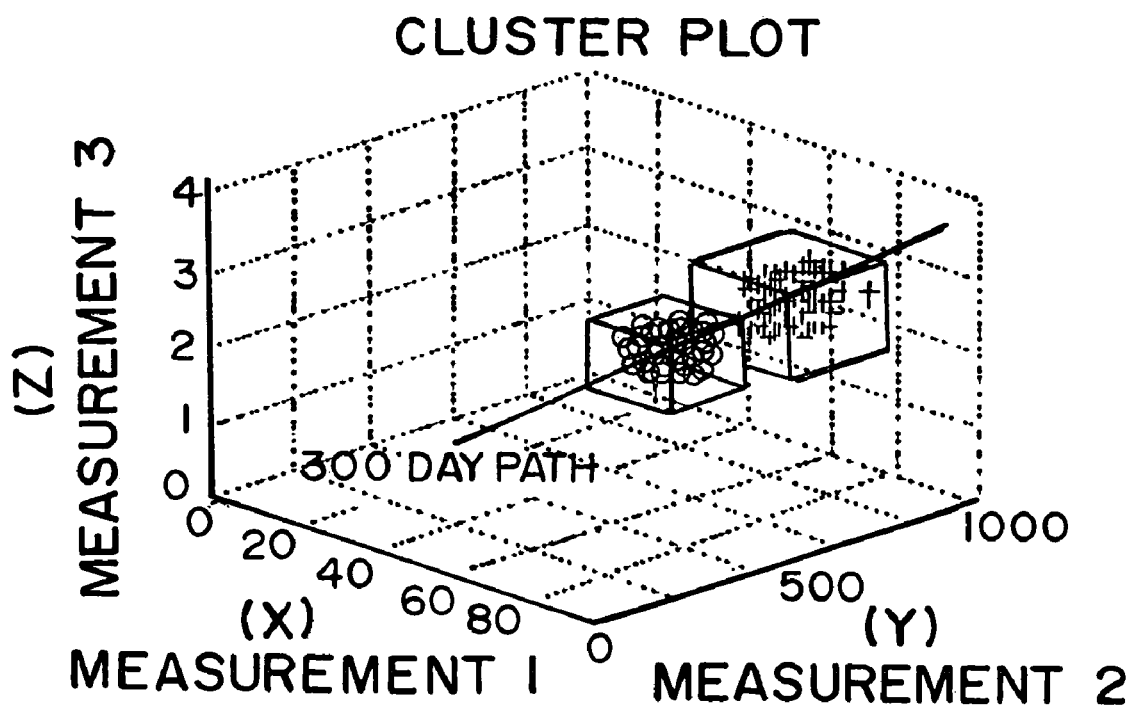
Cluster plots of group data at several times during the stay at a feedlot.
FIG. 2-37B Projection of the planer thermal image onto a 3D target surface.

CLUSTER ANALYSIS PLOT SHOWING FEEDLOT STRATEGY OF HOLDING BACK THOSE ANIMALS WITH SUBTHRESHOLD MEASUREMENTS & ADVANCING THOSE WITH SUPERTHRESHOLD MEASUREMENTS.

Cluster plots of group data at several times during the stay at a feedlot.

Cluster plots of group data at several times during the stay at a feedlot.

SLAUGHTER STEERS
U.S. QUALITY GRADES
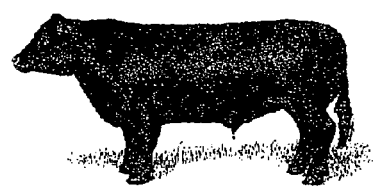 
PRIME
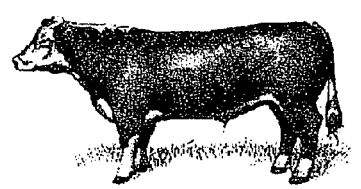 
CHOICE
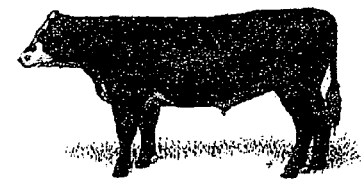 
SELECT
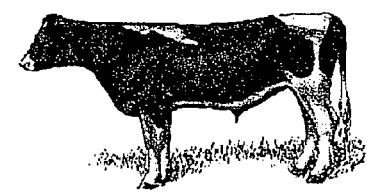 
STANDARD
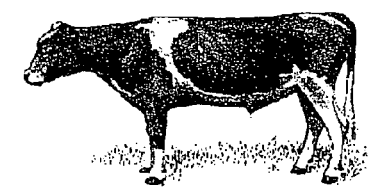 
UTILITY
FIG. 3-16

SLAUGHTER STEERS
U.S. YIELD GRADES
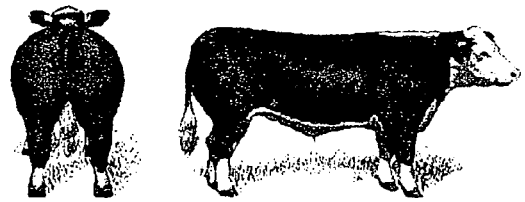
YIELD GRADE 1
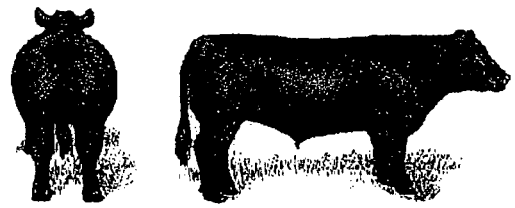
YIELD GRADE 2
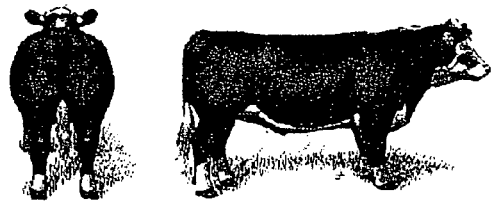
YIELD GRADE 3
YIELD GRADE 4
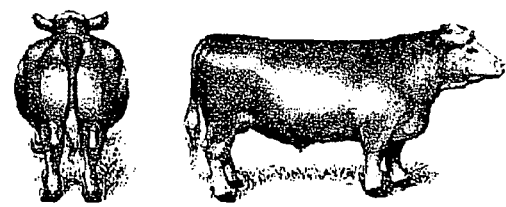
YIELD GRADE 5
FIG. 3-18

Feeder Cattle Official U.S. Grades
Thickness
No. 1
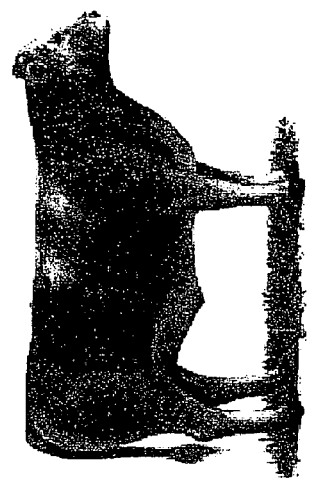
No. 2
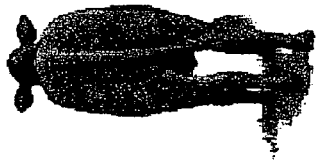
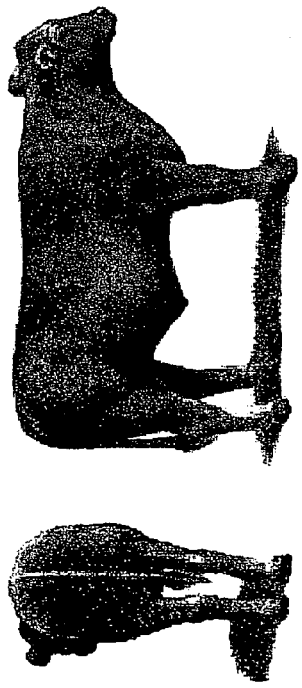
No. 3
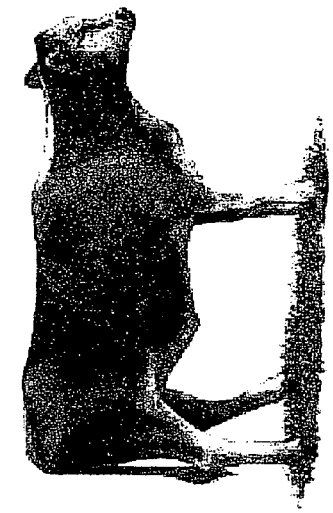
No. 4
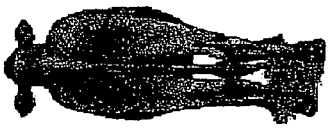
FIG. 3-19

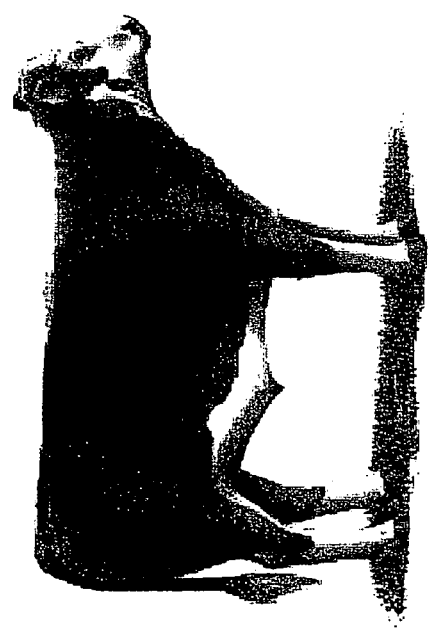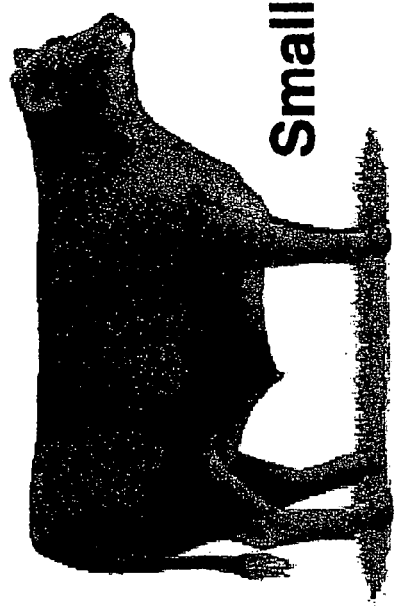
FIG. 3-20

APPARATUS AND METHODS FOR THE VOLUMETRIC AND DIMENSIONAL MEASUREMENT OF LIVESTOCK

This is a Divisional Application of Application, U.S. Ser. No. 10/211,792 filed Aug. 2, 2002 now U.S. Pat. No. 6,974,373.

BACKGROUND OF THE INVENTION

1. Field of the Invention

The present invention applies selected features of advanced machine vision technology to the noninvasive and remote evaluation and quantification of livestock volumes and dimensions. These data are shown to be of value during breeding selections, feedlot evaluations, meat packing transactions and carcass evaluations.

2. Discussion of the Prior Art

Throughout history there has been the desire to measure domestic livestock. Whether such measurements included height, weight, width, length or strength, the measurement need was present. In the recent past weight alone was often used as an indicator of size and value. As consumer demand for leaner meats with lower fat content increases, the need grows to refine animal measurement techniques as well. The current industry trend is toward the consolidation of small operations into larger, more efficient operations. This trend requires not only accurate measurements, but automation and rapid data acquisition as well. The background of the present invention includes developments in both the fields of animal measurements and volumetric imaging.

1.1. Livestock Measurements

According to USDA statistics, U.S. commercial cattle slaughter totaled 35.4 million head in 2001 with commercial hog slaughter at 98.0 million head for the same year. At each stage of meat production there is a need to measure the volume and dimensions of the animals.

Breeding Evaluations.

In general, breeders of both cattle and hog populations are attempting to efficiently produce animals with a higher percentage of lean meat and a lower percentage of fat. However, in order to evaluate breeding efficacy, it is essential for feedlots and packing facilities to accurately measure and track live physical characteristics, growth and performance data and match these with end product carcass information. Without accurate and automated measurements and data collection for the individual animal, such tracking is not possible.

Feedlot Evaluations.

Ideally, the physical and growth characteristics of each animal should be known at each stage of its stay in the feedlot to achieve optimum management. However, in order for this optimum management to be implemented, the volume and physical dimensions of each animal must be accurately measured regularly during the animal's stay at the feedlot. Since North American feedlots may house ten thousand to one hundred thousand animals, it is essential that the aforementioned, repeated measurements be acquired accurately and rapidly as part of an automated tracking system.

Live-Animal, Slaughter Plant Evaluations.

According to USDA statistics for 2001, the top 15 cattle slaughter plants account for 57 percent of the total production. Similarly, those statistics for the top 12 hogs slaughter facilities account for 53 percent of the total. For each of the leading plants an average of these numbers yields an average weekly slaughter of 25,961 and 83,237 head for cattle and hogs, respectively. With production at these levels the measurement of live animals upon delivery requires not only accuracy, but also automation and rapid data acquisition.

Carcass Evaluations.

The same efficiency needs that pressure slaughter plants continue into the meat packaging stages. The accurate measurement and evaluation of carcasses is critical as feedback to breeders and feedlot operators to evaluate changes.

1.2. Livestock Technology

For the above reasons, non-contact imaging techniques are advantageous to measure animals and carcasses in order to achieve both measurement accuracy and improved acquisition speed. Much of the existing state-of-the-art for measuring animals or carcasses relies upon the acquisition of images showing silhouettes or profiles of an animal (or carcass). In any one view, this technique provides only a record of the target animal's shadow with a loss of any three-dimensional shape within the silhouette outline. In order to attempt volumetric measurements many viewing angles must be used. Even with multiple views from many angles, the resulting volume estimation is inaccurate when any type of surface concavity is present.

Other techniques include the use of visible-spectrum, video images to evaluate lean and fat content of the carcass. Since this video image is only two-dimensional (2D), any proportional analysis of fat verses lean meat can only be a calculation of the area in a 2D view of the carcass. Such analyses of three-dimensional volumes in only two dimensions are fraught with error.

Numerous inventors have contributed to the current state-of-the-art for the measurement of animals. Early patents in this field involved automated gates and weighing systems. One such patent was U.S. Pat. No. 4,280,488 (Ostermann) which describes a gate and chute system for sorting and segregating animals by weight using a scales as the measurement method. U.S. Pat. No. 4,288,856 (Linseth) shows a method for separating and grouping animals from a feedlot herd according to weight gain characteristics also using scale measurements. U.S. Pat. No. 4,617,876 (Hayes) describes an animal identification and control system which employs an identification tag which can be read from a distance, an automated weighing system and automated gates to control the movement of the animal.

Hayes, U.S. Pat. No. 4,745,472, proposes ways to obtain side and top profiles of animals via wall grids and visible-spectrum, video images. Chute mechanisms are used to position the animal in an upright, standing position. This patent also proposes ways of making area and linear measurements from these profiles which relate to physical characteristics of the animal.

Chevelier, et al., U.S. Pat. No. 5,194,036, present a method and apparatus for grading animal carcasses involving the use of video images of the carcasses. This patent requires somewhat complicated methods to rotate each carcass such that images can be obtained at multiple angles with multiple cameras. The two-dimensional, recorded images are then compared to a library of images in an attempt to achieve automated grading of the meat.

Petersen, et al., U.S. Pat. No. 4,939,574, presents a method and apparatus for obtaining a dark silhouette or contour of an animal carcass, particularly that of cattle. Details are provided for a light-screening chamber into which the carcass is placed, consisting of one wall with a lighted surface opposite a wall of frosted glass onto which the carcass shadow falls. The shadow or dark silhouette is recorded and digitized via a visible-spectrum, video camera placed at a distance behind the frosted glass wall. The video image is digitized and analyzed via a computer system. Front lit images of the carcass are also recorded and superimposed over the silhouette outline in an attempt to identify the lean (red) and fat (white) portions of the carcass image. Additional provisions are made for the use of manual probes to measure fat thickness at various locations in an attempt to improve the estimate of the fat and lean content.

O'Brien, et al., U.S. Pat. No. 5,205,799, describes a three-dimensional, stereoscopic, imaging system used in conjunction with an X-ray system to view the exterior and interior of an animal carcass.

Bamjii, U.S. Pat. No. 6,323,942, describes a 3D image sensor employing a two-dimensional array of pixel light sensing detectors and dedicated electronics fabricated on a single CMOS integrated circuit. This invention emits a pulse of light and times the response time for each pixel in an N.times.M optical detection array. Measuring the time-of-flight (TOF) for the emitted light to travel to a target and return to given pixel permits a distance to be computed for each part of the reflected image. The proposed TOF measurements are presented as either individual high-speed counters for each pixel or individual gated charge accumulator for each pixel.

Faulkner, U.S. Pat. No. 5,335,288, uses biometric measurements of hand silhouette and finger height to identify a person. The finger height is measured via a structured light technique.

In U.S. Pat. No. 5,412,420, inventor James S. Ellis presents a three-dimensional (3D) measurement system for animals. The patent discloses the use of LASAR cameras in a system which appears to employ an amplitude-modulated, phase-detection, time-of-flight laser technique similar to the Lidar scanning system described in U.S. Pat. No. 5,006,721.

Ellis U.S. Pat. No. 6,777,353 describes a measurement system which purportedly measures the three-dimensional linear, angular and volumetric characteristics of an animal or carcass, such as beef cattle. The capacity to obtain these useful livestock measurements relies largely upon the system's ability to accurately determine the three-dimensional surface of the target animal. This patent teaches that the three-dimensional surface is determined by first projecting light spots onto the surface of the target animal as shown in FIG. 1 of the patent. These light spots are then observed by the receiving camera located immediately adjacent to the projector as shown in FIG. 6 of the patent. According to this patent, the image obtained by the receiving camera may be analyzed to determine the dimensions of the light spots on the surface of the target animal. As described in column 3, lines 56–65, the measured diameter of a given light spot, as measured in the camera image, is proportional to the distance between the target surface and the receiving camera. A spot diameter of 1.5 inches corresponds to a distance of 6 feet, while a spot diameter of 1.75 inches corresponds to a distance of 7 feet. Variations of structured light which may include squares, vertical bars or horizontal bars behave in a manner similar to the light spots.

Jones, et al., U.S. Pat. No. 5,458,418, describes a method for detecting poor meat quality from thermal images of cattle and swine. If the thermal images reveal skin temperatures outside of the predetermined, absolute temperature ranges, 28–32+/–2 degrees C. for cattle and 24–26+/–2 degrees C. for swine, the animal is likely to provide poor meat quality.

Hurnick, et al., U.S. Pat. No. 5,474,085, have proposed a thermographic imaging system for remote sensing of various characteristics of livestock, such as weight, carcass pH, temperature and location.

Scofield, U.S. Pat. No. 5,483,441, has proposed a method for evaluating changeable configuration bodies which move through first and second scenes, corresponding to differing first and second fields of view. The Scofield patent describes methods of obtaining top views, side views, profiles and outline measurements using common, visible-spectrum, video cameras similar to a number of other inventors. This conclusion is especially evident in the embodiment section, column 12, line 59 through column 13, line 10, where a silhouette is created with the animal black and the background white.

Scofield et al., U.S. Pat. No. 5,576,949, is similar to U.S. Pat. No. 5,483,441 with the addition of black and white bars on the walls of the chute to provide a repetitive pattern which is detected via spectral analysis in order to help identify that part of the image that is background and not animal. Apparently this approach provides a more reliable silhouette.

Tong, et al., U.S. Pat. No. 5,595,444, improves upon the invention of U.S. Pat. No. 5,58,418 (Jones, Schaefer, Tong, Scott, Gariepy, and Graham) for identifying cattle and swine that are likely to provide poor meat quality. This invention acquires thermal images of the animals and identifies those that statistically fall outside of a range of normal for a given herd or group as those likely to provide poor meat quality. This is likely to be more accurate and also allows for extreme ambient temperatures since the group statistics would shift with the ambient temperatures.

Scofield, et al., U.S. Pat. No. 5,644,643, is a continuation of U.S. Pat. Nos. 5,483,441 and 5,576,949. This continuation contains additional claims regarding the chute construction and appearance to provide better contrast with regards to the animal.

In U.S. Pat. Nos. 5,673,647, 6,000,361, 6,135,055, and 6,318,289 Bi, William C. Pratt describe cattle management systems in great detail. These system include individual animal identification by electronic methods, animal measurement, automated data inputs, cattle handling and sorting components, computer systems to calculate the optimui slaughter weight and marketing date for shipment of the animal to a meat processing plant. These patents also include a description of computer calculations for correlating live animal characteristics to the measured carcass characteristics.

Godik, U.S. Pat. No. 5,699,797, deals with the properties of human skin obtainable via IR imaging. It employs an active IR illumination source and IR detectors. While applicable to thermal imaging of skin, it discusses skin penetration of 1 cm or less.

Tong, et al., U.S. Pat. No. 5,944,598, uses infrared thermography to detect poor meat quality in live animals. With their technique thermal images are acquired of a group of animals. A mean temperature is computed for the group and every animal in the group. Animals are rejected as having a high probability of producing poor meat quality if their individual thermal characteristics differ significantly from that of the group.

Anderson, et al., U.S. Pat. No. 6,032,084, proposes a fully-automated, animal feedlot management system where each feed delivery vehicle uses real-time virtual reality modeling and satellite-based, global positioning system (GPS) technology to direct various type of feedlot operations. Though the proposed automation is abundant, there is no feedback measuring the growth and performance of the animals. The present invention fills that void by accurately.

Schaefer et al., U.S. Pat. No. 6,123,451, presents a process for determining a tissue composition characteristic of an animal via infrared thermographic imaging. This invention involves the acquisition of a thermal image of the animal and/or carcass, calculating statistical information from the thermal image, inputting the statistical information into a predictive model, and solving the predictive model for tissue composition characteristics such as lean body mass, carcass fat composition, and lean yield. Correlation data presented in the patent provided correlation coefficients between thermal properties and stated variables that ranged from r=00.94 ($r^2$=0.89) to r=0.72 ($r^2$=0.52). The IR images for these data were obtained via a 2D thermal imaging camera.

Belk, et al., U.S. Pat. No. 6,198,834 B1, proposes an image analysis system for scoring characteristics that predict the palatability and yield of a meat carcass or cut. Specifically, the illustrative embodiments included color and color variability of fat and lean tissue, extent of marbling, average number and variance of marbling flecks per unit area, average size of marbling, the variance of marbling size, average texture of marbling and lean tissue, firmness of lean tissue, density of lean tissue, and density of connective tissue.

Cureton, U.S. Pat. No. 6,216,053 Bi, discloses a fully automated feedlot management system similar to that described in U.S. Pat. No. 6,032,084.

1.3. Volumetric Measurements

Numerous methods are available for the general computation of volume and the dimensional measurement of an object. In general, the process of generating 3D, volumetric data contains the following steps:

1. Determine the necessary number and direction of views based upon the complexity of the shape;
2. Acquire a three-dimensional surface image from each view;
3. Generate a 3D surface via mesh or other techniques;
4. Register the multiple surfaces.
5. Fuse the surfaces into one geometry;
6. Display the data; and
7. Compute measurements based upon the 3D model.

The complexity of the target volume determines the number and direction of views required. Simple convex volumes may require as few as two views to image the entire shape. Complex volumes with deep indentations may require multiple views of a single region. The non-contact acquisition of 3D surfaces may be accomplished with a number of technologies. Regardless of method, each surface provides a three-dimensional representation of the volume's shell as viewed from the direction of the given camera. After the acquisition of multiple surfaces, it is necessary to register the surfaces in a common coordinate system. This is most easily accomplished if the geometric relationship between cameras is fixed and known. After registration, the multiple surfaces may be fused into a common volume or geometry. This step must take into account the direction of each view and any loss of accuracy near the edges of the 3D surfaces. Once geometric fusion has been accomplished, a 3D triangulated mesh may be generated for the volume surface. This mesh mathematically represents the surface of the volume and enables the numerical calculation of volume that is desired. Once the volume has been calculated, it may be displayed graphically or numerically. It may also be used as input or feedback for a manufacturing process.

1.4. Three-Dimensional Surface Measurements Technologies

Common to many of these methods is the computation of 3D surfaces. FIGS. 1-1 and 1-2 depicts the many technologies which may be employed to obtain three-dimensional surface measurements. Each has advantages and disadvantages for a given application. The conditions associated with the measurement of live or carcass cattle and hogs makes many of these general techniques impractical.

The large number of animals necessitates an automated measurement system which acquires, processes and records the measurement data rapidly. In a slaughter plant situation, an animal may be slaughtered every 3 to 10 seconds. A lengthy measurement process is not acceptable. Additionally, live animals are often moving. Even carcasses are in constant motion on an overhead conveyor belt. To achieve an accurate measurement an apparatus must be capable of freezing such movement. The technologies represented in FIGS. 1-1 and 1-2 need to be examined in light of light of the specific requirements for measuring live and carcass cattle and hogs.

Contact vs. Non-Contact.

Contact technologies are not well-suited for livestock measurements. Contact methods typically employ a precision, mechanical arm with a sensitive tip. This assembly is carefully scanned over the object acquiring data points one at a time. They can take up to several hours for scanning and digitizing one object. While they can be very accurate, they are best-suited for digitizing small solid objects. Additionally, the precision arm and sensitive tip are not well-suited for a livestock environment.

Conversely, non-contact methods are much more likely to be a match for this application since data acquisition may occur rapidly from a distance. The sensitive equipment can be located in a safe location somewhat removed from the livestock environment.

Reflective Optical vs. Non-Optical.

Reflective methods which employ optical technology can be used successfully for acquiring 3D livestock data. Reflected light methods include those that employ structured illumination patterns to achieve specific signal processing advantages. Non-optical, reflective methods, such as sonar or imaging radar are not as good a match for this application. Sonar or other ultrasonic methods typically use a liquid coupling medium, which is not practical for this project. While ultrasonic air operation is possible, the efficiency and lateral resolution present significant technical challenges. Imaging radar is typically used to map the earth's surface. While well-suited for large targets such as a mountain range, imaging radar is not likely to provide sufficient resolution for this project.

Emitted vs. Transmissive.

Non-contact, emitted technologies include primarily infrared (IR) methods. While IR in the 8–12: μ wavelength is useful for imaging thermal data, the use of structured light techniques in this band is difficult. Thermal patterns are much more difficult to generate and project than optical patterns. Additionally, the resolution of thermal patterns is substantially less than their optical counterparts. Presently, IR imaging systems are slower, more expensive, and of lower resolution than optical systems. Transmissive optical methods are not applicable since cattle and hogs are not transparent to light. Transmissive X-ray systems are not being considered since they render muscle and soft tissue nearly invisible and cost and safety are significant factors.

Optical Methods—Active vs. Passive.

Non-contact, reflective, optical methods for obtaining 3D data may be further divided into active and passive systems. Passive systems rely on the ambient light and surface texture of the target to provide sufficient information to compute dimensional data. Passive methods include passive stereo, shape from shading, shape from silhouette, passive depth from focus, and passive depth from defocus. Since passive system depend on ambient conditions, their reliability is often uncertain. Active optical methods typically employ a controlled light source of some kind which greatly increases system reliability over the similar passive system without the active source.

Active Optical Methods.

Active optical systems include pulsed or modulated light, interferometry, active depth-from-focus, active depth-from-defocus, active silhouette, active triangulation, and active stereoscopic.

Pulsed light methods utilize a pulse of light which bounces off of the target surface and returns to the source. The round trip time is measured and the distance computed from knowledge of the speed of light. A variation on this principle employs a continuously modulated light beam which is bounced off of the target and returned to the source. The phase of the received signal is demodulated to determine the time delay associated with the round trip to the target and back. Both of these variations require expensive test equipment to measure the small time delays inherent in light propagation. A spot or stripe scanning process is also required.

Interferometry methods include moire patterns and holography. Such methods are not applicable to this application since they work best when the surface depths are microscopic.

Active depth-from-defocus (DFD) technology take advantage of the commonly observed fact that objects in focus appear crisp and detailed, while objects out of focus appear blurred. Under controlled, structured light conditions it is possible to measure the degree of blurring and thus compute the associated distance between a given image spot and the reference distance where the image is in complete focus.

Active depth-from-focus (DFF) utilizes similar principles to DFD. However, DFF requires a focal scan through the range of the target. A multitude of images are acquired and processed to identify the precise distance at which each surface point is in the best focus. Since magnification changes with focal distance in most optical systems, registration and alignment of the multiple images can be a problem. During the multiple image acquisitions, animal movement can also be a problem for this application.

Active triangulation typically uses laser spot scanning or scanning stripes. In this method the laser beam and the visible-spectrum camera are at different Such scanning system require multiple images and frequently long scanning times. Computer memory requirements and image processing times can be significant. Consider a CCD camera acquiring images at a video rate of 30 images per second. With a 640×480 pixel image (307,200 pixels per image) and only an 8-bit pixel depth, data is acquired at a 73.7 Mb per second rate. Additionally, holes in the computed surface result when a surface feature obstructs either the laser beam or the camera view.

Active stereoscopic vision systems may also be used to obtain 3D surface measurements. This method uses two cameras separated by a distance sufficient to triangulate on a given point on the target surface. A minimum of two images are required to compute the target surface. Holes in the computed surface result when a surface feature obstructs one of the camera views.

Active silhouette (or profile) is sometimes considered an active optical system. Since it only acquires the outline or shadow of the target, it is not a 3D measurement.

Patent Review for Active Depth-from-Defocus and Depth-from-Focus Technologies

Since the volumetric measurement of live and carcass cattle and hogs imposes numerous constraints on 3D surface measurement technologies, a review of applicable patents will focus on those technologies which most closely meet the of applicable patents will focus on those technologies which most closely meet the requirements of this application, namely active depth-from-defocus (DFD) and active depth-from-focus (DFF) methods.

TABLE 3

Patent Review - Volumetric Measurements via Focus/Defocus Techniques

| U.S. Pat. No. | Title | Inventor | Assignee | Comments |
| --- | --- | --- | --- | --- |
| 6,269,197 | Determining a depth | Aaron S. Wallack | Cognex Corp. | depth using defocus & contrast measurements from 3 images with structured illumination |
| 6,219,461 | Determining a depth | Aaron S. Wallack | Cognex Corp. | depth using defocus & different structured illumination patterns for each of multiple 2D images |
| 6,148,120 | Warping of focal images to correct correspondence error | Michael Sussman | Cognex Corp. | corrects correspondence errors among multiple images when focal distances (& magnification) are changed with non-telecentric optical systems - useful in focus & defocus systems |

TABLE 3-continued

Patent Review - Volumetric Measurements via Focus/Defocus Techniques

| U.S. Pat. No. | Title | Inventor | Assignee | Comments |
|---|---|---|---|---|
| 6,025,905 | System for obtaining a uniform illumination reflectance image during periodic structured illumination | Michael Sussman | Cognex Corp. | method for obtaining a uniform illumination image from multiple structured illumination images (good background discussion) |
| 5,912,768 | Depth-from-defocus optical apparatus with invariance to surface reflectance properties | Bradley Sissom, Michael Sussman | Cognex Corp. | a depth-from-defocus optical apparatus for 3D imaging; includes illumination source, projection lens, viewing lens, and beam splitter (good background discussion) |
| 5,878,152 | Depth from focal gradient analysis using object texture removal by albedo normalization | Michael Sussman | Cognex Corp. | depth of focus techniques employing albedo normalization - removal of the reflectance effects of the object's natural surface texture such that only the structured light illumination is observed (good background discussion) |
| 5,953,126 | Optical profilometry | James M. Zavislan | Lucid Inc. | a spot scanning system which uses a measurement of spot defocus to obtain a depth calculation instead of refocusing the lens assembly at each new spot position to obtain the depth |
| 5,360,970 | Apparatus and method for a single return path signal sensor system | David B. Kay | Eastman Kodak Co. | use of a diffraction grating to aid focusing of a laser on a data track |
| 5,900,975 | Ghost image extinction in an active range sensor | Michael Sussman | Cognex Corp. | a plate beamsplitter with polarizing filter(s) which eliminates ghost images used in focus/defocus imaging systems with telecentric optics |
| 5,300,786 | Optical focus phase shift test pattern, monitoring system and process | Timothy A. Brunner, Michael S. Hibbs, Barbara B. Peck, Christopher A. Spence | IBM | an optical system projecting phase-shifted, projection patterns onto a surface to quantify the degree of focus - used with photolithographic techniques associated with semiconductor masks |
| 5,231,443 | Automatic ranging and automatic | Muralidhara Subbarao | Research Foundation of | A method based on image defocus information for |

TABLE 3-continued

Patent Review - Volumetric Measurements via Focus/Defocus Techniques

| U.S. Pat. No. | Title | Inventor | Assignee | Comments |
|---|---|---|---|---|
| | focusing | | State University of New York | determining the distance of objects |
| 4,841,325 | Automatic focusing device for camera | Kunihish Hoshino Yoshinari Hamanishi Ken Utagawa | Nikon Corporation | An automatic focusing device for detecting the amount defocus |
| 4,088,408 | Device for measuring the contour of a surface | Ernest E. Nurcher, Stephen J. Katzberg, William I. Kelly, IV | USA, NASA | A device for measuring the contour of a suface |

Discussion of Critical Patents:
U.S. Pat. No. 6,269,197—Determining a Depth
Abstract:
A three dimensional image is derived from two-dimensional images. At least one of the two-dimensional images has a predetermined number of pixels. Depth measurements are derived from the two-dimensional images. The number of derived depth measurements is substantially equal to the predetermined number of pixels. The three-dimensional image is derived from the two-dimensional digital images and the depth measurements.

Inventors: Wallack; Aaron S. (Natick, Mass.) Assignee: Cognex Corporation (Natick, Mass.) Issue date: Jul. 31, 2001 Discussion:

This patent is a division of the patent application associated with U.S. Pat. No. 6,219,461.

This invention relates to determining a depth or range sensing via defocus methods. It is intended for industrial applications such as solder paste volumes, 3D clay models, and inspection of semiconductor packages. It attempts to address the perceived state-of-the-art which allows 3D images to be derived from 2D images by exploiting optical principles related to the distance between an out-of-focus point and an in-focus point.

The essence of this invention is a method of analyzing pixel information in 2D images of a 3D object to obtain 3D surface information about the object. It uses at least three different images of the object at different optical path lengths, each with a different structured illumination projected onto the object surface. From this procedure contrast measurements in the 2D image are converted into depth calculations for the image. The structured illumination may be moved for each of the images.

U.S. Pat. No. 6,219,461—Determining a Depth
Abstract:
A three-dimensional image is derived from two-dimensional images. At least one of the two-dimensional images has a predetermined number of pixels. Depth measurements are derived from the two-dimensional images. The number of derived depth measurements is substantially equal to the predetermined number of pixels. The three-dimensional image is derived from the two-dimensional digital images and the depth measurements.

Inventors: Wallack; Aaron S. (Natick, Mass.) Assignee: Cognex Corporation (Natick, Mass.) Issue date: Apr. 17, 2001 Discussion:

This invention relates to determining a depth or range sensing via defocus methods and is a division of the patent application associated with U.S. Pat. No. 6,269,197.

The essence of this invention is a method of analyzing pixel information in 2D images of a 3D object to obtain 3D surface information about the object. For each of the 2D images a different structured illumination pattern is employed. The positions of a periodic structured pattern, with respect to the subject, are shifted by a portion of the repetition period. Focus-based depth measurements are derived for each pixel of at least one of the 2D images.

U.S. Pat. No. 6,148,120—Warping of Focal Images to Correct Correspondence Error
Abstract:
The invention corrects correspondence error among multiple images taken at different focal distances with non-telecentric optical systems, and is particularly useful in focal gradient analysis range imaging systems.

Inventors: Sussman; Michael (Winchester, Mass.) Assignee: Cognex Corporation (Natick, Mass.) Issue date: Nov. 14, 2000 Discussion:

This invention relates to 3D machine vision which employs depth-from-focus and depth-from-defocus techniques.

U.S. Pat. No. 6,025,905—System for Obtaining a Uniform Illumination Reflectance Image During Periodic Structured Illumination
Abstract:
The invention provides an apparatus and method for obtaining a uniform illumination reflectance image of an object, even though the object is illuminated only using periodic structured illumination. The uniform illumination reflectance image so-produced has precise geometric and photometric correspondence with images produced using the periodic structured illumination. To obtain the uniform illumination reflectance image, a sum of a spanning set of periodic structured illumination images is computed. The resulting summation image bears substantially no trace of periodic structured illumination. Various embodiments of the apparatus of the invention are disclosed employing illuminator motion, object motion, and ray deflection to obtain a plurality of periodic structured illumination images of different phase. The invention is useful with triangulation ranging systems using a striped periodic illumination mask, with depth-from-focus ranging systems, and with depth-from-defocus ranging systems.

Inventors: Sussman; Michael (Winchester, Mass.) Assignee: Cognex Corporation (Natick, Mass.) Issue date: Feb. 15, 2000 Discussion:

This invention relates to machine vision systems that employ periodic structured illumination. In applications which use structured illumination it is advantageous to use a uniform illumination image to normalize reflections from the target surface or distortions due to lens. This invention combines periodic structured illumination patterns in a manner that cancels out the periodic structures resulting in a uniform illumination. The cancellation typically consists of spatially shifting the illumination pattern by a specific phase of the illumination period.

U.S. Pat. No. 5,912,768—Depth-from-Defocus Optical Apparatus with Invariance to Surface Reflectance Properties Abstract:

A depth-from-defocus optical apparatus is provided for use with a depth-from-defocus three-dimensional imaging system for obtaining a depth image of an object. The invention facilitates the formation of depth images of objects exhibiting specular reflection, either alone or in combination with diffuse reflection, thereby allowing the application of depth-from-defocus three-dimensional imaging to objects such as microelectronic packages. The optical apparatus of the invention generally includes an illumination source, a projection lens assembly for converging rays of incident light towards an object, and a viewing lens assembly for converging rays of reflected light towards an image plane. Importantly, the viewing lens assembly is of the same working f-number as the projection lens assembly. In preferred embodiments, both the projection lens assembly and the viewing lens assembly exhibit object-side telecentricity so as to substantially eliminate vignetting of off-axis specular object features, and consequently, substantially eliminate specular false depth. The invention can also include an uncrossed polarizer/analyzer pair to balance the dynamic range of specular reflections with the dynamic range of diffuse reflections so as to effectively utilize the limited dynamic range of a single image detector.

Inventors: Sissom; Bradley (Norwood, Mass.); Sussman; Michael (Winchester, Wash.) Assignee: Cognex Corporation (Natick, Mass. Issue date: Jun. 15, 1999 Discussion:

This invention relates to 3D machine vision which employs depth-from-focus and depth-from-defocus techniques. The components of this invention include an illumination source, a projection lens assembly, a viewing lens assembly, and a beamsplitter device. These components together make up a telecentric optical system for focal gradient range systems.

U.S. Pat. No. 5,878,152—Depth from Focal Gradient Analysis Using Object Texture Removal by Albedo Normalization Abstract:

The invention provides a method and apparatus for obtaining a range image of an object. The method includes the act of "albedo normalization", i.e., removing the effects of object reflectance using a structured illumination image of the object and a uniform illumination image of the object to provide an albedo-normalized image. This image is then processed using a focus measure to provide a focal image, which image is then used to provide a range image. The invention substantially removes the effects of object reflectance from an image acquired its degree of focus/defocus remains. Albedo normalization is achieved by dividing an image of an object taken under structured illumination by a corresponding image of the object taken under uniform illumination. The albedo normalization act removes the primary source of noise in range images obtained using a depth from defocus or depth from focus of structured illumination technique, by removing spurious image frequencies from the image before processing by a focus measure. The albedo normalization act permits the depth from defocus and depth from focus techniques to be used for one or more focal positions, and over a broad range of materials of interest in machine vision.

Inventors: Sussman; Michael (Winchester, Mass.) Assignee: Cognex Corporation (Natick, Mass.) Issue date: Mar. 2, 1999 Discussion:

This invention relates to machine vision systems which have the ability to provide range images of 3D objects via defocus methods using structured lighting.

This invention removes the effects of surface reflections from the object targeted with the structured illumination pattern. The natural object reflectance texture, also called 'albedo', may be eliminated by dividing the structured-illumination image by an image obtained under uniform illumination. This process is referred to as albedo normalization. The result is an image of the object which is dependent entirely on the structured illumination. This process is advantageous in applications such as depth from focus/defocus, laser triangulation, stereo vision, advantageous in applications such as depth from focus/defocus, laser triangulation, stereo vision, and other structured lighting methods.

U.S. Pat. No. 5,953,126—Optical Profilometry

Abstract:

A scanning reflection profilometry system utilizes an objective lens which focuses a beam at the surface under test and measures the profile of the surface (its height variations) in accordance with the amount of defocus of the reflected beam. Surface profile distortion which is focus dependent is reduced through the use of a transparent mask over the aperture of the lens in the path of the beam which is incident on and reflected from the surface under test and which covers a portion but not all of the aperture. A photodetector upon which the reflected beam is incident provides output signals representing the change in profile. The system has height sensitivity characteristic of a small spot size on the surface without signal distortion attributable to the diffraction anomalies associated with small spot sizes. A microprofilometer head having the objective lens and other optics is mounted on flexures and driven to execute reciprocal movement so as to scan the surface under test.

Inventors: Zavislan; James M. (Pittsford, N.Y.) Assignee: Lucid Inc (Henrietta, N.Y.) Issue date: Sep. 14, 1999 Discussion:

This invention uses defocus information to obtain a range image. However, it employs a single spot from a laser beam rather than a structured illumination pattern.

U.S. Pat. No. 5,360,970—Apparatus and Method for a Single Return Path Signal Sensor System Abstract:

The radiation resulting from interaction with a data track or groove on a storage surface of an optical information storage and retrieval system is separated into three components and detected to provide tracking, focusing, and data signals. The separation is performed using a dual diffraction grating in a single optical path. The division between grating elements in the dual diffraction grating is oriented perpendicular to the data track or groove projected on the grating element. Diffraction radiation components generated by the dual diffraction grating are applied to a first and a second dual sensor elements. The first and second dual sensor elements provide a focusing signal. The undiffracted radiation component transmitted by the dual grating is applied to a third dual sensor. The division between sensors of the third dual senor is perpendicular to the division of the dual grating. Signals from the third dual sensor elements provide the tracking signal and the data signal. Several embodiments of the basic configuration are disclosed including a variety of configurations for defocusing the undiffracted transmitted radiation on the third dual sensor. In addition, a cylindrical lens can be used to defocus the radiation components from the diffraction grating in a single dimension.

Inventors: Kay; David B. (Rochester, N.Y.) Assignee: Eastman Kodak Company (Rochester, N.Y.) Issue date: Nov. 1, 1994 Discussion:

U.S. Pat. No. 5,900,975—Ghost Image Extinction in an Active Range Sensor

Abstract:

An apparatus is provided that includes a plate beamsplitter having a first surface coated with a partially reflective coating, and a second surface coated with an anti-reflective coating, and a polarizing filter, oriented with respect to the plate beamsplitter so as to substantially block light of substantially incompatible polarization that has traversed the plate beamsplitter, has been reflected by the object to be range imaged, and has been reflected by the plate beamsplitter towards the polarizing filter, thereby substantially preventing the formation of a ghost image of the object to be range imaged. Thus, the invention does not suffer from optical ghost images which commonly occur due to imperfect anti-reflection coatings used to make plate beam splitters. Also, the invention makes practical the use of plate beam splitters in depth from defocus and depth from focus range imaging systems employing coaxial active illumination and viewing.

Inventors: Sussman; Michael (Winchester, Mass.) Assignee: Cognex Corporation (Natick, Mass.) Issue date: May 4, 1999 Discussion:

U.S. Pat. No. 5,300,786—Optical Focus Phase Shift Test Pattern, Monitoring System and Process Abstract:

A photolithography mask structure having a novel optical focus test pattern is described. The mask structure has a non-phase-shifted, transparent substrate and includes a phase shifter of other than 180E disposed between spaced, parallel opposing lines such that an alternating pattern of non-phase-shifted material and phase-shifted material is defined transverse said parallel lines. When projected onto the surface of an object measurable shifts of the test pattern corresponds in direction and magnitude with the extent of system defocus. Various alternating test pattern embodiments are presented, all of which include at least one phase shift window of other than 180E in relation to the mask substrate. Further, a monitoring system and a monitoring process are discussed employing the presented mask structures.

Inventors: Brunner; Timothy A. (Ridgefield, Conn.); Hibbs; Michael S. (Westford, Vt.); Peck; Barbara B. (Westford, Vt.); Spence; Chrisopher A. (Westford, Vt.) Assignee: International Business Machines Corporation (Armonk, N.Y.) Issue date: Apr. 5, 1994 Discussion:

U.S. Pat. No. 5,231,443—Automatic Ranging and Automatic Focusing

Abstract:

A method based on image defocus information is disclosed for determining distance (or ranging) of objects from a camera system and autofocusing of camera systems. The method uses signal processing techniques. The present invention includes a camera characterized by a set of four camera parameters: position of the image detector inside the camera, focal length of the optical system in the camera, the size of the aperture of the camera, and the characteristics of the light filter in the camera. In the method of the present invention, at least two images of the object are recorded with different values for the set of camera parameters. The two images are converted to one-dimensional signals by summing them along a particular direction whereby the effect of noise is reduced and the amount of computations are significantly reduced. Fourier coefficients of the one-dimensional signals and a log-by-rho-squared transform are used to obtain a calculated table. A stored table is calculated using the log-by-rho-squared transform and the Modulation Transfer Function of the camera system. Based on the calculated table and the stored table, the distance of the desired object is determined. In autofocusing, the calculated table and the stored table are used to calculate a set of focus camera parameters. The camera system is then set to the focus camera parameters to accomplish autofocusing.

Inventors: Subbarao; Muralidhara (Port Jefferson Station, N.Y.) Assignee: The Research Foundation of State University of New York (Albany, N.Y.) Issue date: Jul. 27, 1993 Discussion:

U.S. Pat. No. 4,841,325—Automatic Focusing Device for Camera

Abstract:

An automatic focusing device for use in camera lens systems comprises lens means such as a zoom lens for forming the image of an object, detecting means for detecting the amount of defocus of the image of the object formed by the lens means from a predetermined plane such as a film surface, memory means for storing at least one value of conversion coefficient and at least one value of correction coefficient which is used in a calculation for correcting the conversion coefficient, calculating means for correcting the conversion coefficient in accordance with the amount of defocus and the correction coefficient and for calculating the driving amount of at least a portion of the lens means on the basis of the corrected conversion coefficient and the amount of defocus, and lens driving means for driving at least a portion of the lens means, e.g., the front lens group of a zoom lens, in accordance with the driving amount calculated by the calculating means. Disclosed also a lens system, as well as a camera, incorporating this automatic focusing device.

Inventors: Hoshino, deceased; Kunihisa (late of Tokyo, JP); Hamanishi; Yoshinari (Tokyo, JP); Utagawa; Ken (Kawasaki, JP) Assignee: Nikon Corporation (Tokyo, JP) Issue date: Jun. 20, 1989 Discussion:

U.S. Pat. No. 4,088,408—Device for Measuring the Contour of a Surface

Abstract:

The invention is a device for measuring the contour of a surface. Light from a source is imaged by a lens onto the surface which concentrates the energy from the source into a spot. A scanning means is used to scan the spot across the surface. As the surface is being scanned the surface moves relative to the point of perfect focus. When the surface moves away from perfect focus the spot increases in size, while the total energy in the spot remains virtually constant. The lens then re-images the light reflected by the surface onto two detectors through two different sized apertures. The light energy going to the two detectors is separated by a beam splitter. This second path of the light energy through the lens further defocuses the spot, but as a result of the different sizes of the apertures in each light detector path, the amount of defocus for each is different. The ratio of the outputs of the two detectors which is indicative of the contour of the surface is obtained by a divider.

Inventors: Burcher; Ernest E. (Newport News, Va.); Katzberg; Stephen J. (Yorktown, Va.); Kelly, IV; William L. (Hampton, Va.) Assignee: The United States of America as represented by the Administrator of the (Washington, D.C.) Issue date: May 9, 1978.

1.5. Surface and Volumetric Renderings

There are many methods for visualization of volume data. A complete description of this large and rapidly changing field is beyond the scope of this discussion. However, two popular approaches are surface rendering and volume rendering. Surface rendering is a technique which treats the volume as having only a combination of surfaces or shells. Volume rendering on the other hand, maintains and manipulates many cubic building block known as 'voxels' to represent the volume. Volume rendering may be especially useful when the entire volume of the object contains information (density, elasticity, acoustic impedance) such as with magnetic resonance or ultrasound images. Both methods may begin with a 3D point cloud of data points as might be obtained from one or more range images.

Surface Rendering

In surface rendering the volumetric data must first be converted into geometric primitives, by techniques such as isosurface extraction or isocontour extraction. These primitives, such as polygon meshes or contours, are then rendered for display using conventional display techniques.

Advantages of Surface Rendering Include:

a) fast display and manipulation of the 3D reconstructions since only the surface vertices need to be manipulated and stored.

Disadvantages of Surface Rendering Include:

a) a required intermediate conversion to a surface representation which can sometimes be quite complex;

b) the lack of internal details of the volumes, since only the surfaces or shell is maintained; and c) susceptibility to discontinuities in the 3D scanning.

One common method to determine a surface from a set of discrete data points is known as the Marching Cube Algorithm. This algorithm is a table-based, surface-fitting algorithm for rendering surfaces in volume space. The basic idea is to march a cube through the volume containing the surface to determine if the cube, in a given position, is totally inside the surface, totally outside the surface, or intersecting the surface. For those cube positions intersecting the surface, an index is maintained which records which of the 8 cube vertices (corners) are inside the surface and which vertices are outside the surface. Theoretically, $2^8=256$ combinations are possible. However, eliminating symmetrical and inverse duplications, 14 unique configurations exist. Each configuration of vertices which are within the surface and vertices which are outside the surface results in a specific shape or surface patch bounded by the shape of the marching cube. Surface planes intersecting near a cube corner result in a triangular surface intersection, while surface planes which intersect four sides of the cube results in a surface patch having a rectangular shape. When the cube has completed its march through the volume, the resulting index of intersecting cube positions and the record of which vertices where inside and outside the surface can be used to create a patchwork quilt which is an accurate representation of the surface. Even greater surface resolution is possible if interpolation is used to determine where the surface intersects each cube edge as the cube progresses through the volume. The end result is a table of surface patches which can be passed to a rendering program that maps them into image space.

Another common method to obtain a surface from a set of discrete 3D surface points is known as Delaunay Triangulation. In this technique a set of lines is generated connecting each point in 3D space to its natural neighbors. The result is a triangular mesh, with non-uniform vertex locations, which represents the surface. If desired, this surface can then be converted to a rectangular mesh grid via resampling and interpolation. Such a rectangular mesh grid is easily displayed using common graphics programs.

Contour algorithms may also be used to convert non-uniformly sampled, discrete 3D surface data into a surface portrayed on a rectangular grid. In this type of algorithm lines are drawn through or between existing 3D data points of equal elevation. This series of lines may resemble the rings on a topographical map of a mountain. These equi-planar lines may in turn be converted to a rectangular mesh grid via resampling and interpolation.

Volume Rendering

In volume rendering the volumetric data is sampled into many cubic building blocks called 'voxels' (volume element), the volumetric equivalent to the 2D 'pixel' (picture element). Each voxel carries one or more values for characteristics of the volume such as color, density, or elasticity. In volume rendering, the voxels are displayed and manipulated directly with computers having substantial amounts of memory and processing power.

Advantages of Volume Rendering Include:

a) the ability to display the 3D volumes with no knowledge of the volume data set and hence no need to transform the data to an intermediate surface representation;

b) the ability to display any part, including internal structures, since the entire volume has been preserved; and c) less susceptibility to discontinuities in the 3D scanning since the underlying volume is maintained.

Disadvantages of Volume Rendering Include:

a) the need for computers with a large memory and a great deal of processing power since the entire volume is displayed and manipulated; and b) much slower rotations and manipulations are likely even with a large memory and substantial processing power.

One method which somewhat reduces the vast amount of data storage and processing connected with volume rendering and processing is known as octrees. An octree representation of a volumetric image is based on an hierarchial volume subdivision where each volumetric cube is broken into eight equal, sub-cubes. Each of these sub-cubes in turn can be broken into eight sub-cubes of its own. Described in parent-child nomenclature, if all children of an octree branch are included in the graphical image of the volume, then only the parent data need be recorded or manipulated, representing an 8:1 reduction in data and computation time. If two generations of octree levels are included by reference to a grandparent then a 64:1 reduction in data and computation time occurs. This approach maintains the fine resolution for an edge at the child level but enables efficient manipulation when grandparent or great-grandparent cubes of data are in common. This hierarchial level treatment may be extended to any number of generations. With specially derived computation methods volume unions, intersections, and manipulations are much more efficient than brute force treatment of all individual voxels. In the case of MRI or ultrasound data, each child, parent or grandparent cube element may be assigned characteristics such as density in addition to position.

1.6. Thermal Imaging

Thermal Imaging Technology

Historically, thermal imaging equipment was large, inconvenient and expensive. It yielded analog display information with the use of detection elements which required cooling via a supply of liquid nitrogen. Large battery packs were required for any attempt at portable operation. Costs for such a camera system were $50,000–60,000.

Recent solid state developments have resulted in thermal imaging cameras that are only slightly larger that a 35 mm photographic camera. They do not require cooling and easily operate at room temperature. One such thermal imaging camera is the IR SnapShot® manufactured by Infrared Solutions, Inc. This camera is based on Honeywell infrared (IR) thermoelectric thermal array detector technology. It is an imaging radiometer, an infrared camera that acquires a thermal image of a scene and can determine the temperature of any pixel within that scene. Pressing a push button on the camera causes a 120-element linear thermoelectric detector array to scan across the focal plane of a germanium IR lens in approximately 1.5 seconds. Software within the camera permits the 120.times. 120 pixel thermal images to be stored in flash memory cards or downloaded directly to a laptop or desktop computer for processing. The calibrated thermal images may be displayed with numerous colormaps on either the color LCD display of the camera or on the computer displays.

Radiometric IR cameras that operate at a video rate are nearing the end of development. Such cameras promise the thermal accuracy of the still IR cameras with image acquisition at the faster video rate.

Thermal images from radiometric cameras such as those described above provide a wealth of thermal information which can be analyzed and processed. The data is basically a matrix of temperatures in which each element corresponds to a pixel in the thermal image. It is common for IR camera manufacturers to provide software which computes thermal histograms of the scene and user selectable area or line indicators which then provide thermal properties of the selected area or line region of the image.

Thermal Imaging as an Indicator of Backfat

Driven by consumer desire for leaner meat products, there is application in the livestock industries for accurate and convenient methods to evaluate fat content or lean:fat ratios. While the total dissection of muscle mass is still the most accurate method, livestock producers and processors have long measured backfat thickness via ultrasound or directly as an indication of lean:fat ratios. A number of inventors have attempted to employ noninvasive thermal imaging to obtain an indication of lean:fat ratios and other meat quality measurements.

1.7. Calculation of Volumetric Measurements

Silhouette (Profile) vs. 3D Calculations of Volume

In order to evaluate the need for three-dimensional data techniques, it is of value to consider the calculation of volume for a standard geometric shape such as a cylinder.

First consider computing the volume of a cylinder from one or several side views. The diameter and length of the cylinder are D and L, respectively. From any side view, a silhouette or profile approach sees a rectangle that has width, D, and length, L. Any attempt at estimating volume from silhouette data would yield a cylinder volume of:

$$V_{silhouette} = D^2 L \quad (1\text{-}1)$$

where $V_{silhouette}$ is the volume of the cylinder using silhouette data; D is the cylinder diameter; and L is the cylinder width.

Considering the same cylinder from side views with 3D data yields the true cylinder volume:

$$V_{3D} = \pi D^2 L/4 \quad (1\text{-}2)$$

$$\text{ERROR} = V_{silhouette}/V_{3D} - 1 = D^2 L/\pi D^2 L/4 - 1 = 4/\pi - 1 = 27.3\%; \quad (1\text{-}3)$$

Considering the same cylinder from side views with 3D data yields the true cylinder volume:

$$V_{3D} = \frac{\pi D^2 L}{4}; \quad (1\text{-}2)$$

with variables as defined previously.

To evaluate the error of the volume calculation using silhouette or profile in formation:

$$\text{ERROR} = \frac{V_{silhouette}}{V_{3D}} - 1 = \frac{D^2 L}{\frac{\pi D^2 L}{4}} - 1 = \frac{4}{\pi} - 1 = 27.3\%; \quad (1\text{-}3)$$

A natural defense for the above error estimation is that a silhouette view from the end of the cylinder would acquire the necessary circular data. However, in the evaluation of livestock, most silhouette methods use only side and top. Logistically, an end view requires that a camera be placed directly in the path of the animal and an opposing wall be placed at the opposite end. A second practical consideration is that such an end view, in profile, would not be accurate if the animal axis was slightly skewed in one direction or the other. The profile would also be compromised if the head of the animal was turned to one side.

From the above considerations it is evident that a true three-dimensional imaging system will more accurately represent the volume of an animal than silhouette or profile systems.

2.0 SUMMARY OF THE INVENTION

The present invention has been conceived to obtain volumetric, curvilinear and linear measurements of livestock animals and full carcasses, specifically cattle, and hogs. Important goals of the invention are to provide significantly improved accuracy over existing technology and also to increase the speed of acquiring these measurements.

This invention may be used to acquire physical dimensions of cattle or hogs as they pass through a common chute as shown in FIG. 2-1. In this example, range cameras with illuminators are located on three sides of the target animal. An infrared camera is also positioned over the animal to obtain thermal images of the back region. Proximity sensors are aligned to trigger image acquisitions as the animal moves through the target region. The dimensional data is processed and displayed. FIGS. 2-2A and 2-2B show examples of the 3D data available from this invention for a cow and a pig, respectively. A horizontal plane, a vertical plane, and three camera positions are also shown.

2.1. True 3D Surface and Volumetric Measurements

This invention provides a true three-dimensional (3D) data set. From such a 3D data set the accurate computation of volumes, curvilinear surface measurements, and linear measurements are possible. This level of accuracy for a 3D data set is far superior to a simple silhouette or profile data set. The level of accuracy possible with a true 3D data set is also superior to a 2D video data set with (or without) a superimposed grid. FIGS. 2-3A, 2-3B, 2-3C, and 2-3D show a comparison of these three types of data sets with the silhouette shown in the top positions, the 2D video image in the center positions, and the true 3D data set of this invention in the bottom positions.

The silhouette or profile data only provides measurement potential around the outline of the silhouette since no landmarks exist within the darkened shape. Two orthogonal silhouette views, combined to calculate a pseudo-volume, lack the ability to recognize shape concavities and provide only a gross estimation of volume.

The 2D video image has the volumetric limitations of the silhouette data with no ability to account for surface concavities. Though the 2D video data does provide the ability to locate landmarks within the 2D silhouette outline, all surface features and measurements are obtained as their corresponding projections onto a flat, 2D surface. The limitations of the 2D view may be illustrated by observing lines A–B and C–D shown on the skin of the animals in the 2D and 3D views. The 2D side views show no evidence of the surface curvature. The 3D data, also taken from the side, may be rotated to show the true surface curves. FIG. 2-4 shows these surface lines. FIG. 2-4a shows the 2D lines, while FIGS. 2-4b and c show two examples of the 3D lines.

Additional 3D data sets are displayed in FIGS. 2-5A and 2-5B. FIG. 2-5A shows a cow in rear-side, side, and front-side views. FIG. 2-5B shows a pig in front-side, side, and rear-side views. The aforementioned data sets should be compared with the limited silhouette data of FIGS. 2-6A, 2-6B, and 2-6C. When observing FIG. 2-6B it is useful to note that any hip width measurements, obtained from a silhouette, develop gross errors if the animal turns slightly to one side or the other. 2.2. Range Images A range image is an image whose values represent distances from the imaging device. A range image taken from an airplane flying over a mountain range becomes a topographical map when the plane-to-ground distances are referenced to sea level. This invention makes use of range images and range cameras. For the purposes of this patent application a range camera is a device which acquires single or multiple images of a scene and converts those images into a range image output.

A range image may be further described as a grayscale image in which each grayscale pixel value represents a surface elevation instead of the common brightness level. The surface elevation values are referenced to a designated reference plane perpendicular to the axis of the camera lens. FIG. 2-7 illustrates a range camera or 3D camera having a square block and a cone within its field of view. The output range image is shown as a mesh diagram to indicate the pixel elevations which naturally resemble the height of the original targets.

FIG. 2-8a shows a very simple example of a three-dimensional block within an x-y-z coordinate system. If a range camera were placed above the block with the lens axis aligned parallel to the z-axis, a range image matrix similar to that of FIG. 2-8b might result. This is an N×M matrix in which each element value represents a measure of the surface elevation above a reference plane perpendicular to the camera axis. The zero values within the matrix represent those regions of the image where the x-y plane is visible from above. The '3' values within the matrix represent the top surface of the block. The N rows represent incremental steps along the y-axis while the M columns represent incremental steps along the x-axis. FIG. 2-8c shows the range image data represented as a mesh surface which naturally resembles the original target block.

2.3. Range Camera Technology.

Definitions.

For the purposes of this patent, a range camera is any device which provides as its output a three-dimensional data set related to the physical surface or volume of a target located within its field of view. The wide assortment of technologies which may be employed to acquire these 3D data have been discussed in Section 1.4. Any present or new range camera technology which is not described herein, but provides such 3D data, is anticipated under this description and is apparent to anyone skilled in the art.

A large subset of range cameras, which are especially applicable to this invention, includes a visible-spectrum camera capable of obtaining a 2D image, a means of digitizing the 2D image, and sufficient signal processing to convert the digitized 2D image into a 3D surface or volume according to the specific range camera principles. The visible-spectrum camera of this subset may acquire image frames at various speed. An analog video camera may be used to acquire images at a video rate of 30 frames per second with a frame grabber employed to digitize the images. A digital video camera might acquire digital images at a rate of 30 frames per second and download the digital images to a processing unit in real time. A still digital camera may be used to acquire images individually or at a modest frame rate. In the extreme, a still 35 mm camera might even be employed to conceptually demonstrate a capability by acquiring images on film, developing the film, digitizing the images, and processing the images in a non-real-time manner.

In general, within this document, range camera refers to the entire acquisition and processing system which results in a 3D data set; visible-spectrum camera refers to an optical system for acquiring 2D images indicating intensities of reflected light within the visible bands of the electromagnetic spectrum; Infrared or thermal camera refers to an infrared optical system and image acquisition system which results in a 2D thermal image. The meaning of the term, camera, used alone, is most often evident from the paragraph content (i.e., camera positions refers to the positions of visible-spectrum, range, and infrared cameras). The description of a range camera position is often identical to a visible-spectrum camera position for those range camera technologies that employ a visible-spectrum camera to acquire the initial 2D image. The processing component of such a range camera has no fixed physical position since the processing is often done remotely via software or dedicated hardware. While these general terminology guidelines are meant to be helpful, the obvious specifics of local context shall take precedence.

Key Characteristics.

In order to fulfill the primary goals of this invention, the selected range camera or range camera technology should exhibit the following characteristics:

1) a resistance to motion artifacts; and
2) a high animal throughput rate.

A secondary goal is to accomplish the complete output at a video rate (30 frames per second).

For a range camera, motion artifact resistance has two components. The first component is the accurate acquisition of each individual image acquired by a camera. A fast shutter speed or short image acquisition time, used in conjunction with a narrow flash pulse, is able to 'freeze' motion to avoid a blur in that individual image. The second component concerns those range cameras that require multiple images to compute the 3D range image. If the target has moved between these multiple images, the potential for image-to-image misalignment is present. The individual image blurring can be improved with image processing techniques applied to each individual image. The image-to-image misalignment due to motion can be improved by image correlation or realignment techniques applied among multiple images. The simplest and fastest method to address these an individual image and to choose a range camera technology which requires as few images as possible to minimize image-to-image motion misalignment.

The desire to provide range images at or near video rates has additional considerations. For range camera technologies which require more than a single image to compute the range image, the input images must be acquired at a rate substantially faster than 30 frames per second. For example, a range camera technology that requires 3 images to compute a range image must acquire those images at better than 90 frames per second in order to output range images at the video rate. In addition to acquiring the images, each image must be downloaded and processed by the processor within the designated time for one video frame, $1/30$ second. A scanning system that requires 100 images to map out the range image cannot easily acquire, download, and process that quantity of images fast enough to achieve the 30 frames per second output.

A high animal throughput results from efficient processing algorithms in computing the range image, merging multiple surfaces, and computing the desired volume measurements. These goals benefit from a minimal number of images to compute the range image and a high-speed DSP (digital signal processor). Minimizing the number of cameras also improves processing speed.

Table 2-1 compares the range camera technologies best suited for the present invention. These are active depth from defocus, active stereo, active laser present invention. These are active depth from defocus, active stereo, active laser stripe triangulation, and active depth from focus. Pulsed or modulated light (or IR) was not included in this table since such time-of-flight systems are slower point or line scan system which may lack axial resolution due to the high frequency processing required to measure variations in light propagation times.

TABLE 2-1

COMPARISON OF ACTIVE OPTICAL, RANGE CAMERA TECHNOLOGIES

|  | DEPTH FROM DEFOCUS | DEPTH FROM FOCUS | LASER STRIPE TRIANGULATION | STEREO |
| --- | --- | --- | --- | --- |
| cameras per view | 1 | 1 | 1 | 2 |
| laser safety concern | no | no | yes | no |
| data acquisition speed | fast, 2–3 sequential images | medium, requires automated lens focusing through range and the acquisition of multiple images | medium-slow, requires laser scanning in multiple positions and the acquisition of multiple images | fast, 2 simultaneous images |
| single image computation | no, 2–3 typical | no, multiple images required while focusing lens | no, multiple images corresponding to each stripe position | no, requires 2 images, one from each of 2 cameras |
| algorithm stability with surface obstructions present | very stable | very stable | may become unstable | may become unstable |
| surface resolution | depends on illumination and optics | depends on optics and focal steps | high | high |
| registration | relatively easy, single camera with 2 or 3 images | moderately easy, 1 camera with multiple images, must watch for change in magnification with focus change | moderately difficult due to multiple images and stripes | moderately difficult due to registration of 2 cameras |

From this comparison the characteristics of active depth from defocus technology appears as to be a good match with the requirements of this invention. With a low number of images to compute the range image, this technology can achieve a reasonably fast image acquisition rate. The low number of images also minimizes processing time to permit faster animal throughput. Added bonuses include non-laser structured light sources for eye-safe operation and single camera (per view) operation to reduce equipment costs.

Correction for Lens Distortion.

Any range camera technology employing visible-spectrum cameras relies heavily upon the integrity of the 2D image in order to extract 3D information by the selected range camera principles. The 3D features present in the 2D image may be significantly altered by lens distortion within the 2D camera system. For this reason is necessary to correct the 2D image for lens distortion.

2D images used to extract 3D information must be corrected for lens distortion. This correction occurs after the 2D image has been digitized and before attempting to extract 3D information from the image. Since the target animal is large and the desired lens-to-target, working distance is reasonably under 12 feet, a wide angle lens is a logical selection. Images taken with such a wide-angle lens system will result in a barrel distortion effect. Conversely, if a longer, telephoto lens is used, (requiring a much longer working distance) a pincushion distortion results. FIG. 2-8B shows examples of these types of distortion. FIG. 2-8Ba illustrates a rectangular grid similar in concept to one that might be used to calibrate the present invention (many more lines would be on the actual grid used for calibration). FIG. 2-8Bb shows a barrel distortion similar to what might be seen with a wide angle lens. The region of the image near the center is enlarged and the region around the edges is smaller. FIG. 2-8Bc shows a pincushion distortion similar to what might be seen with a telephoto lens. The portion of the image near the center is smaller and the region around the edges is larger. Most lenses and lens systems have a variation on these types of distortion.

Correction of these distortions, as well as other that may occur, may be accomplished via commercially available software packages if the processing interface is acceptable. Commercially available software packages are available to correct the image for such distortion. Such a package as LensDoc™ from Andromeda Software (699 Hampshire Rd., Ste. 109, Thousand Oaks, Calif., 91361) provides such processing for photo software packages such as Adobe Photoshop and Paint Shop Pro.

Custom correction of just the resulting measurements may also be accomplished by knowledge of the distortion magnitude as shown in FIG. 2-8C. If the size of each square in the barrel distortion of FIG. 2-8Bb is measured and the values (cross sectional distance or square root of each area) are plotted across the image on the center of each square, a surface will be formed across the image that has greater magnitude in the image center and lesser magnitude at the edges of the image. A contour plot of the resulting surface is shown in FIG. 2-8Ca. FIG. 2-8Cb shows the same surface in a mesh surface plot format. In FIG. 2-8Da the surface values from point A to point B are shown with the associated values being less than the nominal value in the middle of the image, $h_1$ as shown on the graphs. By computing the average surface value over the distance A–B, a compensation factor for the distance may be computed. Since A–B of the image is shorter than the true A–B due to the shrinking of peripheral regions in a wide-angle lens, multiplication of the measured A–B distance by $h_1/h_{avg}$ will result in the proper enlargement of the measured A–B distance to take into account the lens distortion. The distance correction for the lens distortion is:

$$k = h_1/h_{avg}; \text{ and} \quad (2\text{-}3)$$

$$d_{corrected} = k \cdot d_{measured}. \quad (2\text{-}4)$$

This calibration factor, k, may be passed to the calibration block within the processing channel.

The basic process for correcting the barrel distortion described above may be applied for the pincushion distortion illustrated in FIG. 2-8Bc or to other distortions which may be encountered. While optics with no or minimal distortion are always preferred, some level of distortion may be removed in the above manner.

2.4. Camera Positions

In general, the selection of the number and location of range cameras required to accurately reproduce a target is largely dependent upon the complexity of the target surface. In the case of live or carcass animals, such as cattle and hogs, a three camera configuration such as that shown in FIG. 2-9 is acceptable. Each range camera obtains a range image of the animal surface within its field of view. As shown in FIG. 2-9, orthogonal camera orientations may be chosen with camera axes aligned from the right and left sides and the top. Such orthogonal orientations result in the surface seams as shown. Seams 1-2 and 3-2 are in regions where there is an overlap of range image surfaces. This provides sufficient surface accuracy to achieve the desired volume calculations. However, with the camera alignments shown, the 1-3 seam has no surface overlap. This potential shortcoming may be remedied by aligning side cameras 1 and 3 in the lower positions labeled, 'alternate camera 1 axis' and 'alternate camera 3 axis', respectively. In these alternate alignments, there is more surface overlap along the ventral surface of the animals while maintaining sufficient overlap in the two upper seams. Since the entire surface of the animal is recorded, this range camera configuration permits very accurate volumetric measurements as well as curvilinear and linear measurements.

If it is desired to reduce the count of range cameras for cost of other reasons, it is possible to rely upon the lateral symmetry of the animal and still obtain a reasonably accurate measurement of volumes. FIG. 2-10a shows a 2-camera configuration in which the single side camera obtains a range image that is mathematically duplicated and reversed to represent the range image of the opposite side. The top camera is essential to accurately measure the position of the median or midsagittal plane about which the two side images are aligned. This concept is reasonably sound when the target animal is symmetrical. Measurement errors may appear if lateral symmetry is not precise for some reason. Any diagonal movement of the animal in the chute will be observed from the top camera. For completeness, the top camera may theoretically be replaced by a mechanical method which locates the median plane. FIG. 2-10b shows such a mechanical method. A saddle-like device with a dorsal plane may be lowered onto the back of the animal. The saddle shape will align the dorsal plane with the median plane of the animal. The side range camera can measure the orientation of the dorsal plane and in turn compute the axis of symmetry corresponding to the median plane. Any attempt to use lateral symmetry to compute volumes without locating the median plane can easily result in significant errors.

FIG. 2-11A shows how errors result in calculating cross-sectional area or volume from the use of symmetry with an erroneous positioning of the median plane. FIG. 2-11A.a shows the attempted use of a single camera which has no means of accurately determining the median plane position from a side view. The correct position of the median plane is position B. Positions A and C are erroneous on either side of position B. FIGS. 2-11A.b, and 2-11B.c, and d show cross-sections of the resulting volumes obtained by using an assumption of symmetry and the median plane positions of FIG. 2-11Aa. FIG. 2-11A.b uses median plane position A which results in a serious underestimation of volume. FIG. 2-11B.c uses median plane position B which results in an accurate calculation of volume. FIG. 2-11B.d uses median plane position C which results in an serious overestimation of volume.

2.5. Fast, Motion-Resistant Image Acquisition

The targets for this invention are live animals or full carcasses, specifically those of cattle and hogs. As discussed previously, since live animals are seldom still, it is evident that a fast shutter speed or a rapid image acquisition is advantageous to avoid blurring of all acquired images used as the basis to compute physical measurements. FIGS. 2-12A and 2-12B simulate the effects caused by motion. Excluding the application of extraordinary resolution enhancement techniques, the resolution of the range image is limited by the resolution of the initial camera image. The resolution of the initial camera image is greatly reduced by motion artifacts and blurring. The required shutter speed is related to the desired resolution and the motion speed in the following manner:

$$R=VS; \quad (1\text{-}1)$$

where R is the desired resolution on the surface of the target in inches; V is the velocity of the target in inches per second; and S is the shutter speed or image acquisition time in seconds. Equation (1-1) can be rewritten to solve for the required shutter speed given a desired resolution:

$$S = \frac{R}{V};$$

where the variables are as previously defined. The following table provides some sample shutter speeds for given velocities and resolutions (units have been converted as needed).

| RESOLUTION, R | VELOCITY, V | SHUTTER SPEED, S |
|---|---|---|
| 1 inch | 1 inch/sec | 1 sec |
| 0.5 inch | 5 inches/sec | 100 ms (1/10 sec) |
| 0.1 inch | 20 inches/sec | 5 ms (5/1000 sec) |
| 0.1 inch | 5 mph | ~1/1000 sec |
| 1 mm | 5 mph | 447:μs |
| 1 mm | 1 mph | 2.24 ms |

(The above calculations assume that the optics and image pixel density is sufficient to achieve the stated resolutions.)

2.6. Advantageous Camera Characteristics

Since the core of many range camera technologies is a visible spectrum camera, it is advantageous for the visible spectrum cameras used as part of this invention to have a number of specific characteristics. These characteristics include fast image acquisition or shutter speeds, multi-camera synchronization, structured light systems which project pre-selected patterns onto the targets, both slow and fast frame rates, color image capability, and standby image feed to assist with animal alignment.

The need for fast acquisition or shutter speeds has already been presented. Target motion is the driving requirement for this characteristic. The acquisition speeds need to be coordinated with the animal or carcass velocity and the desired resolution. From a system perspective it may be possible to reduce the speed requirements and cost of the camera systems by simply designing a different chute system which slows the animals down as they pass through the camera area. Conversely, if animal throughput is the priority, acquiring a higher-priced, faster camera system may be the most efficient approach.

Since multiple cameras are proposed for this invention, a synchronization method is advantageous. If digital still cameras are employed, an electronic trigger may be used to initiate all cameras in the system. The same trigger signal may be used, perhaps with a pre-selected delay, to trigger a flash system projecting the structured light patterns onto the target during the acquisition time of a given camera. To avoid crosstalk from one flash pattern to an adjacent camera, it may be useful to stagger the triggers to each camera slightly or vary the acquisition (shutter) delays for each camera.

FIG. 2-13 shows several timing options for such systems. FIG. 2-13a shows a basic camera timing diagram. A trigger pulse (top trace) is provided to a given camera. After a brief shutter delay, the shutter is opened for a period in which the image is acquired (center trace). At an appropriate moment during the acquisition time the flash is fired projecting the structured light pattern on the surface of the target (bottom trace of FIG. 2-13a). FIG. 2-13b shows a timing diagram with simultaneous shutter opening and staggered flashes. This particular approach may be useful during system setup to identify regions of the target surface where the range images overlap, but it would not solve concerns about one cameras flash being picked up by an adjacent camera because all the acquisition times of all cameras occur simultaneously. FIG. 2-13c provides a timing solution to the crosstalk concerns. In this timing diagram both the shutter and flash periods are staggered such that the acquisition time for a given camera can only be illuminated by its own flash unit.

If video cameras are employed with the system, the crosstalk issue is somewhat more complex. Ideally, the flash unit and camera units would be aimed such that cameras are not influenced by adjacent flash units. This would avoid the need for more complex timing solutions. If crosstalk is unavoidable, the video cameras may be synchronized and sequential frames used for each camera with a given camera's flash illuminating the target only during the designated frame. At a 30 Hz frame rate, three sequential frames would take 100 ms or 0.1 seconds. Spreading the image acquisition out over this amount of time may make the system vulnerable to motion artifacts and blurring. If such is the case, using video cameras with faster shutter speeds is an option. The faster shutter speeds enable all cameras and flashes to be triggered during a single video frame. If the video cameras have the capability to vary the shutter timing within a video frame, that method could be used. Otherwise the synchronization of the video signals can be used to stagger the acquisition times sufficiently. The latter approach is also valuable if the range camera technology requires multiple images to obtain a range image.

The image acquisition rate is largely a function of camera selection. Still digital cameras may be used for obtaining range images several seconds apart. Video cameras may be used to acquire images at a video rate. High-speed, video cameras with accelerated frame rates are also available if faster acquisition rates are necessary.

While monochrome images are sufficient for most range camera purposes, the relatively inexpensive use of color cameras has at least one significant application. That application is the identification of animal breed or perhaps even the individual animal by use of the color and pattern markings of the animal's coat. Cattle breeds in particular may easily be identified by color or markings. Individual animals often exhibit unique spot patterns.

A video feed from the either a digital camera or a video camera to a monitor located near the control unit may be an advantage. Such a monitor can be used by the operating personnel to confirm the position of the animal during the measurement process.

2.7. Structured Light Systems

Numerous structured light configurations are possible for the range cameras discussed within this application. Perhaps the simplest is a lens projection system which projects the desired pattern onto the target. Modulated laser systems which rapidly scan the target are also possible, though complex scanning alignments and intensity modulation can result in a relatively, high priced system. The projected pattern may be a grid, a series of dots, bars, or other custom shapes. The particular pattern is selected to match the range camera technology.

2.8. Data Acquisition

The data of this invention is acquired with an equipment layout similar to that shown in FIG. 2-14. In this layout, the target animal enters the chute area from the right and proceeds into the central region where the cameras are positioned. Proximity switches on either side of the proper zone indicate electronically when the animal is in position. Range cameras with the appropriate flash illumination patterns are positioned on each side of the target animal and above the animal to obtain two side and one top view of the subject. An infrared (IR) camera is positioned above the hindquarters of the animal to obtain a thermal image of the animal's back in order to provide an indication of backfat. FIG. 2-15 shows a typical range camera layout. The range image data, shown only for Range Camera 2, is referenced to a horizontal plane through the center of the target animal. The IR camera is positioned in line with the top range camera, #2.

Upon acquiring the appropriate images, these digitized images are downloaded to the Processing Unit shown near the chute area in FIG. 2-14. The Processing Unit in turn passes the data to the personal computer for display and storage of the data. While the Control and Processing Unit and the personal computer are shown alongside the chute, these components may be located a significant distance from the chute area provided that transmission speed and accuracy are not compromised.

2.9 Data Processing

The data obtained from the visible spectrum cameras of FIGS. 2-9, 2-14, and 2-15 must be processed to obtain the range images and then undergo further processing to form the complete 3D model. Once in the form of a 3D model the data may be interrogated to obtain many useful measurements. Conceptually, FIG. 2-16 shows the processing progression. Range cameras acquire 3D data from the target animal and convert them into point cloud format. The control and processing unit, containing sufficient processing power and memory, convert the data into a more useful format. These data can now be display and interrogated via a laptop or desktop computer which in turn may communicate with selected peripheral devices.

Processing Channel

The processing channel from visible spectrum cameras to measurement tables and display is shown in greater detail in FIGS. 2-17A and 2-17B. In this figure, the target animal is illuminated with structured illumination and images are obtained from three strategic camera positions (additional or fewer positions may be required for a shaper of different complexity). Each of the digital images are processed by the range image algorithm to obtain a three-dimensional point cloud set. These points may be oriented somewhat arbitrarily with respect to a given coordinate system. The mesh algorithm is applied to each view data set to convert the arbitrarily-spaced point cloud data into a mesh surface with a grid coordinate system. The mesh algorithm is described hereinafter and is illustrated in FIG. 2-19, and in FIGS. 2-20A through 2-20H. Upon application of the mesh algorithm to each of the three different view data sets, the data takes the form shown in FIG. 2-21. In FIG. 2-21 the three, 3D views of the target animal exist separately but with the same coordinate system. The 3D merger algorithm is then used to align, register and combine the independent view data sets into one unified data set. Once the three separate sets are combined, both default and custom measurements can be made. The output of these measurements can be provided in quantitative tables, graphic displays, or in any other format commonly used for viewing or analyzing data.

FIGS. 2-18A and 2-18B taken together show the same processing channel as FIGS. 2-17A and 2-17B only with the addition of a thermal imaging camera for obtaining thermal images as an indication of backfat thickness.

Mesh Processing

The mesh processing algorithm shown in FIGS. 2-17A, 2-17B, 2-18A and 2-18B is presented in greater detail in FIG. 2-19 and FIGS. 2-20A through 2-20H. The point cloud data set from one range camera view is the input to the mesh algorithm. FIG. 2-19 shows the next processing step to be Delaunay triangulation. This step produces a set of lines connecting each point in the 3D set to its natural neighbors. The result of Delaunay triangulation is a triangular mesh surface with non-uniform sampling in any specific coordinate system. A rectangular grid is next generated with dimensions similar to those of the triangular mesh. Using the triangular mesh data an interpolation technique is used to match the triangular data set to the rectangular grid samples. The output of this process is a 3D surface with points located on a rectangular grid ready for merging operations based on a standard rectangular coordinate system.

Merging Different Views

The data from three different views, shown graphically in FIG. 2-21, must be merged into one cohesive, 3D model. An understanding of the data strengths and weaknesses is valuable before attempting this step. FIG. 2-22 shows the relationship between the accuracy of the surface data and its position within the range camera's field of view. Surface data obtained from the center of the camera's field of view where the surface tangent is normal to the camera axis, is likely to be highly accurate. However, surface data obtained from the outer regions of the camera's field of view, where the surface tangent is nearly parallel to the camera axis, is likely to suffer greater error. The graph of the surface error as a function of the angle between the camera axis (or view axis) and the surface tangent is shown in the lower portion of FIG. 2-22.

FIG. 2-23 shows this concept in a slightly different manner. As two adjacent surfaces are to be merged, the most accurate resulting surface can be obtained by considering the surface error graphed in FIG. 2-22 and shown as a surface confidence interval along portions of the surface position. In FIG. 2-23, the surface position is most accurate directly in front of a given camera view and less accurate away from the cameras where the surface seams must be aligned in order to merge the surfaces.

With the above information, the different surfaces can be merged via a process which aligns the data according to a common grid coordinate system (obtain within the mesh algorithm). At and near the seams, the merging algorithm can apply a weighted average of the two overlapping surfaces. The weighted average surface position at the seams should then emphasize surface data that is closer to a given cameras FOV center. Where both surfaces are away from the FOV center, equal averaging and surface continuity must be employed.

Volumetric Processing

The description provided thus far regarding treatment of the 3D data sets has focused on treatment of the data as a surface function using meshes and grids. These data may also be treated as true volume. Merging and mathematically operating on volume sets is intuitively simpler since it resembles combining 3D blocks in one form or another. However, computer memory required to manipulate 3D volumes in a brute forms implementation is somewhat staggering. A 3D data set oriented in a volume that is 256×256×256 voxels results in 16.8 Mb that must be manipulated with each operation. A surface approximation is substantially less.

To address the memory issue of true volume mathematics, a representation referred to as octrees are sometimes used. This construct applies a tree structure to represent small and large blocks within a volume. A fair treatment of these concepts is beyond the scope of this application. However, the use of volumetric processing techniques as an alternative to the mesh methods described herein is an anticipated extension of the technology of the present invention.

Hardware Components

FIGS. 2-24A and 24-B show one basic hardware configuration for the present invention. In this figure three visible-spectrum cameras and one IR camera are aimed at the target animal. If the cameras are video cameras, the images may be acquired via frame grabbers. If the cameras are digital still cameras, the interface is more likely to be USB, parallel, or serial. After acquisition the images are stored in system memory. The images in memory are passed back and forth to the digital signal processing (DSP) block for rapid processing as described previously by the aforementioned algorithms. Also from the DSP block will come control signals for such uses as flash and camera synchronization, animal gates, alarms, etc. The DSP block interfaces with the personal computer (PC) to provide the PC with the processed data. In this configuration most of the computing will be allocated to the DSP because of its computational speed. However, it may be advantageous to permit some calculations to be conducted on the PC side since there resides significant computing capability at this site as well. The PC is the interface for many peripheral devices. Those shown include, but are not limited to, a printer, a local or remote network, the internet, external memory storage, PDAs, a wireless link, and an infrared link.

2.10. Thermal Imaging as a Measure of Backfat

IR Camera Technology

The same speed concerns expressed for the visible spectrum camera hold for the infrared or thermal camera. The state-of-the-art infrared imaging in the 8–12 µm spectral band, is now in an advanced development stage. Present IR cameras currently are substantially slower and possess lower resolutions (see embodiment section). Video-rate thermal imaging is currently under development and will soon provide a better technological match for this application.

Mapping the IR Image to the Volumetric Surface

FIG. 2-25 illustrates the concept of projecting or warping the planar thermal image onto the 3D surface of the target surface. FIG. 2-25a shows the planar thermal image suspended over the 3D target surface. FIG. 2-25b shows the same thermal data projected onto the 3D surface. Both thermal images are shown in isothermal contours. Other display modalities include color mapping of thermal images, raised contours, raised mesh or combinations of the above.

Mathematically, this is accomplished quite easily. The thermal image, $I_{thermal}$, is an M×N matrix of temperature values. The M and N indices also have x and y coordinates associated with them such that kM×kN are the dimensions of the x-y surface contained in the thermal image. The 3D surface matrix, $I_{surface}$, has x, y, and z coordinates associated with it. If $I_{surface}$ is an M×N matrix containing z elevations or surface positions, then it is straightforward to generate a new matrix that is N×M×2 in which the x and y positions correspond to the N and M dimensions of the new matrix and each matrix position has both a z dimension and a temperature associated with it. In the more likely situation where $I_{thermal}$ and $I_{surface}$ are not ideally aligned matrices, those skilled in the art can interpolate matching x and y positions within each matrix and generate a new matrix which aligns the x-y positions and assigns z elevations and temperature values to each element in the new matrix.

Application to Backfat Measurements

The ability to project 2D thermal images onto a 3D surface provides additional precision for established thermal techniques to indicate backfat. While the 2D thermal image necessarily records thermal data that is not normal to the skin surface, a 3D thermal projection can easily be rotated and analyzed at a viewing angle normal to the skin surface. Such capability enables calculations of thermal properties per true surface area instead of the distorted surface area measurement previously available from 2D thermal images.

Schaefer et al., U.S. Pat. No. 6,123,451, presents a process for determining a tissue composition characteristic of an animal via 2D infrared thermographic imaging. U.S. Pat. No. 6,123,451 involves the acquisition of a 2D thermal image of the animal and/or carcass, calculating statistical information from the thermal image, inputting the statistical information into a predictive model, and solving the predictive model for tissue composition characteristics such as lean body mass, carcass fat composition, and lean yield. Correlation data presented in the patent provided correlation coefficients between 2D thermal properties and stated variables that ranged from r=00.94 ($r^2$=0.89) to r=0.72 ($r^2$=0.52). This was accomplished using 2D IR images. With the present 3D invention, as described above, the skin surface can be thermally analyzed from a normal viewing perspective. With interpolative techniques, each representative area of the skin surface will contribute uniformly to the thermal statistics used to evaluate the animal.

Additionally, statistical calculations may be established using the 3D thermal image. Such statistical measurements as mean, median, and standard deviation of thermal properties may be used to identify those animals which fall outside of a predetermined or learned range of temperatures. For example, a sampled selection of animals from a herd may be found to exhibit acceptable backfat measurements using ultrasonic techniques. These same animals may be used to establish a normal range of thermal properties including a mean, median and/or standard deviation. With the use of the present invention, a much larger number of animals may be quickly measured and the data accurately recorded. Any significant deviation from the measurements of the standard group may be identified as lower quality meat. The present invention includes not only the tools for identifying the outliers, but also the methods for establishing the standards group and formulas for inclusion and exclusion.

Tong, et al., U.S. Pat. No. 5,595,444, improves upon the invention of U.S. Pat. No. 5,58,418 (Jones, Schaefer, Tong, Scott, Gariepy, and Graham) for identifying cattle and swine that are likely to provide poor meat quality. This invention acquires 2D thermal images of the animals and identifies those that statistically fall outside of a range of normal for a given herd or group as those likely to provide poor meat quality. This work was done using only 2D thermal images.

2.11 Measurement Techniques

Volumetric and Dimensional Measurements Calculated Directly from 3D Data

Once the surface of the target animal has been established, a volume can be calculated between any two planes. FIG. 2-26 illustrates this principle. FIG. 2-26a represents the animal torso (which could also be a whole carcass) with its longitudinal axis aligned with the x-axis of a reference coordinate system. FIG. 2-26b shows a slice of the torso in cross section parallel to plane A. The following equation represents the cross section of slice i:

$$A_i = \int_{y_1}^{y_2} f(y) dy - \int_{y_1}^{y_2} g(y) dy \qquad (2-1)$$

where $A_i$ is the cross sectional area at point, $x_i$, located at or between planes A and B of FIG. 2-26a. Referring to FIG. 2-26b, $y_1$ is the minimum y-value of the irregular, circular cross section with $y_2$ being the maximum y-value of the same irregular circle. The upper portion of the cross sectional circle is the function, f(y) while the lower portion of the same cross-sectional irregular circle is the function, g(y). The cross-sectional area of the volumetric slice is the shaded area enclosed by f(y) on the top and g(y) on the bottom.

The truncated volume bounded by planes, A and B, may be found from equation (2-2) below:

$$V_{AB} = \sum_{i=1}^{n} \Delta x A_i; \qquad (2-2)$$

where $V_{AB}$ is the volume between planes A and B; i is the number of the individual planes within the summation; $\Delta x$ is the incremental x-axis separation between planes used to compute the volume; and $A_i$ is the area of each separate cross section; n is the number of cross sections used to compute the volume and may be computed from equation 2-3 below.

$$n = \frac{L}{\Delta x}; \qquad (2-3)$$

where L is the separation between planes A and B; and $\Delta x$ is the incremental x-axis steps between plane samples used in the volume calculation.

The above calculation permits a range of useful calculations since the positions of planes A and B may be anywhere within the volume of the animal or carcass. Those positions may be established by pre-determined default values or by user selection.

Numerous dimensional measurements are possible from the 3D data set. Some of these measurements include hip height, hip width, cross sectional area at the hip, and cross sectional area at the shoulder.

To measure hip height, it is first necessary to identify a search range along the x-axis, $x_C$ to $x_D$, as oriented in FIG. 2-26a. Hip height is the global maximum (referenced to the floor plane) of all the local maximum values for each $f_i(y)$ as defined in equation (2-1). Hip height may be found from equation (2-4) below:

$$H_{hip} = \max[\max(f_i(y))]; \qquad (2-4)$$

where $f_i(y)$ is the topmost edge of cross-sectional area, $A_i$, as shown in FIG. 2-26b.

To measure hip width, an array of $y_1$ and $y_2$ values (FIG. 2-26b), can be processed as shown in equation (2-5).

$$W_{hip} = \max[y_{2i} - y_{1i}]; \; i = C \text{ to } D \qquad (2-5)$$

where $y_{2i}$ and $y_{1i}$ are the $y_1$ and $y_2$ bounds of the $i^{th}$ cross-sectional area shown in FIG. 2-26b; and C and D are x-axis bounds surrounding the hip region.

To measure shoulder width, an array of $y_1$ and $y_2$ values (FIG. 2-26b), can be processed as shown in equation (2-6).

$$W_{shoulder} = \max[y_{2i} - y_{1i}]; \; i = E \text{ to } F \qquad (2-6)$$

where $y_{2i}$ and $y_{1i}$ are the $y_1$ and $y_2$ bounds of the $i^{th}$ cross-sectional area shown in FIG. 2-26b; and E and F of equation (2-6) are x-axis bounds surrounding the shoulder region.

Cross sectional areas at any x-axis location are possible by selecting the x-axis index and computing the corresponding y-z plane area as described by equation (2-1).

Circumferential measurements may be made by reference to FIG. 2-27a and b. Using calculus methods the distance along top half of the cross section, f(y), in FIG. 2-27a may be computed by formulating an equation for f(y) and parametizing it for arc length, s over the y-axis interval from $y_1$ to $y_2$. A numeric approach for this operation is shown in FIG. 2-27b. In this figure a magnified portion of f(y) is shown such that the individual points along the line, f(y), are visible. Equation (2-7) describes the incremental arc length, $\Delta s_i$, along line, f(y), from points $f(y_i)$ to $f(y_{i+1})$.

$$\Delta s_i = \sqrt{(y_{i+1} - y_i)^2 + (z_{i+1} - z_i)^2} \qquad (2-7)$$

The arc length of the line segment, f(y), from $y_1$ to $y_2$ is then given by equation (2-8).

$$s_{f(y)} = \sum_{i=1}^{n-1} \Delta s_i; \qquad (2-8)$$

where $s_{f(y)}$ is the arc length along the line, f(y); $\Delta s_i$, is the incremental arc length between points; i is the elemental index; and n is the number of points along f(y) from $y_1$ to $y_2$ in FIG. 2-27a.

The arc length of the line segment, g(y), from $y_1$ to $y_2$ may be similarly expressed as:

$$s_{g(y)} = \sum_{i=1}^{m-1} \Delta s_i; \qquad (2-9)$$

where $s_{g(y)}$ is the arc length along the line, g(y); $\Delta s_i$, is the incremental arc length between points; i is the elemental index; and m is the number of points along g(y) from $y_1$ to $y_2$ in FIG. 2-27a.

The total circumference, $C_A$, at any point, A, along the x-axis may then be computed as the sum of the line segment lengths for f(y) and g(y), namely:

$$C_A = s_{g(y)} + s_{g(y)} \qquad (2\text{-}10)$$

where $s_{f(y)}$ and $s_{g(y)}$ are defined in equations (2-8) and (2-9), respectively.

Building on equation (2-10), the hide surface area, $SA_{AB}$, may be computed between points A and B on the longitudinal x-axis as shown in FIG. 2-28 and equation 2-11 below.

$$SA_{AB} = \sum_{j=1}^{p-1} \Delta x \, C_j; \qquad (2\text{-}11)$$

where $SA_{AB}$ is the hide surface area; $\Delta x$ is the incremental x-axis, separation between circumferential slices, and $C_j$ is the circumference of each individual slice.

To measure the overall length of the animal it simply necessary to obtain the coordinates for the nose, [$x_{head}$, $y_{head}$, $z_{head}$], and those for the most distant part of the hindquarters, [$x_{tail}$, $y_{tail}$, $z_{tail}$]. The overall length is the linear distance between those two points, namely:

$$L_{overall} = \sqrt{(x_{head} - x_{tail})^2 + (y_{head} - y_{tail})^2 + (z_{head} - z_{tail})^2}; \qquad (2\text{-}12)$$

where $L_{overall}$ is the head-to-tail length as measured from the tip of the nose to the beginning of the tail; and x, y, and z coordinates are as subscripted.

While some sample measurements have been presented herein, it is obvious to those skilled in the art that many more measurements are available from the three-dimensional data set acquired by the apparatus and methods described herein. It is the intent of this application to include those physical dimensions which can be computed in a manner similar to the measurements shown above.

Measurements Calculated from Scaled Model Characteristics

The present invention includes the ability to utilize data from external databases via scaling factors. If external databases contain measurement data common to those measurements available from this invention, and other data not in common with resident measurements, then a scaling factor may be computed to provide scaled external data as an estimate for the present animal.

An example of such scaling follows. From techniques described herein, the following linear measurements are obtained from a cow: $M_1$, $M_2$, $M_3$, $M_4$, $M_5$ and $M_6$. An external database contains linear cattle measurements, $M_{x3}$, $M_{x4}$, $M_{x7}$, $M_{x8}$, $M_{x9}$, $M_{x10}$. Since both sources contain linear measurements 3 and 4 a scale factor, k, may be computed to scale the external data such that it may be used as an estimate for the present cow as shown in equations (2-13) and (2-14), $$k = \frac{M_3}{M_{x3}} = \frac{M_4}{M_{x4}}, \text{ therefore,} \qquad (2\text{-}13)$$

$$M_3 = k \cdot M_{x3} \text{ and } M_4 = k \cdot M_{x4}. \qquad (2\text{-}14)$$

The present cow now has the following measurements and estimated measurements:

direct measurements: $M_1$, $M_2$, $M_3$, $M_4$, $M_5$ and $M_6$
estimated measurement from external data:
$kM_{x3}$, $kM_{x4}$, $kM_{x7}$, $kM_{x8}$, $kM_{x9}$, $kM_{x10}$.

It should be noted that the scalar, k, from the above example was for linear measurements such as hip height or hip width. If the scale factor is computed from linear measurements and applied to area or volume measurements, it must be squared or cubed, respectively, as shown in equation (2-15) and (2-16).

$$M_3 = k \cdot M_{x3}; \qquad (2\text{-}15)$$

However, $$A_3 = k^2 \cdot A_{x3} \text{ and } V_3 = k^3 \cdot V_{x3}; \qquad (2\text{-}16)$$

where $M_3$ and $M_{x3}$ are linear measurements, $A_3$ and $A_{x3}$ are area measurements and $V_3$ and $V_{x3}$ are volume measurements. Since measurements such as weight are proportional to volume, weights are scaled by the factor, $k^3$.

Measurements as Functions of other Measurements

Measurements may also be functions of other measurements. These other measurement may be resident to the system of this invention or external to the system. These functions may be of one variable or multivariate. Examples of functional relationships of variables are shown below in equation (2-17).

ratio: $M_2 = kM_1$; $\qquad (2\text{-}17)$ linear: $M_2 = kM_1 + C$;

nth order polynomial: $M_2 = k_1 M_1 + k_2 M_1^2 + \ldots k_n M_1^n + C$; and multivariate: $M_5 = k_1 M_1 + k_2 M_2 + k_3 M_3 + k_4 M_4 + C$ 2.12. Analysis of Measurement Data With the complete 3D data set available from this invention and the numerous volumetric and dimensional measurements which can be computed from that data set, a number of statistical analyses are possible and advantageous. Some of those are listed below.

Histograms, Averages and Distributions

The automated measurements obtained from an individual animal or carcass at any given time can be combined in any number of ways with measurements obtained at different times or from different animals or carcasses. One of the more useful analyses and displays for this type of data is a histogram as shown in FIG. 2-29. From such an analysis can be learned the distribution type (i.e., normal or bimodal), the mean, median, and standard deviation (normal distribution). Comparing a measurement histogram from one group to that of another group enables an evaluation of the measurement value (mean) as well as the consistency of that value (standard deviation). By tracking the same group over time, the mean value indicates the progress toward a measured goal while the standard deviation is a measure of consistency. FIG. 2-29*a* shows the measurement data as a basic histogram. The mean value, m, is indicated near the center of the histogram. The standard deviation is an indication of the histogram spread. FIG. 2-29*b* shows a comparison of three different groups for the same measurement. These three groups have different means and the third group (bottom graph) shows a larger standard deviation. FIG. 2-29*c* show how one measurement changes with time for the same group. In this example, the mean value increases with time and the standard deviation remains nearly constant.

Cluster Analysis

A cluster analysis is a useful statistical tool for data such as these. A cluster analysis is a scatter diagram where the data are plotted as a function of two or more measurements. FIG. 2-30 shows cluster graphs of two and three measurements. FIG. 2-30*a* shows a cluster graph for two different measurements. FIG. 2-30b shows a cluster graph for three measurement types. For the data of this invention, it may be useful to indicate boundary limits for measured values as shown in FIG. 2-31. The scatter diagram with the square or cube boundaries graphically indicates where measurements fall outside of the predetermined limits.

Other Statistical Analyses

The statistical analyses which may be conducted with the data from this invention are by no means limited to only those presented within this application. Those skilled in the art can easily apply other commonly known methods in a manner similar to those described herein.

2.13. Application of Volumetric and Dimensional Data to Livestock Evaluations

Histograms and Cluster Analyses

FIG. 2-32 shows the application of histogram data to livestock measurement data. Simulated samples show data from two different groups of animals. Boundary limits are also shown which can be used to identify livestock which may require some manner of special treatment.

FIG. 2-33 shows the application of cluster plots to livestock measurement data. Simulated samples show data from two different groups of animals. Boundary limits are also shown (cube outline) which can be used to identify livestock which may require some type of special treatment.

Favored Path Concept

This invention provides an automated, convenient approach for obtaining large quantities of accurate measurement data from livestock and carcasses. Since these data can be acquired frequently from large groups of animals, it becomes practical to use these data to manage livestock breeding, feedlot operations, and slaughterhouse operations more efficiently. One such management strategy will be referred to within this application as the favored path concept or simply the favored path.

FIG. 2-34 illustrate this concept in its simplest sense. The favored size path, P(t), is shown as a dotted line. The actual mean size (by whatever measurement) nearly follows the favored path during time, $t_1$ to $t_2$. After $t_2$ the actual growth drops off significantly. The level of success assigned to the actual size in FIG. 2-34 is based upon the ability to meet or exceed that exhibited by the favored path.

FIG. 2-35a illustrates the favored path concept using histograms as functions of time. Similar to FIG. 2-34, the mean curve closely follows the favored path from 0 through $t_4$, departing from the template at times greater than $t_4$. This figure introduces the notion that Measurement 1 is a distributed variable. The limits bounding the mean curve (+/− 2σ in this example) provide a selection criteria which can be used to screen animals exhibiting characteristics outside the boundaries. FIG. 2-35b extends the favored path concept to more variables. In this case the path, is a function of Measurement 1 and Measurement 2. The limits or bounds also take on additional dimensions. This concept can be expanded to include any number of variables (though graphical presentations are limited to three dimensions).

Automated Grading

The automated grading techniques, which will be described hereinafter in Section 3.8, are made possible by the volumetric imaging described herein. Competitive systems which rely only on 2D images, are not likely to possess the measurement accuracy necessary to automatically grade the cattle or hogs.

Predictive Grading via Multivariate Growth Charts

The predictive grading, described hereinafter takes the grading information available from the meat processor and makes it available earlier, to the advantage of the breeder, feedlot operator, and meat processor. The multiple measurements available from the present invention make the use of multivariate growth charts feasible.

Automated Production Segmentation

The breakdown of a carcass into its numerous meat cuts or segments typically occurs during processing. The measurements of the present invention permit reliable estimates of this production to be made prior to slaughter as will also be described hereinafter. Further, the automated grading and predictive grading, described previously, enable reasonable projections of that information to be made available while the animal is still in the feedlot.

Breeding Evaluations

The statistical analyses of the data which becomes available as a result of this invention should be quite valuable to livestock breeder. By providing periodic feedlot growth data, final slaughterhouse dimensions, and meatpacking quality, the breeder will be equipped to confirm both major and minor changes in the breeding lines. This degree of data tracking is essential if the hog and cattle industries are to meet their goals for leaner and more efficient production.

For example, if a particular breeding program yields hip height measurements with higher mean values and smaller standard deviations, it may be concluded that said breeding program is successful in creating larger animals of a consistent size. In comparison, if a second breeding program yields hip height measurements with the same high mean value but with a substantially larger standard deviation, the second breeding program has the potential for yielding large animals, but the large standard deviation indicates that the yield reliability is uncertain.

Feedlot Evaluations

Feedlot evaluations offer rewarding benefits with this invention. The two-axis cluster diagram of FIG. 2-36 illustrates the management powers provided by this technology. In FIG. 2-36 five different groups of livestock are shown progressing through a feedlot. The horizontal axis is time while the vertical axis is any single measurement of choice which indicates some degree of growth or other parameter of value. In this example, measurements are taken with the present invention at times, $t_1$, $t_2$, $t_3$, $t_4$, and $t_5$. Immediately after the $t_5$ measurements, qualifying livestock are shipped to market. The analysis is not unlike classes entering and graduating from a school. Upon entering the feedlot, Group 1 is measured. Those animals within the expected measurement limits progress through the feedlot planned feedlot program scheduled between times 1 and 2. Those animals measuring above the upper threshold limit are advanced one group into Group 2 just as smart students might be advanced a grade. Upon arriving at time 2, each group is measured. Those animals measuring above the upper threshold are advanced to the next group. Those animals measuring within the expected range proceed through the planned feeding program. Those animals measuring below the lower threshold are held back one group to repeat the 'curriculum' just administered. While FIG. 2-36 shows a simplified implementation of the concept, in reality the system can be implemented with N measurements used as the parameters for advancement, retention and graduation. Those animals which are repeatedly retained merit special consideration, perhaps disposal or direct shipment to the slaughterhouse.

The simulated cluster plots of FIGS. 2-37A and 37-B illustrate a three-variable evaluation of animals moving through the feedlot. The 3D cube edges of FIG. 2-37B.d indicate the evaluation boundaries. These same boundaries are shown, two variable at a time, in parts a), b) and c). The favored path line indicates a 300 day path through the feedlot. The multi-variable slope of this line indicates the growth relationship of the various measurement parameters to each other. The pass, retention and graduation operations described in FIG. 2-36 also apply in the multi-variable case of FIGS. 2-37A and 2-37B (only the graphics get much more complicated).

The multi-measurement, favored path concept discussed previously can also be applied within the feedlot management. Empirically, a favored path, exhibiting specific growth rates, measurement ratios and time progression characteristics can be identified. Initially, it may be simply the measurement progress of a top-quality group of animals. Each time a better group passes, the better path becomes the favored path. After sufficient experience, a deviation from the favored path can be detected at the next measurement session and corrective actions taken. This adaptive process may be used to optimize feeding program, breeding stock and many other parameters.

Harvesting (Slaughterhouse) Evaluations

Measurements taken upon arrival to the slaughterhouse can be used to confirm end feedlot conditions, transportation losses, and final live breeding data. The continued data stream of measurements augments the feedlot information. Payment to livestock owners may be based on more accurate information. Additionally, the detailed dimensions may be of value in automating meatpacking strategy and planning.

Carcass Evaluations

In a manner well understood by those skilled in the art, whole or carcass measurements can be used to correlate with live animal measurement and develop a tighter tracking throughout the livestock chain.

2.14. User Interface.

A key component to this invention is a convenient, useful, user interface. FIG. 2-38 shows a component of that user interface. Vertical lines A—A and B—B may be moved along the appropriate livestock image. If processing times are short enough, or if they have been computed in advance, the measurements may be updated as the cursors scroll along the length of the animal. If longer processing times are necessary, the measurements may be updated upon a mouse click or keystroke. The positions of A—A and B—B may be user selected, user default values, or manufacturer, default values. Further details of one embodiment of a user interface are provided in Sections 3.12.

With this in mind, it is an object of present invention to provide a method and apparatus for measuring the physical characteristics of livestock animals such as cattle and hogs. More particularly, it is an object of the invention to provide a method and apparatus of the aforementioned character for obtaining data concerning volumetric, curvilinear (surface) and linear measurements of livestock animals such as cattle and hogs and the full carcasses thereof that can be analyzed to provide information that will substantially assist the commercial producer of livestock animals in producing a high-quality end product for the consumer while adding profitability to the enterprise.

Another object of the invention is to provide a method and apparatus as described in the preceding paragraph which will efficiently produce data useful to the livestock producer for breeding evaluations.

Another object of the invention is to provide a method and apparatus of the character described that will efficiently produce data useful to the feedlot manager in economically managing the health and growth of the cattle delivered to the feedlot.

Another object of the invention is to provide a method and apparatus of the character described which, through the use of a plurality of strategically positioned cameras and appropriate data processing means associated therewith that will produce accurate three-dimensional data sets representing the surface of the livestock animal.

Another object of the invention is to provide a method and apparatus of the character described in the preceding paragraph in which the three-dimensional data sets representing the surface of the livestock animal are used to determine the volume of the animal.

Another object of the invention is to provide a method and apparatus of the character described in the preceding paragraph in which the three-dimensional data sets representing the surface of the livestock animal are used to determine the hip height of the animal.

Another object of the invention is to provide a method and apparatus of the character described in the preceding paragraph in which the three-dimensional data sets representing the surface of the livestock animal are used to determine the hip width of the animal.

Another object of the invention is to provide a method and apparatus of the character described in the preceding paragraph in which the three-dimensional data sets representing the surface of the livestock animal are used to determine the cross-sectional area at the hip of the livestock animal.

Another object of the invention is to provide a method and apparatus of the character described in the preceding paragraph in which the three-dimensional data sets representing the surface of the livestock animal are used to determine the cross-sectional area at the shoulder of the livestock animal.

Another object of the invention is to provide a method and apparatus of the character described in the preceding paragraph in which the three-dimensional data sets representing the surface of the livestock animal are used to determine the overall length of the animal.

By way of summary, one form of the method for measuring the physical characteristics of a livestock animal comprises the steps of positioning the livestock animal within a defined target zone; using the first camera, obtaining a range image of the first side of the livestock animal; using the second camera, obtaining a range image of the second side of the livestock animal; and using the third camera, obtaining a range image of the back portion livestock animal. The first second and third range images thus obtained are entered into the data processing means of the invention where the images are processed in a manner to form a three-dimensional data set representing the surface of the livestock animal.

In another form of the method of the invention the downloaded first, second and third range images are processed by a range image algorithm to obtain used to form a three-dimensional point cloud set from which a data set representing the surface of the livestock animal is then produced.

After the three dimensional data set has been obtained, the data processing means can be used to analyze the data set in a manner to determine the volume, hip height, hip width, cross-sectional area at the hip of the animals, cross-sectional area at the shoulder of the animal and the length of the livestock animal.

BRIEF DESCRIPTION OF THE DRAWINGS

FIG. 1-2 illustrates various optical options for accomplishing three-dimensional surface measurements.

FIG. 2-1 is a generally perspective view of one form of the apparatus of the invention for measuring the physical characteristics of a livestock animal.

FIG. 2-2A is a generally perspective, diagrammatic view illustrating the positioning of the cameras used to obtain the range images from which the three-dimensional image of the surface characteristics of the cow shown in the drawing is determined.

FIG. 2-2B is a generally perspective, diagrammatic view illustrating the positioning of the cameras used to obtain the range images from which the three-dimensional image of the surface characteristics of the pig shown in the drawing is determined.

FIG. 2-3A is a generally diagrammatic view comprising silhouette, two-dimensional and three-dimensional front side views of a cow.

FIG. 2-3B is a generally diagrammatic view comprising silhouette, two-dimensional and three-dimensional rear side views of a cow.

FIG. 2-3C is a generally diagrammatic view comprising silhouette, two-dimensional and three-dimensional front side views of a pig.

FIG. 2-3D is a generally diagrammatic view comprising silhouette, two-dimensional and three-dimensional rear side views of a pig.

FIG. 2-4 is a generally diagrammatic view comprising two-dimensional and three-dimensional line segments.

FIG. 2-5A is a series of generally perspective views of three-dimensional data of a cow.

FIG. 2-5B is a series of generally perspective view of three-dimensional data of a pig.

FIG. 2-6A is a series of views of silhouette data of a cow taken from the side, rear and top of the cow.

FIG. 2-6B is a pair of views of silhouette data of a cow taken from the top and side view of the cow.

FIG. 2-6C is a pair of view of silhouette data of a pig taken from the top and side of the pig.

FIG. 2-7 is a generally perspective view illustrating the basic function of the cameras that form a part of the apparatus of the invention.

FIG. 2-8 shows at the upper portion a generally diagrammatic perspective view of a simple target block within an X, Y, Z coordinate system; at the central portion is a generally diagrammatic plan view of a range image matrix of the assembly shown in the upper portion; and at the lower portion is a generally perspective view of a mesh surface representing a three-dimensional data surface.

FIG. 2-9 is a generally diagrammatic view showing the orientation of the cameras used to obtain the rate images from the target animal.

FIG. 2-10A is a generally diagrammatic view illustrating the placement of cameras in an alternate form of the apparatus of the invention.

FIG. 2-10B is a generally diagrammatic view illustrating a mechanical means for identifying the median plane of the target animal.

FIGS. 2-11A and 2-11B taken together contstitute a generally diagrammatic view illustrating the necessity of establishing the median plane position.

FIG. 2-12A is a generally illustrative view showing motion artifacts caused by slow camera operations in obtaining the image of a cow.

FIG. 2-12B is a generally illustrative view showing motion artifacts caused by slow camera operations in obtaining the image of a pig.

FIG. 2-13 is a generally diagrammatic view showing a timing diagram with simultaneous shutters and staggered flash to identifying regions of the target surface where range images overlap.

FIG. 2-14 is a generally diagrammatic plan view of an alternate form of the apparatus of the present invention that makes use of three video cameras.

FIG. 2-15 is a generally perspective view of still another alternate form of the apparatus of the invention that makes use of three video cameras.

FIG. 2-16 is a generally perspective, diagrammatic view illustrating the general signal processing stages of one form of the method of the invention.

FIGS. 2-17A and 2-17B taken together constitute a generally diagrammatic view illustrating the manner of processing the range data obtained by a three-camera system.

FIGS. 2-18A and 2-18B taken together constitute a generally diagrammatic view illustrating the manner of processing the range data obtained by a three-camera system along with thermal imaging.

FIG. 2-19 is a generally diagrammatic view of one form of video camera layout for obtaining range images of the target animal and illustrating the processing steps of one form of invention for converting a point cloud into a mesh system.

FIG. 2-20A is a generally diagrammatic view illustrating the processing steps required to convert a three-dimensional point cloud of data into rectangular grid mesh.

FIG. 2-20B is a generally diagrammatic view further illustrating the processing steps required to convert a three-dimensional point cloud of data into a rectangular grid mesh.

FIG. 2-20C is a generally diagrammatic view further illustrating the processing steps required to convert a three-dimensional point cloud of data into a rectangular grid mesh.

FIG. 2-20D is a generally diagrammatic view further illustrating the processing steps required to convert a three-dimensional point cloud of data into a rectangular grid mesh.

FIG. 2-20E is a generally diagrammatic view further illustrating the processing steps required to convert a three-dimensional point cloud of data into a rectangular grid mesh.

FIG. 2-20F is a generally diagrammatic view further illustrating the processing steps required to convert a three-dimensional point cloud of data into a rectangular grid mesh.

FIG. 2-20G is a generally diagrammatic view further illustrating the processing steps required to convert a three-dimensional point cloud of data into a rectangular grid mesh.

FIG. 2-21 is a series of generally perspective views showing the merging of the view surfaces of a pig.

FIG. 2-22 is a generally perspective, diagrammatic view illustrating the merging of the various view surfaces captured by the range cameras of the apparatus of the invention.

FIG. 2-23 is a generally diagrammatic view depicting the confidence intervals for the surface positioning in each of the side and top views of the target animal.

FIGS. 2-24A and 24-B taken together constitute a generally diagrammatic view illustrating the data processing of the images received from the video cameras of the apparatus shown in FIG. 2-14.

FIG. 2-25 is a generally diagrammatic, exploded view illustrating the projection of the planer thermal image obtained by the thermal camera of the apparatus of the invention into a three-dimensional target surface.

FIG. 2-26 is a generally diagrammatic view illustrating the calculation of volumes from a sum of cross-sectional areas.

FIG. 2-27 is a generally diagrammatic view illustrating circumferential measurements of the animal torso in accordance with one form of the method of the invention.

FIG. 2-28 is a generally diagrammatic view illustrating the calculation of hide or surface area of the target animal.

FIG. 2-29 is a generally diagrammatic view illustrating useful statistical measurements available from the data produced in the practice of the method of the present invention.

FIG. 2-30 is a generally diagrammatic view illustrating cluster graphs for two measurements types and three-measurement types.

FIG. 2-31 is a generally diagrammatic view illustrating cluster graphs useful and indicating boundary limits and animal measurements that have fallen outside predetermined limits.

FIG. 2-32 is a generally diagrammatic view of various histograms representing livestock measurements obtained in the practice of the method of the present invention.

FIG. 2-33 is a generally perspective diagrammatic view of cluster plots representing livestock measurements.

FIG. 2-34 is a generally diagrammatic view of the simplest form of the favored path concept of one form of the method of the present invention.

FIG. 2-35 is a generally diagrammatic view further illustrating the favored path concept of one form of the method of the present invention using histograms and a measurement cluster graphs.

FIG. 2-36 is a generally diagrammatic view of a cluster analysis plot of a feedlot strategy using data developed in the practice of the method of the present invention.

FIGS. 2-37A and 2-37B taken together constitute a generally diagrammatic view showing cluster plots of group data taken at several times during the stay of the animal at a feedlot.

FIG. 2-38 is a generally diagrammatic view illustrating one form of user interface for obtaining custom measurements.

FIG. 3-1A is a generally perspective, fragmentary view of an alternate form of a camera arrangement of the apparatus of the invention.

FIG. 3-1B is a generally perspective, fragmentary view of still another form of camera and illuminator arrangement of the apparatus of the invention.

FIG. 3-1C is a generally perspective, fragmentary view of yet another form of camera and illuminator arrangement of the apparatus of the invention.

FIG. 3-2 is a generally perspective view of another form of the apparatus of the invention which includes a differently configured chute construction.

FIG. 3-3 is a generally perspective view of yet another form of the apparatus of the invention.

FIG. 3-4 comprises a top and side view of a form of the apparatus embodying a chute of different construction.

FIG. 3-5 is a generally perspective view of still another form of the apparatus of the invention that embodies a two camera system.

FIG. 3-6 is a generally perspective, fragmentary view illustrating one type of proximity sensor construction.

FIG. 3-7 is a generally diagrammatic view comprising a schematic representation of the various components of one form of the apparatus of the invention.

FIG. 3-8 is a generally diagrammatic view illustrating one form of user interface for obtaining custom measurements.

FIG. 3-9 comprises a side and front view of an animal carcass of the character that can be analyzed in accordance with one form of the method of the invention.

FIG. 3-10 is a side view of a plurality of animal carcasses being carried on a conventional conveyor system.

FIG. 3-11 is a generally diagrammatic view illustrating the application of the methods of the invention to the measurement of animal carcasses.

FIG. 3-12 is a generally diagrammatic block diagram representation of MATLABS processing for transforming 30 data sets into rectangular surface mesh coordinates.

FIG. 3-13 comprises generally perspective views of the projection of a planar thermal image onto a 3D target surface.

FIG. 3-14 is a chester analysis plot illustrating one type of feedlot strategy.

FIGS. 3-15A and 3-15B taken together comprise a series of cluster plots of group data.

FIG. 3-16 is a generally illustrative view showing the various U.S. Quality Grades for beef cattle.

FIG. 3-17 is a generally diagrammatic view illustrating one form of automated grading method.

FIG. 3-18 is a generally illustrative view showing the various U.S. yield grades for beef cattle.

FIG. 3-19 is a generally illustrative view showing the various U.S. feeder cattle grades in terms of the thickness.

FIG. 3-20 is a generally illustrative view showing the various U.S. feeder cattle grades in terms of frame size.

FIG. 3-21 is a generally illustrative view showing an angus beef guide.

FIGS. 3-22A and 3-22B are generally illustrative views showing various cuts of beef.

FIG. 3-23 is a generally illustrative view showing various cuts of pork.

FIG. 3-24 is a generally diagrammatic view illustrating beef cattle yields.

FIG. 3-25 is a generally diagrammatic view illustrating various pork cuts

3.0 DESCRIPTION OF THE INVENTION

The present invention concerns novel methods and apparatus for obtaining volumetric, curvilinear (surface) and linear measurements of livestock animals and full carcasses, specifically cattle and hogs. As used herein, the term "animal" means both live animals as well as carcasses. Important goals of the invention are to provide significantly improved accuracy over existing technology and also to increase the speed of acquiring these measurements.

Figure 1:
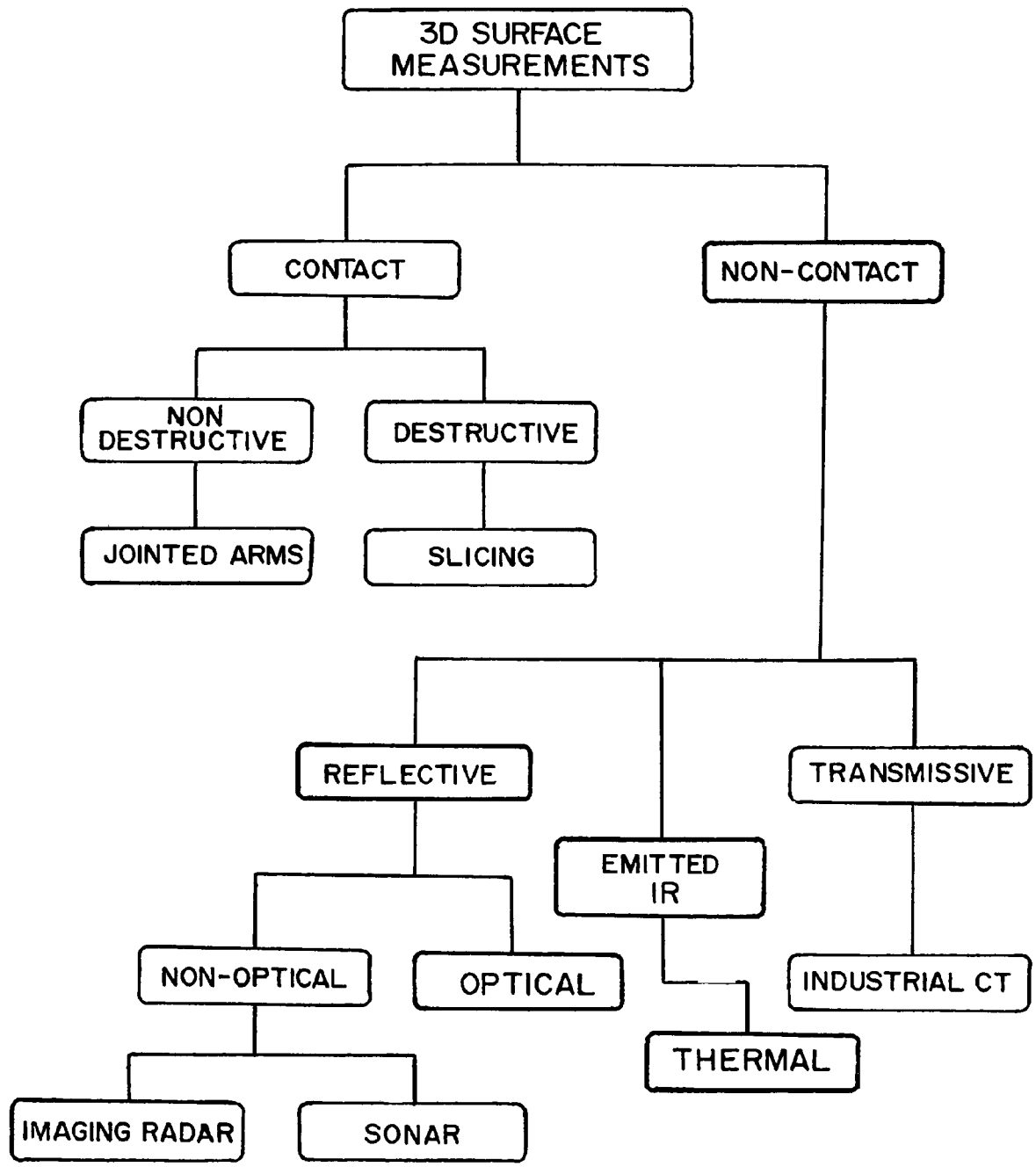
FIG. 1-1 illustrates various options for accomplishing three-dimensional surface measurements.
Figures 1, 2:
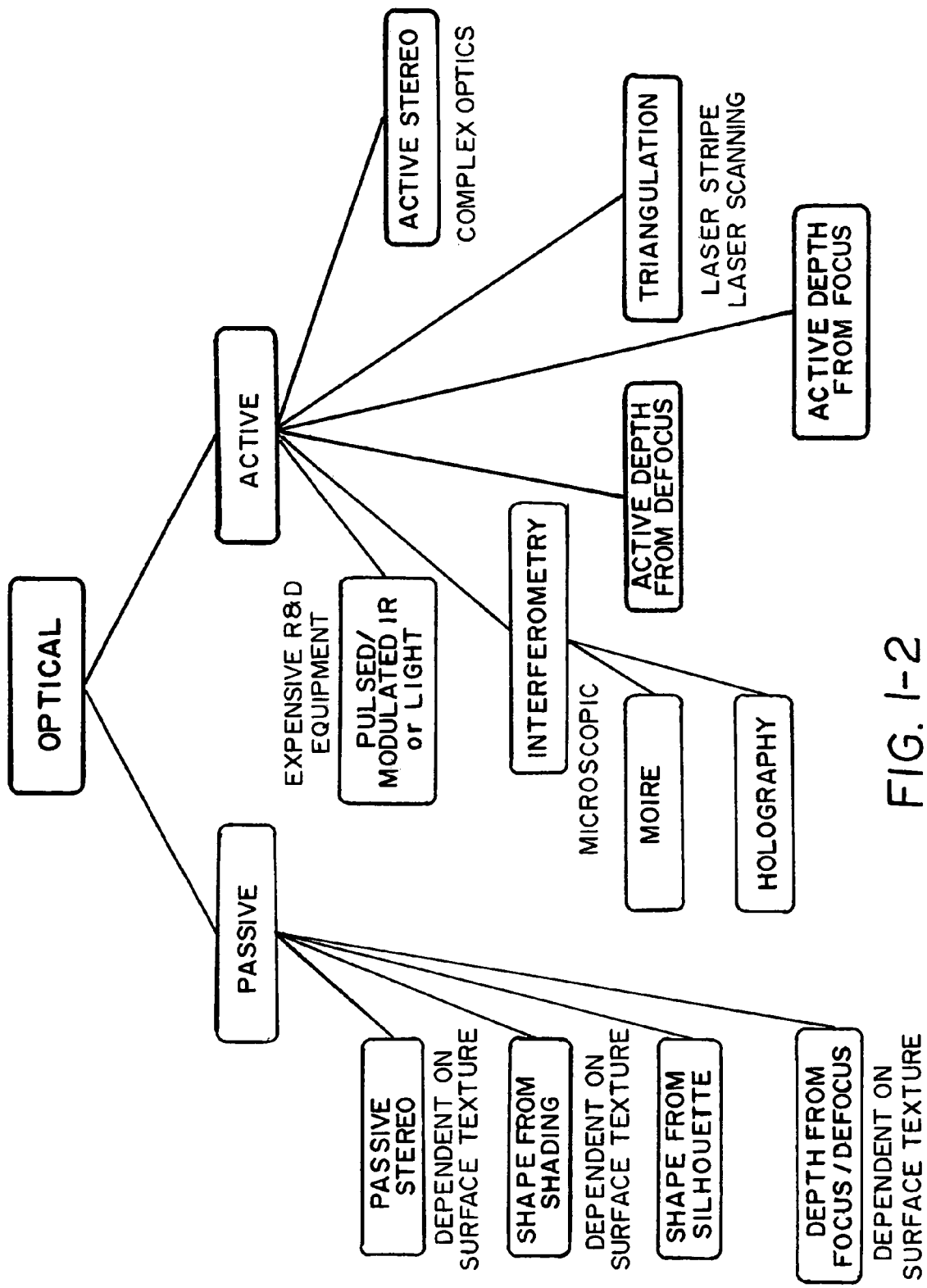
Figures 1, 2:
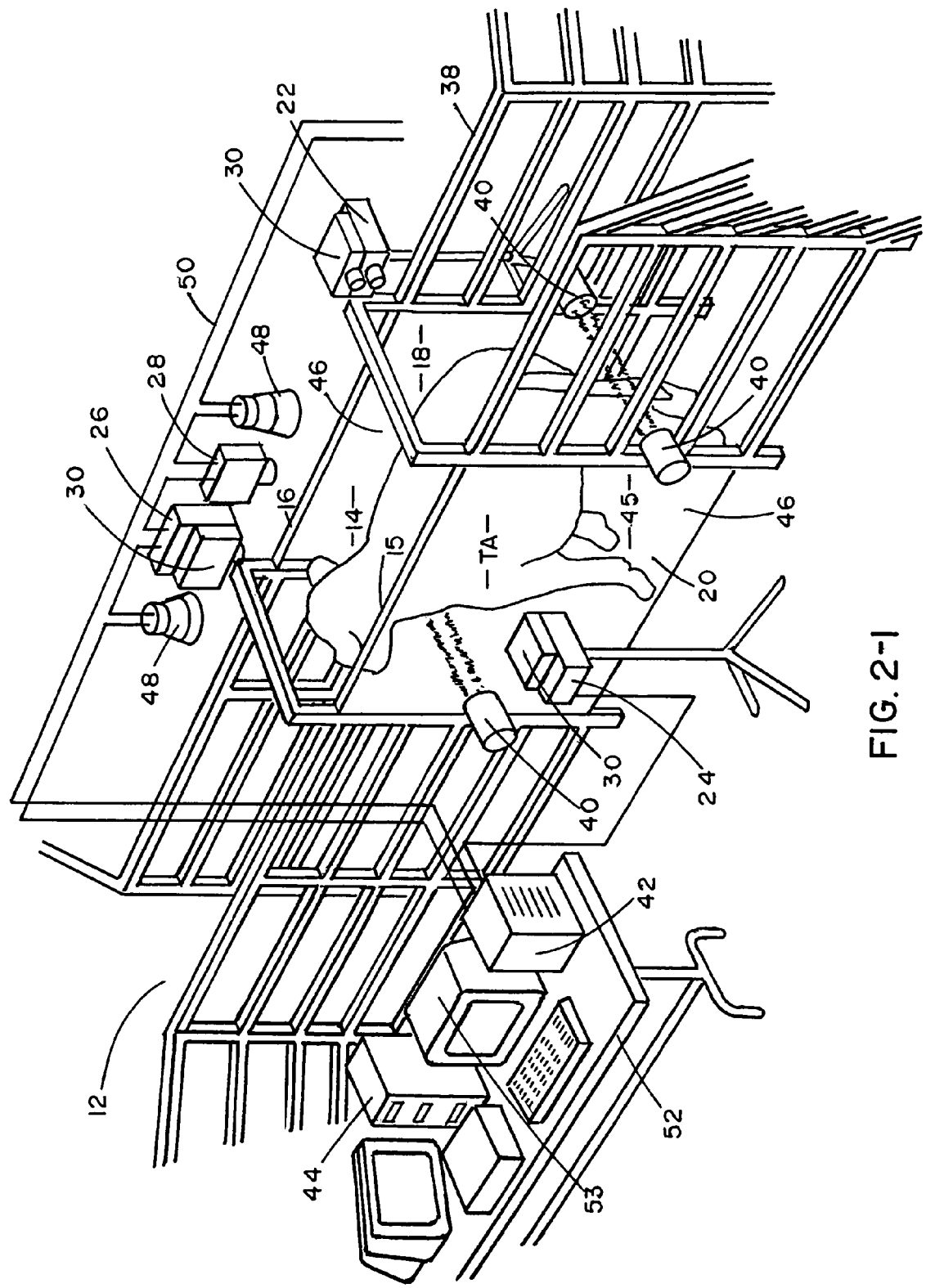
Figures 2, 2A:
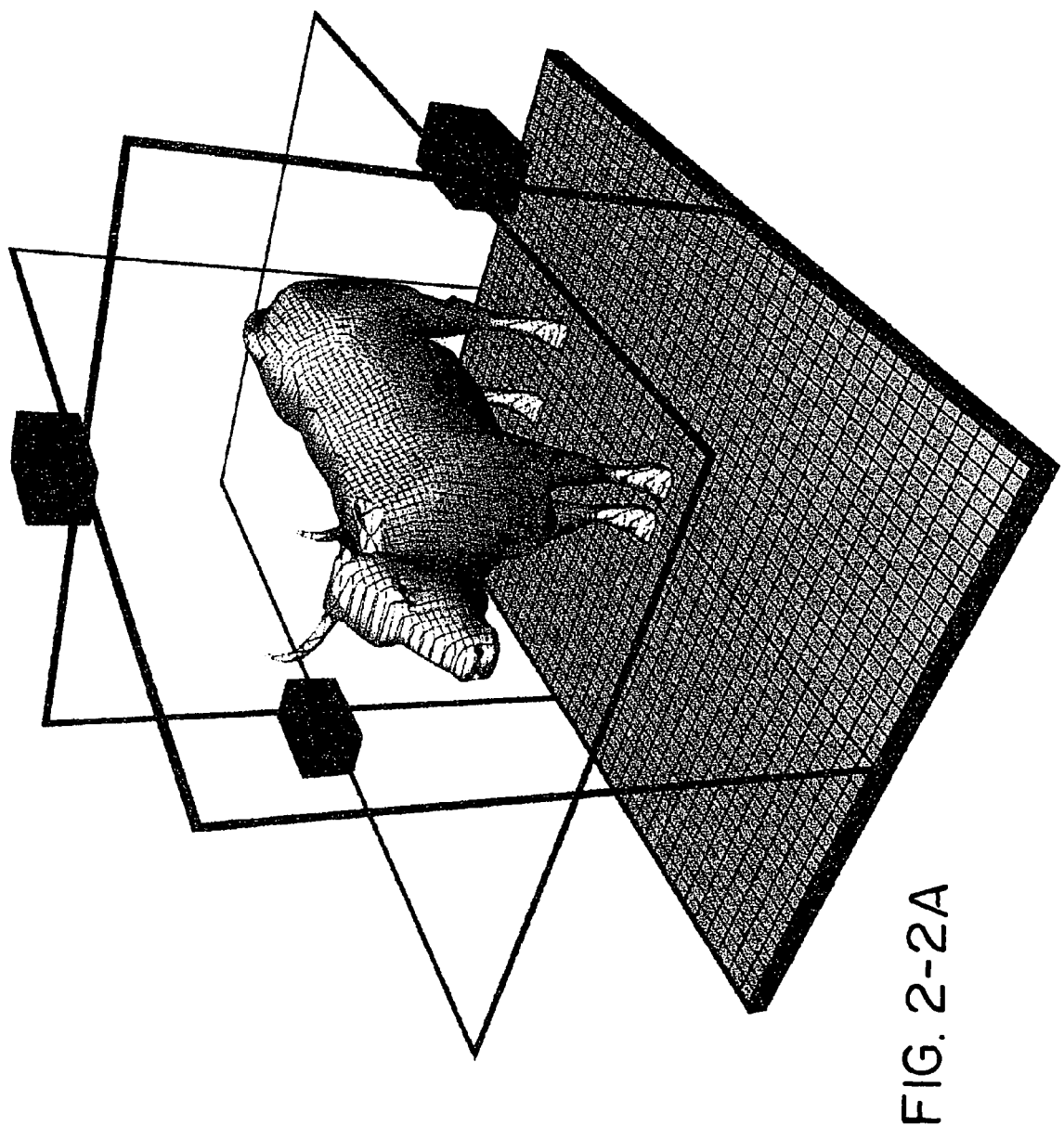
Figures 2, 2B:
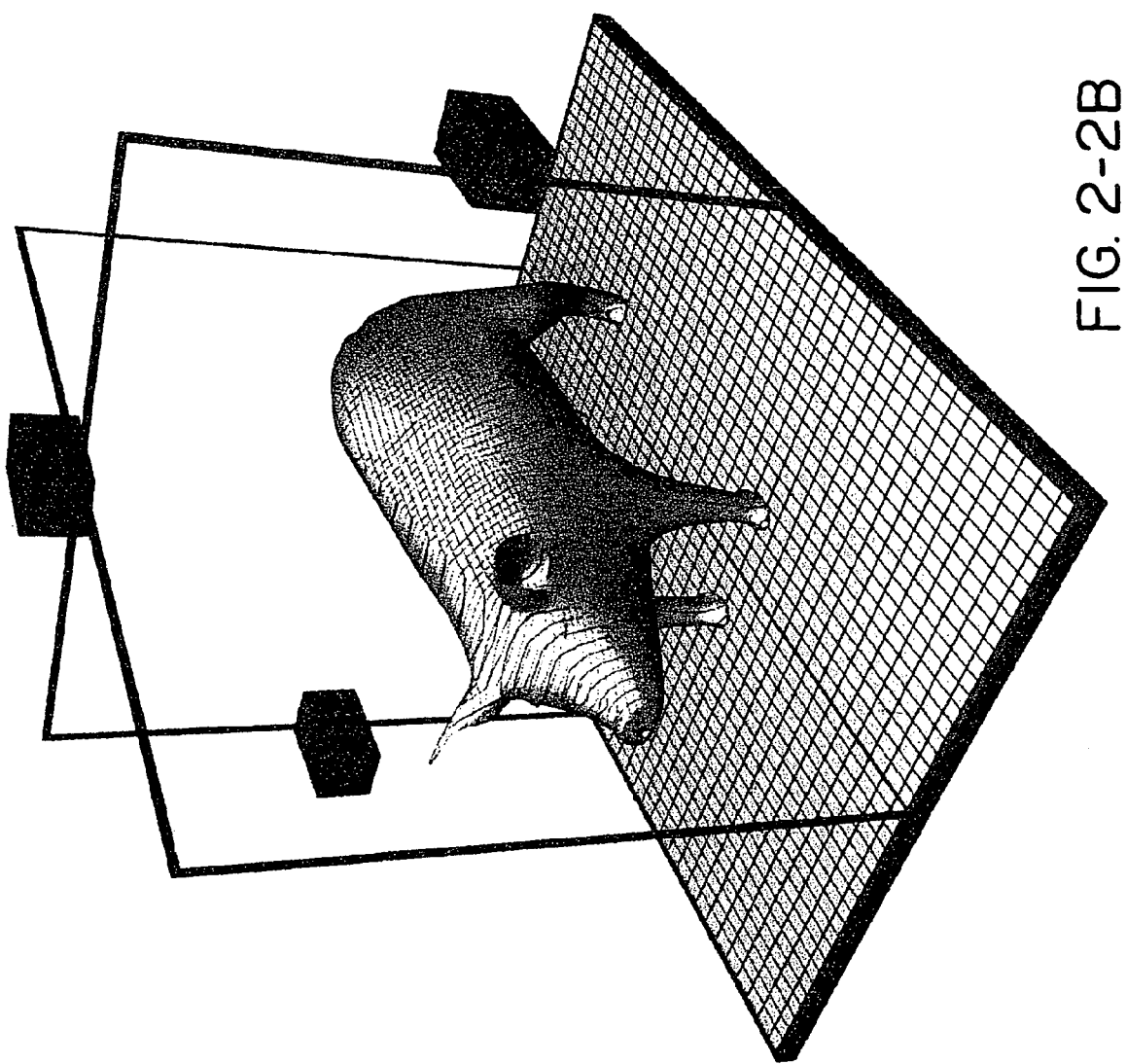

The apparatus of the invention comprises three cameras and data processing techniques to achieve 3D data sets that are a dramatic improvement over silhouette, profile or even two-dimensional (2D) video images that may possess grayscale or color information. FIGS. 2-2A and 2-2B graphically illustrate the power of the three-dimensional data set for cattle and hogs, respectively. These figures show animal data sets which are oriented in a three-axis, coordinate system (though other coordinate systems such as cylindrical or spherical are also possible). The black boxes indicate likely camera positions used to acquire 3D surfaces which are combined to yield the full surface data sets. While the present embodiments use camera technologies which yield surface information about the target animals, the substitution of other camera methods such as magnetic resonance, ultrasound, or X-ray can yield full volume data which includes the location and geometries of internal organs such as heart, lungs, muscles, and bone. FIGS. 2-2A and 2-2B indicate the position of median and lateral planes intersecting near the animals' center of gravity. Any number of parallel or non-parallel planes may be used to intersect the animal data set for visualization and measurement purposes. FIG. 2-2A also shows a horizontal plane intersecting the cow data set at the level of the side view cameras.

The power of the 3D data set is further illustrated in FIGS. 2-5A and 2-5B which show various views of cattle and hogs, respectively. In both figures the top image shows the rear perspective view; the center image shows the full side view; full left view; and the bottom image shows the perspective front view.

While FIGS. 2-5A and 2-5B show certain angular views of the target animals, it is evident to those skilled in the art that a view from any angle is possible. The animal data set may be rotated, revolved or scaled in order to be viewed from any direction, or in any regional detail, which may be found beneficial.

Similarly, while FIGS. 2-5A and 2-5B show live target animals, the system target can just as easily be used to analyze full or partial carcasses. The dimensional and viewing capabilities for such an application are identical to those described for live animals.

3.1. Range Camera Technology

Range Camera Characteristics

The advantageous characteristics of a range camera technology have been previously discussed herein. In brief, an applicable range camera technology should exhibit characteristics which include fast image acquisition or shutter speeds, multi-camera synchronization, structured light systems which project pre-selected patterns on the targets, both slow and fast frame rates, color image capability, and standby image feed to assist with animal alignment.

The need for a range camera technology that overcomes likely target motion dominates the selection criteria. Depth-from-defocus (DFD) technology leads the present range camera technology when viewed from the perspective of target motion. DFD offers a number of advantages over competing approaches.

Description of Depth-from-Defocus Technology

Depth-from-defocus (DFD) technology takes advantage of the commonly observed fact that objects in focus appear crisp and detailed, while objects out of focus appear blurred. Technically, a focused image occurs when the light reflected from a target, located at a distance, $d_T$, from the lens, is precisely focused onto an image plane behind the lens. Under highly focused conditions, detailed surface texture from the target is reproduced on the image plane with high contrast. When a charge-coupled device (CCD) is placed at the image plane to convert the image into an electrical signal, high contrast translates to a large-amplitude, peak-to-peak voltage. As the target distance changes from the distance, $d_T$, the image becomes more blurred, correlating to a reduction in contrast and translating to a reduction in the peak-to-peak amplitude of the electrical voltage.

The degree of contrast reduction, as indicated by the voltage amplitude, can be calibrated to the change in distance from $d_T$. Most applications of depth-from-defocus employ two or more images acquired with different focus settings enabling improved precision in calibrating the distance change. To enhance the surface texture of the target, a structured illumination pattern may be employed.

A depth-from-defocus system employs a single visible-spectrum camera. Present technology uses at least three images to establish a range map of the surface. Two images are acquired at different focal distances with structured illumination while a third image is acquired with uniform illumination in order to provide cancellation of any surface reflections present in the images (albedo normalization). Innovation may eventually be able to reduce the number of images required, thus improving the throughput for real-time processing. Changes in the focal distances of the images may require compensation for the associated changes in magnification. Correction for lens aberration or distortion are also advisable.

Since a single camera is used, multiple image registration and alignment is simplified. The single camera also minimizes discontinuities in the range image. Holes in the surface due to surface obstructions will not cause algorithm instabilities as is the case for triangulation and stereoscopic systems. A flash projection system which illuminates the target with a predetermined structured light pattern provides both the desired pattern and additional motion resistance via the flash duration (a high flash intensity over a short duration effectively stops the motion within the image field).

Depth-from-Defocus Advantages over Competing Technologies

Depth-from-defocus (DFD) methods offers a number of advantages for a volumetric measurement system. FIGS. 1-1 and 1-2 show the various technologies which might be used to acquire range image (3D) data for this invention.

DFD is a non-contact technology. It uses faster and less expensive visible spectrum optics. It uses reflected light. Using optical methods, it avoids many of the pitfalls associated with non-optical methods. It even has advantages over a number of other active optical technology.

Depth-from-defocus is a non-contact method. Such non-invasive measurement methods provide remote acquisition of data and avoid the mechanically intensive probe arrays necessary with most contact techniques.

Depth-from-defocus methods may employ either visible or infrared energy. At the present time and in the foreseeable future, visible systems will provide the best performance for the 3D, surface-measurement geometry. For non-thermal data, visible equipment is faster, exhibits higher resolution, and is less expensive.

A comparison of specification are shown in the table below:

TABLE 3-1

Comparison of Visible and Infrared Cameras for 3D Surface Mapping

| FEATURE | VISIBLE | INFRARED |
| --- | --- | --- |
| resolution | still digital cameras:<br>2048 × 1536 = 3.1 megapixels<br>2272 × 1704 = 3.9 megapixels<br>2560 × 1920 = 4.9 megapixels<br>2832 × 2128 = 6.0 megapixels | 120 × 120 = 14,400 pixels<br>360 × 240 = 86,400 pixels |
| cost | $500–5000 | $13,500–30,000 |
| speed | 1/30 to 1/2000 sec | 1.5 seconds |
| A/D resolution |  | 12 bits (4096 levels) |
| thermal information | NO | YES |

Depth-from-defocus methods typically use reflected light. This characteristic enables structured illumination patterns to be used to achieve specific signal processing advantages. As stated earlier, infrared energy, primarily an emissive energy method, might be employed if an advantage presents itself. Transmission methods which transmit energy through the target, such as magnetic resonance, ultrasound or X-ray, were not judged practical or economical for this application.

Depth-from defocus techniques are optical methods. Non-optical technologies which include sonar and imaging radar have significant disadvantages for this application. Sonar or other ultrasonic methods typically use a liquid coupling medium, which is not practical for this project. While ultrasonic air operation is possible, the efficiency and lateral resolution present significant technical challenges. Imaging radar is typically used to map the earth's surface. While well-suited for large targets such as a mountain range, imaging radar is not likely to provide sufficient resolution for this project.

DFD is also an active optical method since it uses structure illumination to enhance the surface texture. Other active optical methods include pulsed or modulated light, interferometry, active depth-from-focus, active triangulation, and active stereoscopic.

Pulsed light methods utilize a pulse of light which bounces off of the target and returns to the source. The round trip time is measured and the distance computed from knowledge of the speed of light. A variation on this principle employs a continuously modulated light beam which is bounced off of the target and returned to the source. The phase of the received signal is demodulated to determine the time delay associated with the round trip to the target and back. Both of these variations require expensive test equipment to measure the small time delays inherent in light propagation. A spot or stripe scanning process is also required.

Interferometry methods include moire patterns and holography. Such methods are not applicable to this project since they work best when the surface depths are microscopic.

Active depth-from-focus (DFF) utilizes similar principles to DFD. However, DFF requires a focal scan through the range of the target. A multitude of images are acquired and processed to identify the precise distance at which each surface point is in the best focus. Since magnification changes with focal distance in most optical systems, registration and alignment of the multiple images can be a problem.

Active triangulation typically uses laser spot scanning or stripe scanning. In this method the laser beam and the camera are at different angles such that the illuminated profile of the surface is recorded in the camera. Such scanning system require multiple images and possible considerable scanning time. Holes in the computed surface result when a surface feature obstructs either the laser beam or the camera view. Since this is a mature technology, achieving a proprietary patent position may be difficult.

Active stereoscopic vision systems may also be used to obtain 3D surface measurements. This method uses two cameras separated by a distance sufficient to triangulate on a given point on the target surface. A minimum of two images are required to compute the target surface. Holes in the computed surface result when a surface feature obstructs one of the camera views. This also is a mature technology and may be difficult to achieve a proprietary patent position.

A comparison of active optical surface detection technologies is presented in Table 2-1.

3.2. Equipment Layout

The equipment of this embodiment consists of range cameras, infrared camera(s), animal positioning devices, a control unit, a processing unit, a personal computer and peripheral devices. Each range camera consists of a visible spectrum camera, at least one illuminator, and the necessary data processing capability to convert the still or video images into range images. The positioning of the range cameras is important to assure complete and accurate coverage of the target animal.

Range Camera Positions

In one embodiment of the apparatus of the invention, three visible-spectrum, range cameras are selected to accurately reproduce livestock targets as shown in FIG. 2-9. (As previously discussed, two cameras could also be used with an assumption of lateral symmetry.) The cameras are positioned to provide two opposing side views and a top view. The side view cameras are positioned at the longitudinal center of the animal with the vertical elevation being slightly below the expected center of the animal to provide additional ventral surface coverage. Each range camera obtains a range image of the animal surface within its field of view. The surface seams are shown in FIG. 2-9. Seams 1-2 and 3-2 are in regions where there is an overlap of range image surfaces. This provides sufficient surface accuracy to achieve the desired volume calculations. The 1-3 seam is given a bit of overlap by the reduced vertical camera positions.

Since this embodiment employs visible spectrum cameras instead of more expensive laser ranging cameras, the need to assume lateral symmetry is not as great. Therefore, no special effort is required to establish the median plane to compute lateral symmetry. The opposing range images of the side cameras will simply indicate the dimensional position of the surface segments. This approach is also less sensitive to animals that may not be aligned precisely with the coordinate system of the cameras. Any misalignment will still result in a 3D data set which can be rotated mathematically if necessary.

Visible Spectrum Cameras

The ideal visible spectrum camera for this embodiment would acquire three images (or however many images were required for range camera processing) simultaneously, with very fast shutter or acquisition speeds. The fast shutter speed would assure that there was no motion blurring within a given image. The simultaneous acquisition of three images would assure that there was no misalignment from image to image due to movement of the target animal. This ideal camera would also have the ability to be electronically triggered in order to synchronize the image acquisitions with the structured-light, flash illumination.

The Nikon, D1x, and the Canon EOS-1D cameras are viable candidates for the visible spectrum camera. These cameras are single lens reflex (SLR), digital cameras. Both are capable of stopping any motion on an individual image with shutter speeds of up to $\frac{1}{16000}$ of a second. The resolution of the DX1 and the EOS-1D are 5.74 megapixels and 4.48 megapixels, respectively. Both may be controlled by computer via a IEEE 1394 interface (very fast USB-2). Both accept a wide assortment of interchangeable lenses. The DX1 and EOS-D1 can store 9 frames and 21 frames, respectively, to resident memory before needing to download to a computer or record to memory disk.

With respect to shoot speed, the Nikon, DX1 is only capable of continuous shooting at a rate of 3 frames per second or at a frame interval of 333 ms. The Canon, EOS-1D is somewhat faster at 8 frames per second or a frame interval of 125 ms. Both are significantly slower than the video rate of 30 frames per second (33.3 ms frame interval). To completely avoid motion registration problems between images, a frame interval of 1 ms or less would be preferred. However, since the shutter speeds are so fast, there is unlikely to be any blurring on an individual image. Therefore, software processing may be used to realign any movement shifts present between images.

Illuminators

This embodiment utilizes illuminators which project structured light patterns on the target animal. These illuminators consist of a flash source, a pattern mask, and a lens system capable of projecting the pattern onto the target animal. The flash source is electronically synchronized with the acquisition trigger for its respective camera. The pattern mask contains a structured light pattern which projects a textured surface onto the surface of the target animal. This pattern is processed via the digital signal processing unit as part of the range image algorithm.

Infrared Camera(s)

A radiometric infrared camera is advantageous for an embodiment of this invention since it is capable of providing a pixel-by-pixel measurement of surface temperature. This thermal image may be processed, and warped onto the 3D surface constructed from the combination of range images.

One IR camera which provides a quality thermal image is the IR Snapshot® camera developed and manufactured by Infrared Solutions, Inc. using Honeywell thermoelectric sensor technology. This camera employs a low-cost, uncooled, scanned linear array of thermoelectric thermal sensors. It provides a thermal image which is 120×120 pixels based on radiated IR in the 8 to 12 μm spectral band. Each pixel has 12 bits of useable resolution. The accuracy is specified at ∀2E C or 2% of the reading. The camera may be controlled via an RS-232 serial port and images stored on a resident flash card or downloaded via the serial link to a laptop or personal computer. The unit may be either line or battery powered.

Animal Positioning Equipment

As part of the present invention it is necessary to position the target animal (or whole carcass) in a proper position with respect to the range and thermal cameras. This is accomplished via a series of chutes which in a single file manner, direct the target animals into the proper position. Proximity sensor automatically alert the system when the animal is within the designated target zone. These proximity sensors may take a number of different forms. They may include a light transmitter and receiver which indicates proximity by breaking a visible or infrared beam. They may also include ultrasonic or infrared motion detection in a very limited region in front of each proximity detector. Numerous other means of detecting the proximity of the animal to a specific location are known to those skilled in the art. Additionally, a video camera (or video output on the range camera) may be used to confirm the proximity of the target animal to the target zone.

Control Unit

A control unit takes as input, the signals from the proximity sensors that identify when the target animal is within the target zone. This control unit, in turn, outputs trigger signals to initiate image capture procedures by the range and thermal imaging cameras. This control unit may consist of discrete digital circuitry, digital and analog circuitry, microprocessor-based circuitry. The control function may also be combined with the image processing function within the processing unit.

Processing Unit

The processing unit implements the algorithms, image processing, surface processing, volume processing, and measurements described within the Summary section of this application. Digital signal processing (DSP) components from such companies and Texas Instruments and Analog Devices Inc. are prime candidates for inclusion in this unit. Additionally, array processing subsystems and boards may be used to increase the processing speed if desired.

Personal Computer

A personal computer (PC) is a key component for this system. Candidates for this component include units from Dell Computer, Hewlett-Packard, and IBM. One such Dell computer is the Dimension 8200 Series with the following features:

Pentium 4 Processor at 2.4 GHz with 512 k L2;
256 Mb PC800 RDRAM;
19 inch color monitor;
GeForce4 Ti 4600 Graphics card with DVI and TV out;
120 GB, 7200 RPM hard drive;
Windows XP operating system;
16×variable DVD ROM drive;
CD-RW drive;
10/100 PCI Fast Ethernet card;
56K telephony modem;
Soundblaster Pro/16 sound card; and
appropriate software.

Such interface features as USB ports, USB-2 ports, 10/100 Ethernet interface, RS232 serial, parallel, and 56K modem permit the PC to efficiently interface with other system components as well as peripheral devices. The processor, memory and graphics card are selected to permit display and interface with the graphical output of the DSP unit. The CD-RW drive permits economical backup and storage of the resulting data. The large fast hard drive enables efficient manipulation of large data sets.

Peripheral Devices

An almost unlimited assortment of peripheral devices are possible with the above described system. Some of these peripheral devices include:

printers (laser, color inkjet, color laser, or other);
local network;
internet;
wireless links;
infrared links; and
PDAs.

Weight Measurement

While weight is not a scanned measurement consistent with the present invention, it is a commonly used metric associated with livestock. Therefore, it is reasonable to include a scales as part of any measurement station. Applicable microprocessor-based, livestock scales are available from Weightronix of Fairmont, Minn.

System Layout

Referring particularly to FIG. 2-1 of the drawings, one form of the apparatus of the invention is there shown. The apparatus here comprises an animal positioning device, generally designated by the numeral 12. Device 12 defines an animal target zone 14 that has first and second sides 15 and 16, an open top 18 and a floor 20. Positioned in close proximity of positioning device 12 are first and second range cameras 22 and 24 and a top range camera 26. An infrared camera 28, of the character previously described is also positioned proximate the open top 18 of the positioning device. Each range camera consists of a visible spectrum camera, at least one illuminator 30, and the necessary data processing capability to convert the camera images into range images.

In the embodiment of the invention shown in FIG. 2-1, the cameras are positioned to provide two opposing side views and a top view. As indicated in FIGS. 2-2A and 2-2B, the first and second side view cameras are positioned at the longitudinal center of the animal with the vertical elevation being slightly below the expected center of the animal to provide additional ventral surface coverage. Each range camera obtains a range image of the animal surface within its field of view. The surface seams are shown in FIG. 2-9. Seams 32 and 34 are in regions where there is an overlap of range image surfaces. This provides sufficient surface accuracy to achieve the desired volume calculations. Surface seam 36 is given a bit of overlap by the reduced vertical camera positions.

As previously mentioned, while various commercially available cameras can be used in accomplishing the method of the present invention, the previously identified camera manufactured by the Nikon, Inc. with the model designation "D1x" and the previously identified camera manufactured by Canon, Inc. having the model designation "EOS-1D" are suitable for use in the practice of the invention. These cameras are single lens reflex (SLR), digital cameras and both are capable of stopping any motion on an individual image with shutter speeds of up to $1/16000$ of a second. The resolution of the "DX1" and the "EOS-1D" are 5.74 megapixels and 4.48 megapixels, respectively. Both may be controlled by computer via an Institute of Electrical and Electronics Engineers (IEEE) 1394 interface and both accept a wide assortment of interchangeable lenses. The "DX1" and "EOS-D1" can store 9 frames and 21 frames, respectively, to resident memory before needing to download to a computer or record to memory disk. Because of the very fast shutter speeds of these cameras there is unlikely to be any blurring on an individual image. Therefore, software processing may be used to realign any movement shifts that may exist between images.

The illuminators 30, which, as previously described, comprise the illumination means of the invention for illuminating the target area, are readily commercially available and project structured light patterns on the target animal. In the present form of the invention, the illuminators 30 comprise a flash source, a pattern mask, and a lens system capable of projecting the pattern onto the target animal. The flash source is electronically synchronized with the acquisition trigger for its respective camera. The pattern mask contains a structured light pattern which projects a textured surface onto the surface of the target animal. This pattern is processed via the digital signal processing unit as part of the range image algorithm.

The radiometric infrared camera 28 of the apparatus of the invention, which, as previously described, is also commercially available from various sources, including Infrared Solutions, Inc. of Plymouth, Minn., is capable of providing a pixel-by-pixel measurement of surface temperature. As will later be discussed, this thermal image may be processed, and warped onto the 3D surface constructed from the combination of range images. An infrared camera manufactured by Infrared Solutions, Inc. and sold under the name and style "IR SNAPSHOT" has proven suitable for use in the accomplishment of the methods of the present invention. This camera employs a low-cost, uncooled, scanned linear array of thermoelectric thermal sensors. It provides a thermal image which is 120×120 pixels based on radiated IR in the 8 to 12 μm spectral band. Each pixel has 12 bits of useable resolution. The accuracy is specified at 2 degrees C. or 2% of the reading. The camera may be controlled via an RS-232 serial port and images stored on a resident flash card or downloaded via the serial link to a laptop or personal computer.

In accomplishing the method of the present invention it is necessary to position the target animal (or whole carcass) in a proper position within a target zone 14 that is defined by the positioning device 12. This is accomplished by means of a series of chutes, such as chute 38 (FIG. 2-1) that comprise a part of the positioning device 12. The chutes, in a single file manner, direct the target animals into the proper position within the target zone 14. Proximity sensors 40 automatically alert the system when the animal is within the designated target zone 14. These proximity sensors are readily commercially available and may take a number of different forms. For example, they may include a light transmitter and receiver which indicates proximity by breaking a visible or infrared beam. They may also include ultrasonic or infrared motion detection in a very limited region in front of each proximity detector. Numerous other means of detecting the proximity of the animal to a specific location are known to those skilled in the art. Additionally, a video camera (or video output on the range camera) may be used to confirm the proximity of the target animal to the target zone.

The data processing means of the invention, which includes the previously discussed control and processing unit 42, takes as input the signals from the proximity sensors that identify when the target animal is within the target zone. The control unit, in turn, outputs trigger signals to initiate image capture procedures by the previously identified range and thermal imaging cameras. Control unit 42 may comprise of discrete digital circuitry, digital and analog circuitry, and microprocessor-based circuitry. The control function may also be combined with the image processing function within the processing unit.

The previously described processing unit of the data processing means, which is also of conventional design, implements the algorithms, image processing, surface processing, volume processing, and measurements the character of which will presently be described. Digital signal processing (DSP) components from such companies and Texas Instruments, Inc. of Dallas, Tex. and Analog Devices Inc. of Norwood, Mass. are prime candidates for inclusion in this unit. Additionally, array processing subsystems and boards may be used to increase the processing speed if desired.

A personal computer (PC), generally designated in FIG. 2-1 by the numeral 44, also forms apart of the data processing means of the present invention. While various commercially available personal computers can be used in accomplishing the methods of the present invention, a computer manufactured and sold by Dell Computer Corporation of Austin, Tex. under the name and style "Dimension 8200 Series" has the desired capabilities. The particular features of this computer have been previously discussed herein As also previously discussed, various peripheral devices of a character well-known to those skilled in the art can be used with the above described system.

Figures 2, 3, 3A:
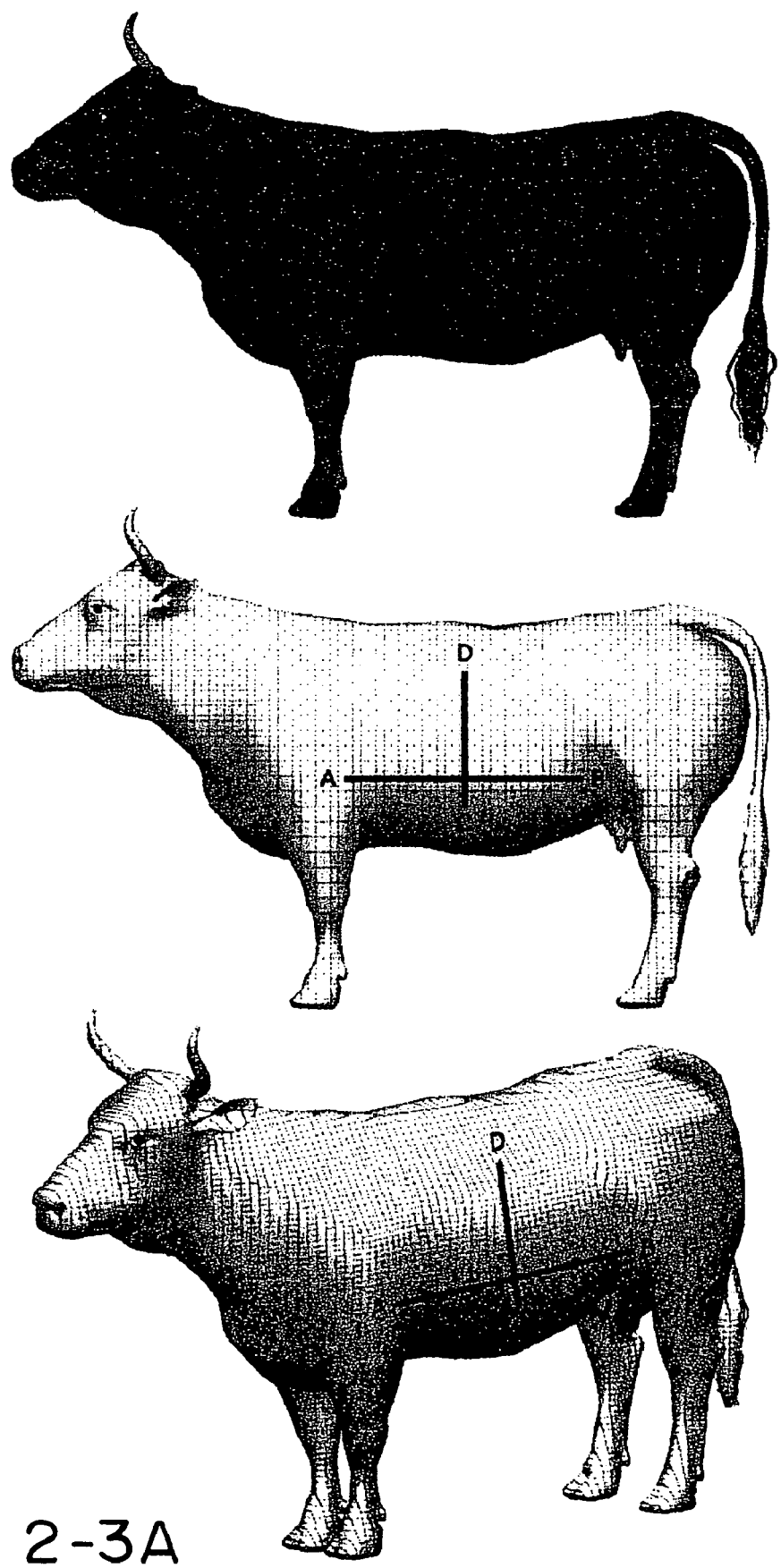
Figures 2, 3, 3B:
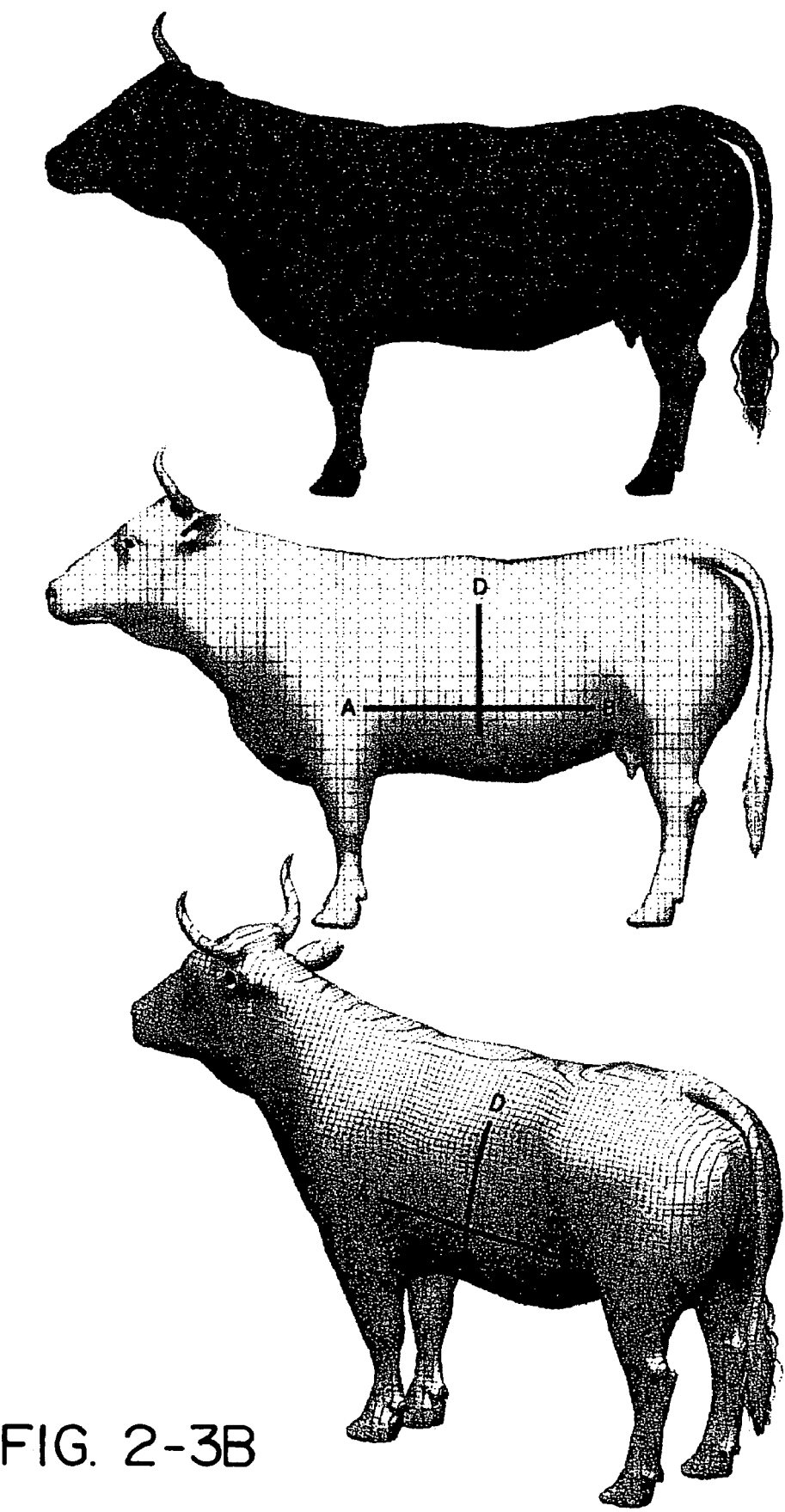
Figures 2, 3, 3C:
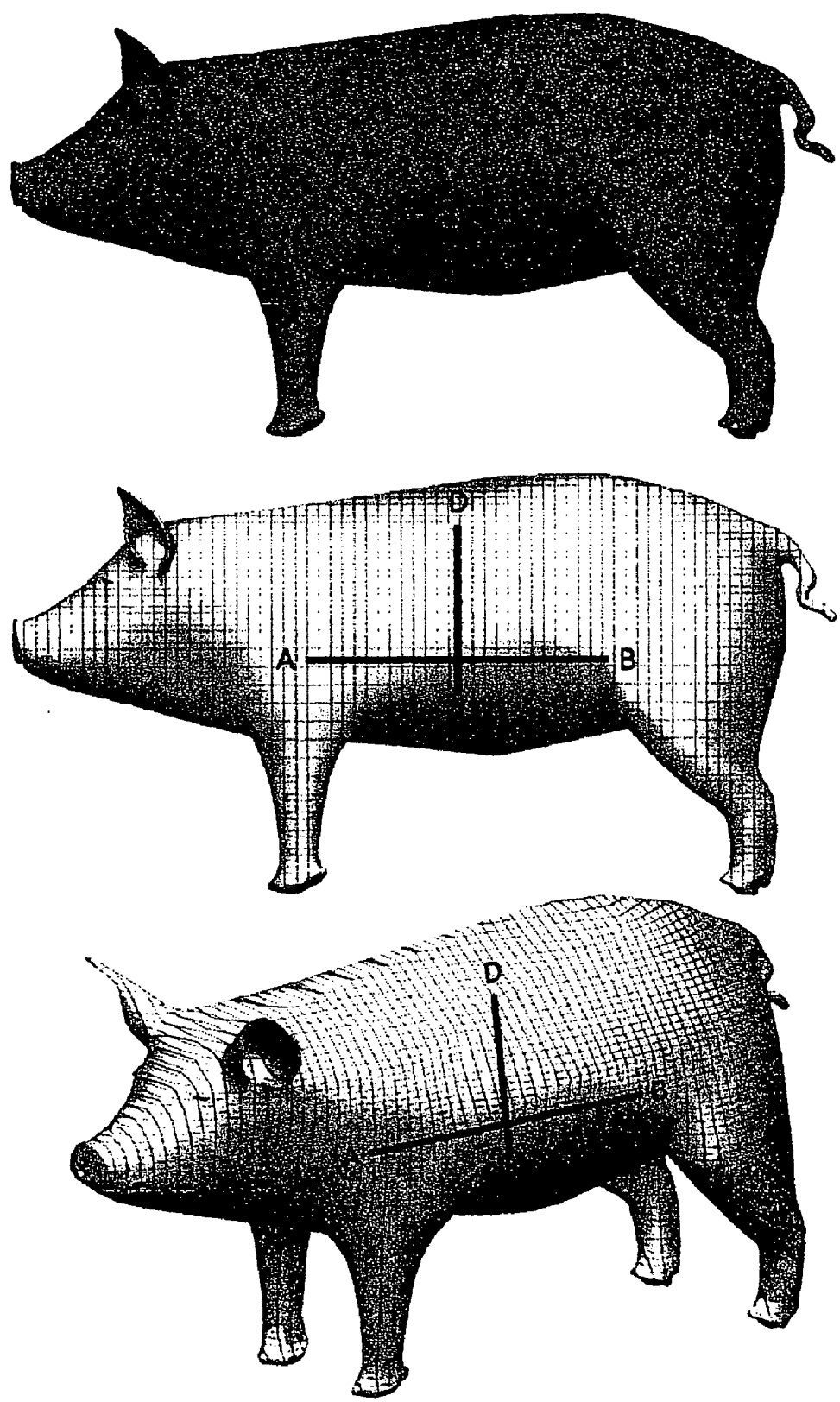
Figures 2, 3, 3D:
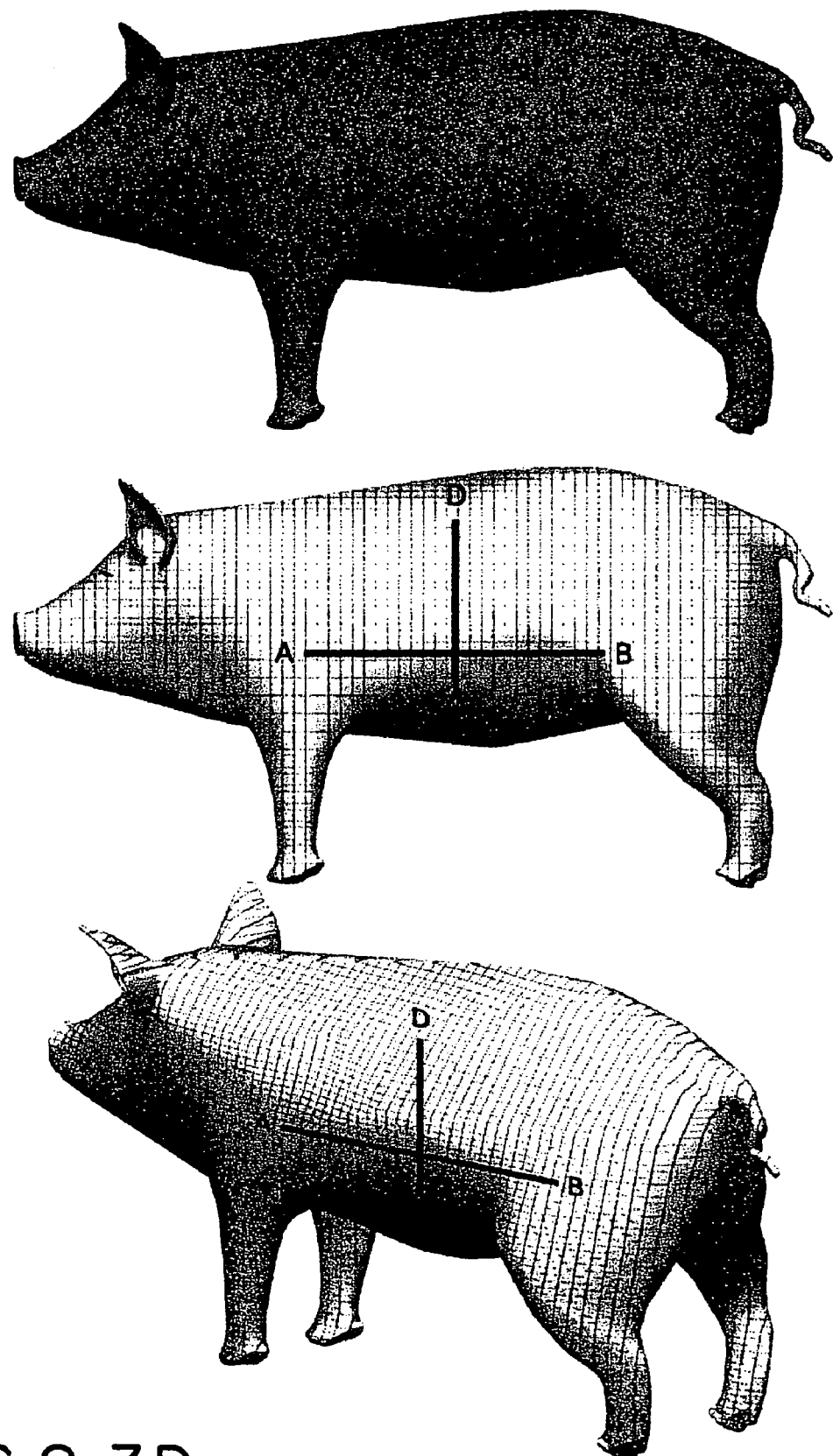
Figure 2:
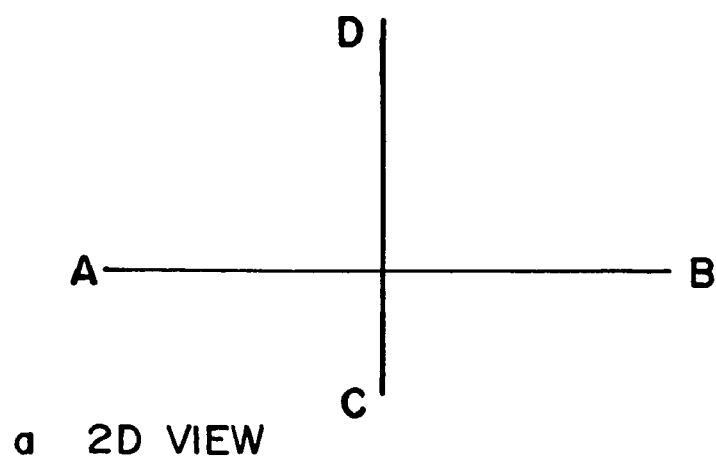
Figure 3:
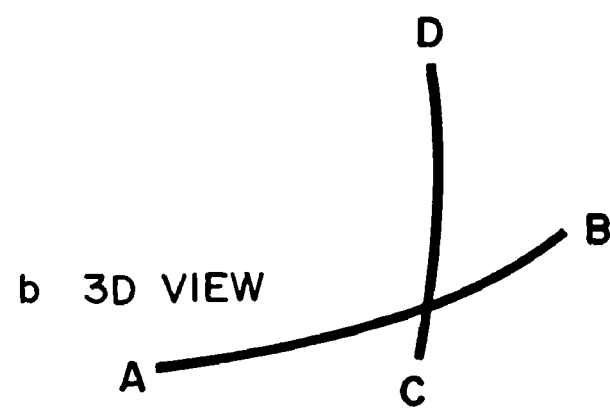
Figures 1A, 3:
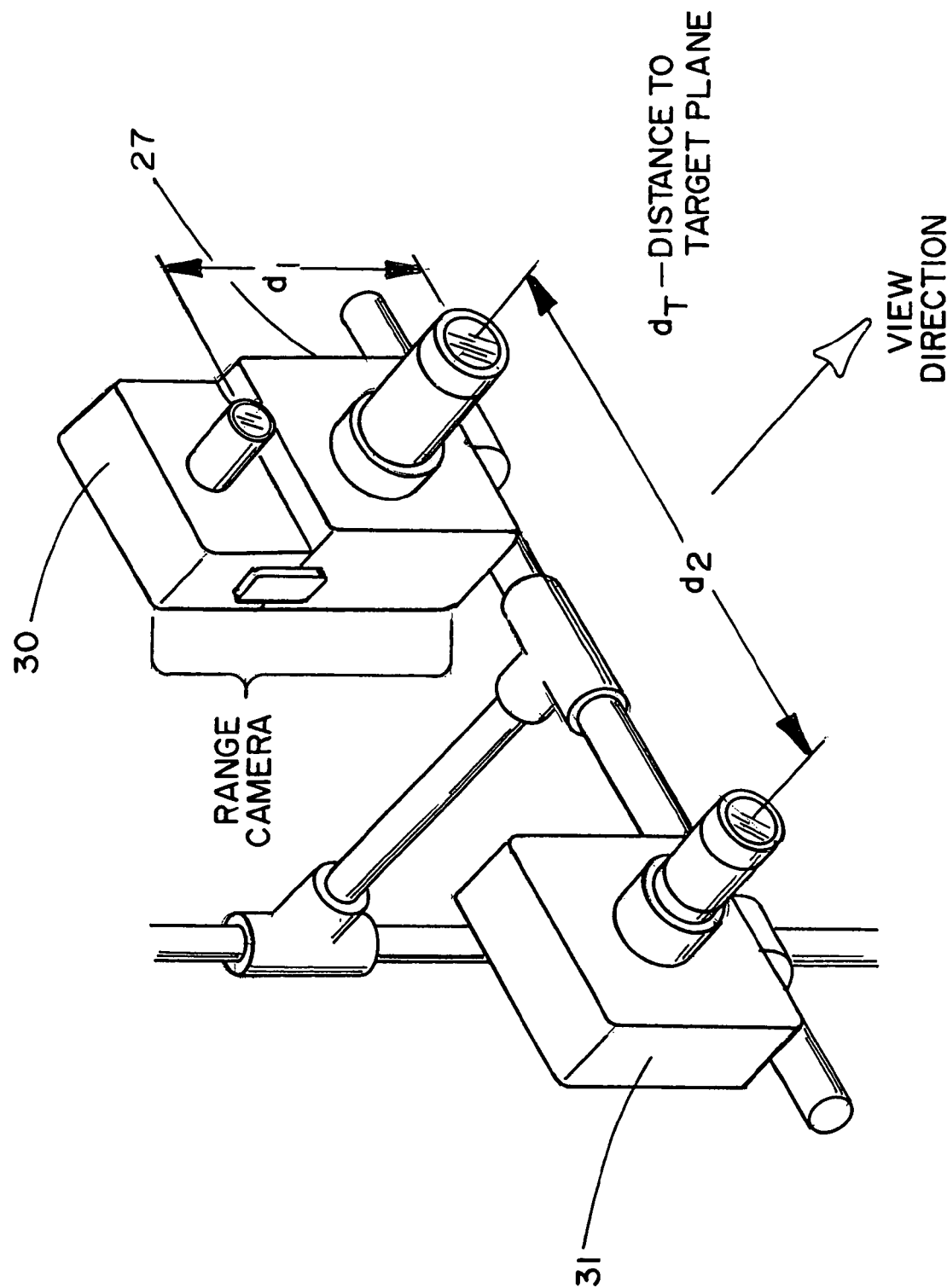

Also forming apart of the apparatus of the invention are weighing means for determining the weight of the target animal. A microprocessor-based, livestock scale 45, that is mounted in the floor 20 of the positioning means, is suitable for present purposes. Scale 45 is available from various sources including Weightronix of Fairmont, Minn. Referring to FIGS. 3-1A, 3-1B, and 3-1C, alternate forms of range camera arrangements are there shown. Referring particularly to FIG. 3-1A, a visible spectrum camera 27 is shown on the right side of the figure with the structured light illuminator 30 positioned on top of the visible spectrum camera. The separation distance, $d_1$, between the lens axes of the illuminator and the visible spectrum camera should be as small as possible to avoid parallax errors and possible gaps in the resulting 3D surface. In the extreme, telecentric optics permit the illuminator and the visible spectrum camera to share the same objective lens thus eliminating any parallax errors. The distance, $d_2$, should also be minimized to reduce errors between the range image and the thermal image. The distance, $d_T$, is the distance from the range camera to the target plane.

Figures 1B, 3:
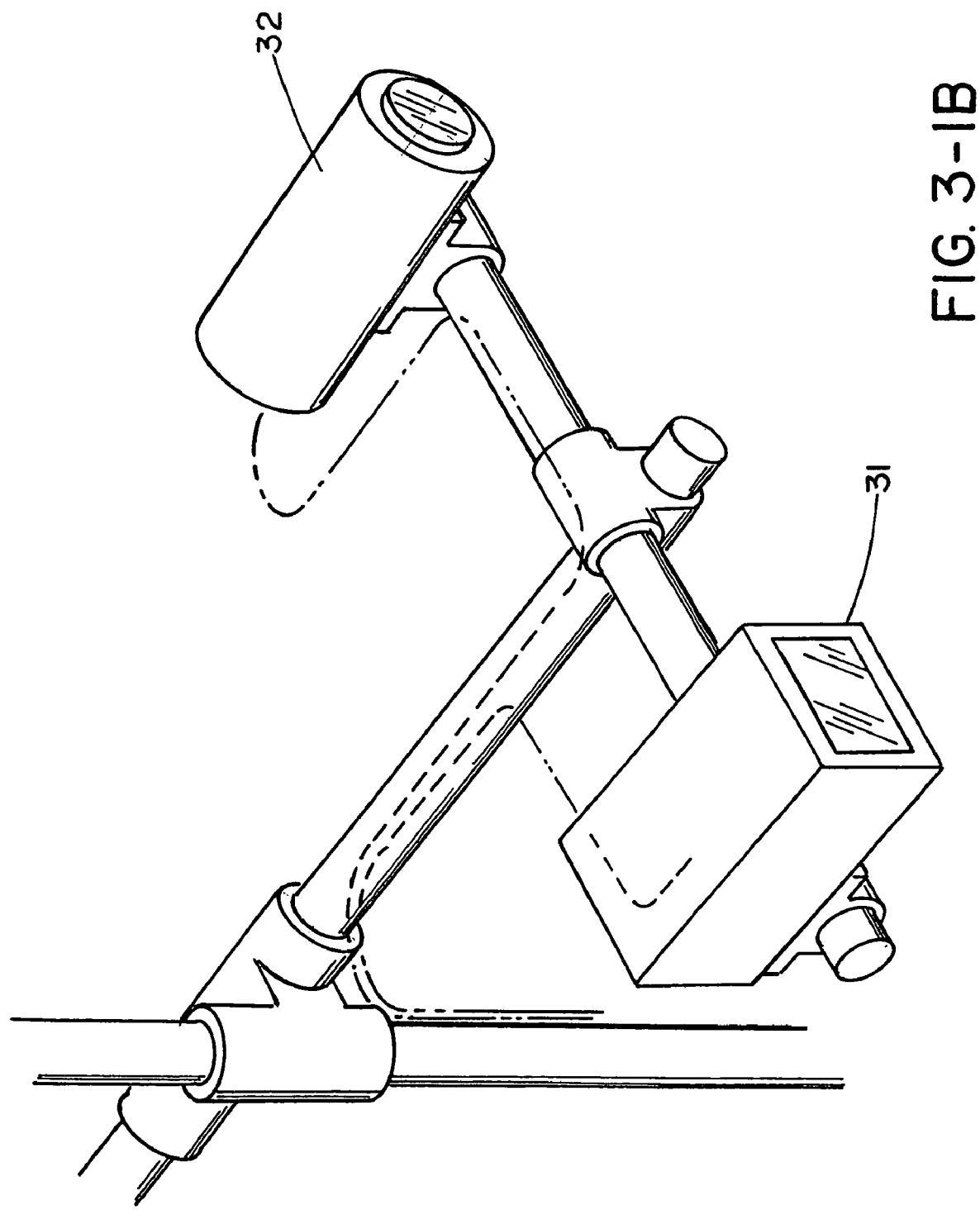
Figures 1C, 3:
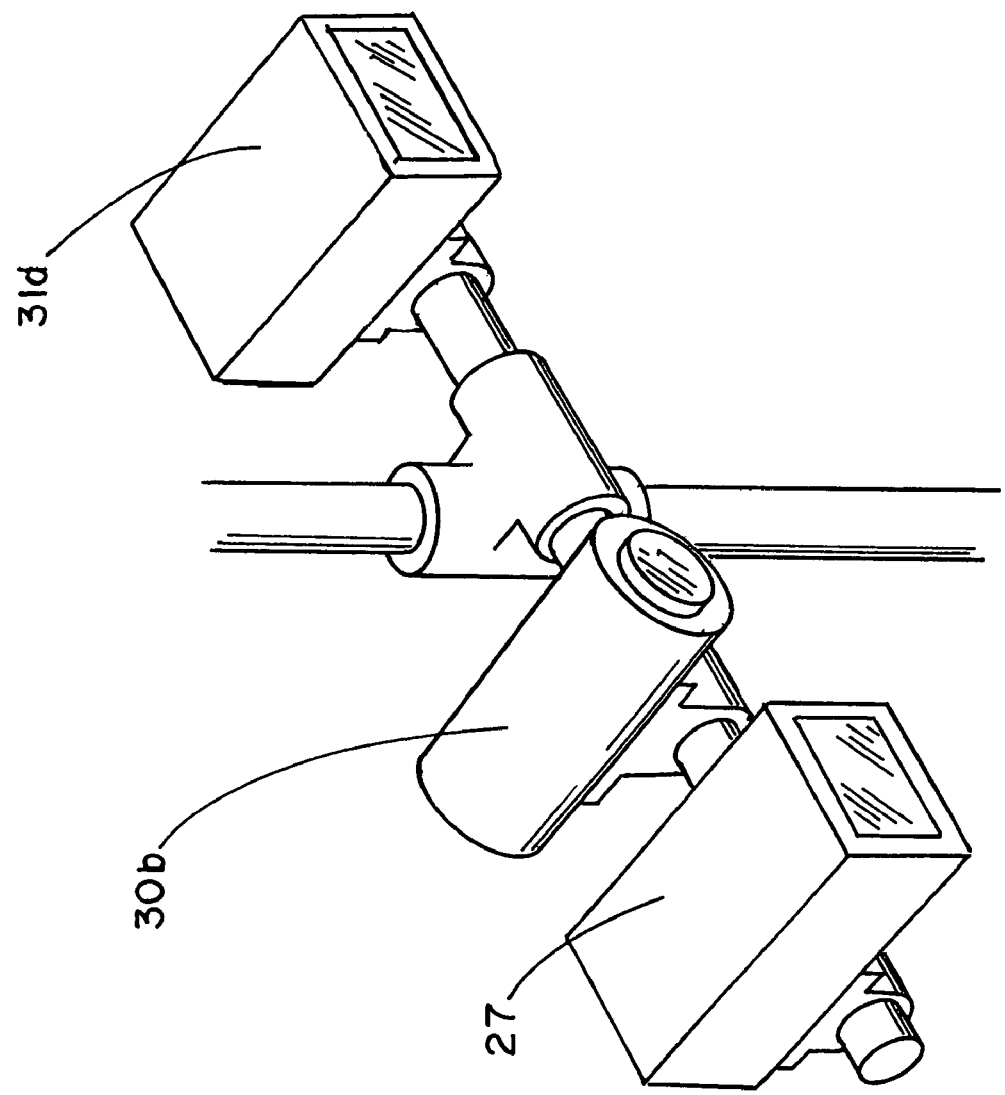
Figures 2, 3:
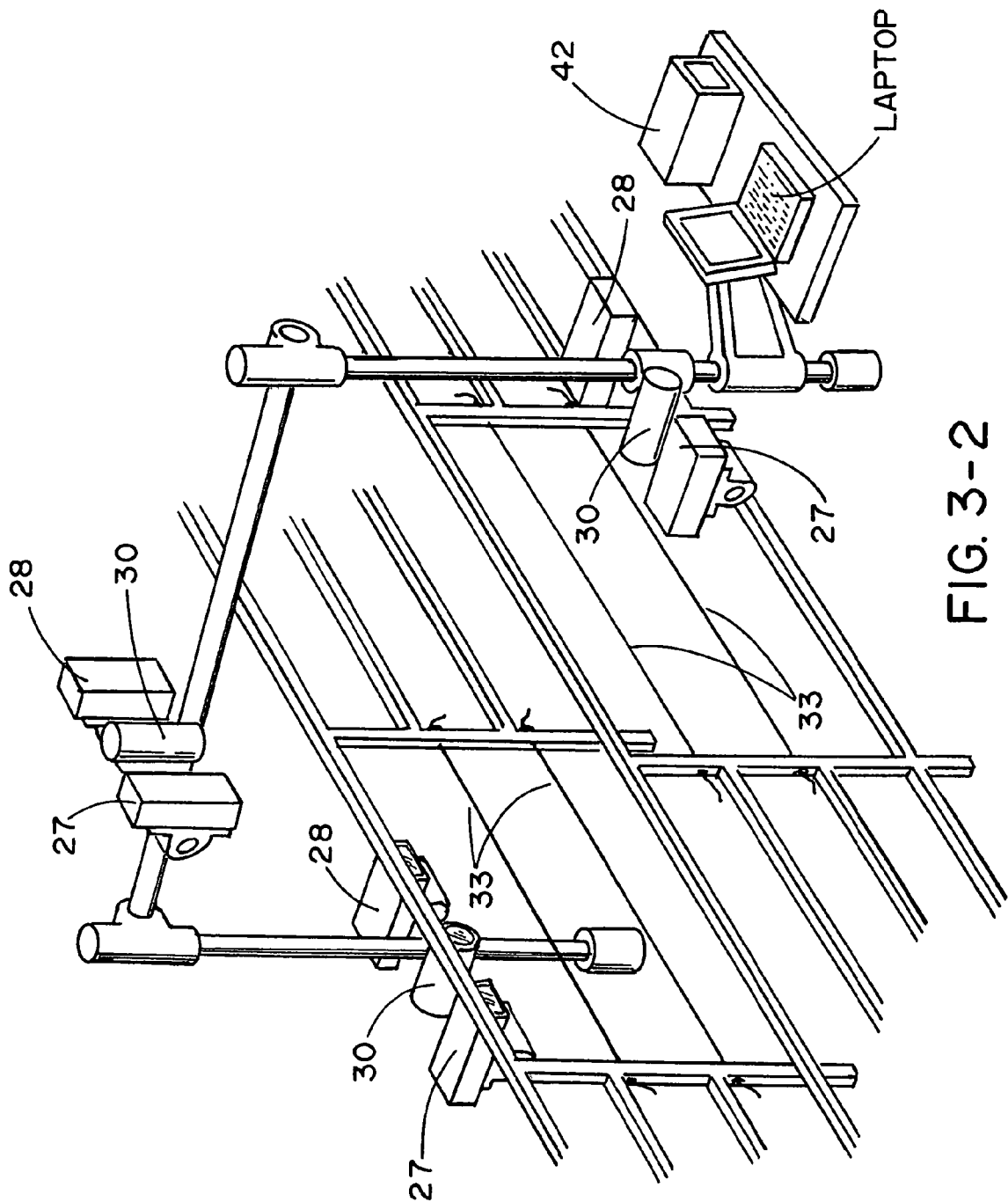
Figure 3:
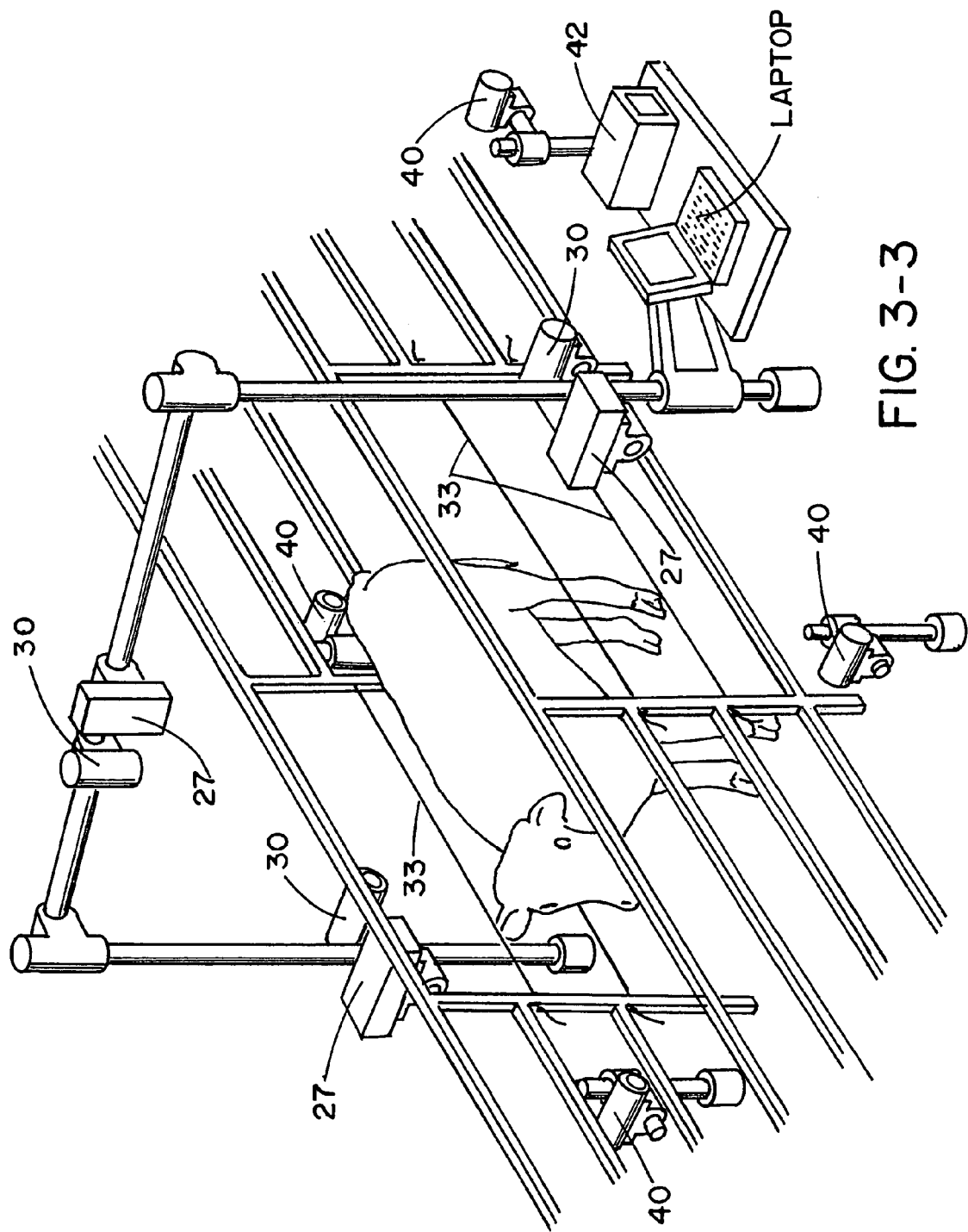
Figures 3, 4:
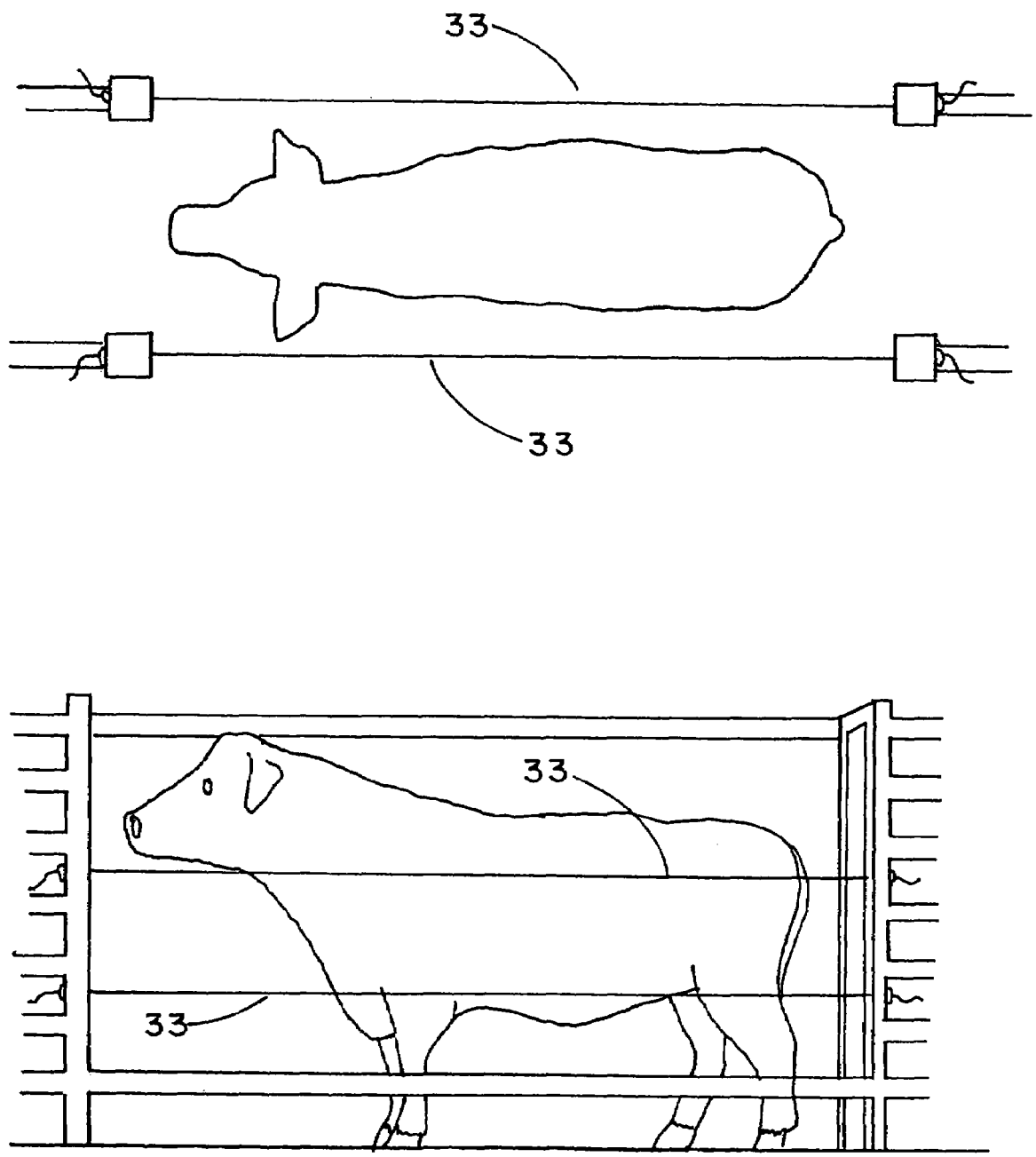
Figures 3, 4, 5:
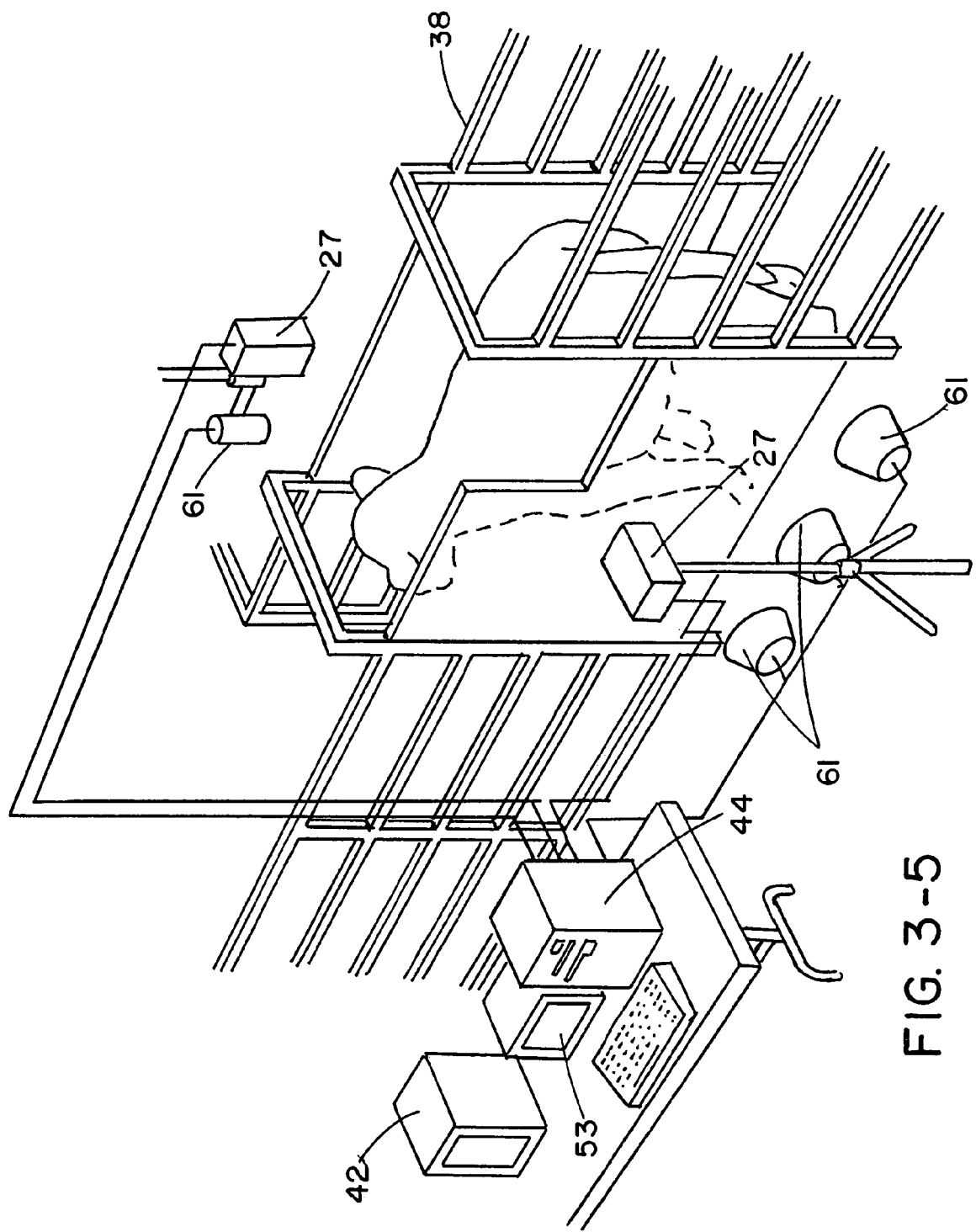
Figures 3, 4, 5, 6:
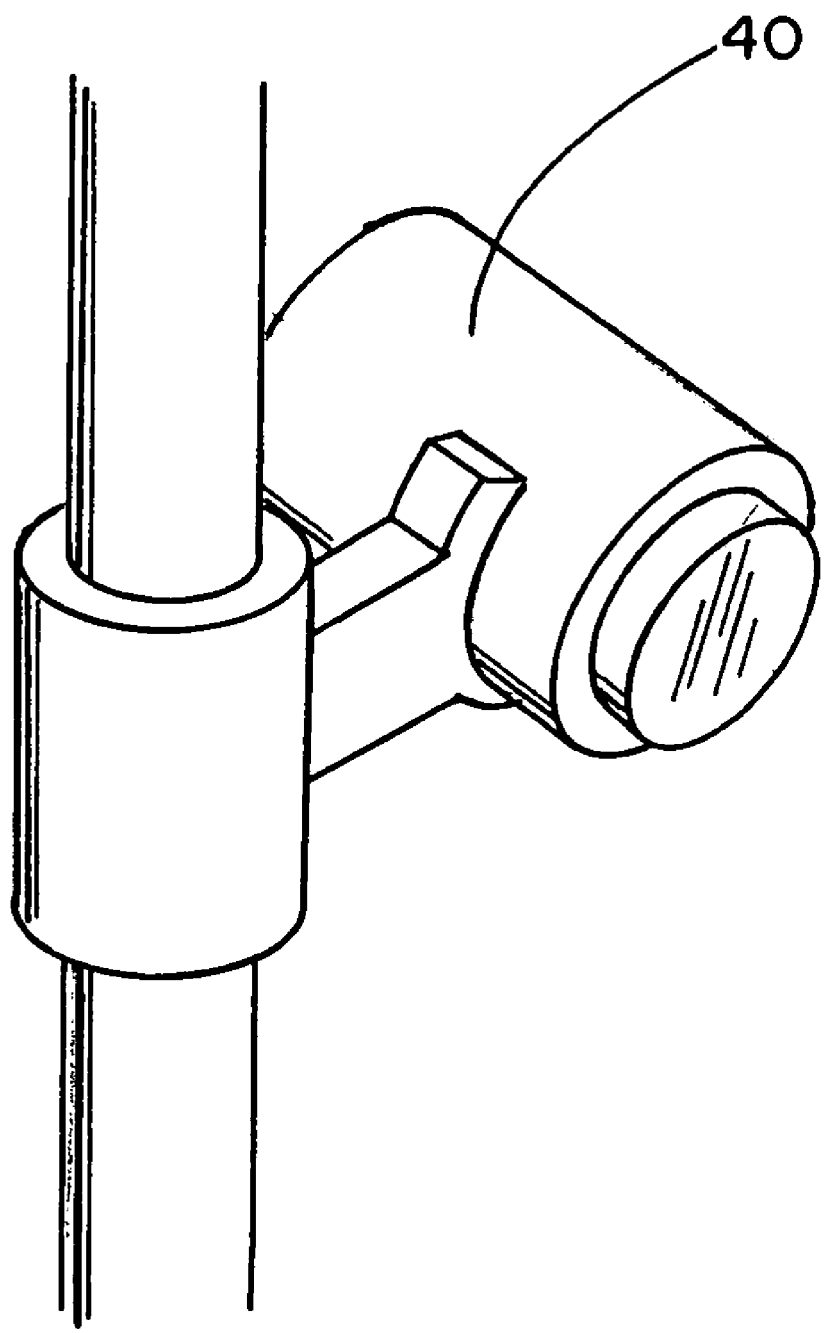
Figures 3, 4, 5, 6, 7:
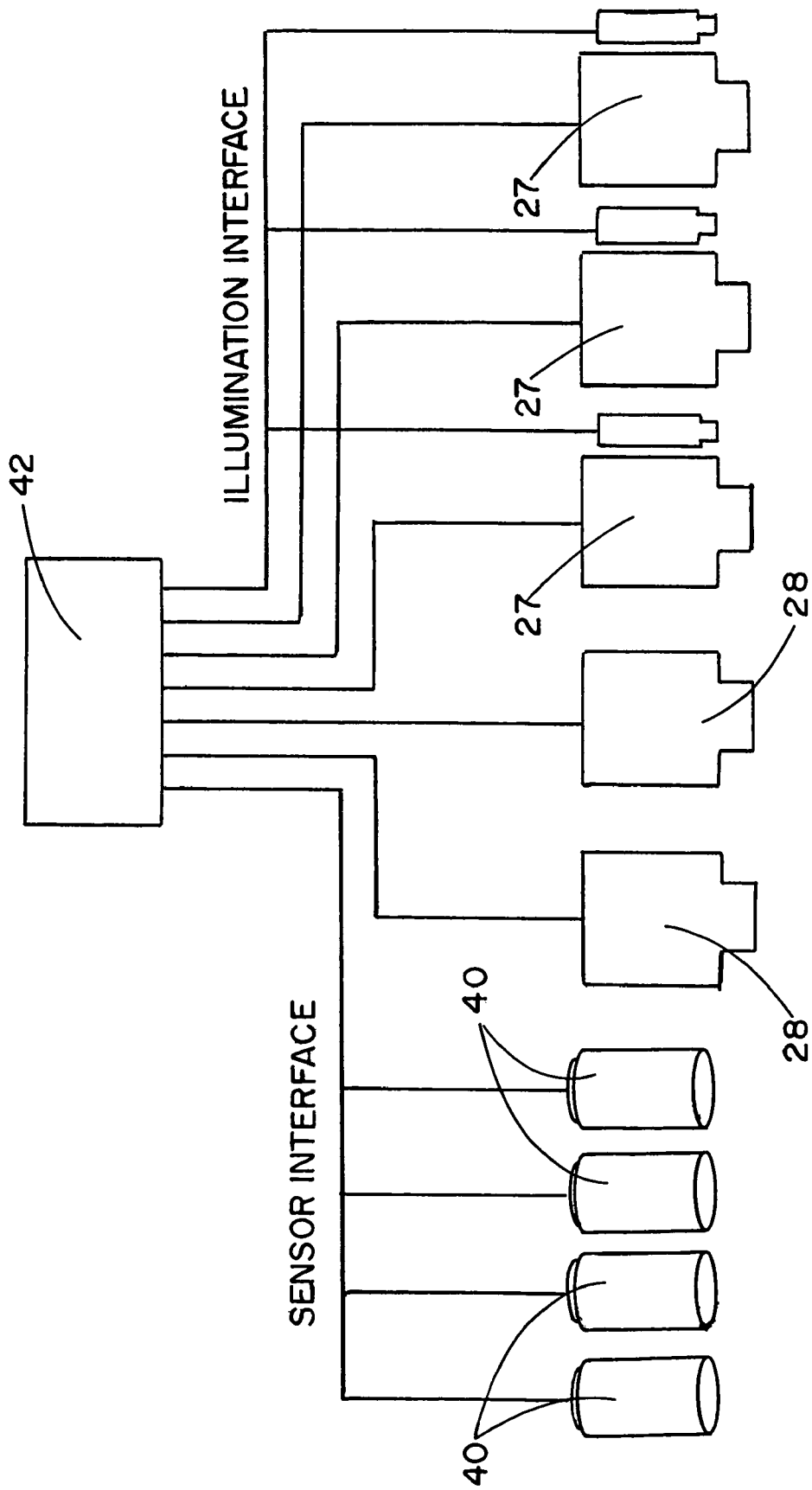
Figures 3, 4, 5, 6, 7, 8:
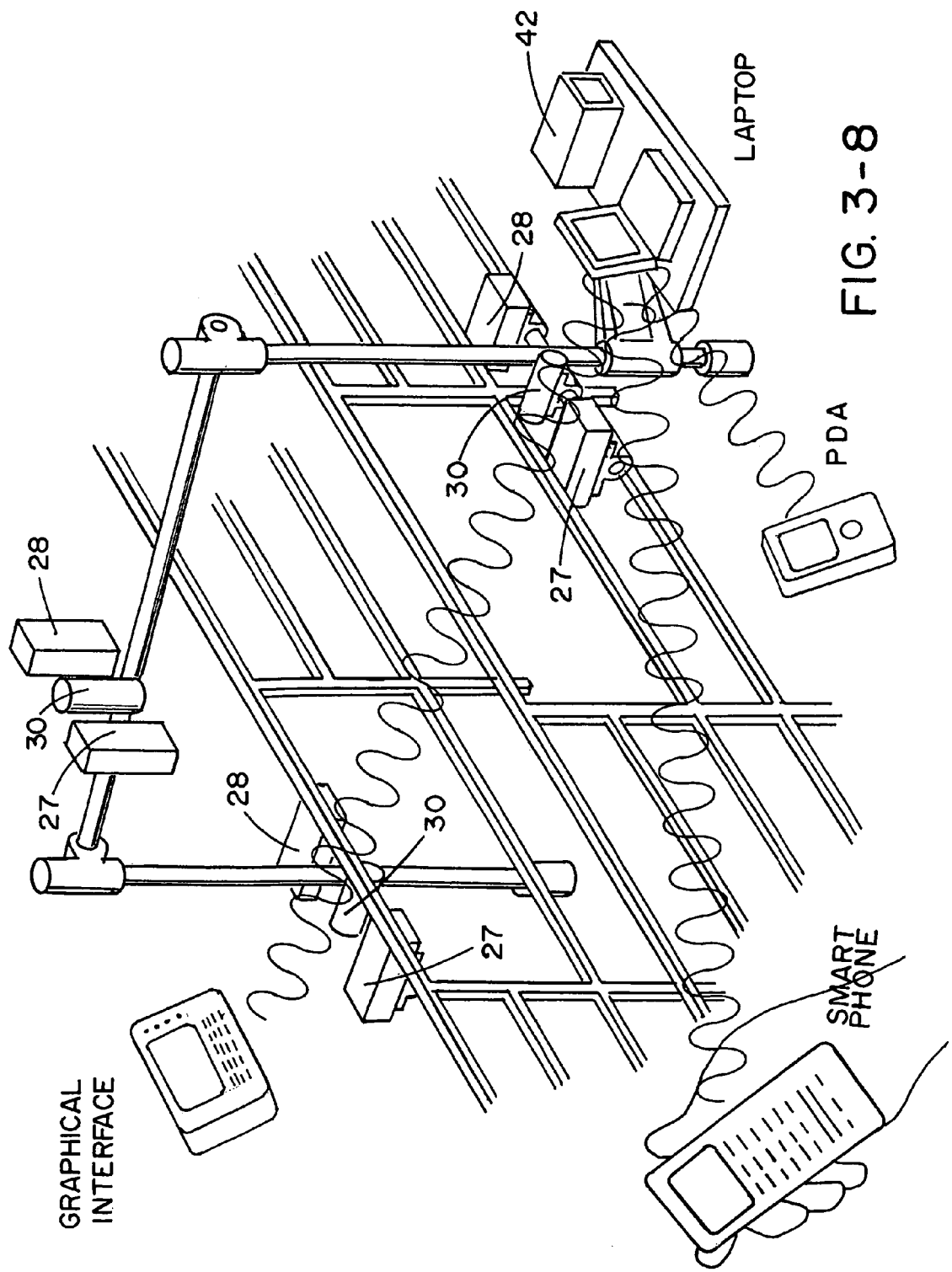
Figures 3, 4, 5, 6, 7, 8, 9:
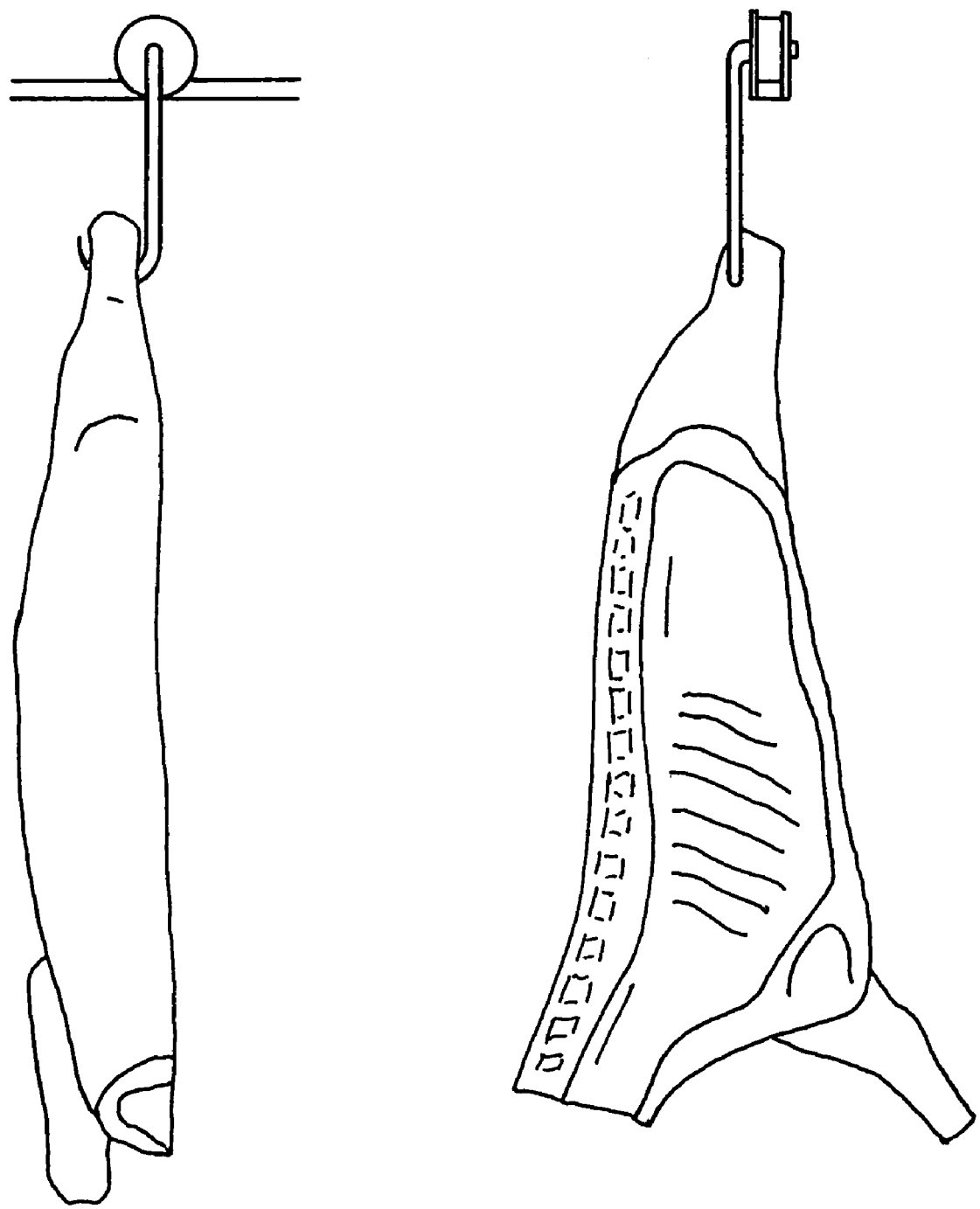
Figures 3, 4, 5, 6, 7, 8, 9, 10:
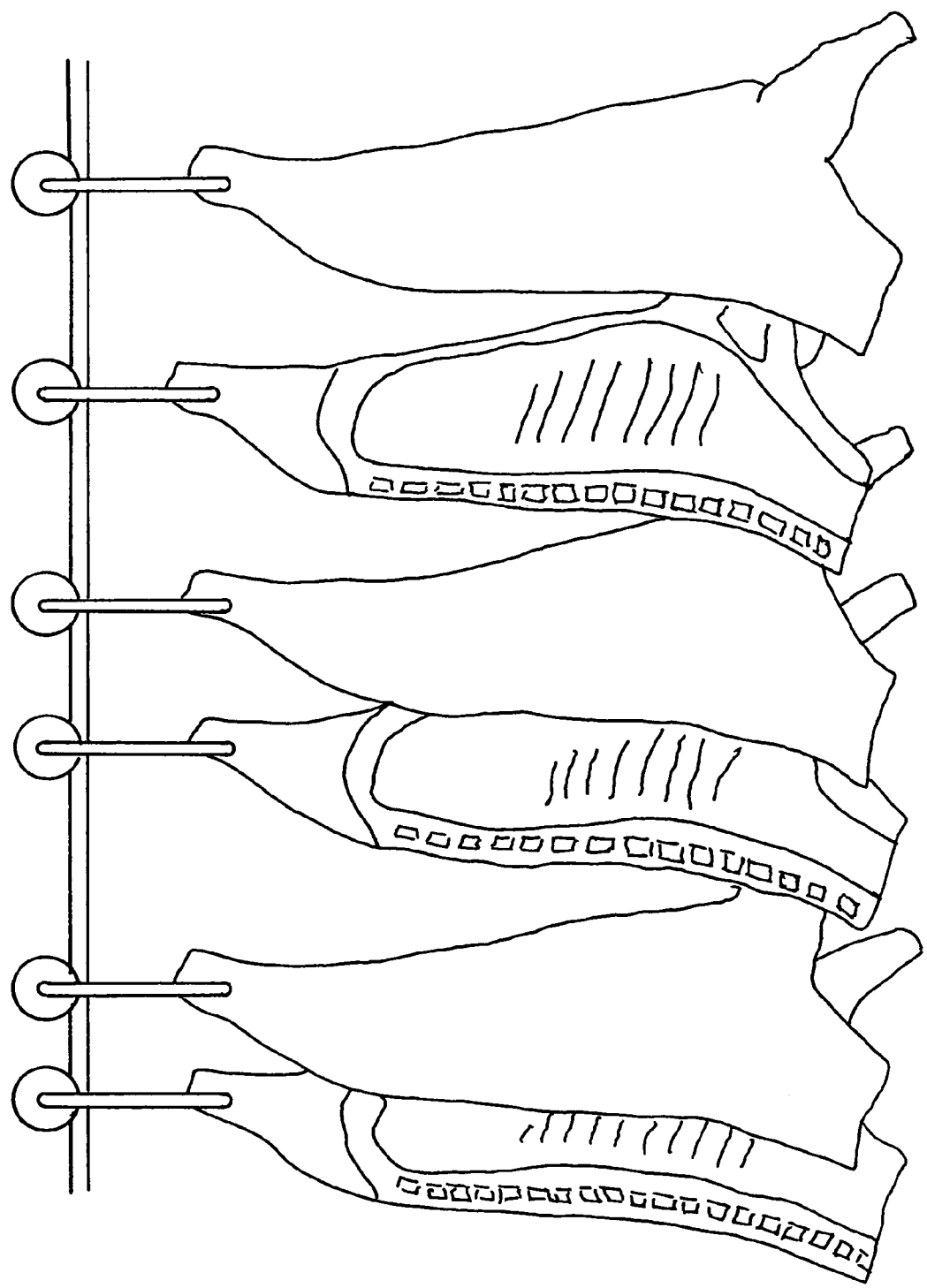
Figures 3, 4, 5, 6, 7, 8, 9, 10, 11:
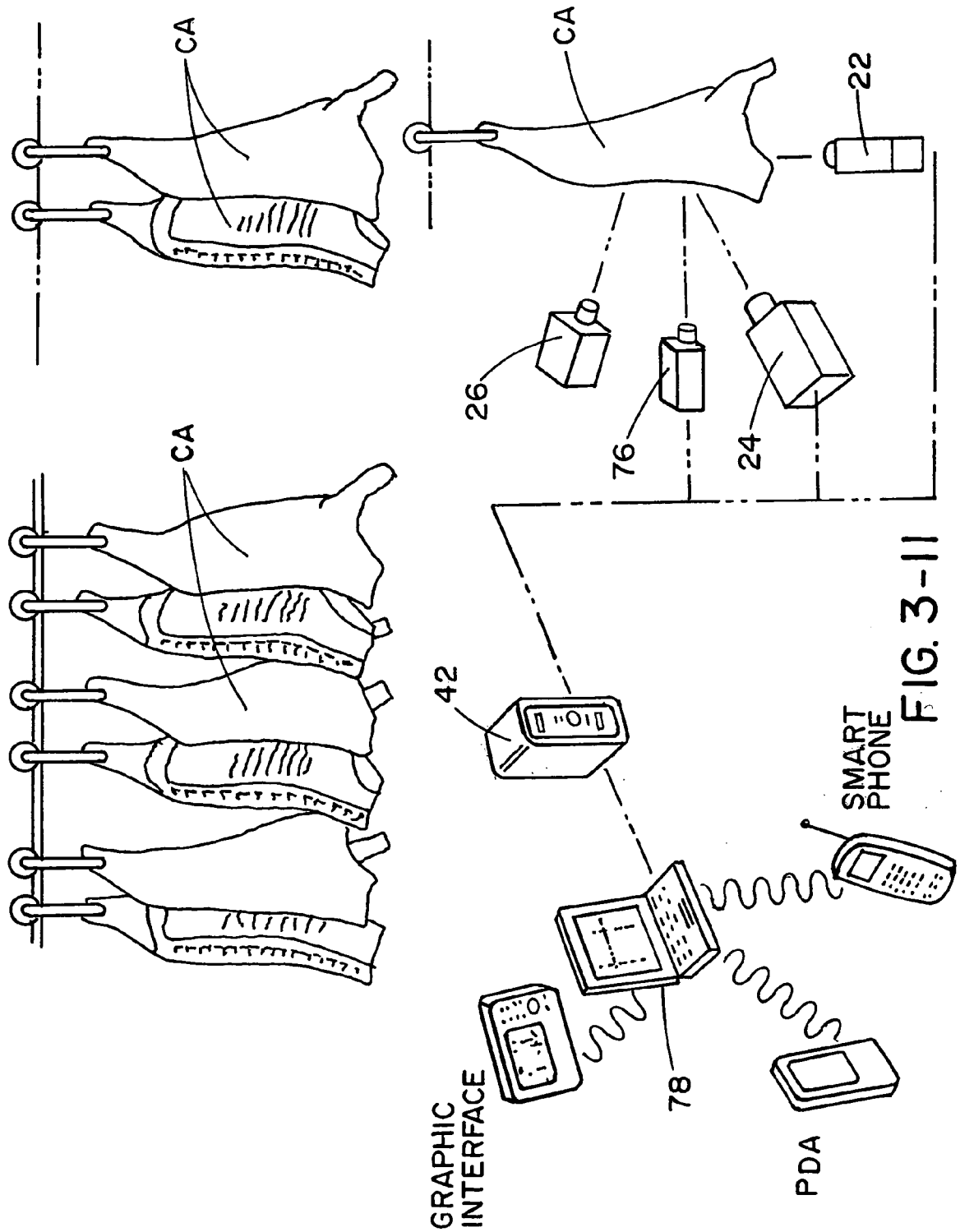
Figures 3, 4, 5, 6, 7, 8, 9, 10, 11, 12:
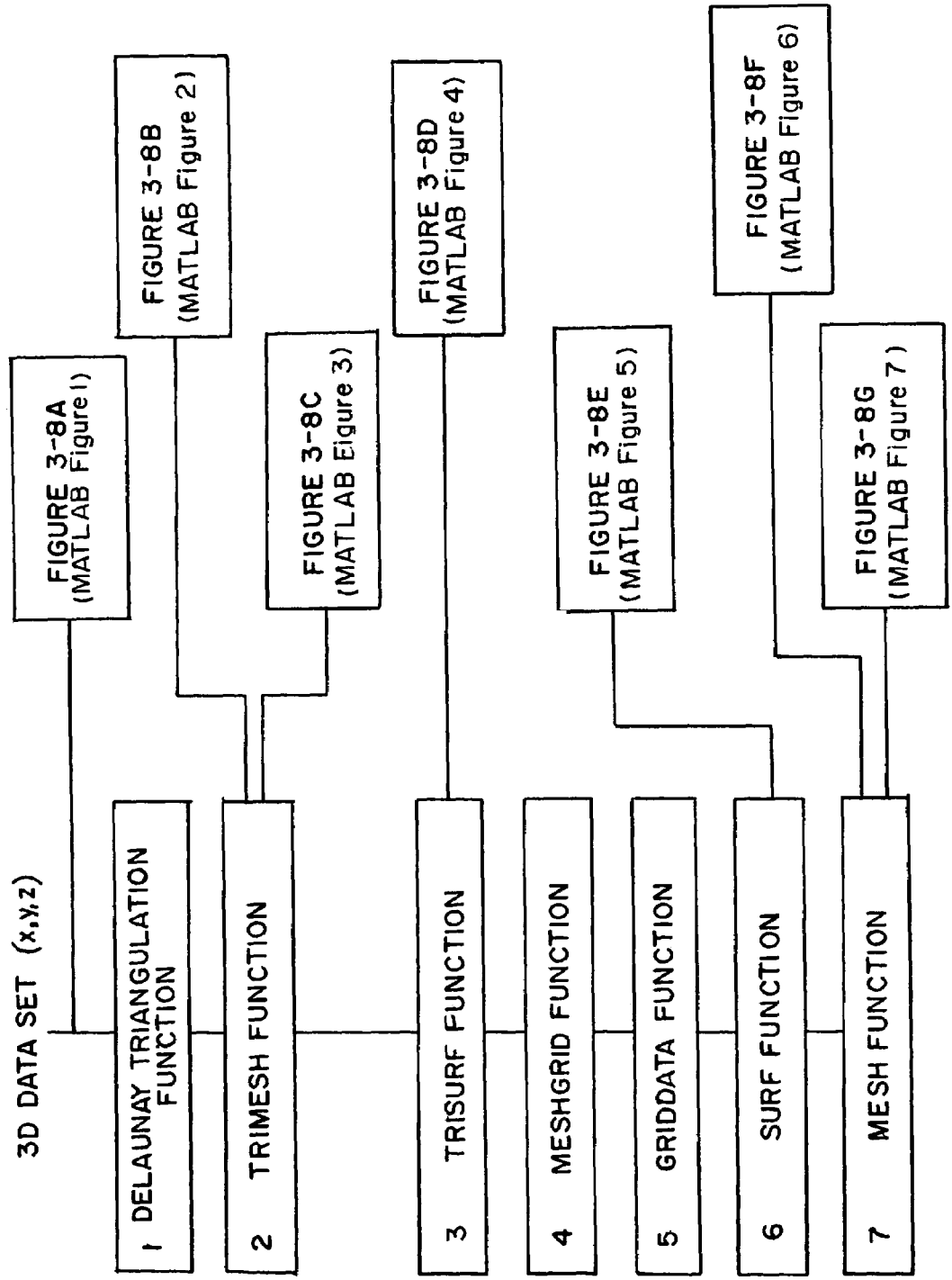
Figures 3, 4, 5, 6, 7, 8, 9, 10, 11, 12, 13:
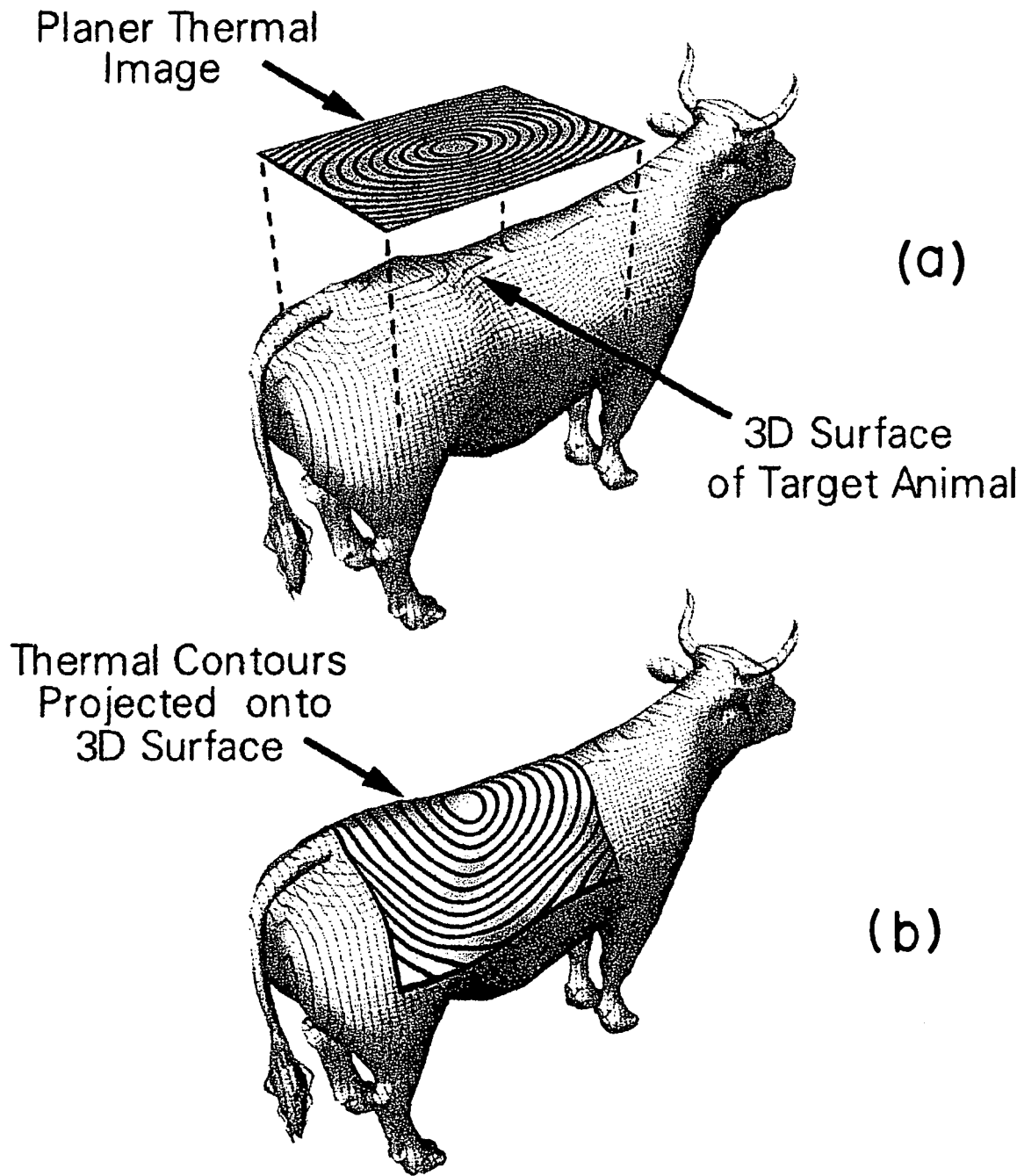
Figures 3, 4, 5, 6, 7, 8, 9, 10, 11, 12, 13, 14:
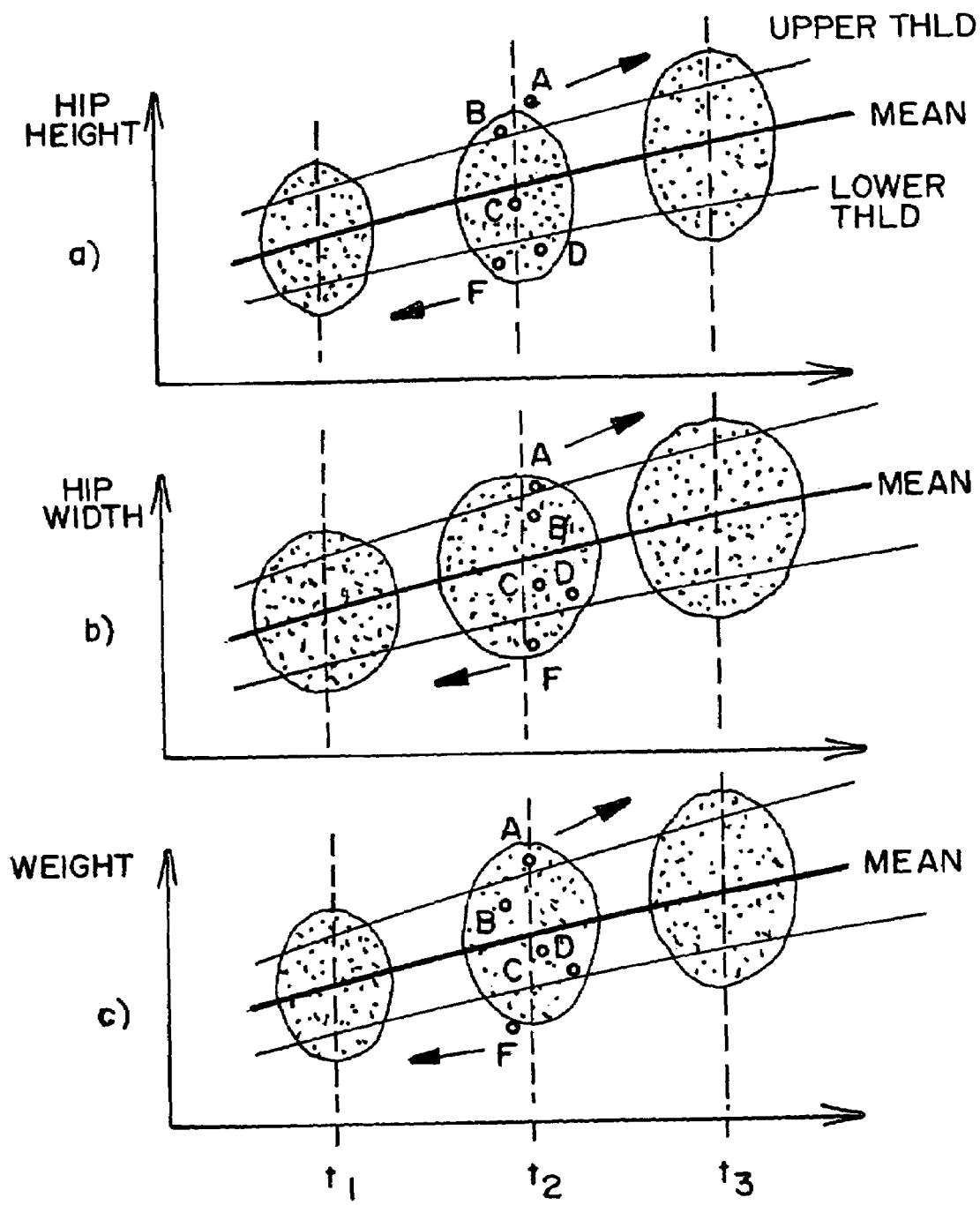
Figures 3, 4, 5, 6, 7, 8, 9, 10, 11, 12, 13, 14, 15, 15A:
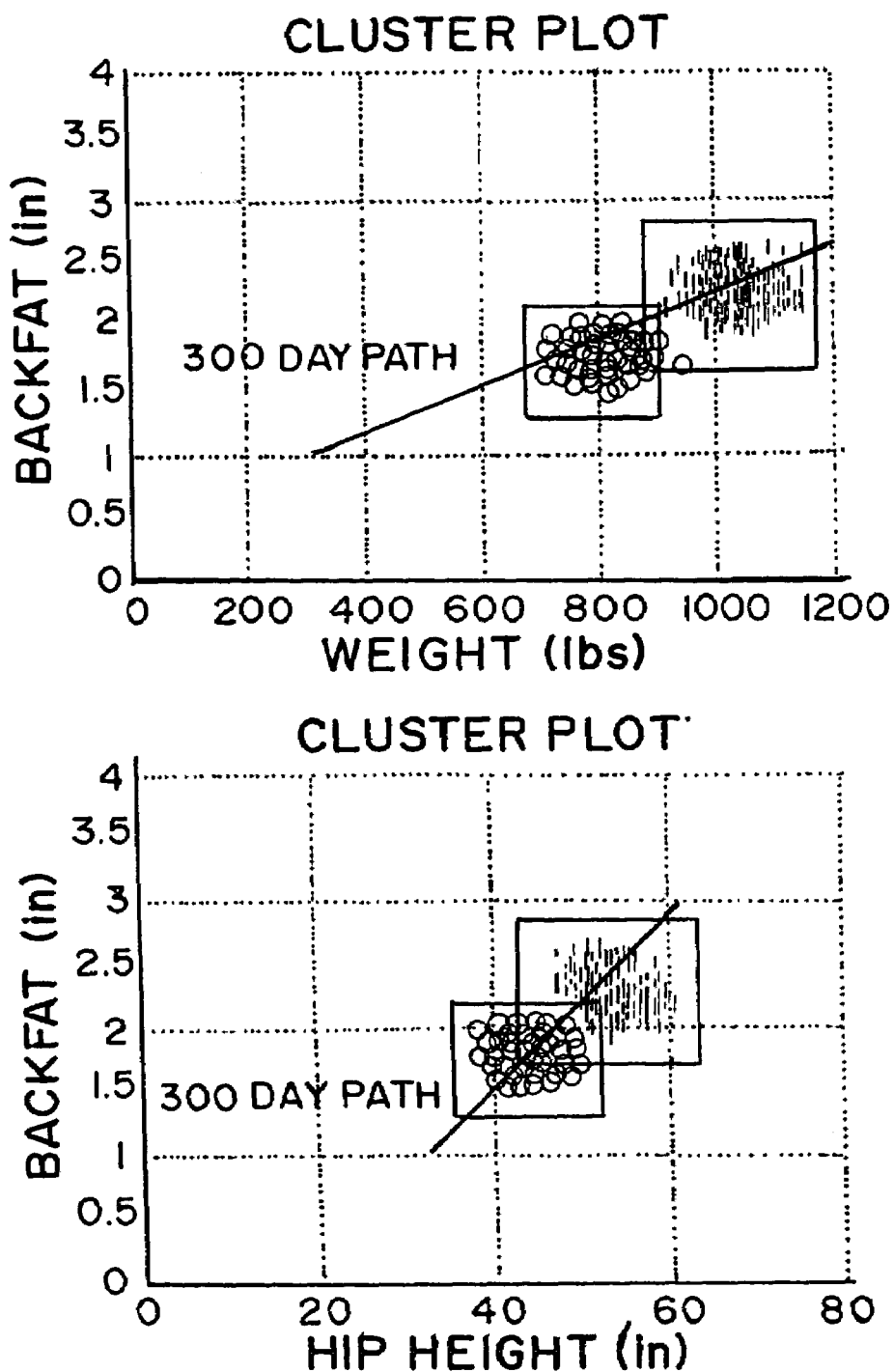
Figures 3, 4, 5, 6, 7, 8, 9, 10, 11, 12, 13, 14, 15, 15B:
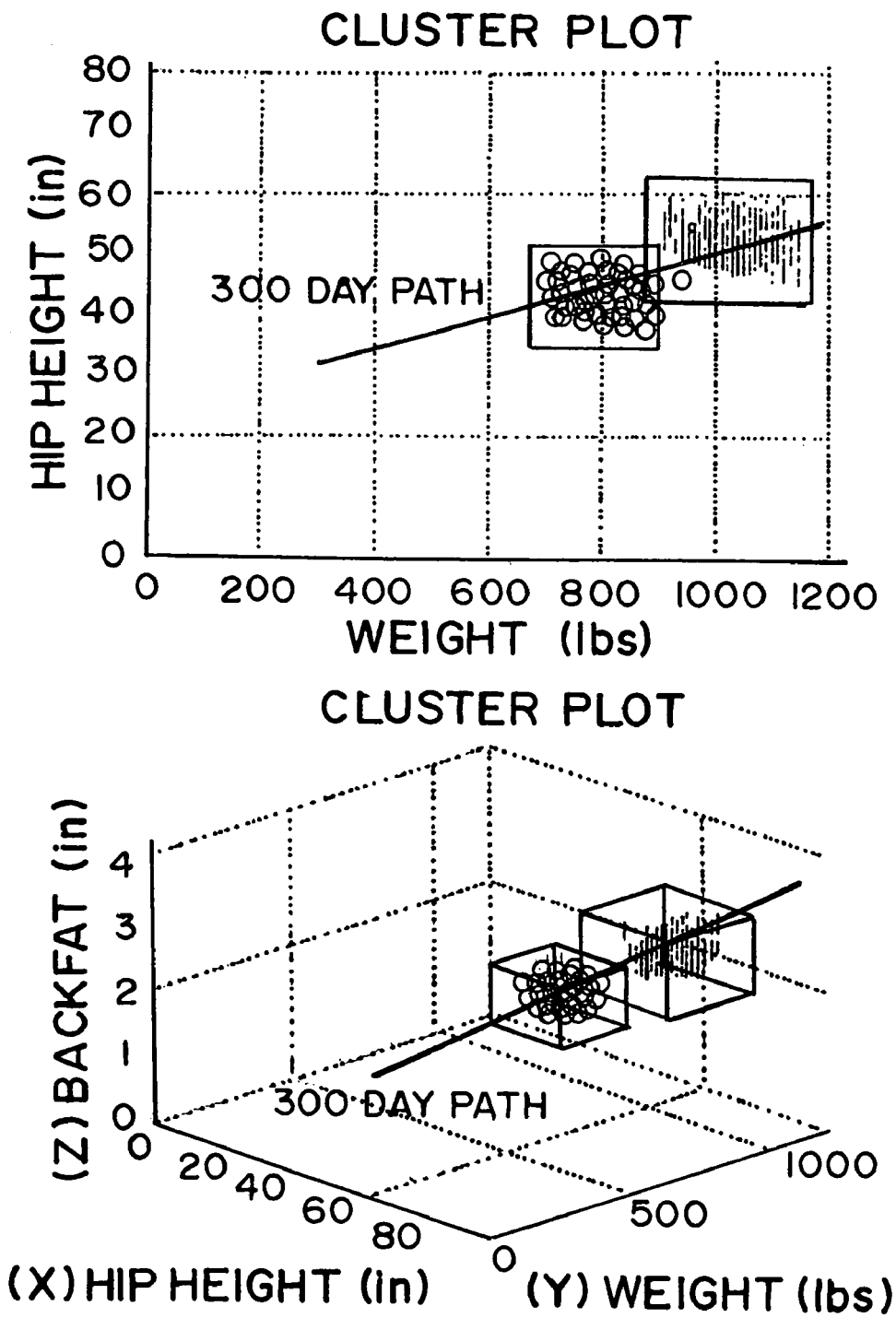
Figures 3, 4, 5, 6, 7, 8, 9, 10, 11, 12, 13, 14, 15, 16, 17:
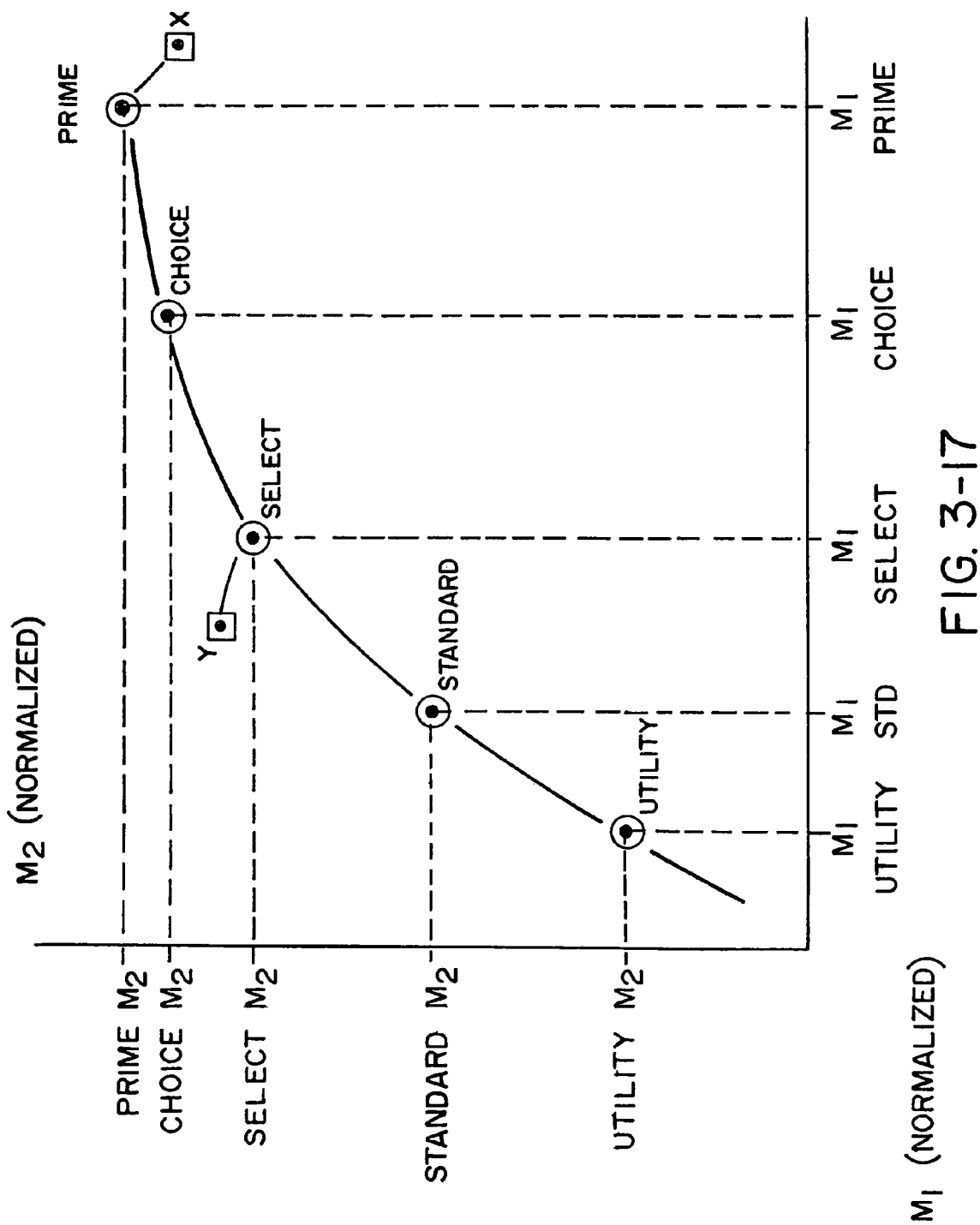
Figures 3, 4, 5, 6, 7, 8, 9, 10, 11, 12, 13, 14, 15, 16, 17, 18, 19, 20, 21:
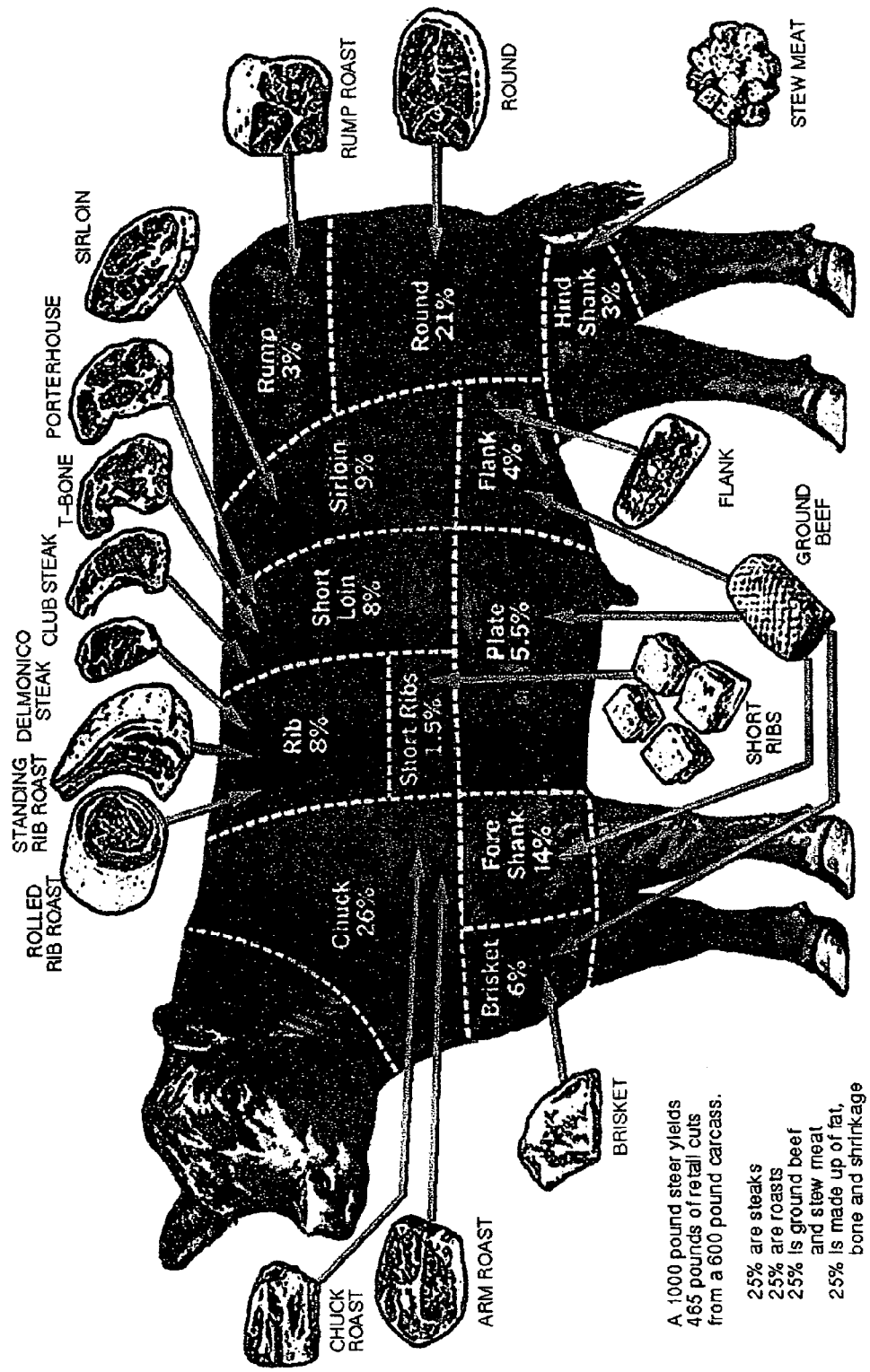
Figures 3, 4, 5, 6, 7, 8, 9, 10, 11, 12, 13, 14, 15, 16, 17, 18, 19, 20, 21, 22, 22A:
Figures 3, 4, 5, 6, 7, 8, 9, 10, 11, 12, 13, 14, 15, 16, 17, 18, 19, 20, 21, 22, 22B:
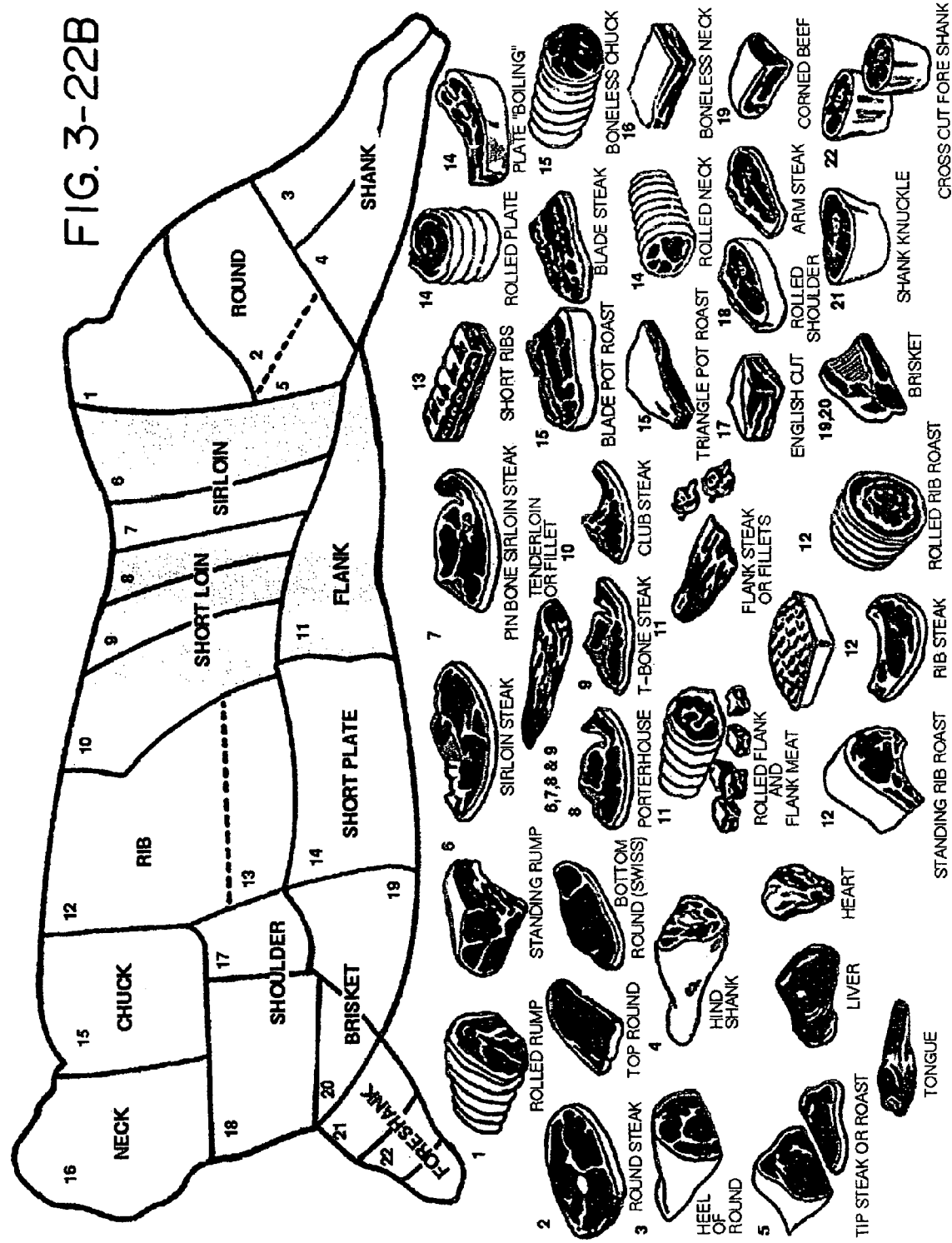
Figures 3, 4, 5, 6, 7, 8, 9, 10, 11, 12, 13, 14, 15, 16, 17, 18, 19, 20, 21, 22, 23:
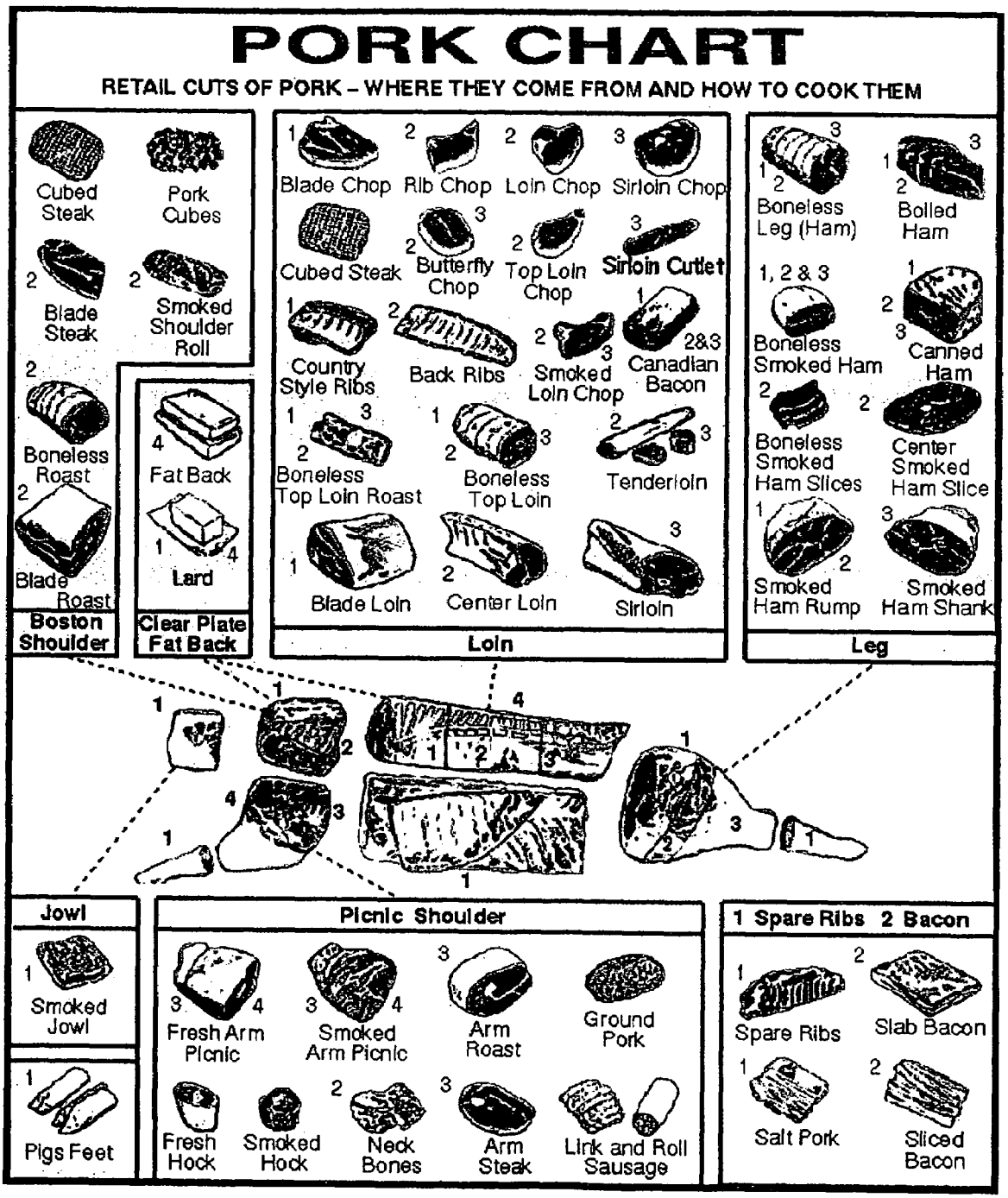
Figures 3, 4, 5, 6, 7, 8, 9, 10, 11, 12, 13, 14, 15, 16, 17, 18, 19, 20, 21, 22, 23, 24:
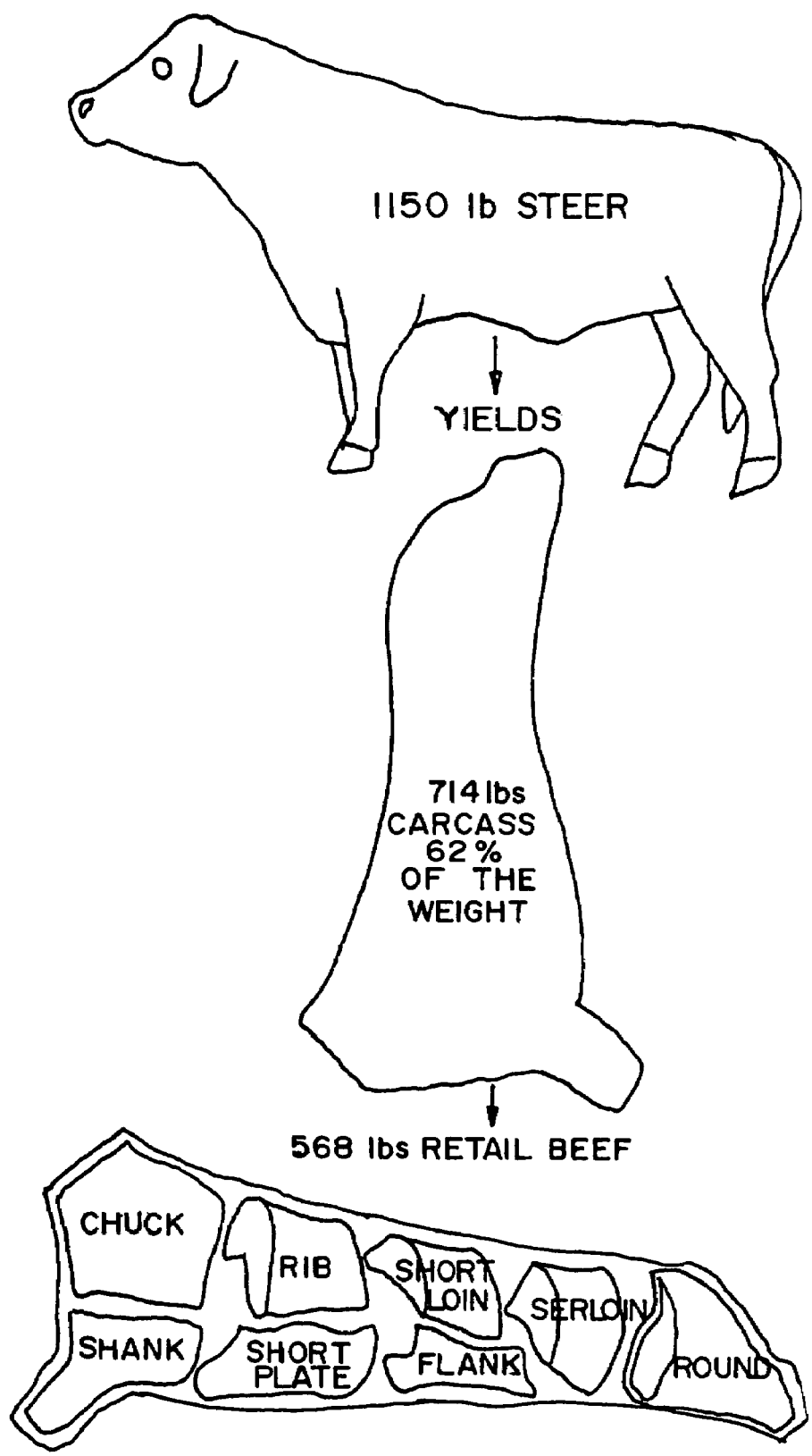
Figures 3, 4, 5, 6, 7, 8, 9, 10, 11, 12, 13, 14, 15, 16, 17, 18, 19, 20, 21, 22, 23, 24, 25:
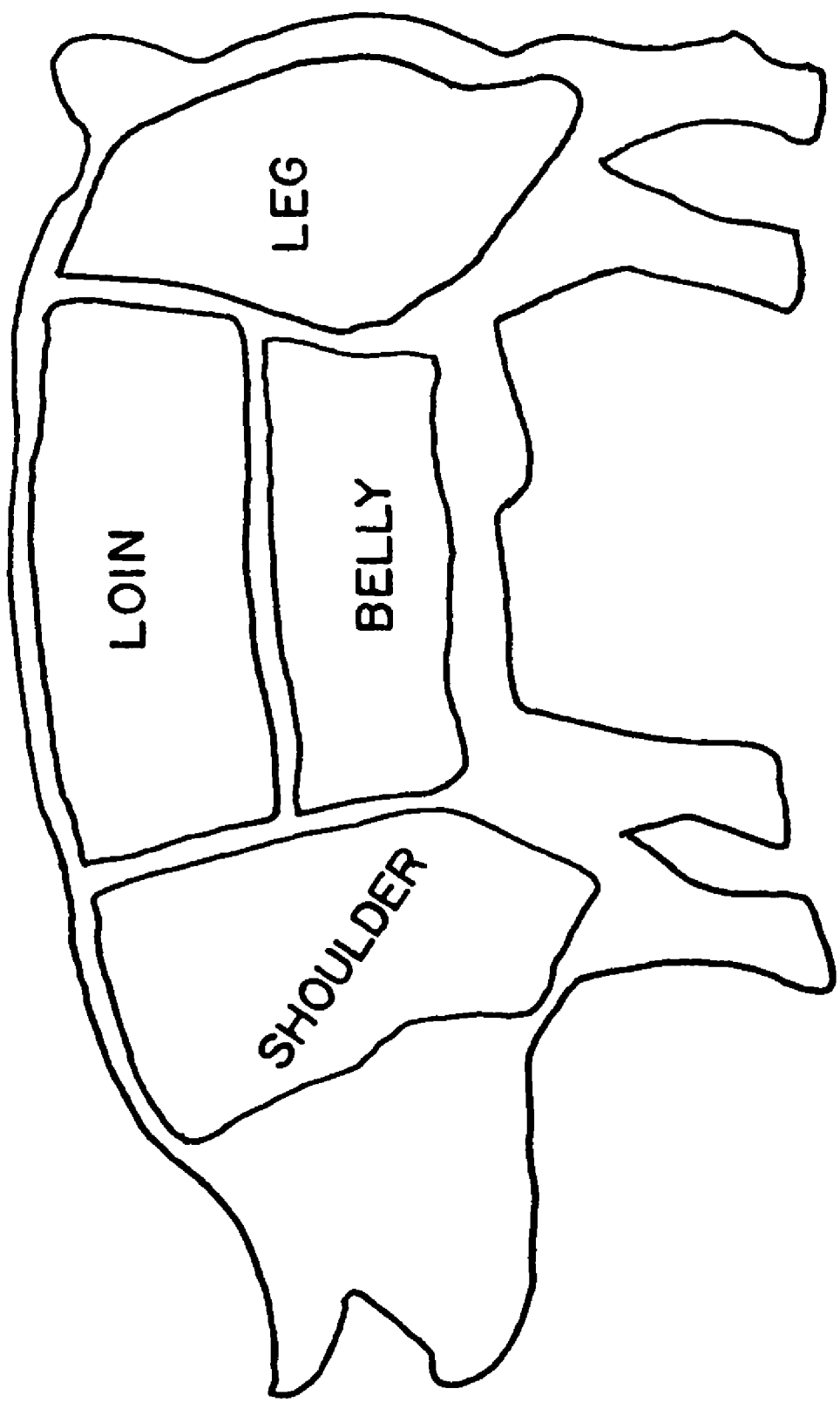

FIG. 3-1B shows an IR camera with coaxial illuminator 30a. FIG. 3-1C shows a discrete illuminator 30b and a camera set with an infrared camera 31a and a visible spectrum camera 27.

Referring once again to FIG. 2-1, it is to be noted that the chute structure 38 directs the target animal "TA" into the correct imaging position within the target zone. The proximity sensors 40 located at the front and rear of the target of zone 14 transmit approximate signals when the animal is in the correct position. As shown in FIG. 2-1, the target zone 14 is formed by a pair of substantially transparent side walls 46 that permit interrogation of the target animal by the range camera system. Ambient light sources 48 mounted on an overhead bar 50 provide ambient illumination to the target zone. If desired, a flash pattern illumination source can also be located close to the visible spectrum camera to avoid parallax errors.

As indicated in FIG. 2-1, the data processing means of the invention for processing image data from the cameras 22, 24, 26, and 28 with which it is operably associated, here comprises a control and processing unit 42. Unit 42 is supported on a table 52 that is preferably located adjacent the animal positioning device 12. Personal computer 44 and an associated monitor 53 are also preferably located on table 52.

FIG. 3-2 shows an alternate form of the equipment layout. This latest embodiment is similar in many respects to that shown in FIG. 2-1 and like numerals are used to designate like components. Here the apparatus includes three range cameras 27 and three IR cameras 28. Target visibility is enhanced from the side views by replacing the normal chute bars with blackened, steel cables 33 in the regions viewed by the cameras. The blackened cables are nearly invisible to the mesh processing algorithm and thermal cameras.

FIG. 3-3 shows another somewhat similar embodiment of the apparatus of the invention wherein like numerals are used to designate like components. This embodiment includes three range cameras and no IR cameras. Once again, target visibility is enhanced from the side views with the blackened, steel cables in the regions viewed by the cameras.

Figure 4:
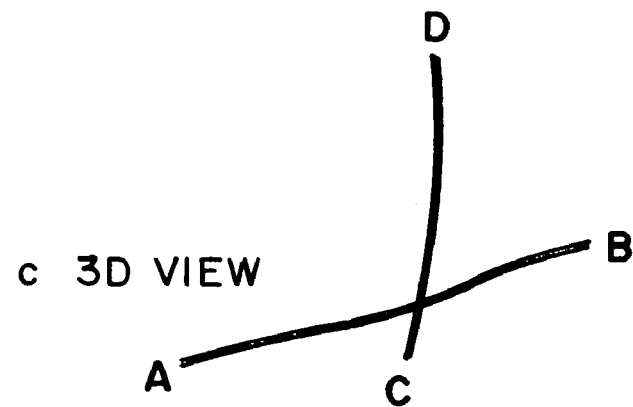

FIG. 3-4 shows two views of a cow within the camera region of the chute. Both top and side views show the use of blackened steel cables 33 to maintain fence integrity with only minimal camera interference.

Figures 2, 3, 4, 5, 5A:
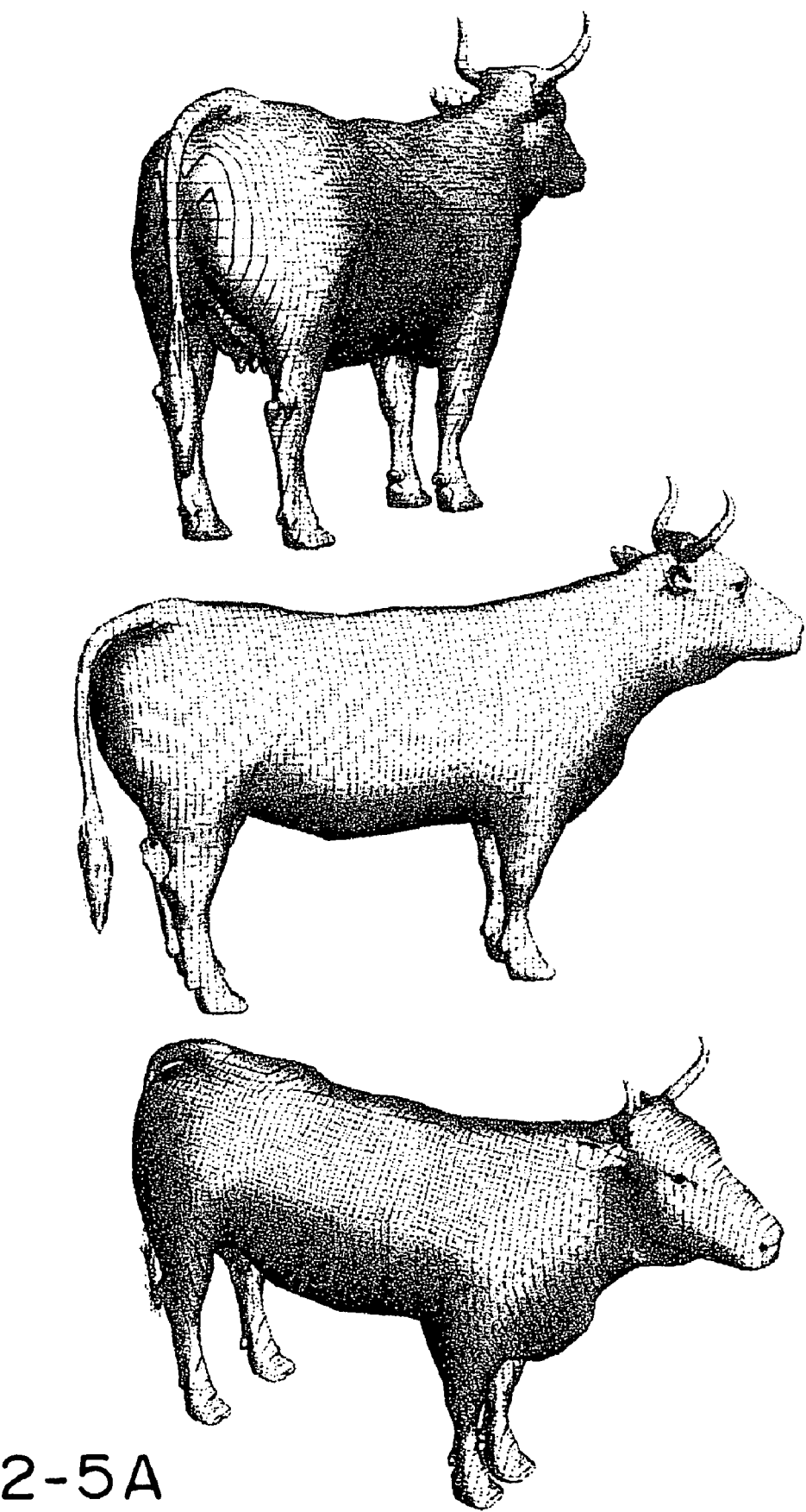
Figures 2, 3, 4, 5, 5B:
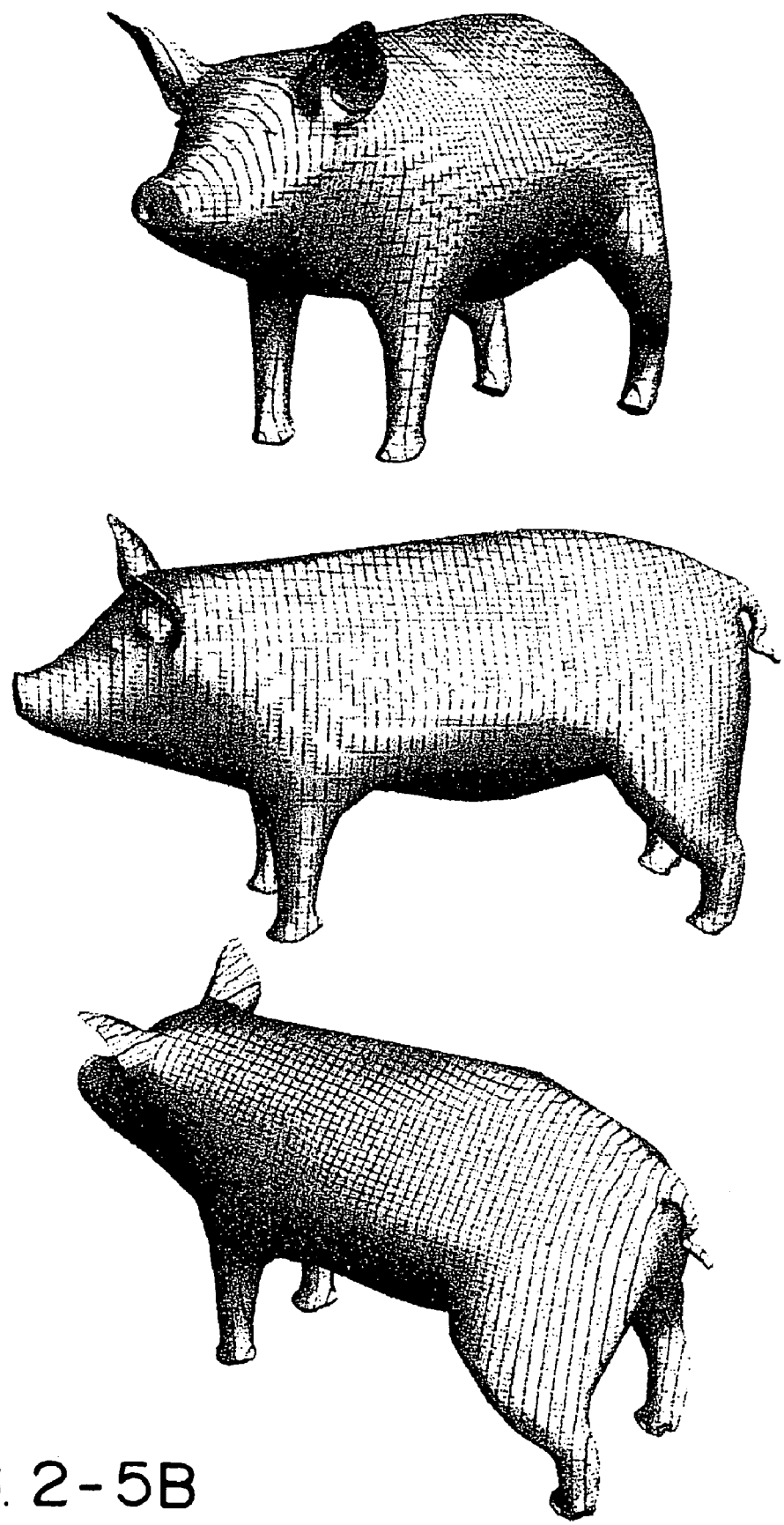
Figures 2, 3, 4, 5, 6, 6A:

FIG. 3-5 shows still another form of the apparatus of the invention wherein two range cameras 27 are positioned with one on one side and one at the top. Such a configuration assumes lateral symmetry as previously discussed herein. A transparent side window is shown in FIG. 3-5 in place of the blackened steel cable.

FIG. 3-6 shows a typical mounting method for the proximity sensors 40. These senor may emit and detect light, infrared energy, or ultrasound. The path from one emitter to a receiver may be placed across the chute in such a manner that the target animal will break the beam when it is in the desired imaging position. The broken proximity beam then triggers the imaging system. Other types of proximity sensors and orientations are well known to those skilled in the art.

FIG. 3-7 schematically represents one embodiment of the interconnections between system components. This embodiment contains three visible spectrum cameras 27 as part of the range camera system, two thermal cameras 28, 4 proximity sensor components 40, a DSP and control unit 42, and an interface for interacting with a central computer, printer, monitor, bluetooth wireless system, internet or other desired peripheral device.

FIG. 3-8 illustrates the interaction of system and peripheral components. Shown here are the graphical interface of the system in addition to a smart phone and PDA. All of these units may communicate with the laptop or descktop computer connected to the present invention. Wired, wireless radio frequency, infrared, or ultrasonic links are all anticipated by this invention.

While the figures of this description have shown primarily animals as the target of the present invention, as previously discussed, carcasses may also be measured with the methods defined herein. For example, FIGS. 3-9 and 3-10 show carcasses hanging on an overhead conveyor line as is typical in meat processing facilities. FIG. 3-11 shows similar carcasses in the environment of the apparatus of the present invention. As illustrated in FIG. 3-11, an individual carcass must be isolated to a degree which permits the accurate imaging of its dimensions. Range cameras and thermal cameras may be used. The same processing, user interface, and peripheral devices will function with the carcass data as with the live animal data.

In accordance with one form of the method of the present invention, the apparatus as shown in FIG. 2-1 and as described in the preceding paragraphs can be used to obtain volumetric, curvilinear and linear measurements of livestock animals, such as cattle and hogs, as well as full carcasses of the animals. As previously discussed, important goals of the invention are to provide significantly improved accuracy over existing animal imaging technology and also to increase the speed of acquiring useful data. By way of example the apparatus of the present invention can be used to provide a true three-dimensional (3D) model or data set of the target animal such as depicted in FIGS. 2-5A and 2-5B. From such 3D models or data sets, highly accurate computation of volumes, curvilinear surface measurements, and linear measurements is possible. As previously discussed, the level of accuracy achieved by the apparatus of the invention is far superior to a simple silhouette or profile data derived in accordance with prior art methods which only provide measurement potential around the outline of the silhouette since no landmarks exist within the, darkened shape. In this regard, when two orthogonal silhouette views are combined to calculate a pseudo-volume, shape concavities cannot be recognized and only gross estimates of volume can be achieved. As will be made clear from the discussion which follows, the level of accuracy possible with a true 3D data set such as achieved by the methods of the present invention is superior to a 2D video data set of a character derived in accordance with prior art methods which share the volumetric limitations of the silhouette data with no ability to account for surface concavities or protuberances. Though the 2D video data derived by the prior art systems does provide the ability to locate landmarks within the 2D silhouette outline, all surface features and measurements are obtained as their corresponding projections onto a flat, 2D surface.

With regard to the determination of the number and location of range cameras required to accurately reproduce the target, various factors must be considered. One of these factors is the complexity of the target surface. In the case of live or carcass animals, such as cattle and hogs, a three camera configuration such as that shown in FIG. 2-9 is acceptable. With this configuration, each range camera obtains a range image of the animal surface within its field of view. As shown in FIGS. 2-1 and 2-9, orthogonal camera orientations may be chosen with camera axes aligned from the right and left sides and the top. Such orthogonal orientations result in the surface seams shown in FIG. 2-9 and previously discussed herein. The orientations shown in FIGS. 2-1 and 2-9 provide sufficient surface accuracy to achieve the desired volume calculations. However, with the camera alignments shown, it is to be noted that seam 36 has no surface overlap. This potential shortcoming may be remedied by aligning side cameras 24 and 26 in the lower positions labeled in FIG. 2-9 as, "alternate camera 1 axis" and "alternate camera 3 axis", respectively. With these alternate alignments, it can be seen that there is more surface overlap along the ventral surface of the animals while maintaining sufficient overlap in the two upper seams. Since, in accordance with the method of the invention, the entire surface of the animal is recorded, this range camera configuration permits very accurate volumetric measurements as well as curvilinear and linear measurements.

In accordance with an alternate form of the method of the apparatus, it is possible to rely upon the lateral symmetry of the animal and still obtain a reasonably accurate measurement of volumes. For example, FIG. 2-10a) shows a 2-camera configuration in which a single side camera 52 obtains a range image that is mathematically duplicated and reversed to represent the range image of the opposite side. The top camera 54, of this alternate apparatus, is essential to accurately measure the position of the median or midsagittal plane about which the two side images are aligned. This concept is reasonably sound when the target animal is substantially symmetrical and properly physically positioned in the center of the chute region.

As depicted in FIG. 2-10a), the top camera 54 may theoretically be replaced by a mechanical method which locates the median plane. By way of example, this mechanical method may comprise a saddle-like device 56 having a dorsal plane that can be lowered into engagement with the back of the animal. With such a construction, the saddle shape will align the dorsal plane with the median plane of the animal. The side range camera can measure the orientation of the dorsal plane and in turn compute the axis of symmetry corresponding to the median plane.

In accordance with one form of the method of the invention, various timing options for the range cameras can be employed. By way of example, a basic camera timing diagram, such as that shown in FIG. 2-13 can be used. As indicated in FIG. 2-13, a trigger pulse (top trace) is provided to a given camera. After a brief shutter delay, the shutter is opened for a period of time during which the image is acquired (center trace). At an appropriate moment during the acquisition time the flash is fired projecting the structured light pattern on the surface of the target (bottom trace of FIG. 2-13). FIG. 2-13 shows a timing diagram with simultaneous shutter opening and staggered flashes. This particular approach is useful during system setup to identify regions of the target surface where the range images overlap. The lower right-hand portion of FIG. 2-13 illustrates a timing solution to the crosstalk concerns. In this timing diagram both the shutter and flash periods are staggered such that the acquisition time for a given camera can only be illuminated by its own flash unit. The lower right-hand portion of FIG. 2-13 illustrates timing diagrams with staggered shutters and staggered flash.

It is to be understood that numerous structured light configurations are possible for the range cameras used in the accomplishment of the method of the invention. Perhaps the simplest is a lens projection system which projects the desired pattern onto the target.

Modulated laser systems which rapidly scan the target are also possible, though complex scanning alignments and intensity modulation can result in a relatively, high priced system. The projected pattern may be a grid, a series of dots, bars, or other custom shapes. In practice, the particular pattern is selected to match the range camera technology.

Referring once again to FIG. 2-14, an alternate form of the apparatus of the invention is their illustrated. This alternate form of the apparatus is similar to that shown in FIG. 2-1, but video cameras, rather than the digital cameras, previously described, are used as the range camera inputs. In accomplishing the method of the invention using this alternate form of apparatus, the target animal enters the chute area from the right and proceeds into the central region where video cameras 58, 60 and 62 are positioned. Proximity switches 64 positioned on either side of the target zone indicate electronically when the animal is in the correct position. Video cameras 58 and 60, each having appropriate illumination means such as illuminators 61, obtain side views of the target animal. Similarly, top camera 62 obtains a top view of the target animal. An infrared (IR) camera 66 is positioned above the hindquarters of the animal to obtain a thermal image of the animal's back in order to provide an indication of backfat. FIG. 2-15 shows a typical camera layout for a three video camera apparatus of the character shown in FIG. 2-14. The range image data is referenced to a horizontal plane through the center of the target animal and the IR camera 66 is positioned in line with the top camera 62.

Upon acquiring the appropriate images, these images are downloaded to the processing unit 70 that is located near the chute area 72. The processing unit in turn passes the data to a personal computer 74 for display and storage of the data. While the control and processing unit and the personal computer are here shown alongside the chute, it is to be understood that these components may be located a significant distance from the chute area provided that transmission speed and accuracy are not compromised.

In the manner described in greater detail hereinafter, the data obtained from the videocameras 58, 60 and 62 must be appropriately processed to obtain the range images and then undergo further processing to form the complete 3D model. Once in the form of a 3D model the data may be interrogated to obtain many useful measurements.

The processing channel from the video cameras 58, 60 and 62 to measurement tables and display is depicted in FIG. 2-19. In this figure, the target animal is illuminated with structured illumination and images are obtained from three strategic camera positions. Each of the figure images are processed by the range image algorithm to obtain a three-dimensional point cloud set. It is to be understood that the digital images obtained from the previously identified range cameras 26, 28, and 30 can similarly be processed by the range image algorithm to obtain a three dimensional point cloud set.

Referring once again to FIG. 3-5, still another form of the apparatus of the invention is there illustrated. This alternate form of the apparatus is similar to the earlier described embodiments and like numerals are used in FIG. 3-5 to identify like components. In the embodiment of FIG. 3-5 the invention, only two cameras, rather than the three cameras, previously described are used. In accomplishing the method of the invention using this latest form of apparatus, the target animal once again enters the chute area from the right and proceeds into the central region where cameras 27 are positioned. Cameras 27, each having appropriate illumination means, shown here as illuminators 61 to illuminate the target area, obtain top and side views of the target animal.

Upon acquiring the appropriate images, these images are downloaded to the processing unit 42 that is located near the chute area. The processing unit in turn passes the data to a personal computer 44 for processing of the data in a manner presently to be described.

3.3. 3D Data Acquisition and Processing

Data Acquisition

The image data obtained from the various range cameras must be converted to range image data. One embodiment of this invention uses the visible spectrum cameras in a manner consistent with the previously discussed depth-from-defocus (DFD) technologies.

Depth-from-defocus (DFD) methods provide key characteristics which make DFD a good fit for the present invention. DFD requires only a single camera per view and also requires a low quantity of images to obtain depth information. Additionally, DFD provides a reasonably stable surface in the event of localized surface obstructions. The low number of required images and the single camera features enable near simultaneous data acquisition to minimize the effect of target motion on measurement accuracy. In general, the fewer the number of images, the shorter the acquisition and processing times.

The 3D data obtained via DFD methods must be processed to obtain the range images. These data then undergo further processing to form the complete 3D model. Once in the form of a 3D model the data may be interrogated to obtain the desired measurements.

Mesh Processing

FIGS. 2-19 and 3-12 show flow charts of a custom processing algorithm which converts the 3D data from the range camera into mesh data aligned on a rectangular grid. The 3D data from the range camera may be non-uniformly spaced and not necessarily on a rectangular grid or axis. Data in such a format is difficult to process, merge with other surfaces, or analyze for measurement purposes. The processing algorithm of FIGS. 2-19 and 3-12 interpolates the incoherent 3D data from the range camera into uniformly sampled data on a common rectangular grid. The later data may be easily processed to merge surfaces or obtain physical measurements.

The 3D data set shown in FIG. 2-20A resulted from a manually produced contour diagram of the surface (skin) of a pig. Points on each contour curve were interactively selected via computer mouse and assigned appropriate contour elevations. Nearly 600 data points were defined in this manner.

Block 1 of FIG. 3-12 implements the Delaunay triangulation function of the MATLAB script program (version 5.3), which program is readily obtainable from The Math Works, Inc. company. This function projects the 3D data set onto the x-y plane and generates triangles in such a way that no data point is contained within any triangle's circumcircle. The circumcircle of a triangle is that unique circle which passes through all three vertices. The formulation of Delaunay triangles is a key step in the transformation of a surface sampled at non-uniform intervals and non-rectangular coordinates to an accurately interpolated surface which is uniformly sampled on a rectangular grid.

This Delaunay function requires x and y coordinate inputs for each data point having coordinates, (x1, y1, z1). It returns an M-by-3 matrix, TRI, which contains one Delaunay triangle per row, with the vertices designated by indices into vectors x1 and y1 where M is the length of arrays x1 and y1. DELAUNAY begins by removing any duplicate points. Next, it adds random perturbations, 'fuzz', to the mantissa (x value) in order to enhance the Delaunay algorithm performance and avoid degeneracy for collinear data. The magnitude of the random perturbations is negligible for most data spacing. The data is then offset such that it is centered around zero. At this point a core Delaunay algorithm, written by Steve J. Fortune, AT&T Bell Laboratories, (reference: Steve J. Fortune, "A Sweepline Algorithm for Voronoi Diagrams," Algorithmica 2, 153-174, 1987) is applied. The resulting matrix, TRI, contains the Delaunay triangles as previously described. One final check is made to remove any triangles with zero area from the list.

Block 2 applies the TRIMESH function to the data resulting from Delaunay triangulation. The result is a graphical display of the Delaunay triangles in three dimensions. The color of the triangle edges is mapped according to the magnitude of the z1 value. TRIMESH requires inputs of TRI, x1, y1, and z1. TRI contains the triangles as indices into x1, y1 and z1. The output is the graph of Delaunay triangles contained in matrix, TRI, as described. Previously identified FIG. 2-20B (MATLAB FIG. 2) shows a top view of these triangles. Previously identified FIG. 2-20C (MATLAB FIG. 3) shows a 3D view of the same triangles.

Block 3 is the application of the TRISURF function which displays the Delaunay triangles of TRI as surfaces. TRISURF requires inputs of TRI, x1, y1, and z1. The output of TRISURF is a graph in which each triangle of TRI is displayed in three dimensions with its color assigned according to its average z1 value and the colormap associated with z1. Previously identified FIG. 2-20D (MATLAB FIG. 4) shows the output of TRISURF with the Delaunay triangles as surfaces.

Block 4 applies the MESHGRID function to the data x1 and y1. This function transforms the domains specified by vectors x1 and y1 into arrays x1 and y1. The latter arrays, uniformly spaced and sampled, will be used for the interpolation of z-values via GRIDDATA.

Block 5 represents the application of the GRIDDATA function with x1, y1 and z1 as non-uniformly spaced inputs and xi, yi as uniformly spaced inputs. GRIDDATA generates the uniformly spaced output, zi. This function fits a surface of the form, zi=f (xi, yi). GRIDDATA interpolated the surface to go exactly through the surface at points xi, yi, and zi, where xi and yi are uniformly spaced as generated by MESHGRID.

Block 6 plots the colored parametric surface defined by the three input variable, xi, yi and zi. The colormap, when used in this manner, is identically the zi variable. The color is proportional to the height of zi. Previously identified FIG. 2-20E (MATLAB FIG. 5) shows the surface plot with flat shading.

Block 7 plots the colored parametric mesh defined by the three input variable, xi, yi and zi. The colormap, when used in this manner, is identically the zi variable. The color is proportional to the height of zi. Previously identified FIG. 2-20F (MATLAB FIG. 6) shows the surface plot with flat shading and rectangular mesh.

Figures 2, 3, 4, 5, 6, 7:
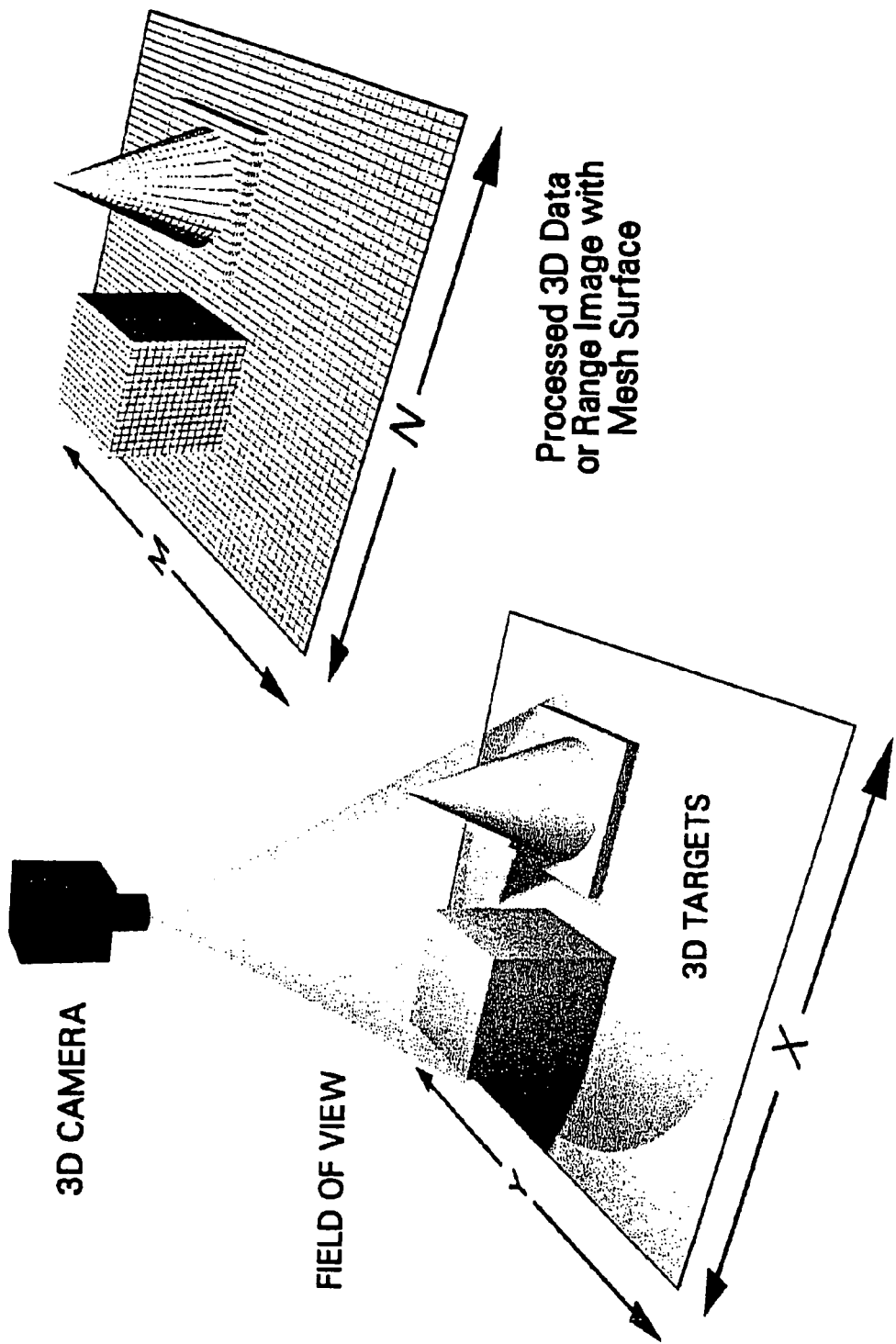
Figures 2, 3, 4, 5, 6, 7, 8, 9:
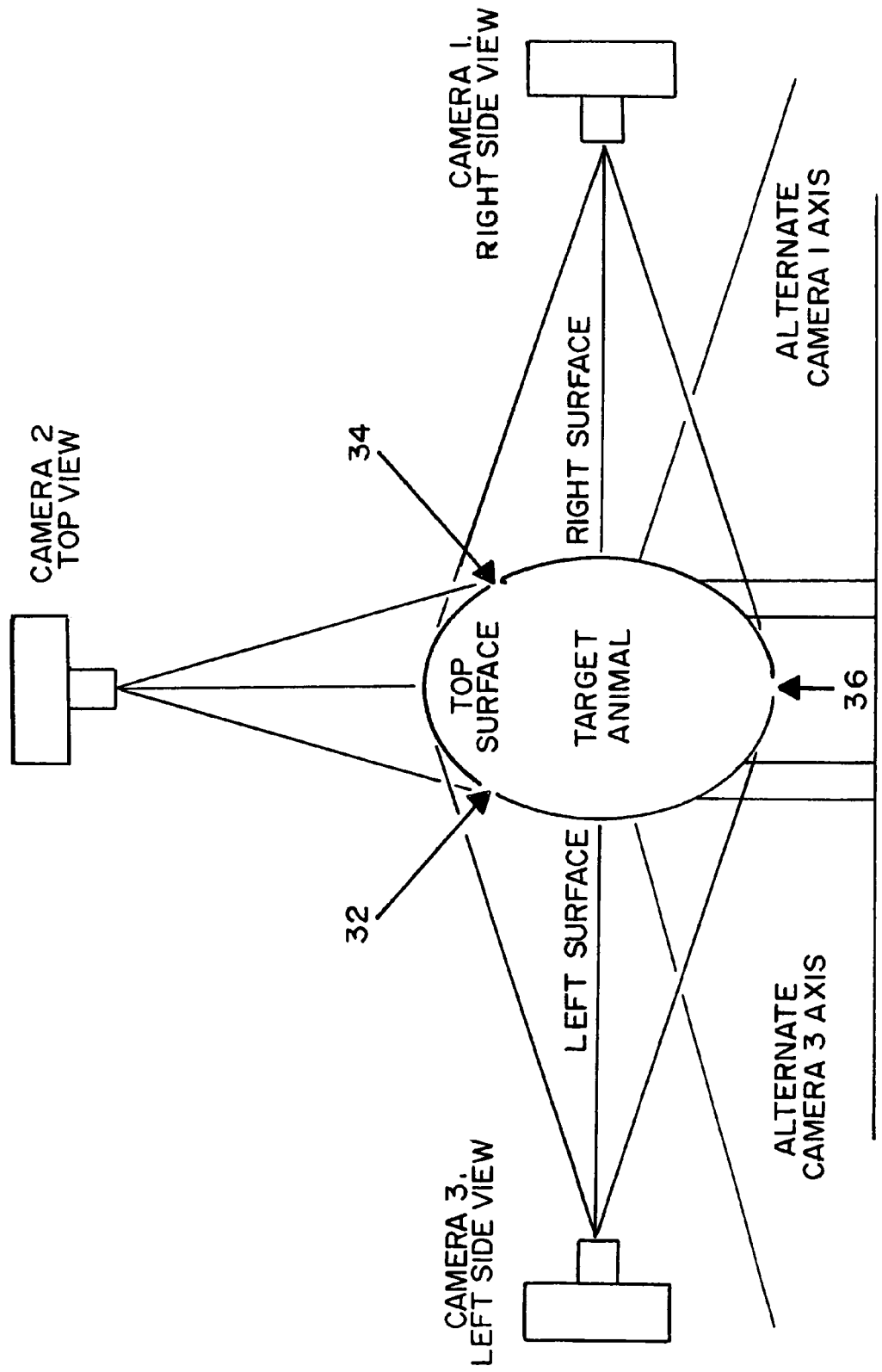
Figures 2, 3, 4, 5, 6, 7, 8, 9, 10, 10A:
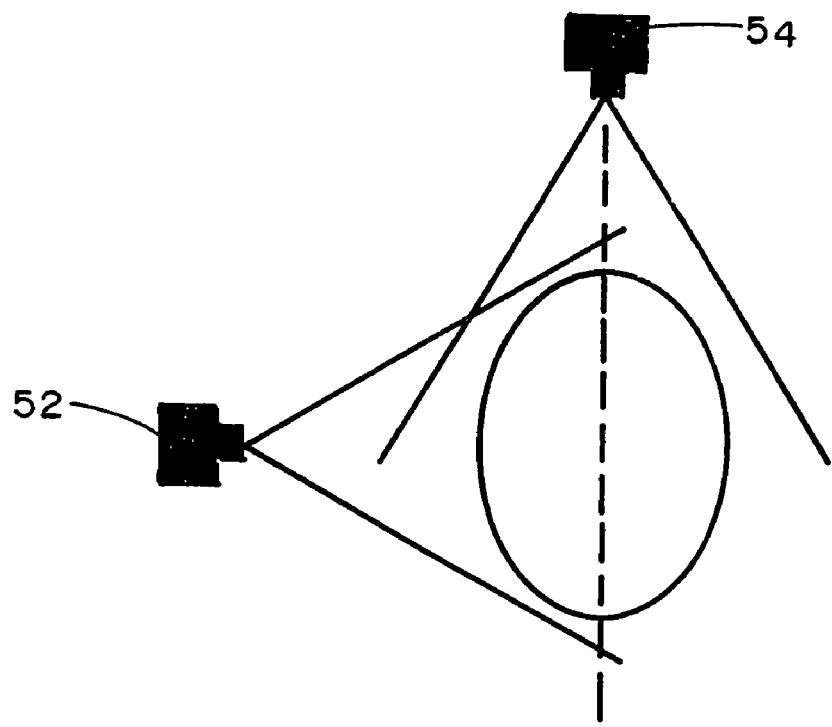
Figures 2, 3, 4, 5, 6, 7, 8, 9, 10, 10B:
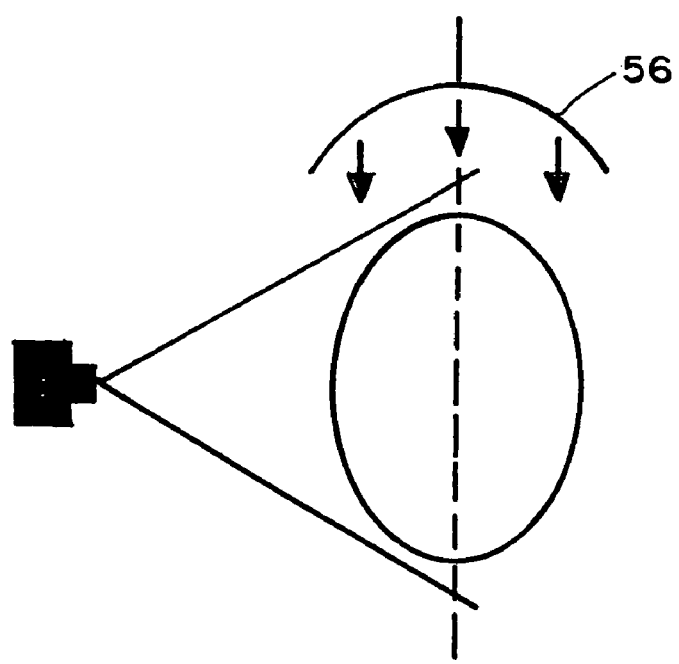
Figures 2, 3, 4, 5, 6, 7, 8, 9, 10, 11, 12, 12A:
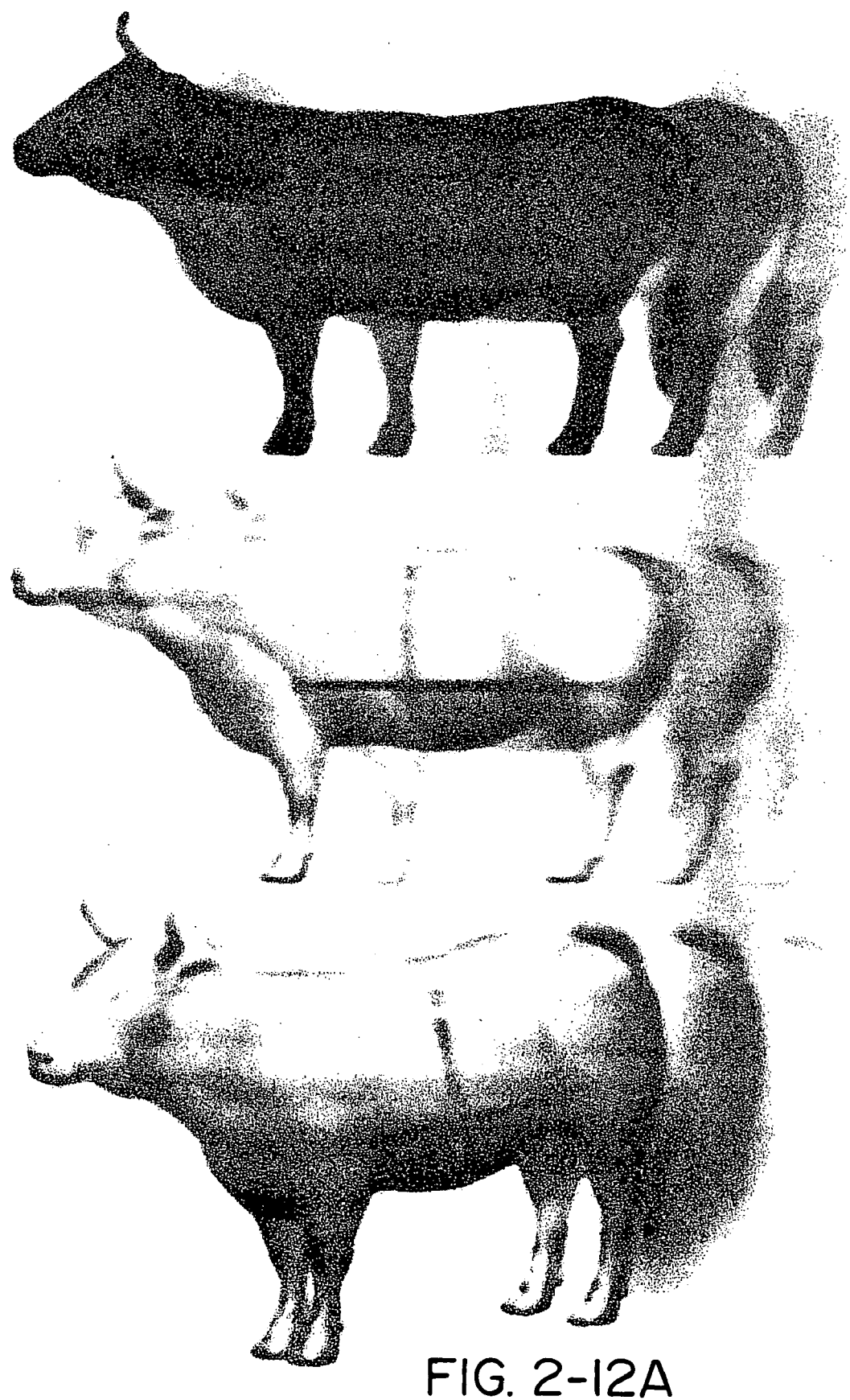
Figures 2, 3, 4, 5, 6, 7, 8, 9, 10, 11, 12, 12B:
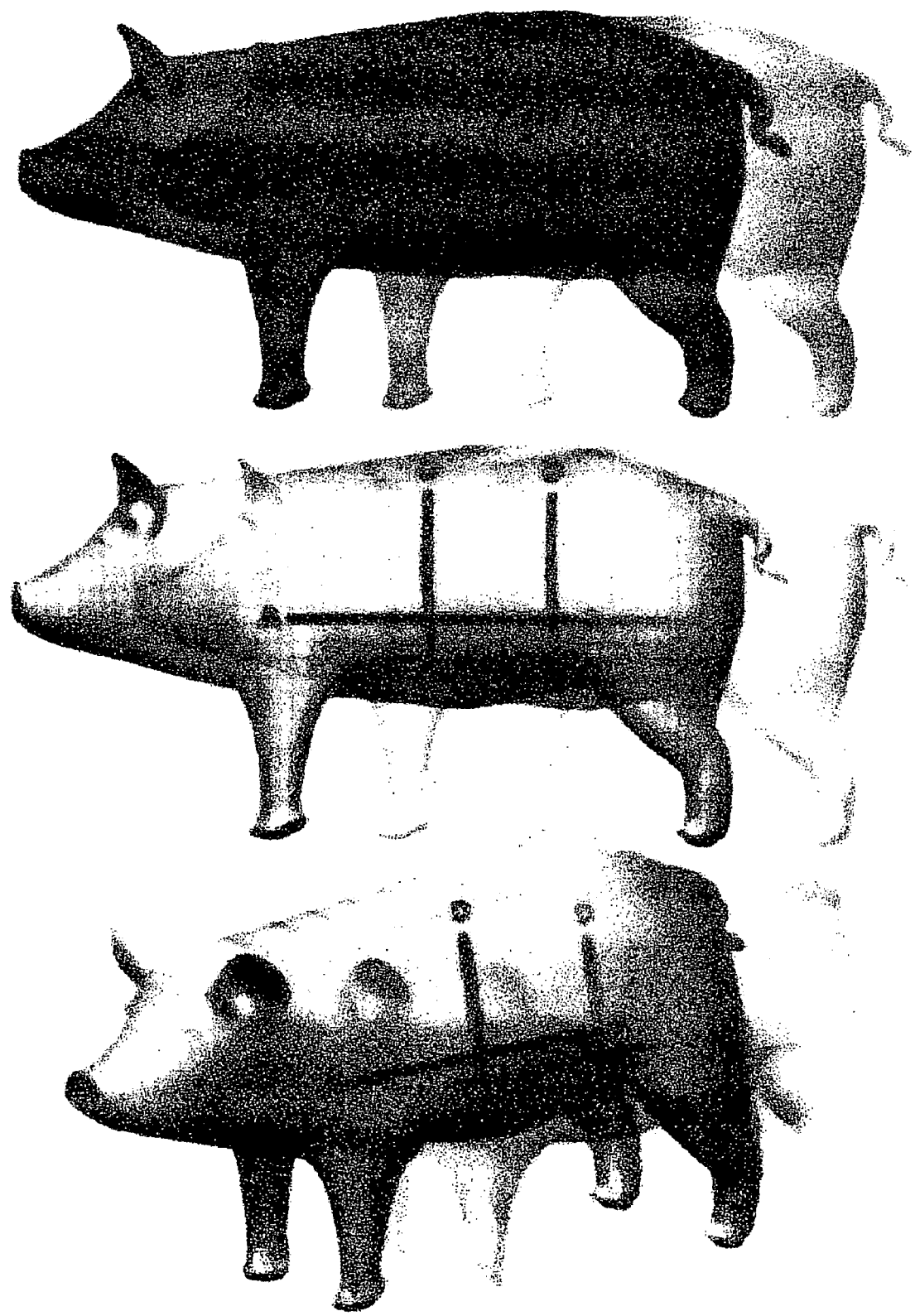
Figures 2, 3, 4, 5, 6, 7, 8, 9, 10, 11, 12, 13:
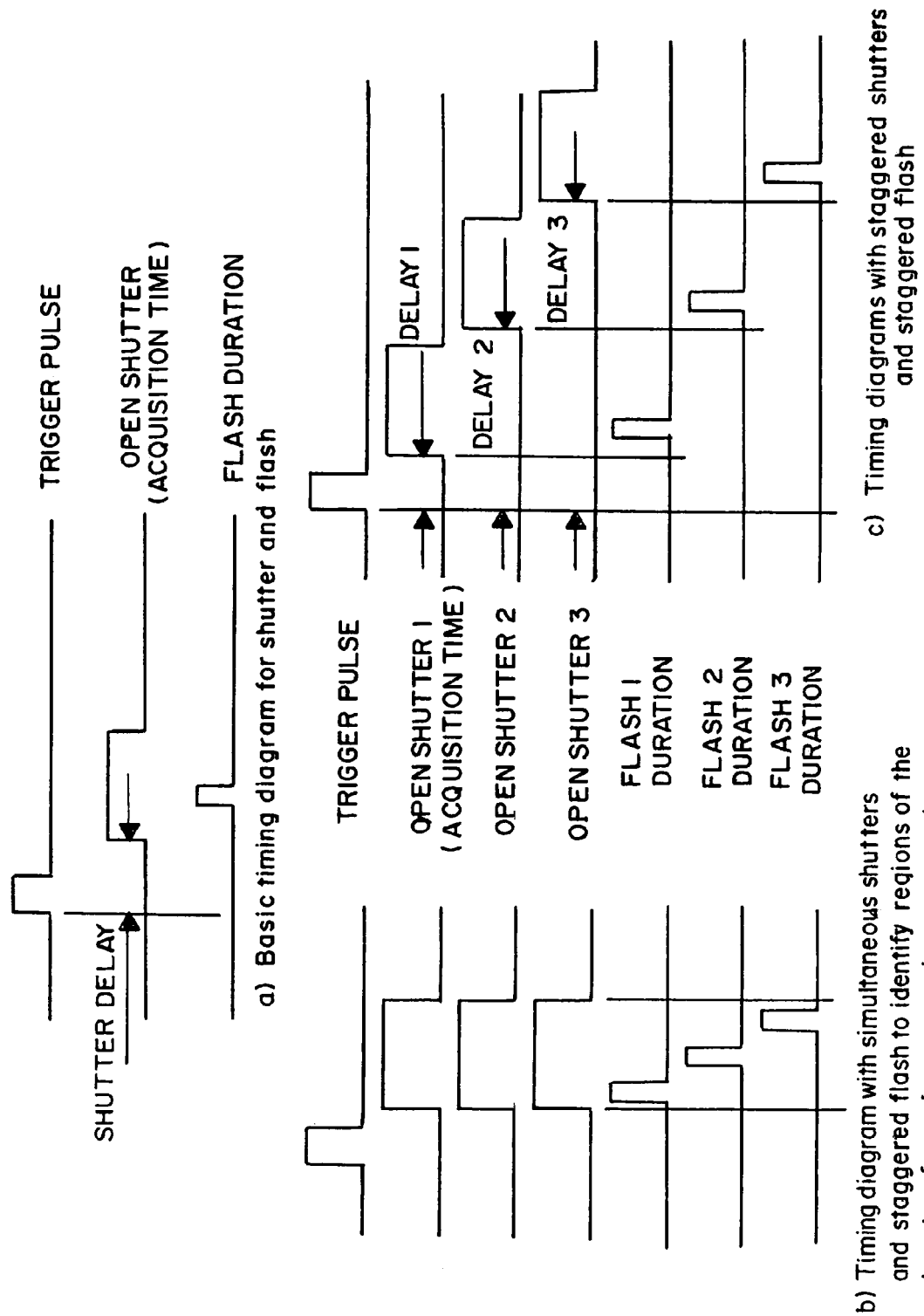
Figures 2, 3, 4, 5, 6, 7, 8, 9, 10, 11, 12, 13, 14:
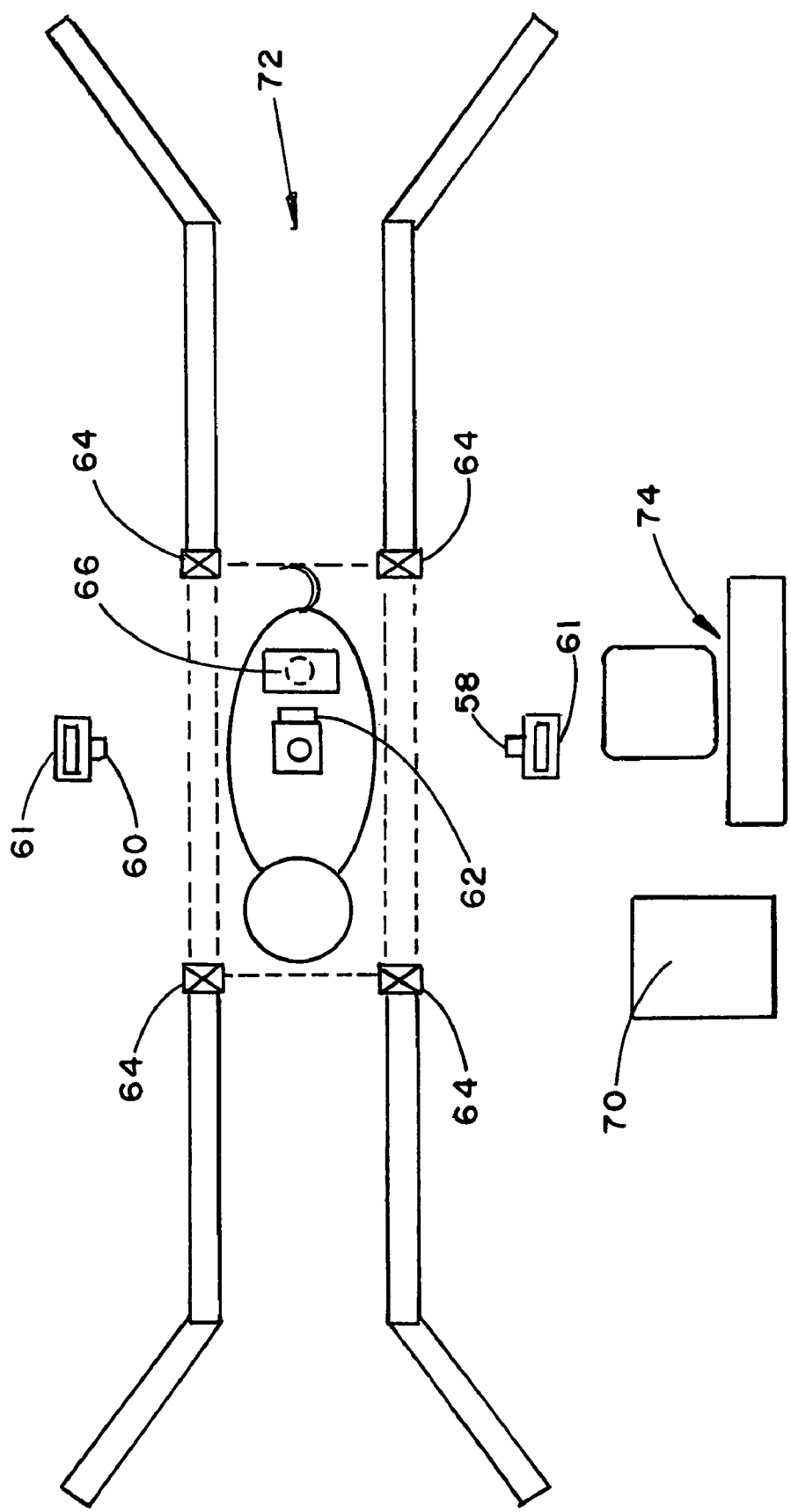
Figures 2, 3, 4, 5, 6, 7, 8, 9, 10, 11, 12, 13, 14, 15:
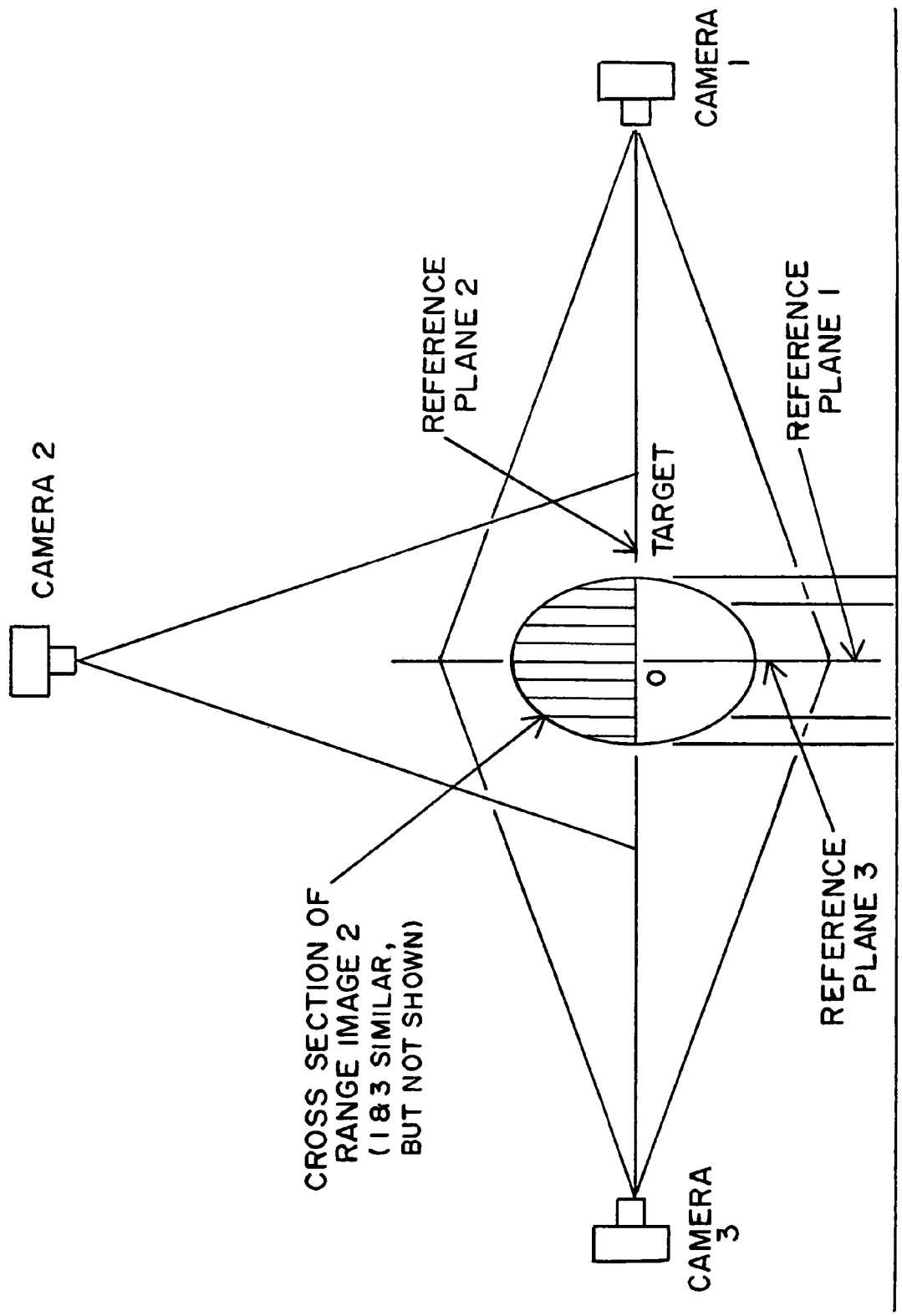
Figures 2, 3, 4, 5, 6, 7, 8, 9, 10, 11, 12, 13, 14, 15, 16:
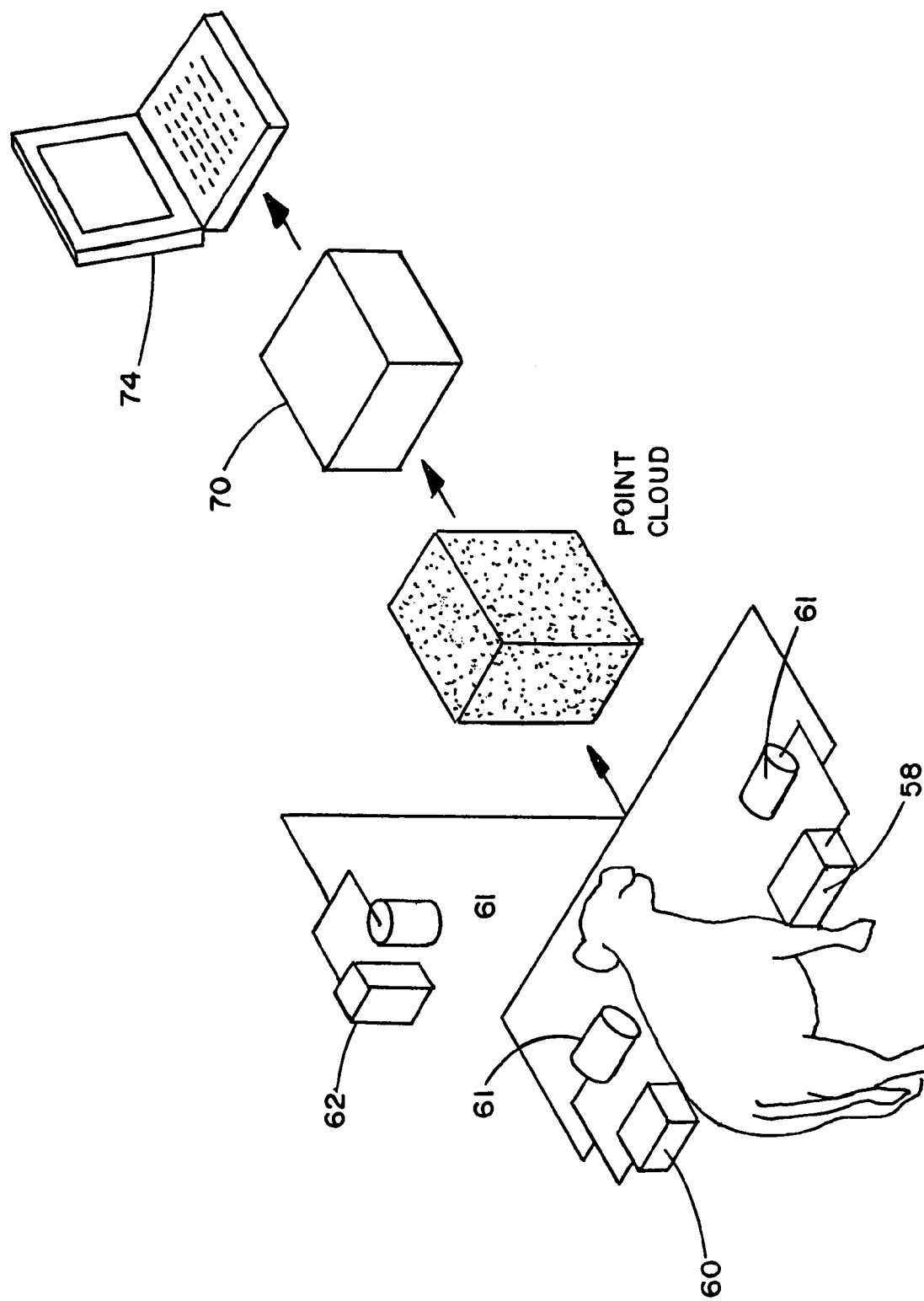
Figures 2, 3, 4, 5, 6, 7, 8, 9, 10, 11, 12, 13, 14, 15, 16, 17, 17A:
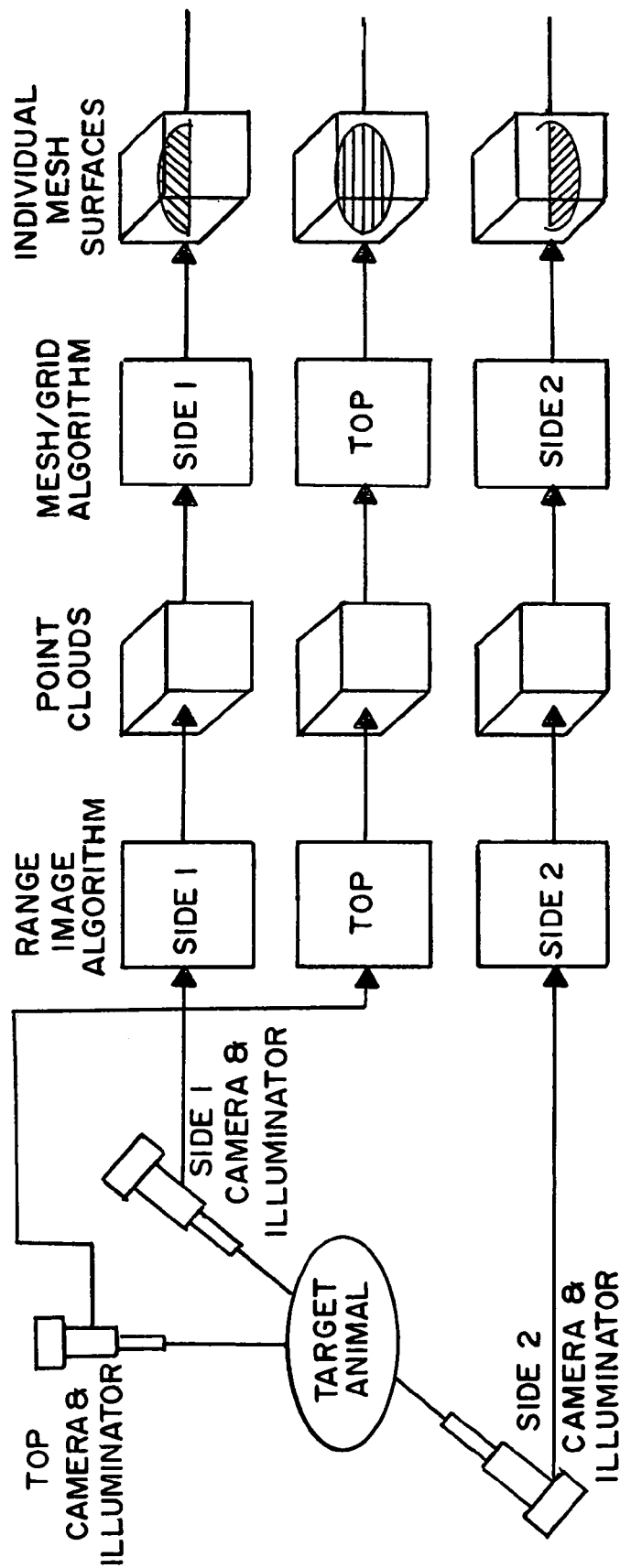
Figures 2, 3, 4, 5, 6, 7, 8, 9, 10, 11, 12, 13, 14, 15, 16, 17, 17B:
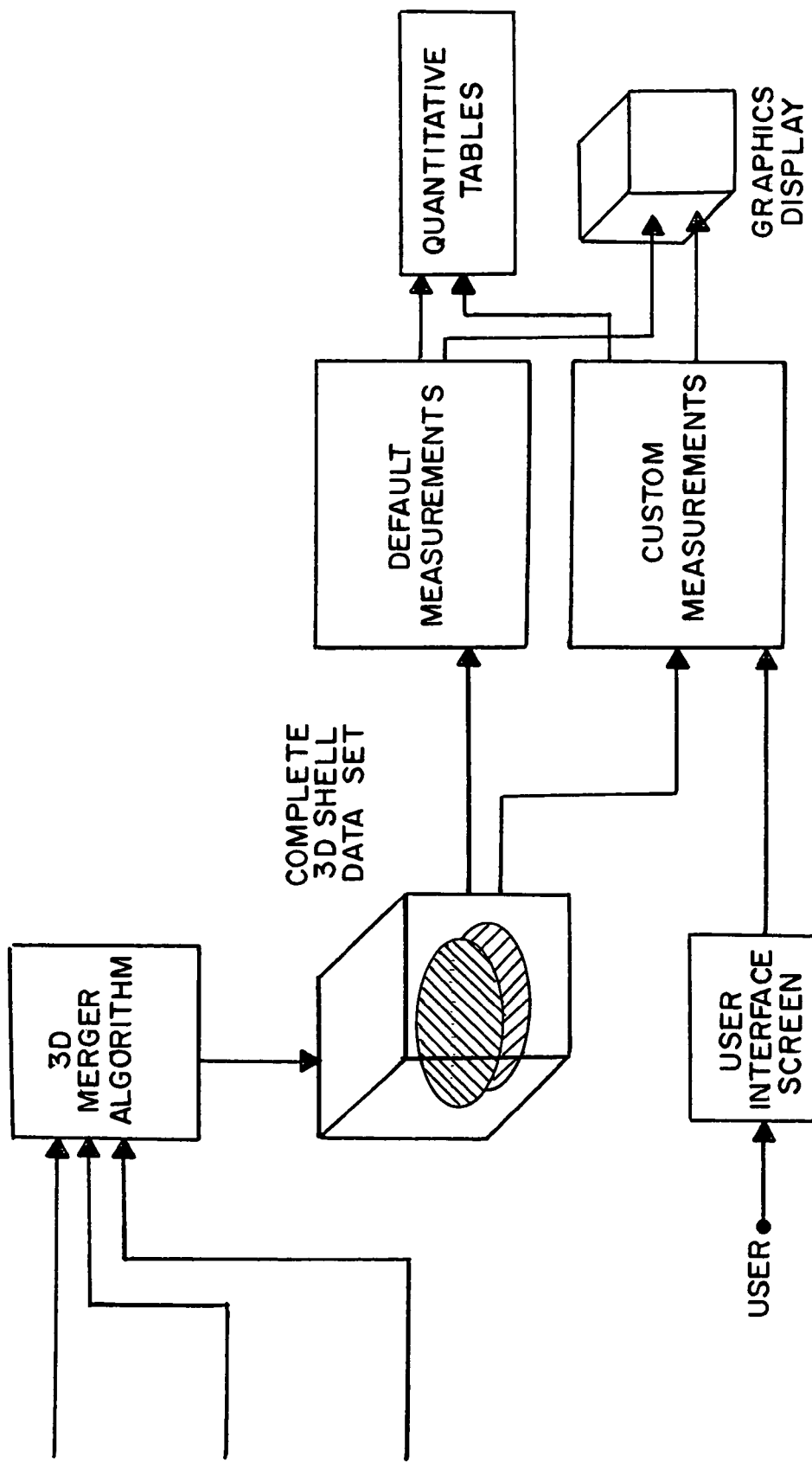
Figures 2, 3, 4, 5, 6, 7, 8, 9, 10, 11, 12, 13, 14, 15, 16, 17, 18, 18A:
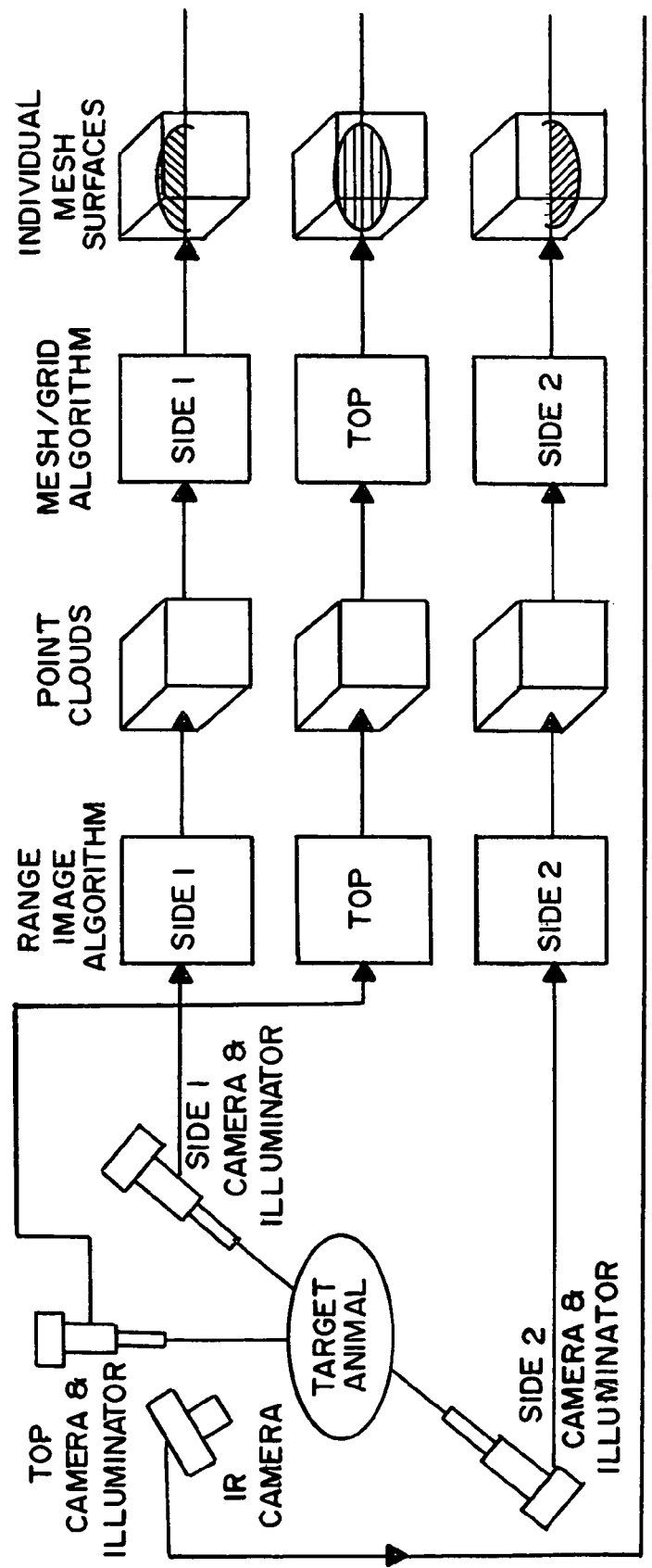
Figures 2, 3, 4, 5, 6, 7, 8, 9, 10, 11, 12, 13, 14, 15, 16, 17, 18, 19:
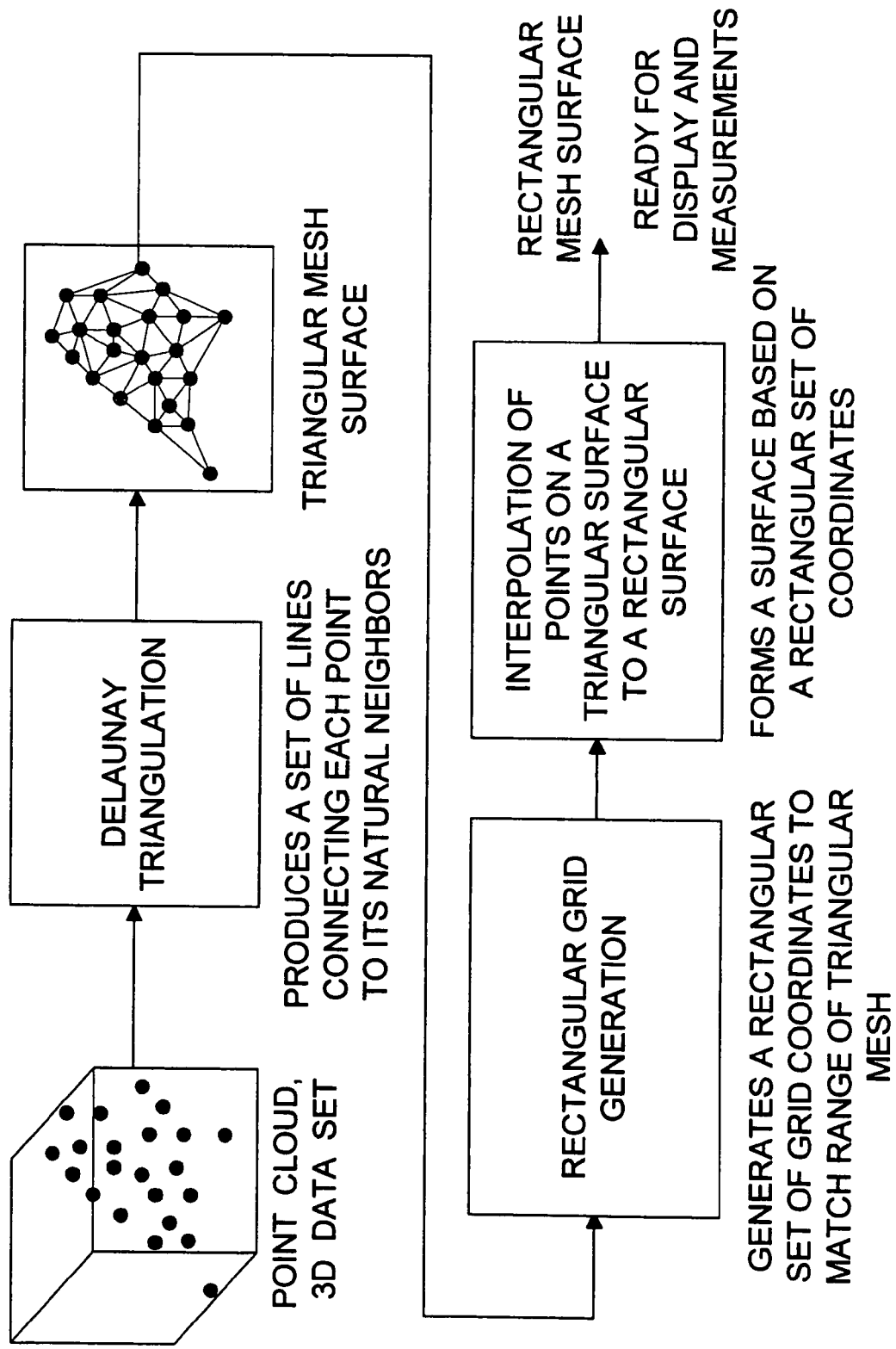
Figures 2, 3, 4, 5, 6, 7, 8, 9, 10, 11, 12, 13, 14, 15, 16, 17, 18, 19, 20, 20A:
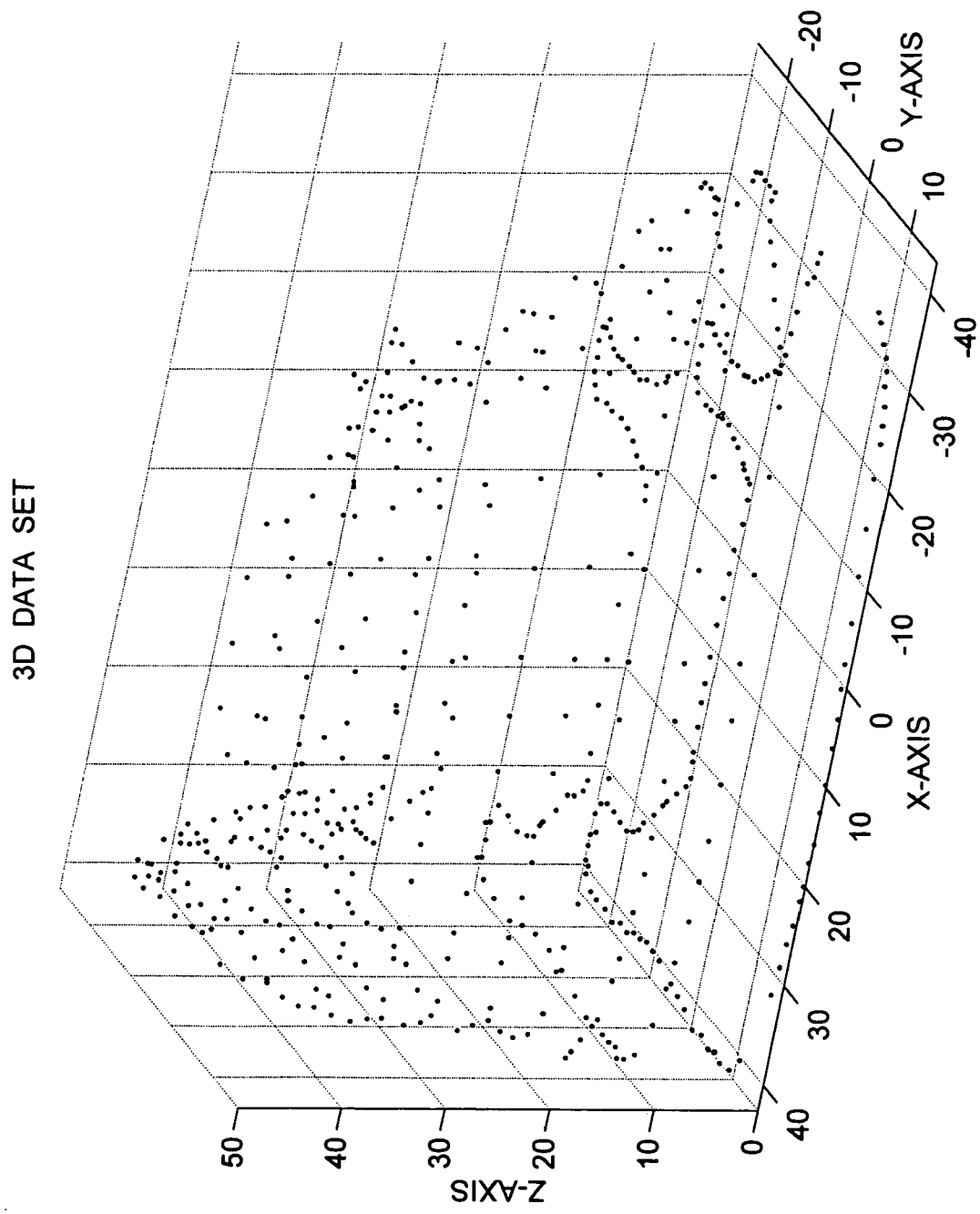
Figures 2, 3, 4, 5, 6, 7, 8, 9, 10, 11, 12, 13, 14, 15, 16, 17, 18, 19, 20, 20B:
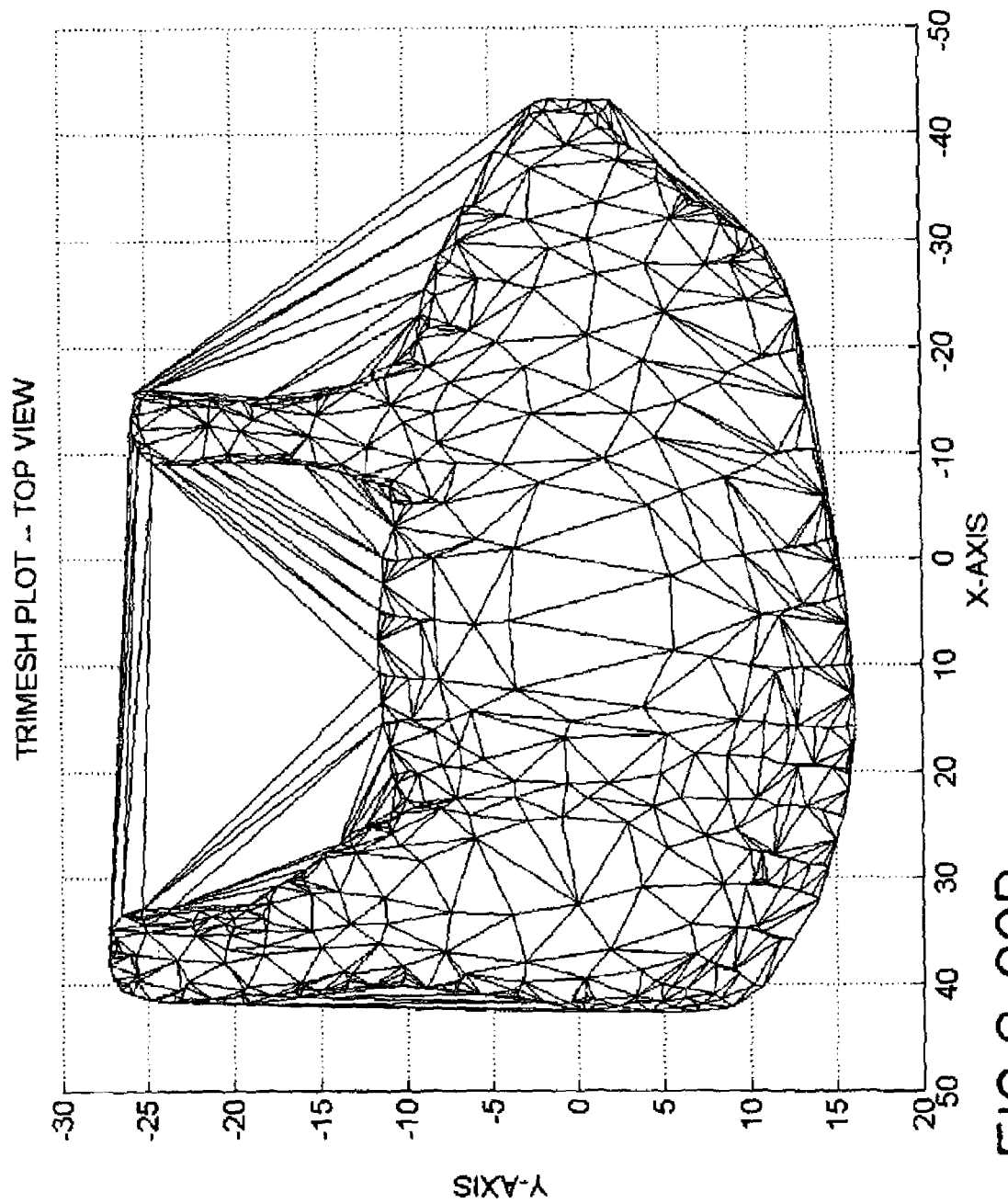
Figures 2, 3, 4, 5, 6, 7, 8, 9, 10, 11, 12, 13, 14, 15, 16, 17, 18, 19, 20, 20C:
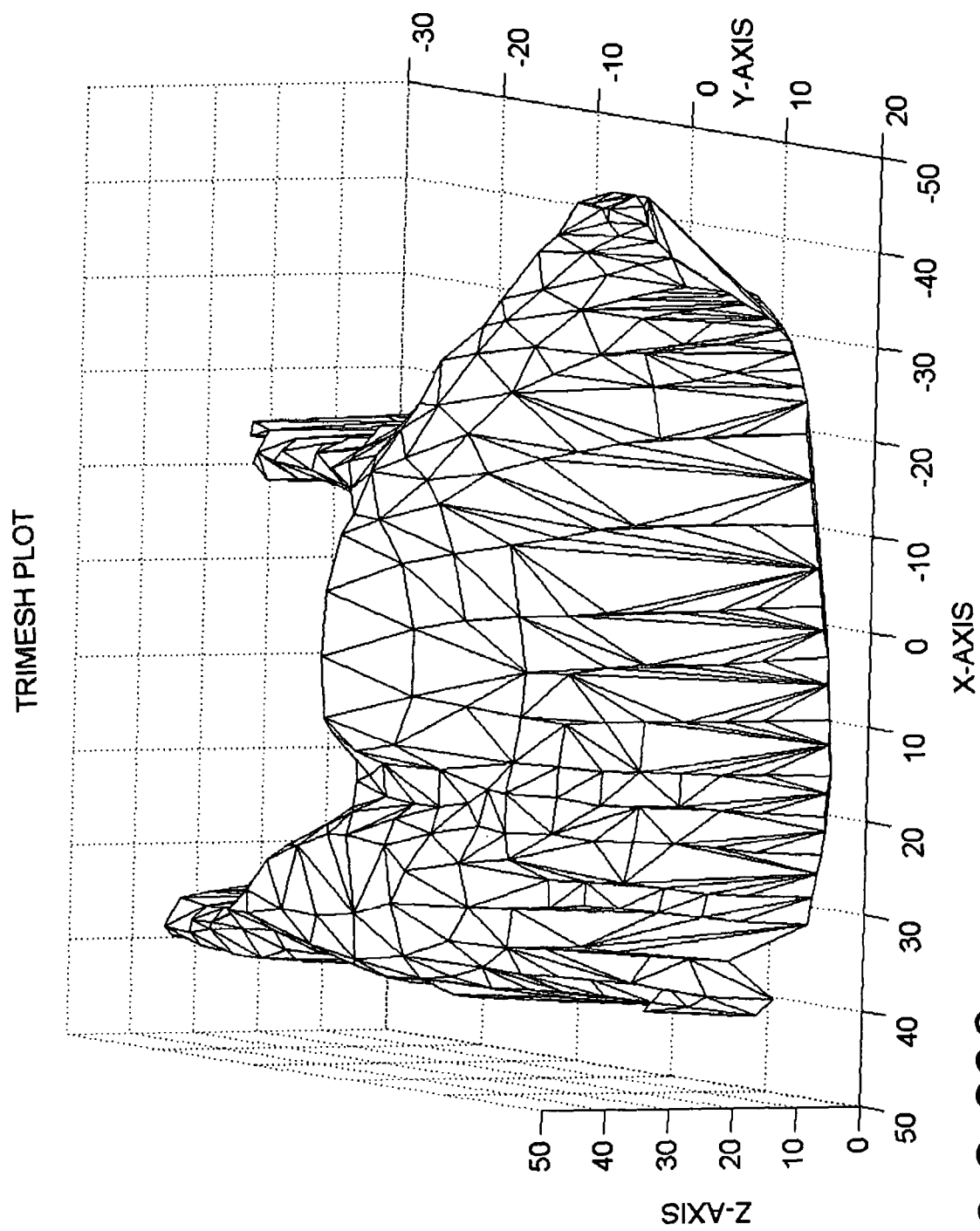
Figures 2, 3, 4, 5, 6, 7, 8, 9, 10, 11, 12, 13, 14, 15, 16, 17, 18, 19, 20, 20D:
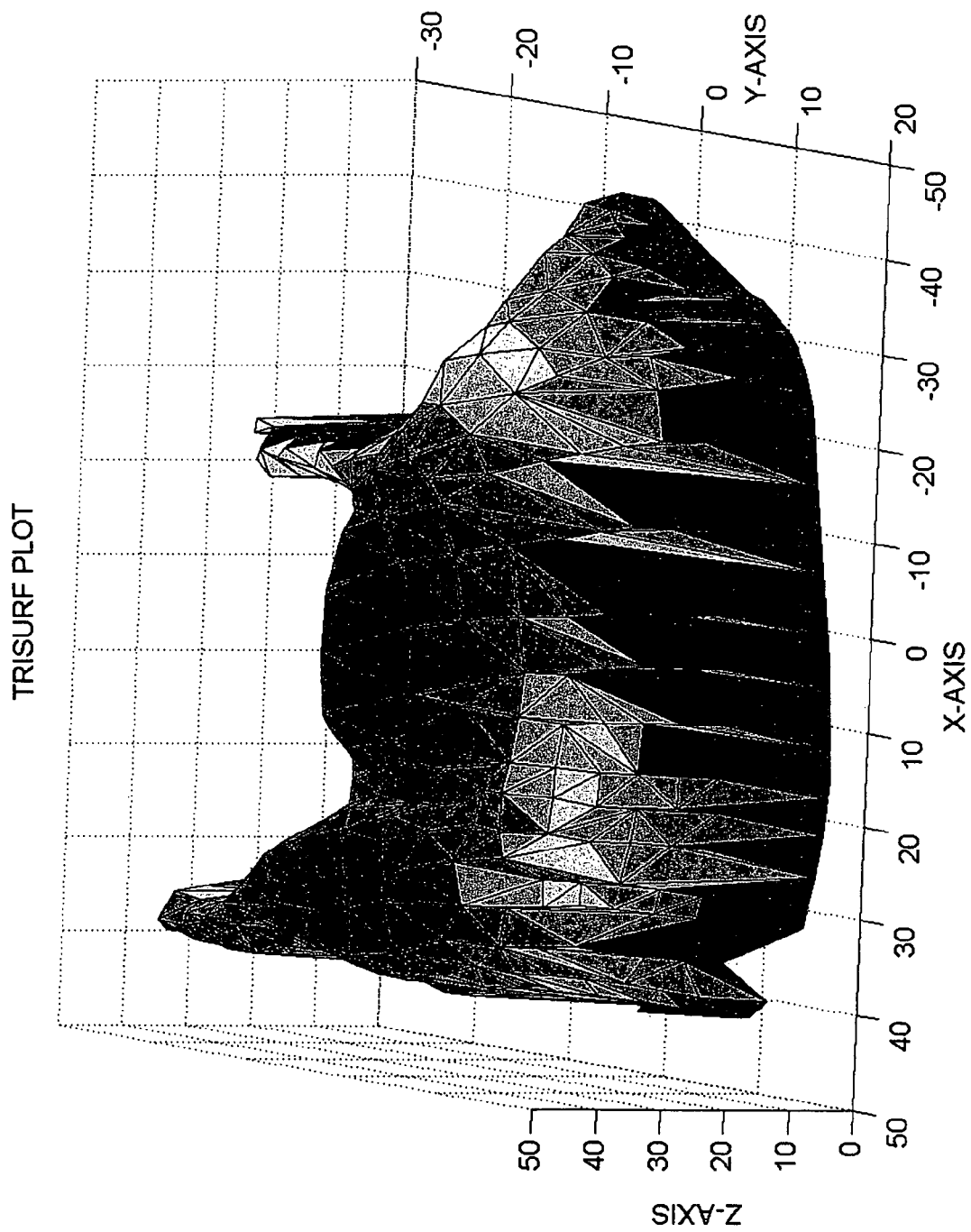
Figures 2, 3, 4, 5, 6, 7, 8, 9, 10, 11, 12, 13, 14, 15, 16, 17, 18, 19, 20, 20E:
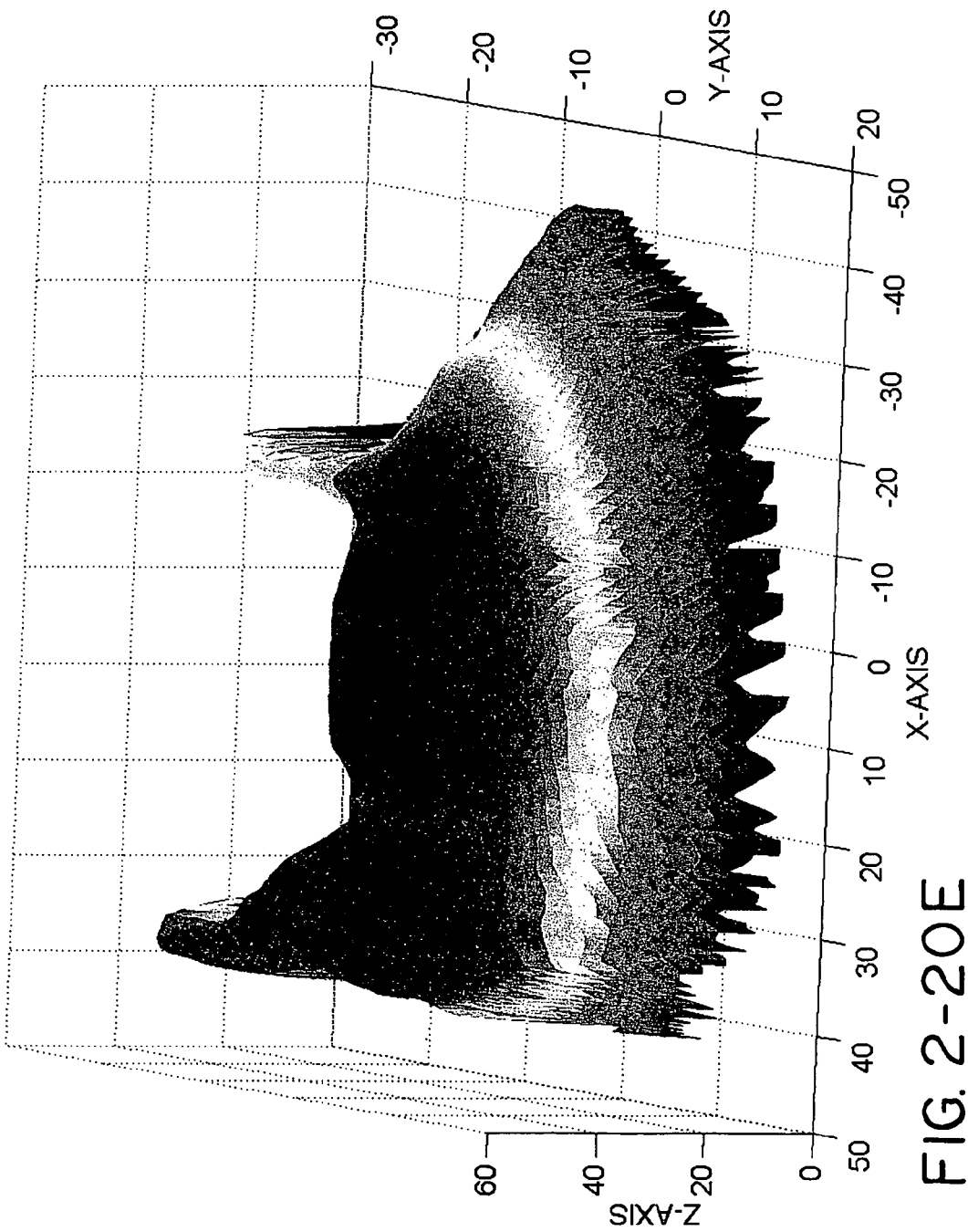
Figures 2, 3, 4, 5, 6, 7, 8, 9, 10, 11, 12, 13, 14, 15, 16, 17, 18, 19, 20, 20F:
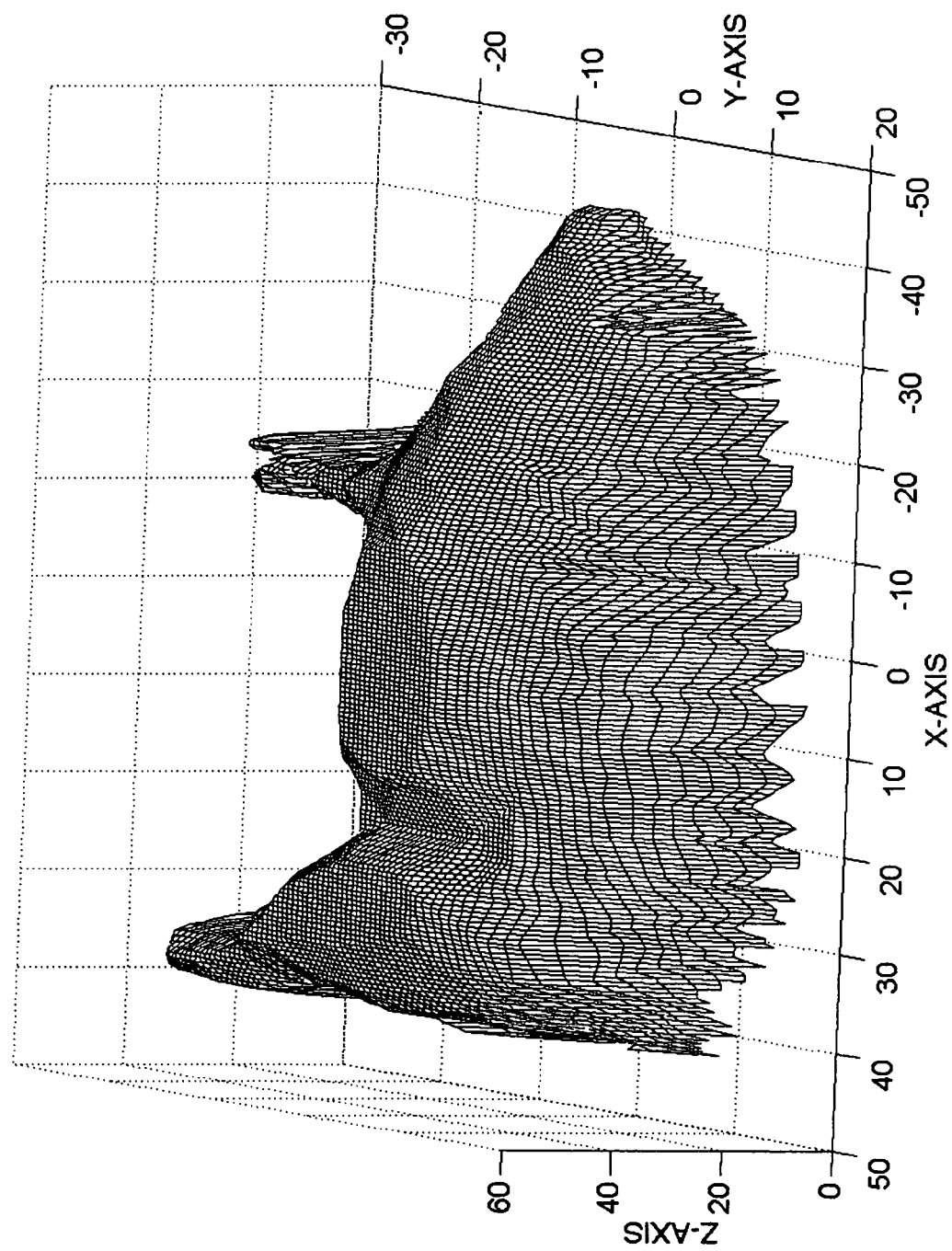
Figures 2, 3, 4, 5, 6, 7, 8, 9, 10, 11, 12, 13, 14, 15, 16, 17, 18, 19, 20, 20G:
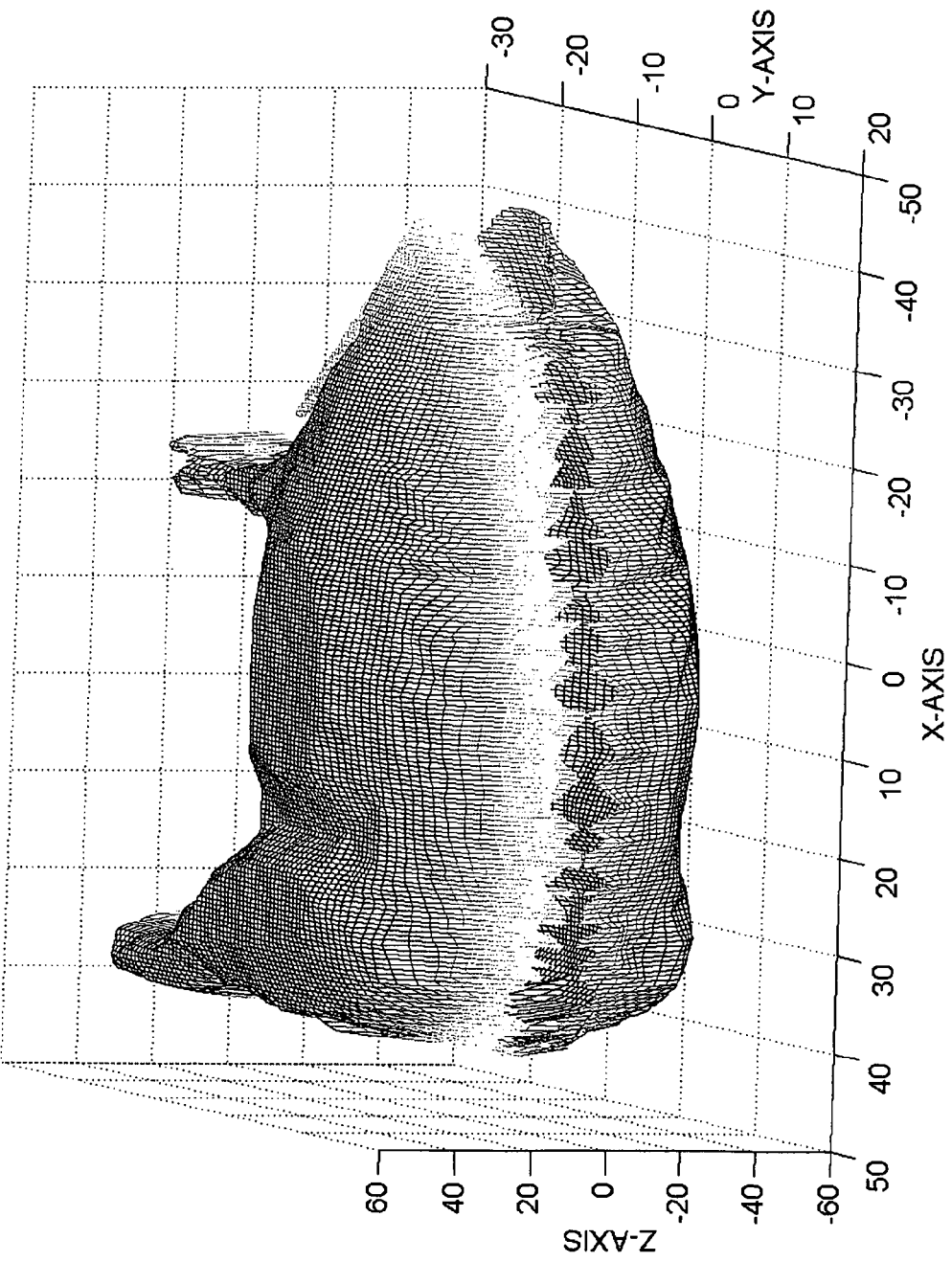
Figures 2, 3, 4, 5, 6, 7, 8, 9, 10, 11, 12, 13, 14, 15, 16, 17, 18, 19, 20, 21:
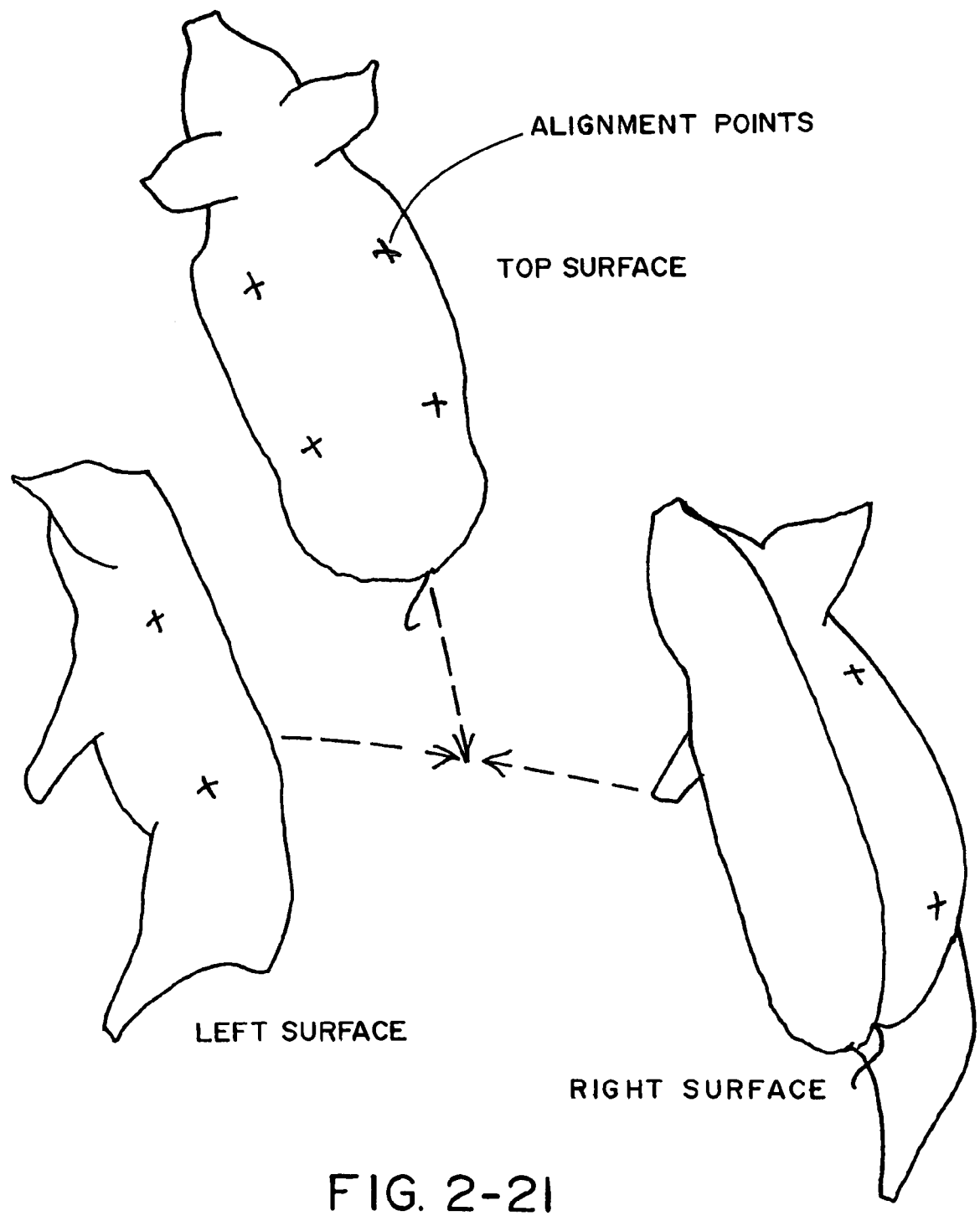
Figures 2, 3, 4, 5, 6, 7, 8, 9, 10, 11, 12, 13, 14, 15, 16, 17, 18, 19, 20, 21, 22:
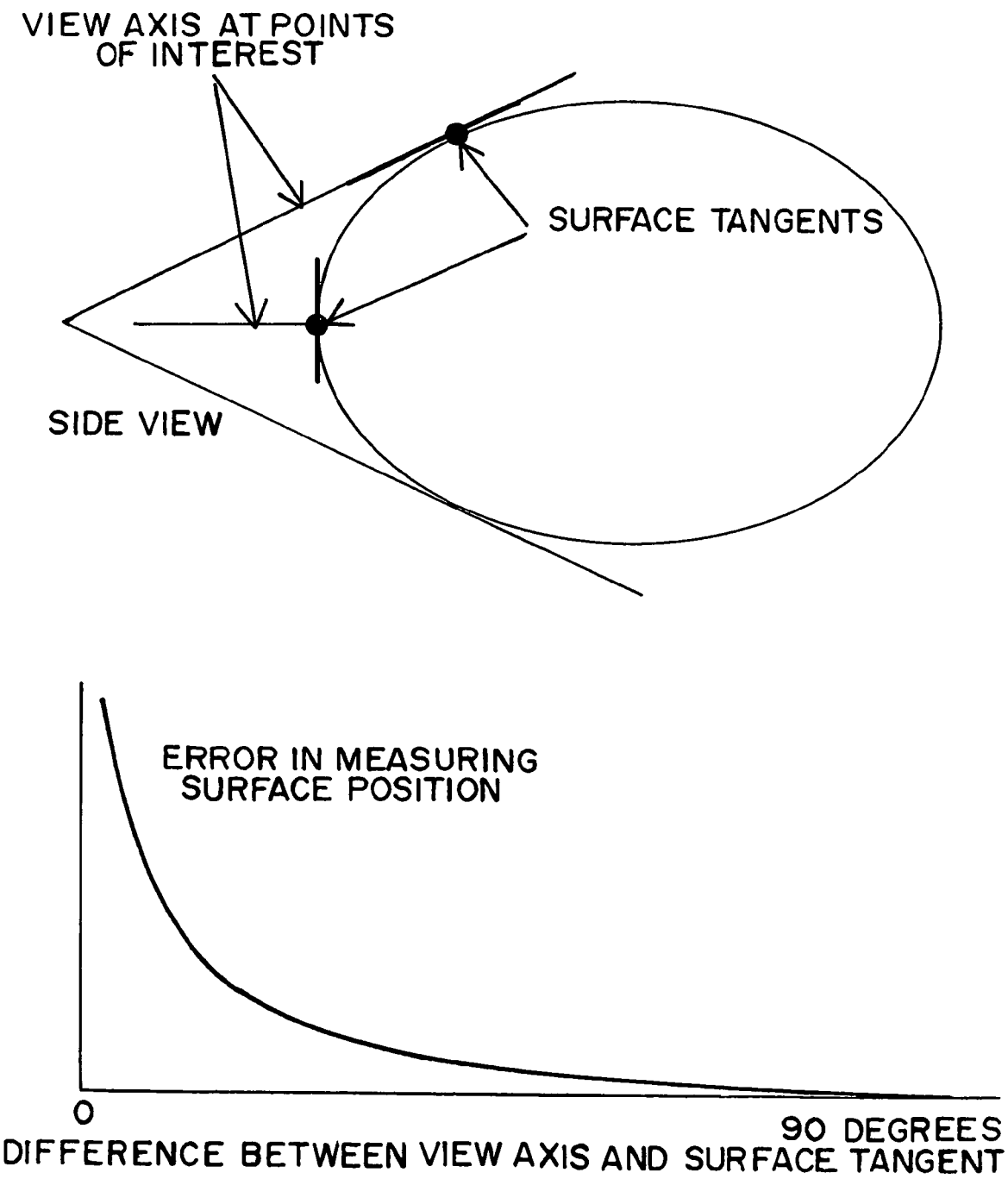
Figures 2, 3, 4, 5, 6, 7, 8, 9, 10, 11, 12, 13, 14, 15, 16, 17, 18, 19, 20, 21, 22, 23:
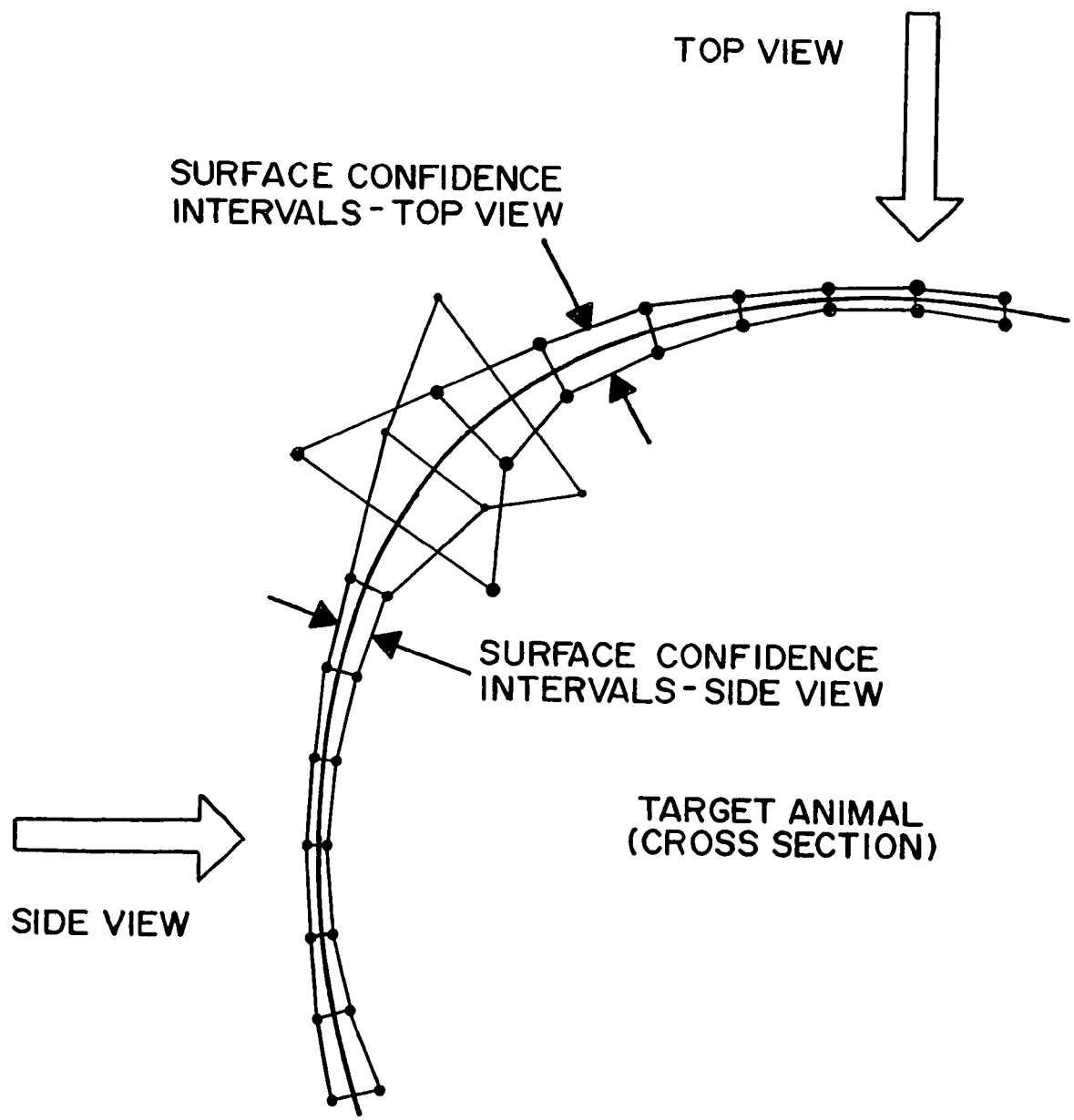
Figures 2, 3, 4, 5, 6, 7, 8, 9, 10, 11, 12, 13, 14, 15, 16, 17, 18, 19, 20, 21, 22, 23, 24, 24A:
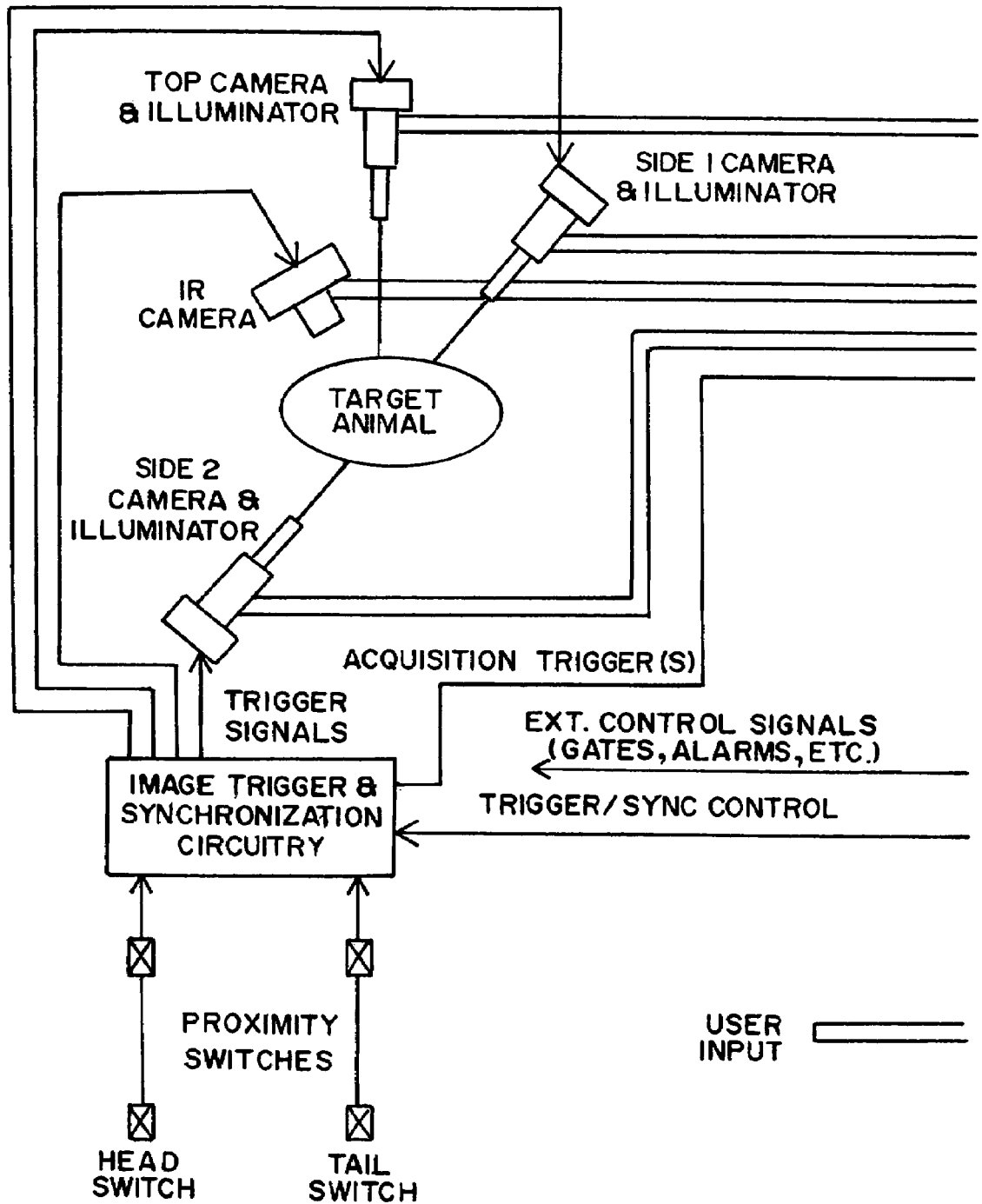
Figures 2, 3, 4, 5, 6, 7, 8, 9, 10, 11, 12, 13, 14, 15, 16, 17, 18, 19, 20, 21, 22, 23, 24, 24B:
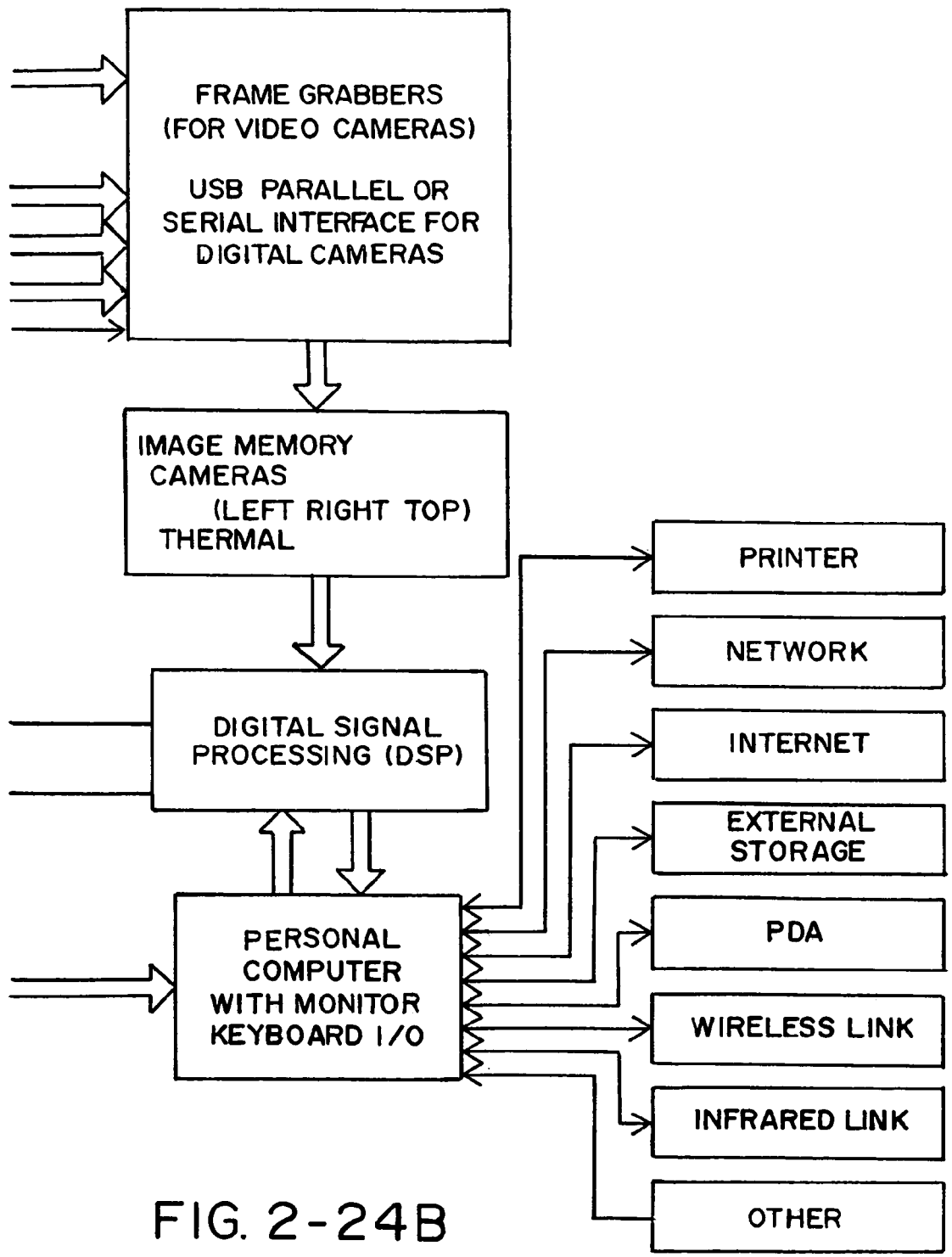
Figures 2, 3, 4, 5, 6, 7, 8, 9, 10, 11, 12, 13, 14, 15, 16, 17, 18, 19, 20, 21, 22, 23, 24, 25:
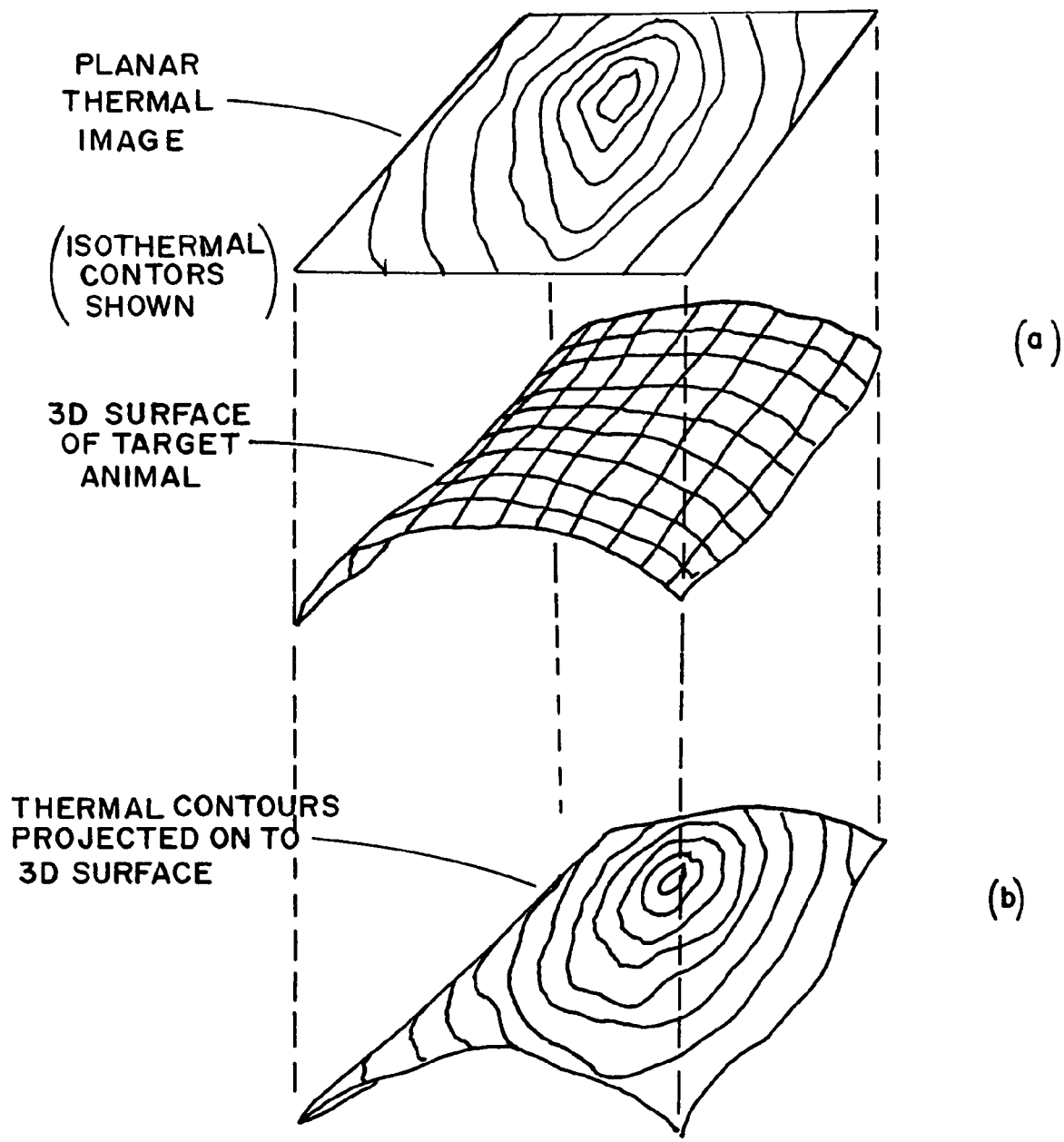
Figures 2, 3, 4, 5, 6, 7, 8, 9, 10, 11, 12, 13, 14, 15, 16, 17, 18, 19, 20, 21, 22, 23, 24, 25, 26, 27, 28:
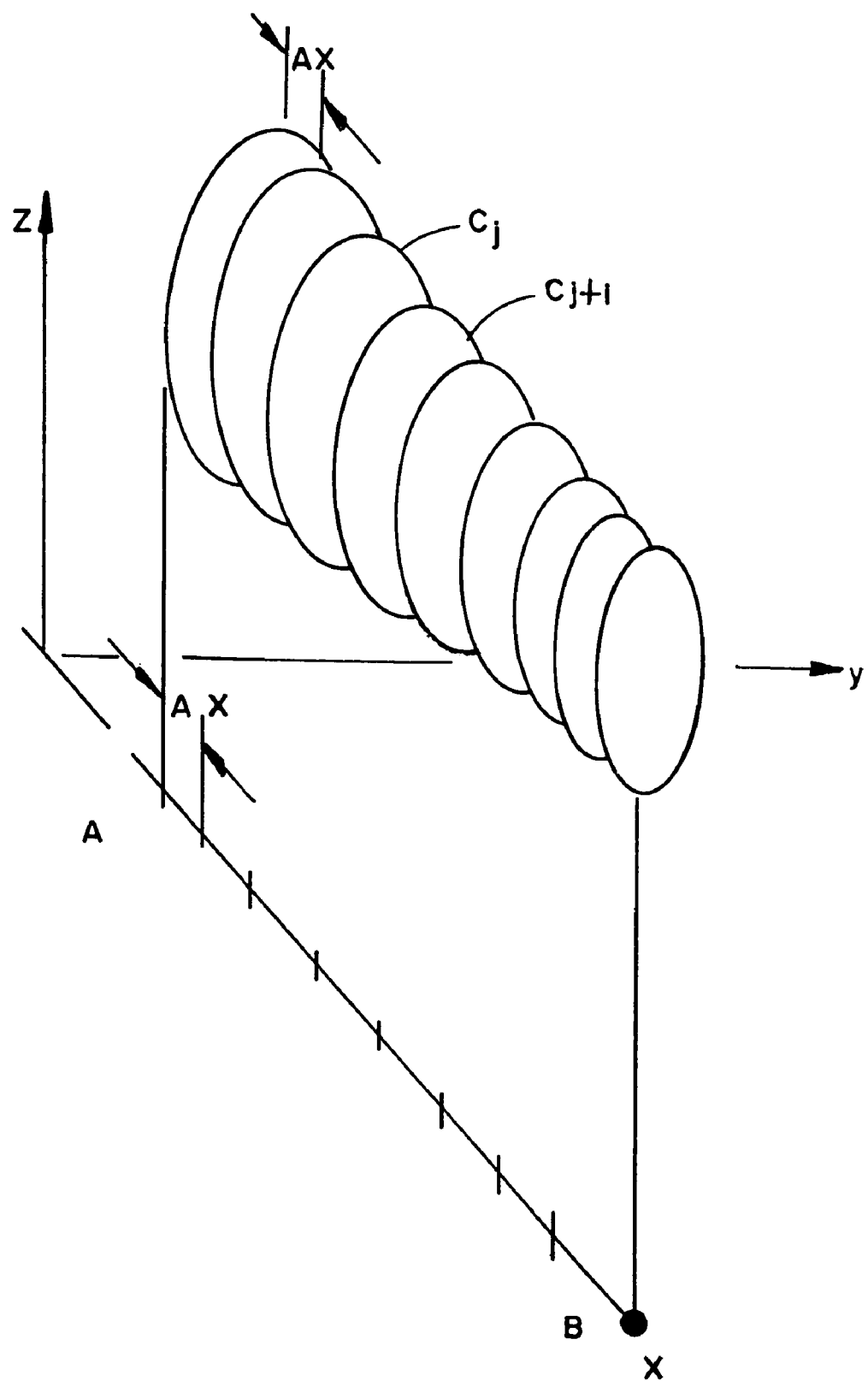
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
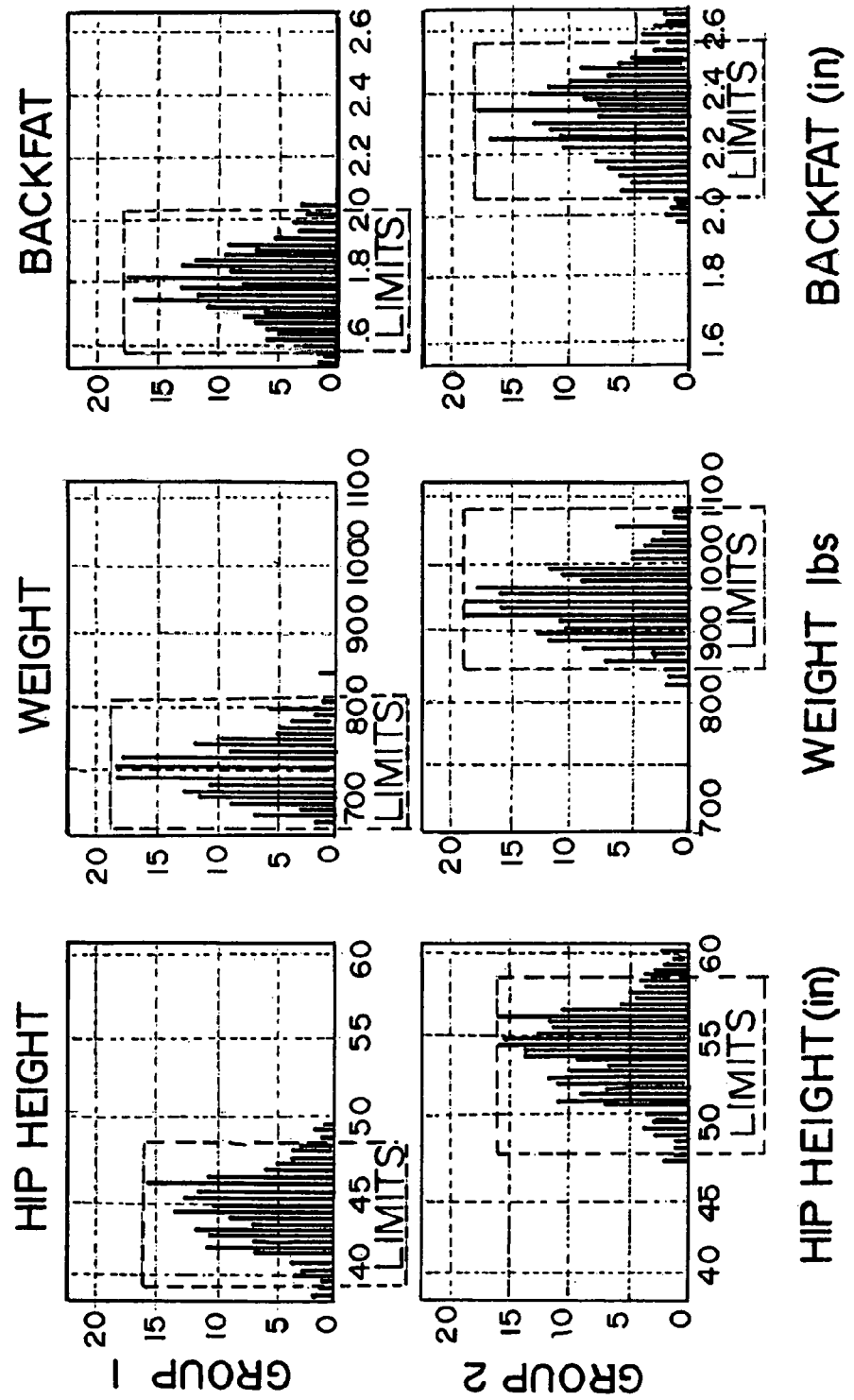
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
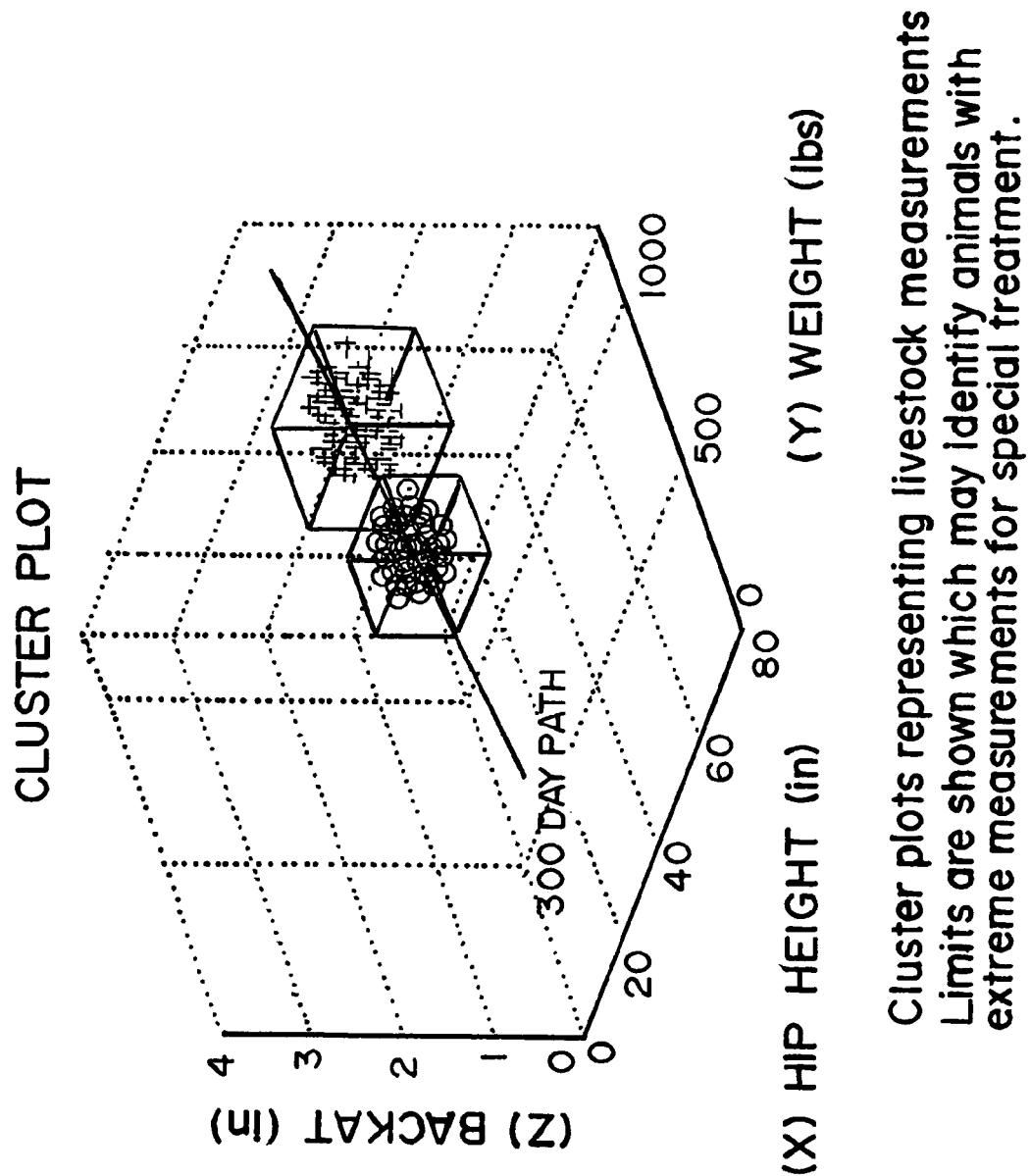
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
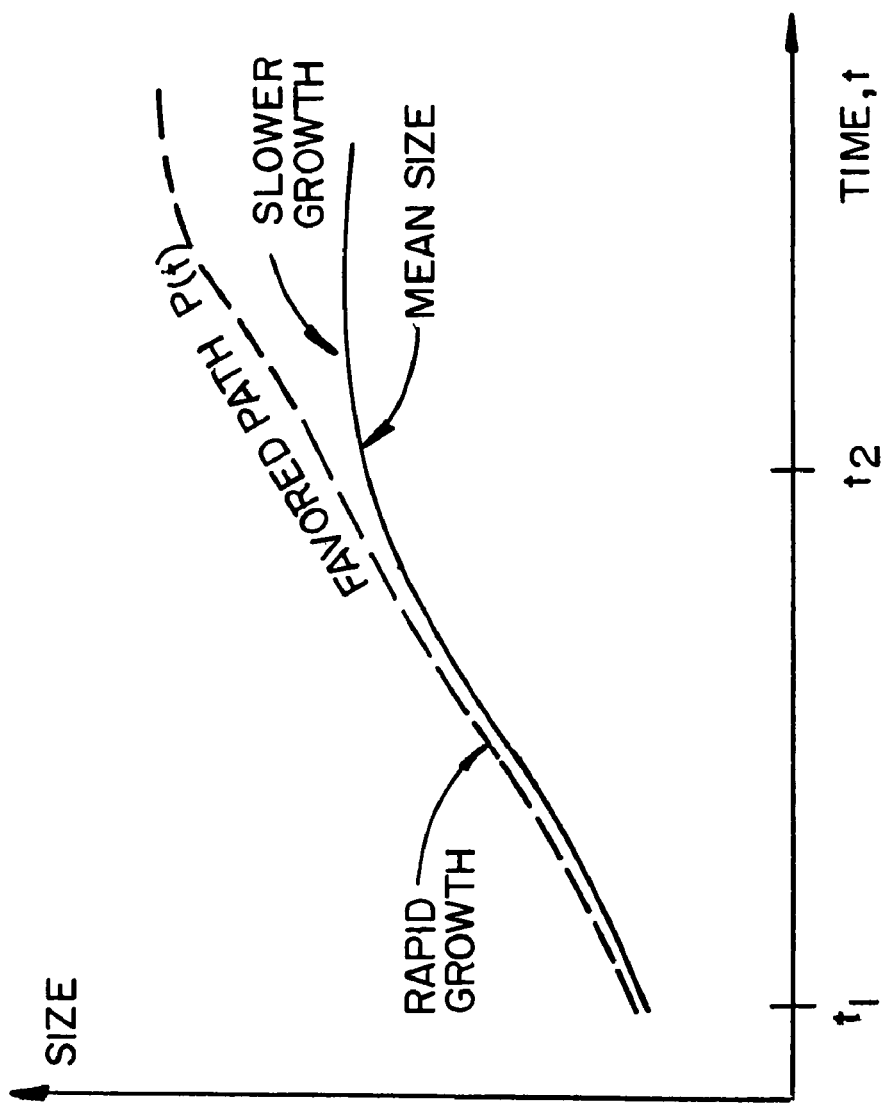
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
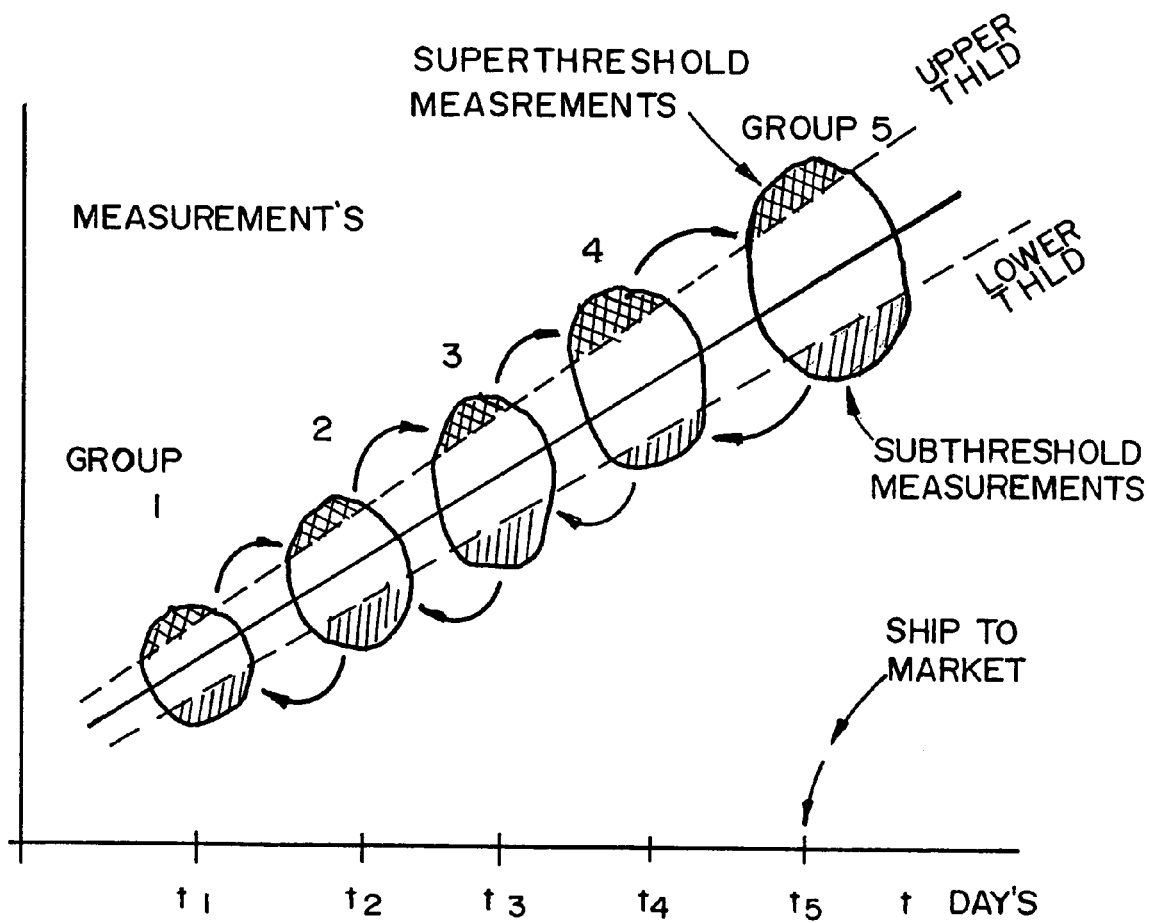
Figures 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
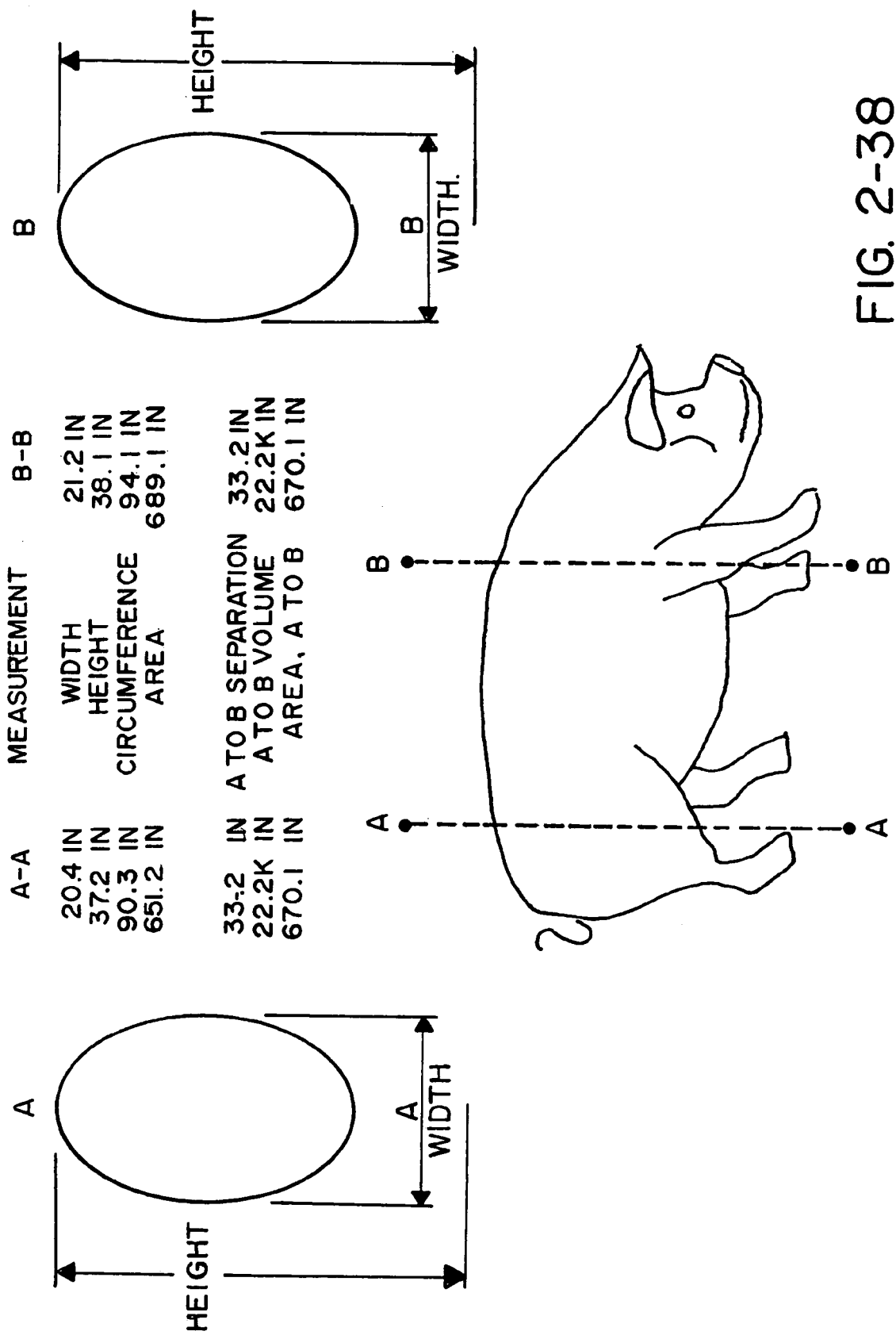

The merging of two mesh surfaces is simulated in previously identified FIG. 2-20G (MATLAB FIG. 7). In the region of the surface interface, resembling a zipper, an average or weighted average of the two surfaces should be used. While only two surface are shown to make up the entire pig in FIG. 2-20G, the camera configurations shown herein result in three surfaces, two sides and a top, to maximize surface accuracy and avoid the surface uncertainty evident near the zipper regions shown in previously identified FIG. 2-20G.

The merging strategies as previously discussed, and as shown in FIGS. 2-21, 2-22 and 2-23, apply to the present embodiment.

Processing this data, including graphing the seven figures, takes approximately 3.5 seconds with a 500 MHz, Pentium III personal computer. Using later model computers that are presently available, (i.e. 2.4 GHz, Pentium IV) this processing and display time is likely to drop under 400 ms. A product implementation of this algorithm (including edge merging and measurement data) would be implemented via digital signal processing components that may operate at speeds of 600–1350 Mflops. Since the faster PC discussed above is probably operating in the range of 2–10 Mflops, a DSP implementation would result in a very substantial increase in processing speed. Such an implementation would fall within the realm of video rates (assuming the number of images required by the range camera is not prohibitive).

Volumetric processing was not selected for this embodiment due to the increase in data volume and the limited memory and processing power presently available.

3.4. Thermal Imaging Techniques

IR Camera Technology

As previously described herein, a radiometric infrared camera is advantageous for an embodiment of this invention since it is capable of providing a pixel-by-pixel measurement of surface temperature. One IR camera which provides a quality thermal image is the IR Snapshot® camera developed and manufactured by Infrared Solutions, Inc. using Honeywell thermoelectric sensor technology. This camera employs a low-cost, uncooled, scanned linear array of thermoelectric thermal sensors. It provides a thermal image which is 120×120 pixels based on radiated IR in the 8 to 12 μm spectral band. Each pixel has 12 bits of useable resolution. The accuracy is specified at $\forall 2E$ C or 2% of the reading. While providing a reasonable-quality image, the old acquisition speed of 1.5 seconds is much slower than desired. Shortly to become available, the next generation of IR cameras, operating at a video rate, will be much preferred.

Mapping the Thermal Image to the Volumetric Surface

FIG. 3-13 shows the concept of projecting or warping the 2D thermal image onto the 3D surface of the target animal. FIG. 3-13a shows the planar thermal image suspended over the 3D target surface. FIG. 3-13b shows the same thermal data projected onto the 3D surface. Both thermal images are shown in isothermal contours.

3.5. Measurements

Volumetric and Dimensional Measurements Calculated Directly from 3D Data

Numerous measurements may be made from the three-dimensional data set generated by this invention. Table 3-4 shows the appropriate formulas used to compute some sample measurements. The actual calculations may be made on either the digital signal processing unit or the personal computer. Either device has the computing power for these tasks.

TABLE 3-4

Measurement Calculations from 3D Data

| MEASUREMENT | EQUATION or PROCESS | EQUATION NUMBER |
| --- | --- | --- |
| hip height | $H_{hip} = \max[\max(f_i(y))]$ i at position of hip | (2-4) |
| hip width | $W_{hip} = \max[y_{2i} - y_{1i}]$ i = C to D | (2-5) |
| shoulder height | $H_{hip} = \max[\max(f_i(y))]$ i at position of shoulder | (2-4) |
| shoulder width | $W_{shoulder} = \max[y_{2i} - y_{1i}]$ i = E to F | (2-6) |
| weight | measure target animal on scales | |
| cross-sectional area (any slice) | $A_i = \int_{y_1}^{y_2} f(y)dy - \int_{y_1}^{y_2} g(y)dy$ | (2-1) |
| circumference at a plane | $C_A = s_{g(y)} + s_{g(y)}$ | (2-10) |
| hide surface area | $SA_{AB} = \sum_{j=1}^{p-1} \Delta \times C_j$ | (2-11) |
| volume (A to B) | $V_{AB} = \sum_{i=1}^{n} \Delta \times A_i$ | (2-2) |
| overall length | $L_{overall} = \sqrt{(x_{head} - x_{tail})^2 + (y_{head} + y_{tail})^2 + (z_{head} - z_{tail})^2}$ | (2-12) |
| profile or silhouette | project the 3D data set onto a plane oriented at any desired angle and throw out all but the outline data; a black silhouette may be obtained by determining if points are within or without the outline and assigning a uniform black color accordingly | |

Measurements Calculated from Scaled Model Characteristics

As previously discussed in Section 2.11, data from external databases may be scaled and applied to data from this invention. The large number of measurements conveniently available with this invention enables the user to easily tie into additional databases and scale that data to the livestock at hand.

One scaling application makes use of existing volumetric data such as a magnetic resonance image (MRI) of a cow or hog. Such an MRI image contains the position and size of all internal organs, muscles and bones. Though the present animal may differ from the reference MRI animal. Both have very accurate external dimensions. The computation of a scaling factor based on external dimensions enables the entire MRI dataset to be scaled to match the present animal. Veterinarians, breeders and researchers then have an accurate 3D model of the present animal. This same scaling may be used by slaughterhouses to accurately estimate production yields based on MRI models or proportions obtained from full dissections of previous carcasses. If minor external variations exist between the model and the present animal, software may be used to slightly warp or distort the localized region of the model to fit the present animal, thus providing additional insight into variations in muscle mass or skeletal structures.

Numeric databases may also be mined for valuable data which is not readily apparent from an external inspection of an animal. Data obtained from expensive research studies having both external measurements and dissected results may be valuable in the determination of such parameters as lean/fat ratio, cardiac output, or stroke volume.

Measurements as Functions of Other Measurements

As researchers or others use the present invention it is likely that numerous correlations will become evident between external dimensions and other factors of interest. When any measurement is found to be highly correlated or in any way a function of an external measurement which can be acquired by the present invention, then that measurement may be tracked by the present invention via the functional definition and the external measurements. As earlier discussed, the functional relationship between measurements may be linear, quadratic, cubic, multivariate, or any of a number of different mathematical forms.

In functional relationships between measurements it is worthy to remember the power relationship between linear dimensions, areas and volumes. Equation 3-1 illustrates this observation:

$$L_1 \propto k_{1_1} M_1; \quad A_1 \propto k_{1_1}^2 M_1; \quad V_1 \propto k_{1_1}^3 M_1; \qquad (3\text{-}1)$$

where $M_1$ is a linear measurement; $L_1$ is a length; $k_1$ is the linear scalar between $M_1$ and $L_1$; $A_1$ is an area; and $V_1$ is a volume.

3.6. Analysis of Measurement Data

Histograms, Averages and Distributions

Previously identified FIG. 2-32 illustrates the power of a statistical analysis of the data gathered via the present invention. In this figure, statistics of two groups of 300 animals each are simulated for hip height, weight and backfat thickness. The mean values of these parameters are lower for Group 1 in all categories. From an inspection of the histograms, the scatter or standard deviation (Gaussian distribution) is wider for Group 2. Limits may be set near the extremes of each measurement to identify outliers that may require special attention.

Cluster Analyses

Cluster analyses are another way to statistically evaluate groups of livestock data obtained with the present invention. FIG. 2-33 illustrates a cluster plot of the same data from FIG. 2-32. In FIG. 2-33 the data are presented as a point cloud in a three-measurement space. The 3D boxes indicate the acceptable limits for each measurement. The '300 day path' indicates that the data are for two different groups at different stages of their stay in a feedlot.

Other Statistical Analyses

The above statistical analyses are not, by any means meant to be a complete treatment of the statistical analyses possible for the many measurements available from the present invention. A somewhat expanded list might also include the following: arithmetic mean, median, mode, frequency distributions, weighted arithmetic means, class limits and boundaries, measurements of skewness, geometric and harmonic means, average and quartile deviations, confidence interval analyses, trend analyses, probability analyses, proportional analyses, decision model analyses, Chi-squared tests, variance analyses, time-series trend analyses, least-squares analyses, curve fitting, seasonal variation analyses, periodic fluctuations, time series analyses and modeling, regression and correlation analyses, and multi-regression analyses. Even this larger list cannot be all inclusive for those skilled in the art.

Favored Path Concept

Previously identified FIG. 2-34 shows the favored path concept using hip height as the indicator of size. Such a graph might be the result of an animal's growth during its stay at a feedlot. The favored path line (dotted), perhaps established by a record animal in the past, serves as the template for efficient growth. Feed, medication, and breeding are all parameters that may be evaluated with this approach. When the favored path record is regularly exceeded, a new guideline may be chosen.

Previously identified FIG. 2-35a shows another implementation of the favored path concept in which weight is the indicator. In this graph, an entire group of animals is tracked with a histogram at each measuring time which indicates not only the mean weight of the group but also the spread or standard deviation. In this manner, an entire group may be evaluated against a growth template or favored path.

FIG. 2-35b shows a three-dimensional graph with three different measurements along the axes, namely, hip height, weight and volume. At several times during the feedlot stay the groups are measured and their progress plotted as shown in a three-dimensional measurement space. The line shown is the favored path established from past history; measurement limits are shown to evaluate the performance spread. This particular graph with weight, hip height and volume is likely to be sensitive to variations in lean/fat ratio as animals progress through the feedlot. An increase in animal fat would increase the volume and weight without proportionate changes in hip height (or other structural measurement), resulting in a deviation of the trajectory away from the favored path.

3.7. Application of Measurements to Livestock Evaluations

Breeding Evaluations

The statistical evaluations discussed herein are all useful for breeding evaluations. If a particular breeding combination excels at the feedlot or the slaughterhouse then it is viewed as successful and should be continued. If it is not successful in those two arenas then that particular combination is viewed with less pleasure and is less likely to be continued. While the previous, rather simplistic explanation is true in general, the specifics become very complex. The data collected by this invention are likely to become very valuable as genetic tracking becomes commonplace. The same computer algorithms that will track livestock genes will require physical measurements like those provided by this invention.

Feedlot Evaluations

The feedlot management as earlier described in Section 2.13, namely the advancement or retention of animals from specific feedlot groups is illustrated in greater detail in FIGS. 3-14a, b, and c. In each of these figure parts three groups of animals are represented at various stages of the feedlot growth schedule. Table 3-5 compiles the specific progress of animals A, B, C, D, and F.

TABLE 3-5

Compilation of Feedlot Animal Progress depicted in FIG. 3-15.

| Animal: | | A | B | C | D | F |
|---|---|---|---|---|---|---|
| Hip Height | Above Upper Threshold | + | + | | | |
| | Within Range | | | 0 | | |
| | Below Lower Threshold | | | | — | — |
| Hip Width | Above Upper Threshold | + | | | | |
| | Within Range | | 0 | 0 | | |
| | Below Lower Threshold | | | | 0 | — |
| Weight | Above Upper Threshold | + | | | | |
| | Within Range | | 0 | 0 | 0 | |
| | Below Lower Threshold | | | | | — |
| Recommendation: | | + | 0 | 0 | 0 | — |

In Table 3-5, the '+' indicates that the animal scored high enough to be advanced to the next higher group, the '0' indicates that the animal scored within the expected range and should be kept within its current group, and the '−' indicates that the animal scored below the expected range and should repeat the present level with the next lower group. As a result of the three measurements considered, A should be advanced, B, C, and D should be kept in their present group, and F should repeat the present level with the next lower group. While this example is illustrated with only three measurements, many more may be used in the true feedlot application. Additionally, while in this example each animal is given a '+', '0', or '−' grade, in the actual application the numerical value above or below the range would likely be included in the analysis and tabular output.

FIGS. 3-15A and 3-15B show the data of FIGS. 3-32 and 3-33 in a slightly expanded format with the three-dimensional data presentation broken down further into three, two-variable graphs. The 300-day path through the feedlot is shown as well.

Harvesting (Slaughterhouse) Evaluations

The accurate measurements provided by the present invention is advantageous to meat processors as well. A precise measurement of product dimensions enables fair and efficient trade between processors and suppliers. Additionally, precise measurements permit efficient processing and improved production planning.

3.8. Automated Grading

The measurements of this invention may be used to automate the grading of cattle and hogs. FIG. 3-16 is a chart showing U.S. Quality Grades of prime, choice, select, standard, and utility. From a simple visual comparison of prime and utility grades it is evident that measurements such as hip width, hip height, and volume can easily discriminate between the extremes of prime and utility grades. The measurements of this present invention make the discrimination between the other grades equally clear by comparing a set of measurements to an empirically determined set of standard grading measurements which are characteristic of each of the U.S. quality grades. One method for automating the grading of cattle and hogs uses n normalized measurements in a measurement space. The normalization of each measurement might be to its prime grade value. In this method, n measurements are used to classify each animal. Each grade has a nominal normalized measurement value for each of the n measurements. This results in a point for each grade in n-measurement space. The set of measurements for an unknown animal give it a point in the same measurement space. Using this method, the automated grading amounts to simply finding the grade point which lies closest to the unknown animal point.

In a one measurement analogy, grades of A, B, C, D and F might be assigned to a student's test scores with nominal values of A=95, B=85, C=75, D=65, and F=55. A test score of 83 falls closest to the B value of 85, therefore a B is assigned. Likewise, a test score of 91 falls closest to the A value of 95 resulting in an A assignment. Rounding rules may be established for any score falling exactly on a midpoint between two grades.

FIG. 3-17 illustrates this method using two measurements, $M_1$ and $M_2$. Animal, X, has measurements between choice and prime. Distance calculations yield:

$$d_{x\text{-}prime} = \sqrt{(M_{1X}-M_{1prime})^2 + (M_{2X}-M_{2prime})^2}; \quad (3\text{-}2)$$

$$d_{x\text{-}choice} = \sqrt{(M_{1X}-M_{1choice})^2 + (M_{2X}-M_{2choice})^2}; \quad (3\text{-}3)$$

where $M_{1X}$ is the normalized measurement, $M_1$, for animal, X; $M_{1prime}$ is the normalized measurement, $M_1$, for prime grade; $M_{2X}$ is the normalized measurement, $M_2$, for animal, X; $M_{2prime}$ is the normalized measurement, $M_2$, for prime grade; $d_{x\text{-}prime}$ is the distance from the X position to the prime position in the graph of FIG. 3-26; and $d_{x\text{-}select}$ is the distance from the X position to the select position in the graph of FIG. 3-26.

If $d_{x\text{-}prime}$ is found to be less than $d_{x\text{-}choice}$, animal X would be given a prime grade. Animal Y, shown in FIG. 3-26 would be graded as select since the measurements of animal Y, [$M_{1Y}$, $M_{2Y}$], lie closest to the nominal select measurement point at [$M_{1select}$, $M_{2select}$].

Alternative embodiments may grade the measurements according to measurement ranges for each grade. Additionally, alternative embodiments may use weighted measurements values instead of normalized values.

FIG. 3-18 is a chart showing U.S. Yield Grades of 1, 2, 3, 4, and 5. From a visual comparison of Yield Grades 1 and 5, it is evident that measurements such as hip width, hip height, and volume can discriminate between these extreme grades. The measurements of this present invention make the discrimination between the other yield grades equally clear by comparing a set of measurements to an empirically determined set of standard grading measurements which are characteristic of each of the U.S. yield grades. The automated grading methods described above and in equations (3-2) and (3-3) may be applied to yield grades as well as quality grades.

FIG. 3-19 is a chart showing U.S. Thickness Grades of 1, 2, 3, and 4. Similar to the automated grading for quality and yield, the measurements of this invention may be used for thickness grading.

FIG. 3-20 is a chart showing U.S. Frame Size Grades of Large, Medium and Small. Similar to the automated grading for quality, yield, and thickness, the measurements of this invention may be used for frame size grading.

From the application of the present invention to automated grading for U.S. Quality, U.S. Yield, U.S. Thickness, and U.S. Frame Size, it is evident that the present invention and its measurements may be used to automate cattle and hog grading systems which exhibit characteristic physical measurements which differ from grade to grade. This invention is applicable to animal grading systems issued by the United States, Canada, or any other legal entity in which there are physical measurements that can distinguish one grade level from another.

3.9. Predictive Grading via Multivariate Growth Charts

With the measurement capability and convenience of the present invention it is possible to not only grade cattle and hogs immediately prior to market, but to grade them throughout their entire growth cycle. Typical growth charts show age (in months) as the independent variable and either height or weight as the dependent variable. With the present invention, growth charts can be generated that include such measurements as hip height, hip width, volume, weight, shoulder height, shoulder width, length, hide area, and/or rib width. Such multivariate growth charts can culminate in the grading classifications as discussed herein. By tracking the growth of cattle and hogs via multivariate growth charts, feedlot efficiencies will be enhanced, breeding programs will be confirmed more rapidly, and meat processing facilities will be able to efficiently generate schedules with advanced knowledge of incoming grades and quantities.

3.10. Automated Production Segmentation Value

As previously discussed, this invention can provide scaling capability based upon the external measurements of the present invention and pre-existing models. FIG. 3-21 shows a pre-existing model in which the percentage of meat cuts are specified and the approximate source of each cut is indicated. With the present invention, exact measurements may be made of each region, enabling a precise estimation of the quality and quantity of cuts available from a given animal. FIGS. 3-22A and 3-22B show additional specifications for meat cuts from a cow or bull carcass. FIG. 3-23 shows similar segmentation of the swine carcass. FIG. 3-24 indicates segmentation of the cattle carcass while FIG. 3-25 is indicative of swine.

When the measurements of this invention are obtained periodically throughout the growth cycle of cattle or hogs, a number of efficiencies become available to the meat processor and supplier. With frequent data sampling, multivariate growth charts enable tracking of feedlot progress and accurate projections of quantities, grades and market dates. Such automated management allows a meat processor to closely link sales quantities and prices to purchase quantities and prices, thus reducing risk and providing competitive advantages over competing meat processors. The supplier also benefits since herds with specific characteristics may be scheduled when market prices are more favorable for those specific qualities. The predictive modeling and projections enable some schedule variations at the feedlot level to optimize the time to market.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method for measuring the physical characteristics of an animal having a frame size, a thickness, first and second sides and a back, said animal being positioned within a target zone having first and second sides, an upper portion and a bottom portion using an apparatus comprising means for defining the target zone, a first camera disposed on said first side of said target zone, a second camera disposed on said second side of target zone, a third camera disposed proximate said upper portion of said target zone and data processing means operably associated with said first, second and third cameras for processing data received from said cameras, said first, second and third cameras, said method comprising the steps of:

(a) positioning the animal within the target zone;
   (b) using the first camera, obtaining a range of images of at least a portion of the first side of the animal;
   (c) using the third camera, obtaining a range of images of at least a portion of the back of the animal; and
   (d) entering into the data processing means, said range images to produce a plurality of entered range images and processing said plurality of entered range images to form a three-dimensional set representing at least a portion of the surface of the animal.

2. The method as defined in claim 1, including the step of processing said plurality of entered range images to form a three-dimensional point cloud set which three-dimensional point cloud set is used to form a unified data set representing at least a portion of the surface of the animal.

3. The method as defined in claim 2, including the further step, of using the data processing device and the three-dimensional data set for determining at least a portion of the volume of the animal.

4. The method as defined in claim 2, including the further step of, using the data processing device and the three-dimensional data set for determining the hip width of the animal.

5. The method as defined in claim 2, including the further step of, using the data processing device and the three-dimensional data set for determining a cross-sectional area of the animal at a selected location.

6. The method as defined in claim 2, including the further step of, using the data processing device and the three-dimensional data set for determining at least a portion of the surface area of the animal.

7. The method as defined in claim 2, including the further step of, using the data processing device and the three-dimensional data set for determining the length of at least a portion of the animal.

8. The method as defined in claim 2, including the further step of, using the data processing device and the three-dimensional data set, for determining the frame size of the animal.

9. The method as defined in claim 2, including the further step of, using the data processing device and the three-dimensional data set for determining the thickness of the animal.

10. The method as defined in claim 2, in which the animal has a yield grade and in which the method includes the further step of, using the data processing device and the three-dimensional data set for determining the yield grade of the animal.

11. The method as defined in claim 2, in which the animal has a quality grade and in which the method includes the further step of, using the data processing device and the three-dimensional data set for determining the quality grade of the animal.

12. The method as defined in claim 11, including the further step of, using the data processing device and the three dimensional data set for determining the hip height of the animal.

13. The method as defined in claim 2 in which said apparatus further includes an infrared camera disposed proximate said upper portion of said target zone and in which said method comprises the further step of measuring the back fat of the animal.

14. The method as defined in claim 2 in which the apparatus used in accomplishing the method of the invention further includes weighing means for weighing the animal disposed at the bottom of the target zone, and in which said method includes the further steps of:
    (a) weighing the livestock animal using the weighing means to determine the weight of the animal; and
    (b) using the data processing means for acquiring the weight of the animal and then determining the number of remaining days the animal is to be fed.

15. The method as defined in claim 14 including the further step of using the date processing means for determining a feeding regimen for the animal.

16. A method for measuring the physical characteristics of an animal having first and second sides, a rear portion, and a back portion, said animal being positioned within a target zone having first and second sides, an upper portion, a rear portion and a bottom using an apparatus comprising an animal positioning device for defining the target zone, a first camera disposed on a selected one of said first and second sides of said target zone, a second camera disposed proximate a selected one of said upper portion of target zone and said rear portion of said target zone and data processing means operably associated with said cameras for processing data received from said cameras, said method comprising the steps of:
    (a) positioning the animal within the target zone;
    (b) using the first camera, obtaining range images of a selected one of the first and second sides of the animal;
    (c) using the second camera, obtaining range images of a selected one of the back portion and the rear portion of the animal; and
    (d) entering into the data processing means said range images to produce a plurality of entered range images and processing said plurality of entered range images to obtain a data set representing at least a portion of the surface of the animal.

17. The method as defined in claim 16, in which the apparatus includes a thermal camera disposed at a selected one of the upper portion of the target zone and the first side of the target zone, and in which the method comprises the additional steps of using the data processing means for determining the back fat of the animal.

18. The method as defined in claim 16, including the further step of using the data processing means to determine areas of localized injury to the animal.

19. The method as defined in claim 16, including the further step of using the data processing means to determine the general wellness of the animal.

* * * * *